US006000028A

United States Patent [19]
Chernoff et al.

[11] Patent Number: 6,000,028
[45] Date of Patent: Dec. 7, 1999

[54] MEANS AND APPARATUS FOR MAINTAINING CONDITION CODES IN AN UNEVALUATED STATE

[75] Inventors: Anton Chernoff, Harvard; John S. Yates, Needham, both of Mass.

[73] Assignee: Digital Equipment Corporation, Houston, Tex.

[21] Appl. No.: 08/593,286

[22] Filed: Jan. 29, 1996

[51] Int. Cl.$^6$ .................................................. G06F 9/45
[52] U.S. Cl. .......................................... 712/226; 712/234
[58] Field of Search .................................. 712/220, 226, 712/227, 234, 23, 41; 395/705, 500.01; 707/101, 103, 104, 4

[56] References Cited

U.S. PATENT DOCUMENTS

| | | | |
|---|---|---|---|
| 4,914,581 | 4/1990 | Talgam et al. | 340/146.2 |
| 5,287,490 | 2/1994 | Sites | 395/500 |
| 5,301,325 | 4/1994 | Benson | 395/707 |
| 5,307,492 | 4/1994 | Benson | 395/707 |
| 5,307,504 | 4/1994 | Robinson et al. | 395/800.41 |
| 5,317,740 | 5/1994 | Sites | 395/704 |
| 5,339,238 | 8/1994 | Benson | 395/707 |
| 5,339,422 | 8/1994 | Brender et al. | 395/704 |
| 5,428,786 | 6/1995 | Sites | 395/709 |
| 5,432,795 | 7/1995 | Robinson | 395/704 |
| 5,450,575 | 9/1995 | Sites | 395/707 |
| 5,507,030 | 4/1996 | Sites | 395/704 |
| 5,551,015 | 8/1996 | Goettelmann et al. | 395/707 |
| 5,564,050 | 10/1996 | Barber et al. | 707/4 |
| 5,574,927 | 11/1996 | Scantlin | 395/800.41 |
| 5,598,560 | 1/1997 | Benson | 395/707 |

OTHER PUBLICATIONS

"Adaptive Systems for the Dynamic Run–Time Optimization of Programs", G. Hansen, Carnegie–Mellon University, Mar., 1974, pp. 1–171.

"Data Structures and Algorithms", A. Aho et al., Computer Science and Information Processing, pp. 110–117.

"Compiler Design Theory", P. Lewis, II et al., pp. 559–568.

"Method and Apparatus for Direct Conversion of Programs in Object Code Form Between Different Hardware Architecture Computer Systems", J. Goettelmann et al., pp. 3–37.

"Data Flow Analysis for 'Intractable' Imbedded System Software", H. Johnson, pp. 109–115.

"Efficiently Computing Static Single Assignment Form and the Control Dependence Graph", R. Cytron et al., ACM Transactions on Programming Language and Systems, vol. 13, No. 4, Oct., 1991, pp. 451–490.

"Compilers: Principles, Techniques and Tools", A. Aho et al., Computer Science, pp. 527–647.

U.S. application No. 07/667,071, filed Mar. 7, 1991.
U.S. application No. 07/666,028, filed Mar. 7, 1991.
U.S. application No. 07/666,072, filed Mar. 7, 1991.
U.S. application No. 08/580,686, filed Dec. 29, 1995.
U.S. application No. 07/665,888, filed Mar. 7, 1991.
U.S. application No. 07/666,039, filed Mar. 7, 1991.

"Binary Translation", Richard L. Sites et al., Digital Technical Journal, pp. 137–152.

*Primary Examiner*—Parshotam S. Lall
*Assistant Examiner*—Viet Vu

[57] ABSTRACT

A computer system for executing a binary image conversion system which converts instructions from a instruction set of a first, non native computer system to a second, different, native computer system, includes an run-time system which in response to a non-native image of an application program written for a non-native instruction set provides an native instruction or a native instruction routine. The run-time system collects profile data in response to execution of the native instructions to determine execution characteristics of the non-native instruction. Thereafter, the non-native instructions and the profile statistics are fed to a binary translator operating in a background mode and which is responsive to the profile data generated by the run-time system to form a translated native image. The run-time system and the binary translator are under the control of a server process. The non-native image is executed in two different enviroments with first portion executed as an interpreted image and remaining portions as a translated image. The run-time system includes an interpreter which is capable of handling condition codes corresponding to the non-native architecute.

18 Claims, 72 Drawing Sheets

101, GENERAL PURPOSE REG.

| |
|---|
| EAX, 104a |
| EBX, 104b |
| ECX, 104c |
| EDX, 104d |
| EDI, 104e |
| ESI, 104f |
| EBP, 104g |
| ESP, 104h |
| CONTEXT, 105 |
| FSP, 106 |
| CCR, 107a |
| CCS, 107b |
| CCD, 107c |
| SHADOW, 108 |
| SEGOFF, 109 |
| T0, 110a |
| T1, 110b |
| T2, 110c |
| T3, 110d |
| NXTEIP, 118a |
| NXTQ_LO, 118b |
| NXTQ_HI, 118c |
| NXTJMP, 118d |
| Q0, 118e |
| Q1, 118f |
| QUAD, 120 |
| FRAME, 112 |
| ERA, 114 |
| EA, 116 |
| UNUSED, 117 |
| UNUSED, 117 |

FIG. 8

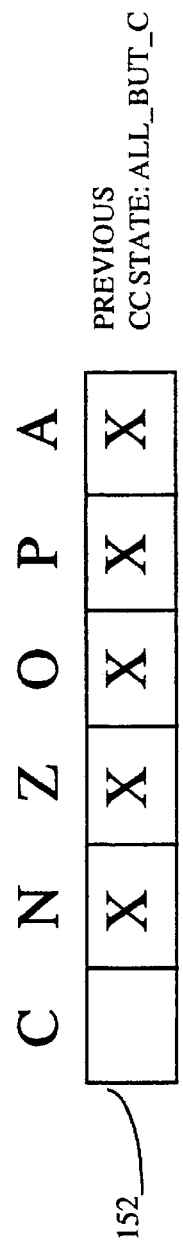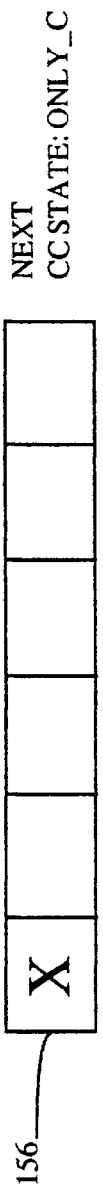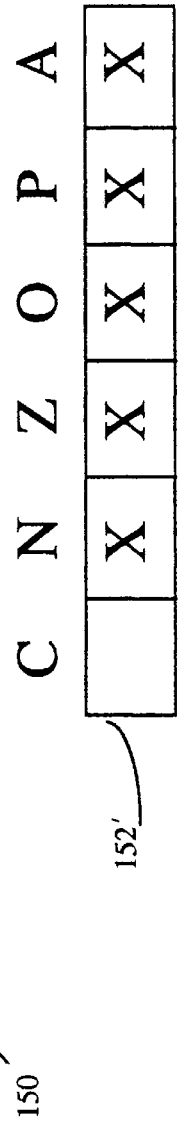
FIG. 16
FIG. 17

355  ARCH B:

;   First ARCH B instruction for jacket or passthru

;   ... n bytes of ARCH B code

352  From - Table:

353  INSTX

354  ARCH A:

;   First ARCH A instruction for jacket or passthru

;   ARCH A code

680, IR OPCODE TABLE

| OPCODE, 682 | OPERAND COUNT, 683 | OP 1, 684 | OP 2, 685 | OP 3, 686 |
|---|---|---|---|---|
| ⋮ | ⋮ | ⋮ | ⋮ | ⋮ |
| ADD, 682a | 3, 683a | READ 684a | READ, 685a | WRITE, 686a |
| ⋮ | ⋮ | ⋮ | ⋮ | ⋮ |
| INC, 682b | 1, 683b | READ_MOD WRITE, 684b | 685b | 686b |
| ⋮ | ⋮ | ⋮ | ⋮ | ⋮ |

FIG. 49

| READ, 708 |
|---|
| WRITE, 710 |
| READ_WRITE, 712 |
| READ_MODIFY_WRITE 714 |
| NO_ACCESS, 716 |

672, BBSC SUMMARY INFORMATION

FIG. 51

32-bit register EAX

Code Patterns

| Bit Mask Value | Last instruction | Replacement Instruction |
|---|---|---|
| Z-bit | BEQ | FBEQ <Reg> |
| Z-bit | BNE | FBNE <Reg> |
| N-bit | BEQ | FBLT <Reg> |
| N-bit | BNE | FBGE <Reg> |

MEANS AND APPARATUS FOR MAINTAINING CONDITION CODES IN AN UNEVALUATED STATE

BACKGROUND OF THE INVENTION

This invention relates generally to computer systems and more particularly to execution of computer programs on non-native computer system architecture.

As is known in the art, computer systems which generally include a central processing unit, a main memory, and input-output device interconnected by a system bus are used to execute computer programs to perform some useful task. One type of computer program is an operating system which is used to interface the central processing unit to an application program. The aforementioned application program is a program used by a user of the computer system to perform the useful task. The operating system includes all of the software resources needed by the computer system to interface each of the hardware elements, to the computer system as well as to interface the application program to other programs on the computer system.

The application programs can include programs such as spreadsheets, word processors, electronic mail, etc. The application program executes on the computer system under the control of the operating system. The operating system often includes routines or libraries which the application program uses in order to complete its execution.

It is generally known that application programs are written for a particular computer architecture or computer instruction set as well as a particular operating system. Computer architectures are varied, but common architectures include the so-called Alpha® architecture by Digital Equipment Corporation's assignee of the present invention, the so-called X86 architecture which is based upon the family of X86 microprocessors designed and built by Intel Corp., as well as others such as the Power PC® architecture designed and built by Motorola, IBM and Apple. Other architectures include the VAX® architecture by Digital Equipment Corporation and the PA-RISC® architecture by Hewlett Packard.

Generally, programs written for one architecture are also written for a particular operating system which is supported on the architecture. Thus, for the aforementioned Alpha architecture, the architecture supports the Windows NT® operating system by Microsoft Corporation, the Open VMS® operating system by Digital Equipment Corporation, and the UNIX operating system by Digital Equipment Corporation as well as others. Generally application programs written for one architecture and a particular operating system can not directly execute on a different architecture and/or different operating system. New computer architectures are developed in order to provide significant performance improvements for the hardware associated with the architecture. For example, the so-called Alpha® architecture based upon the 64 bit Alpha microprocessor is a RISC type architecture (Reduced Instruction Set Computer). Presently, versions of the Alpha microprocessor operate at clock speed of 300 MHz. On such an architecture, an application program executes much faster with higher performance and thus provides to a user significant performance advantages.

One drawback to a new architecture, however, is that often application programs written for older architectures can not run directly on the new architecture. This occurs because the instruction sets of the new architecture and the old architecture are different and since different instructions are used in each architecture, the programs are not directly transferable.

While it is desirable for a user to migrate to a new higher performance architecture, one of the most significant drawbacks for a user to migrate to a new architecture is the user's pre-existing investment in software applications as well as data files resulting from application programs run on the old architecture. That is, an architecture which has been in existence for a number of years and used by a large number of users will represent a substantial cumulative financial investment. If that investment is not transferable to a new architecture users will be highly reluctant to migrate to the new architecture.

There are several approaches which have been developed over the years to assist users to migrate from an old architecture to a new architecture. One approach is the so-called "porting approach". With the porting approach a software vendor agrees with the owner of the architecture to take its source code for a particular application program and run the source code through a compiler developed for the new architecture and to perform some sort of checking such as a quality assurance check at the end of the compilation. Thus, with porting the source code of application is converted into an executable image which can run on the new architecture. Porting is a viable solution for many applications. In particular applications involved in the so-called enterprise computing field are excellent candidates for porting since the nature of the program and the nature of the customer are such that there is an expectation of a high level of support from the software vendor as well as from the owner of the architecture.

Another technique commonly employed is so-called "on-line interpretation". In on-line interpretation, a software module called an "interpreter" interprets instructions from the application program written in the non-native instruction set and converts those instructions into instructions or routines which execute on the new architecture. The interpreter thus tests the instructions to determine the resources needed by the instruction and analyzes the instruction to determine the function of the instruction. From this testing the interpreter maps the instruction to a routine that performs the same function only written in instructions executable on the new architecture. After the routine is identified the routine is executed in the computer system to provide the equivalent function called for in the application program written in the non-native instruction set.

A third technique commonly used is a so-called "static translator". In static translator, a software program called a translator receives an instruction in the old architecture, and for each instruction, provides an instruction sequence in the new architecture to accomplish what the original instruction does in the old architecture.

When interpretation or translation is employed to enable a user to execute a non-native application program on a new architecture, the goal is to accurately (transparently?) emulate the architecture for which the application program was initially written so that the user is not aware of any differences between executing the application on the new architecture and executing the application on the architecture it was originally written to execute. Accurate emulation can be difficult to achieve however, when the original architecture relies on a feature of the original architecture not present in the new architecture. An example of such a feature is the condition codes maintained on an X86 machine.

Condition codes are maintained on an X86 machine to provide knowledge of the machine state in the subject architecture to the computer system. Currently, X86 machines utilize six condition codes. These codes are Carry (C), Negative (N), Zero (Z), Overflow (O), Parity (P), and a low nibble carry (A). These condition code bits are modified as a result of the execution of a certain instructions within the X86 instruction set. Subsequent instructions may query the condition code bits to use ore or more of them as input to the instruction, an operand, or one or more of the bits may be used as the basis of a conditional branch.

The instructions that modify the condition codes on an X86 machine fall into five categories which designate which condition code bits are modified as a result of the execution of the individual instructions. In the first category all condition code bits are modified (ALL). The second category of instructions modify all but the Carry bit (ALL_BUT_C). The third category of instructions modify only the Carry bit (ONLY_C) while the fourth category modifies only the Zero bit (ONLY_Z). The final category of instructions modify only the Carry and Overflow bits (C_AND_O). As an application program has no control over the manipulation of the condition codes, i.e. cannot turn off the setting of the bits, to accurately emulate the X86 environment, the emulating environment should also maintain condition codes.

A simplistic approach to emulating condition codes is to maintain, in memory or within the registers of the new architecture, a set of bits which would be used to emulate the X86 condition codes. These bits would be appropriately modified upon execution of each condition code modifying opcode just as the condition codes bits within the X86 architecture are modified.

One problem encountered by this approach however, is that computing the values of the condition codes is computationally intensive. As a result, execution of the application program on the new architecture could appear noticeably slower to the user than it would be on the original architecture.

In addition, condition codes are not necessarily used each time they are altered. That is, execution of a subsequent condition code modifying opcode may overwrite the modifications to the condition codes made by a previous opcode before a subsequent instruction is executed which uses one or more of the condition codes. In a system updating the condition codes after each opcode is executed, a considerable amount of CPU time is wasted which, if avoided, could speed up the execution time of the application program. Moreover, as some instructions only modify a subset of the condition codes it would be an additional waste of CPU time to recompute the current state of each of the condition code bits after each opcode is executed.

SUMMARY OF THE INVENTION

In accordance with the present invention, a method is provided for maintaining a plurality of condition codes bits in an unevaluated state. The method includes the step of storing, in response to an execution of a condition code modifying instruction, a first table of methods, the methods providing access to evaluation routines which, when executed, modify one or all of the plurality of condition code bits and the step of providing a first pointer to the first table of methods. With such an arrangement, the execution speed of an application program is minimally effected due to the maintenance of condition codes.

In accordance with a further aspect of the invention, the method also includes the step of providing a second table of methods, which correspond to a previously executed condition code modifying instruction, the methods providing access to evaluation routines which, when executed, modify one or all of said plurality of condition code bits and the step of providing a second pointer to said second table of methods. With such an arrangement, needless evaluations of the condition codes are avoided as condition code modifications made by condition code modifying instructions which are never consumed by subsequent condition code modifying instructions are not evaluated thus saving CPU processing time.

BRIEF DESCRIPTION OF THE DRAWINGS

The foregoing features and other aspects of the invention will now become apparent when the accompanying description is read in conjunction with the following drawings in which:

FIG. 8 is block diagram of a register file in the computer system of FIG. 1 showing assignment of registers corresponding to the non-native architecture;

FIGS. 16, 17 and 18 are a series of diagrams useful in understanding how condition codes are handled in the run-time system of FIG. 3;

FIG. 49 is a block diagram of an opcode table;

FIG. 51 is a block diagram which depicts the BBSC summary information field of FIG. 48;

DESCRIPTION OF THE PREFERRED EMBODIMENTS

COMPUTER SYSTEM

Figure 1:
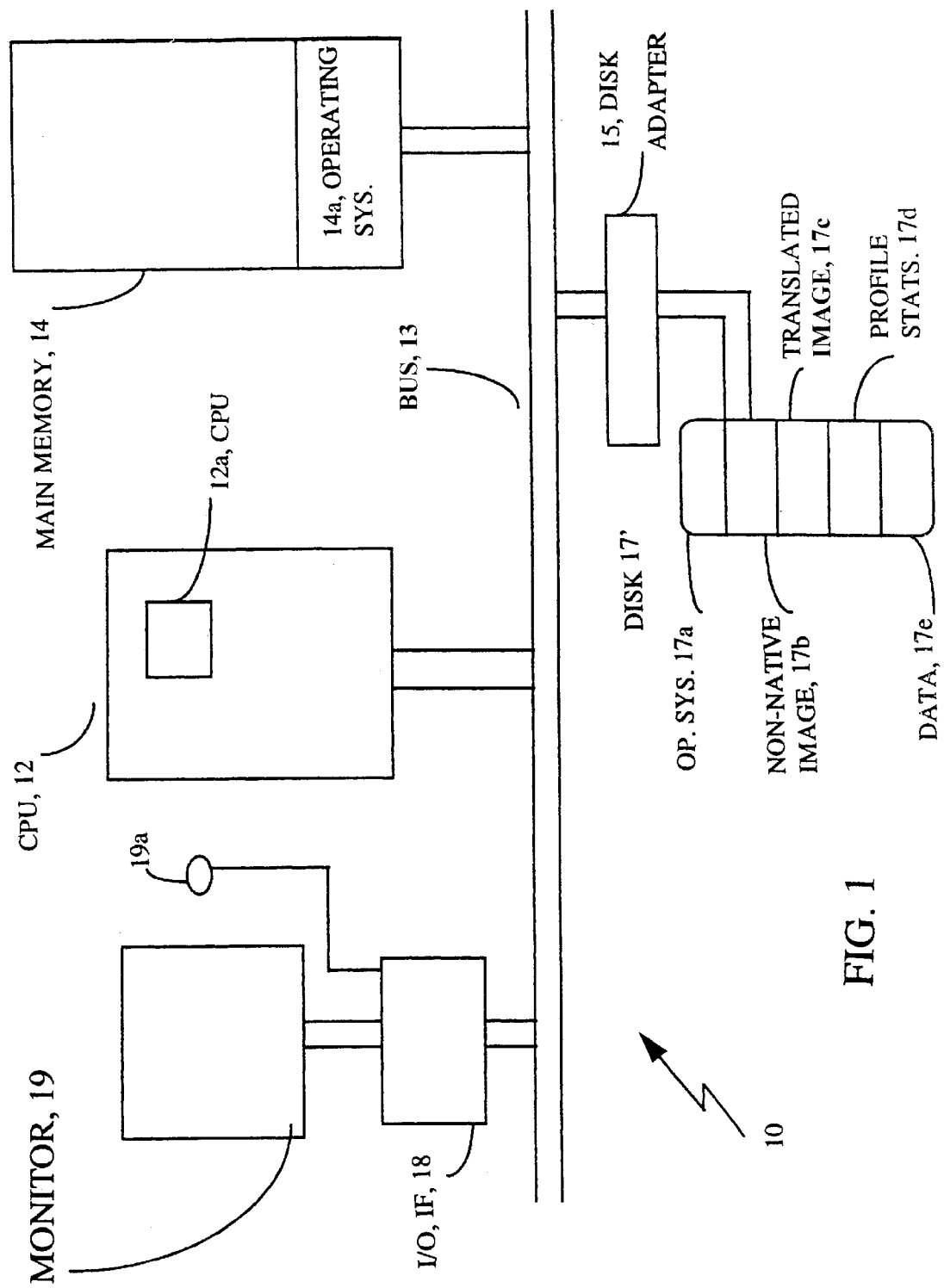
FIG. 1 is a block diagram of a computer system.

Referring now to FIG. 1, a computer system 10, is shown to include a processor module 12 which has a high performance processor 12a. The computer system 10 further includes, in addition to the processor module 12, a main memory 14, an disk adaptor 15 and an I/O user interface 18, as well as a monitor 19 all coupled by a system bus 20, as shown. Here the processor 12a is a high performance microprocessor such as an Alpha® microprocessor manufactured by Digital Equipment Corporation, assignee of the present invention, or other high performance processor.

The main memory 14 is comprised of dynamic random access memory and is used to store instructions and data for use by the microprocessor 12a on the processor module 12. The disk adaptor 15 is used to couple the system bus 20 to a disk bus which itself is coupled to disk storage device 17.

The disk storage device 17 is here illustratively partitioned into a plurality of segments or blocks of data which are here represented for convenience as being self-contained and contiguous, but which may be scattered across the disk 17 and be non-contiguous. The disk 17 includes a first storage segment 17a storing an operating system for the computer system 10 as well as an application program stored in segment 17b.

The application program stored in segment 17b is a non-native executable image. That is, the application program is comprised of instructions from a different instruction set than that used in the computer system 10 (i.e. a different computer architecture). Also the application program could have been written for a different operating system than that stored in 17a. Since the instructions provided in the program stored in segment 17b are different from the instruction set executed on the microprocessor 12a the program in segment 17b can not be directly executed on the system 10.

The disk also includes a storage segment 17c which here represents an native executable image of the application program stored in segment 17b. This native image is generated in the computer system via a binary image conversion system (16, FIG. 2) which is here stored with the operating system in the segment 17a as will be described. The image stored in segment 17c corresponds to instructions which can be executed on the microprocessor 12a and thus conforms to the architecture of the computer system 10.

Also stored in a segment 17d are profile statistics which are collected during execution of a portion of the non-native application program stored in 17b. The profile statistics are provided by execution of a run-time routine which converts non-native instructions into native instructions. These profile statistics are used in a background process to convert portions of the non-native image into a native image corresponding to the operation and function of those portions of the non-native application program. In addition, data which are used for the particular application program are also stored on the disk in segment 17e.

The computer system 10 further includes an I/O user interface 18 which is here an interface used to couple a mouse 19a, for example, to the system bus 20 as well as a monitor 19.

The computer system 10 operates in a generally conventional manner. That is, at "power on", selected portions (not numbered) of the operating system stored in segment 17a are loaded into main memory 14 and occupy a particular address space in main memory 14, such as, address space 14a. As a user of the computer system 10 executes application programs on the system 10, the application programs are run under the control of the operating system.

A typical operating system represented by that stored in 17a is the so-called Windows NT® operating system of Microsoft Corporation Redmond, Washington. In Windows NT® or other window type operating systems, displayable images called "icons" are presented to a user on the monitor 19. These icons represent an executable command to initiate execution of a program. When pointed to by a cursor controlled by a mouse, for example, and clicked on this user action activates the command and causes the represented computer program to execute.

Here, however, the application program stored in segment 17b is written in a non native instruction set. That is, the instruction set of the application program is not the same as the instruction set of the computer system 10. Thus, the executable image of the application program stored in segment 17b is comprised of non-native instructions which can not be directly executed on the computer system 10. Nevertheless, the non-native application has a corresponding icon (not shown) which is represented in the window provided by the operating system.

Each non-native application image has a unique identification name (ID) or image key. The identification name or image key is included in the non-native image file and is a unique identifier for the non-native application image. During installation of the file containing the image, typically a server process portion of the operating system determines the unique ID or key to the non-native application image. The ID number is generally assigned by concatenating together unique information of the file. Examples of the types of information include, the time stamp of the file, the file name, the file size and the date that the file was originally produced. Thus, the same non-native image if loaded a multiplicity of times on the computer system will have the same I.D. number. The statistics as well as the translated code associated with each one of the non-native images will be the union of all prior executions of the non-native images for each instance of the non-native application. Other arrangements are of course possible.

When the user clicks on the icon for the program stored in 17b, a portion of the operating system recognizes the ID of the executable image represented by that icon as being comprised of instructions that are non-native to the instruction set and architecture of computer system 10. In general a software module called a loader in the operating system will recognize that the identification name (ID) of the file represented by the selected icon as being non-native to the architecture. Thus, the operating system initiates the execution of an instruction conversion program 16 or feeds the file instruction by an instruction to an instruction pre-processor. Alternatively, a loader can be provided which handles the non-native image by examining the image to determine all files, libraries and resources needed by the image. The loader will thus prepare the non-native image for execution. Part of the preparation is the initiation of the instruction conversion program 16 or alternatively instruction pre-processor, as will now be described.

BINARY IMAGE CONVERSION SYSTEM

Figure 2:
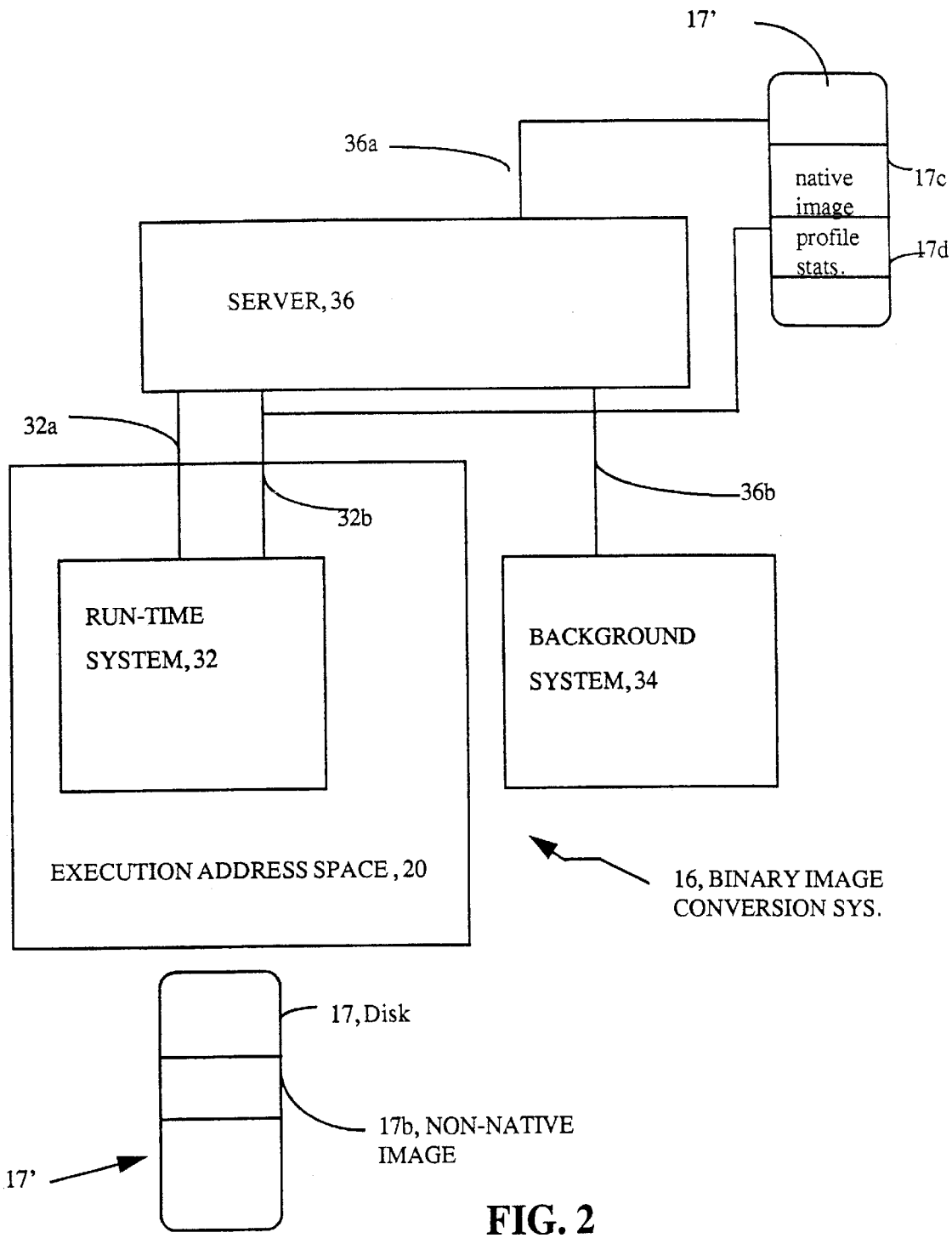
FIG. 2 is a block diagram of a dual stage instruction conversion system including a run-time system and a background system.

Referring now to FIG. 2, the binary image conversion system 16 is shown to include a run-time system 32 which is responsive to instructions provided from the disk segment 17b. As mentioned, the run-time system 32 can be implemented as software to emulate the non-native architecture or as a hardware preprocessor to convert the non-native instructions into native instructions. When implemented as software, the run time system 32 consumes more disk space on disk 17 and occupies more main memory storage in main memory 14. Whereas, when implemented in hardware, the run time system 32 requires more chip space in the high performance microprocessor 12a. Here the run-time system will be described as a software implementation which operates in an execution address space 20 of the computer system 10.

As mentioned above, disk segment 17b stores instructions of an application program complied and/or written for an instruction set which is different from the instruction set of system 10. The run-time system 32 receives portions of a non-native executable image from segment 17b comprised of the non-native instructions. The run-time system 32 provides a native instruction or a native instruction routine comprised of a plurality of instructions which are executed by the computer system 10 to provide the same functionality as the non-native image. That is, the functionality called for in the instruction in the executable image of the non-native instruction set is equivalently provided by the routines determined by the run-time system 32. The run-time system executes the equivalent routines on the computer system 10. This provides the equivalent function to provide the same result in computer system 10 which implements the new architecture as would occur in a new or old computer system (not shown) implementing the non-native architecture.

In a preferred embodiment of the run time system 32, the run-time system 32 examines and tests the code from the segment 17b to determine what resources are used by the instruction and the function of the instruction. The run-time system 32 provides the equivalent instructions corresponding to the architecture of the computer system 10.

As the equivalent instructions are determined they are executed in the system 10 and profile data or statistics, as will be described, are collected in response to their execution. The profile statistics describe various execution characteristics of the instruction sequence. These profile data are fed to a server process 36 via a datapath 32b.

Prior to performing a conversion by the run time system 32, the run-time system 32 interrogates the server process 36 via a path 32a to determine from the server process whether there is a native image corresponding to the routine of the application program stored in segment 17b whose execution has just been requested by a user. If a native image does not exist (as would occur the first time the non-native image is executed), the run-time system initiates an interpretation process. If there is code in existence for the particular instruction reached in the application program, due to a prior execution in the run-time system and subsequent conversion by a background system, the run-time system 32 will request and execute the native code.

As mentioned, in general, the first time the application program 17b is executed by a user there will be no native image code in existence. As the program executes, however, native code will be generated by the background process in a manner to be described, and over time as substantial portions of the non-native image are executed, convertible portions of the non-native image will be converted by the background process into native image code. As native image code is generated, it is also stored in segment 17c in a manner that is transparent to the user.

In addition the native image file 17c contains an address correlation table which is used to track the segments of native code corresponding to segments of non-native code. This table is used at run time of the program in segment 17b to determine whether and which non-native segments have equivalent translated native segments.

Translation into the native image is provided via a background system 34 which operates in one embodiment after the interpreter has finished execution of the instructions to provide translated code dependant upon the execution characteristics of the run-time converted instructions. Alternatively, the background system operates while there is a pause in CPU utilization by the run-time system 32. Alternatively, the background system can make translated code available to the run-time system 32 during execution to permit substitution of translated code for a subsequent occurrence of the non-native image during the current execution of the application program. Further still, the run-time system can be implemented as a preprocessor which provides the profile statistics for use by the background process. The background process can be implemented in hardware or software or a combination of both.

The background system 34 receives the profile data generated by the run-time system 32. In accordance with the characteristics of the profile data, the background system 34 forms a native image of at least portions of the instructions of the non-native image stored in segment 17b of disk 17. A preferred arrangement is to have the background system implemented as a binary translator to produce translated code. The native image portions are stored in logical disk drive 17' for use if needed in subsequent executions of the application program from segment 17b. Here it should be understood that the logical disk drive 17' is a logical partition of the disk drive 17 and is here referred to as being a logical disk drive, because in general, it is transparent to the user, but it physically represents space storage such as segment 17c on the actual disk drive 17. Alternatively, the logical disk drive 17 could be a separate disk drive.

The run-time system 32 and the background system are each under the control of the server process 36. The server process 36 is present throughout the operation of the computer system 10. The server process 36 is a software service process which, amongst other things, is used to schedule various transactions within and between the run-time 32 and background systems 34.

After generation of native image code such as by the binary translator, the image translated code is stored on logical disk drive 17' in logical segment 17c' with the profile statistics being stored in logical segment 17d'. These locations correspond to segments 17c and 17d in FIG. 2.

Each time there is a new execution of the application program stored in segment 17b, the run-time system will send a request to the server process 36 for native code corresponding to the non-native code currently in the run-time system 32. The translated code is code which was generated by a previous execution of the background system 34 in accordance with the profile statistics collected by execution of the routines furnished by the run-time system 32. The server process 36 supplies corresponding translated code (if any) to the run-time system 32. If there is translated code, the run-time system 32 will have the translated code execute in place of interpreting the code. Otherwise if there is no translated code, the run-time system 32 will interpret, translate, or otherwise convert the relevant portions of the non-native code currently executed in the computer system 10.

As more code of the program stored in segment 17b is executed, more sections of the program are interpreted producing as a result of the execution, profile statistics which are fed to the server process 36.

The server process 36 controls inter alia the storage of the profile statistics. That is, the server process 36 will merge new (raw) statistics with previously stored merged statistics to provide a new merged profile. The server process will compare the new merged profile with the stored merger profile and will initiate a translation process in the background system 34 when there is a difference between the two statistics. The degree of difference needed to initiate execution is selectable. Such a difference indicates that heretofore never executed code was interpreted and executed in the run-time system. This process will be ongoing until all portions of the non-native image have been encountered by the user and all of the portions which can be translated by the background system 34 have been translated.

The server process also determines the unique key or I.D. number to uniquely identify the non-native image stored in segment 17b. As mentioned above, the attributes of the image comprising the I.D. include the file size, the date of creation of the image, the time stamp and so forth. This key is also used to identify the profile statistics with the non-native program.

The background system 34 will, in general, translate nearly all instructions provided from the non-native applications stored in 17b. Certain types of instructions are preferably not translated. In general those instructions which are not translated are ones in which the execution of the instruction is not predictable. For example, instructions which are self modifying (i.e. are not in read only sections, that is, are on a writtable page) will not be translated. For these instructions the run-time system will execute them via the interpretation routines. Further, instructions for which in the non-native architecture there is no easily produced analog in the native architecture will not be translated. For example, in the X86 architecture of Intel, floating point instructions use a floating point control register to determine inter. alia. rounding modes etc. Although for many executions of the instructions the contents of the register may be in a normal state, this can not be guaranteed. Rather than have the translator determine the state it is more economical to handle these instructions in the interpreter.

Since execution or profile statistics in part determines what code is translated by the background translator non-instruction code is not mistaken for instructions by the translator. Therefore, the translated code can be optimized without fear of optimizing non-instructions.

Figure 3:
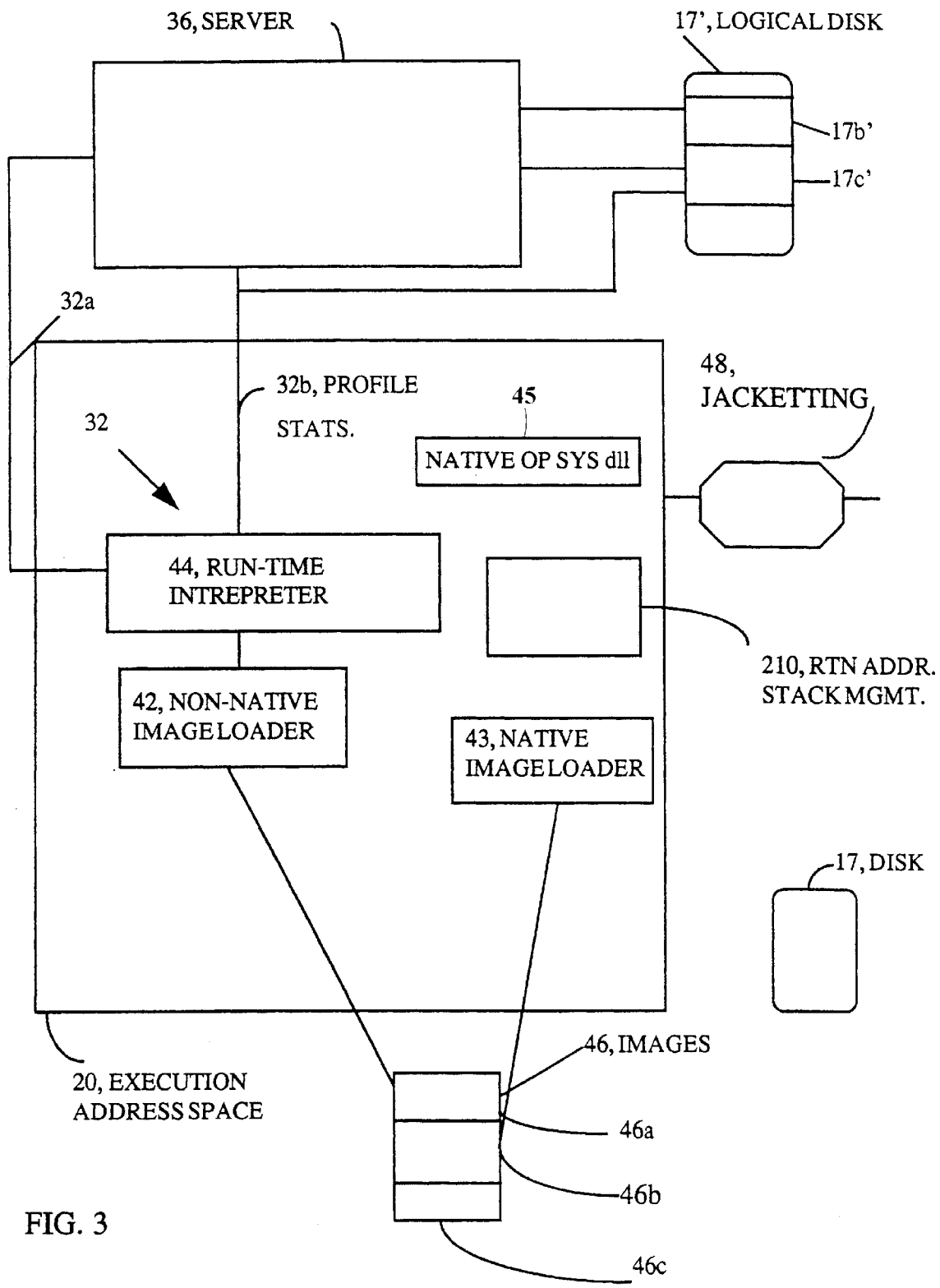
FIG. 3 is a block diagram of the run-time system portion of the instruction conversion system of FIG. 2.
Figure 22:
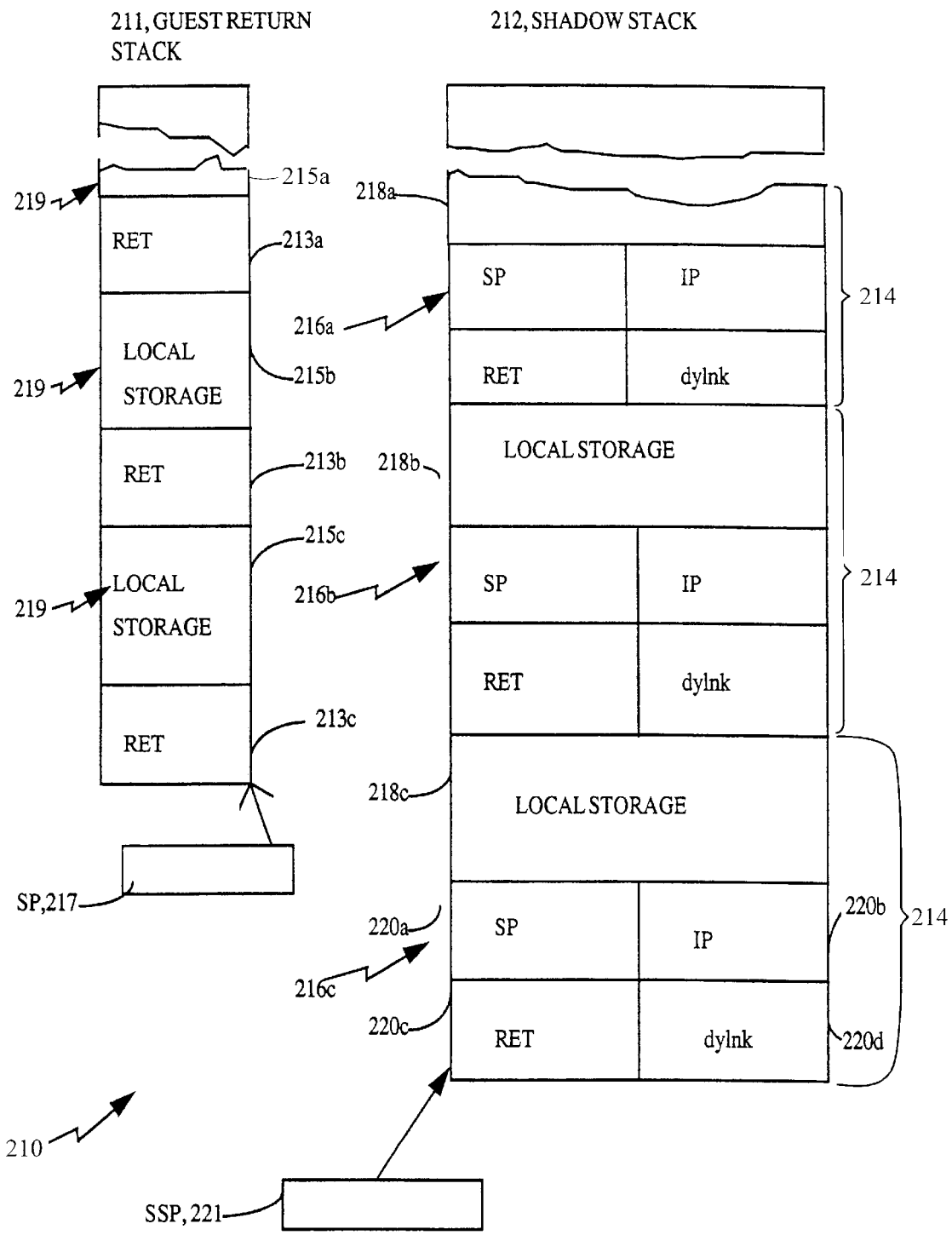
FIG. 22 is a block diagram of a pair of data structures stored in memory which represents a return address stack for a non-native image of a program as well as shadow stack for a native image of the program.

Referring now to FIG. 3, the run-time system 32 is shown to include an execution address space containing run-time system 32 which includes a run-time interpreter 44, a non-native loader 42 which is fed the ID corresponding to the non-native application image provided from segment 17b of the disk 17, a native image loader 43, native operating system dll's (dynamic link libraries) 45 and a return address stack management arrangement 20 (FIG. 22). The non-native loader 42 is similar to the native image loader 43 except it is capable of handling non-native images and interrogates the server process to determine whether there is any native code corresponding to the non-native code awaiting execution. The non-native loader 42 receives instructions corresponding to a non-native image of the application segment 46a and a native image of the application 46b corresponding to translated instructions provided from the background translator 34, and segment 46c corresponding to data. The non-native loader 42 is used to initially load the non-native file. The native loader 43 is used to initially load the native file if any.

Figure 3A:
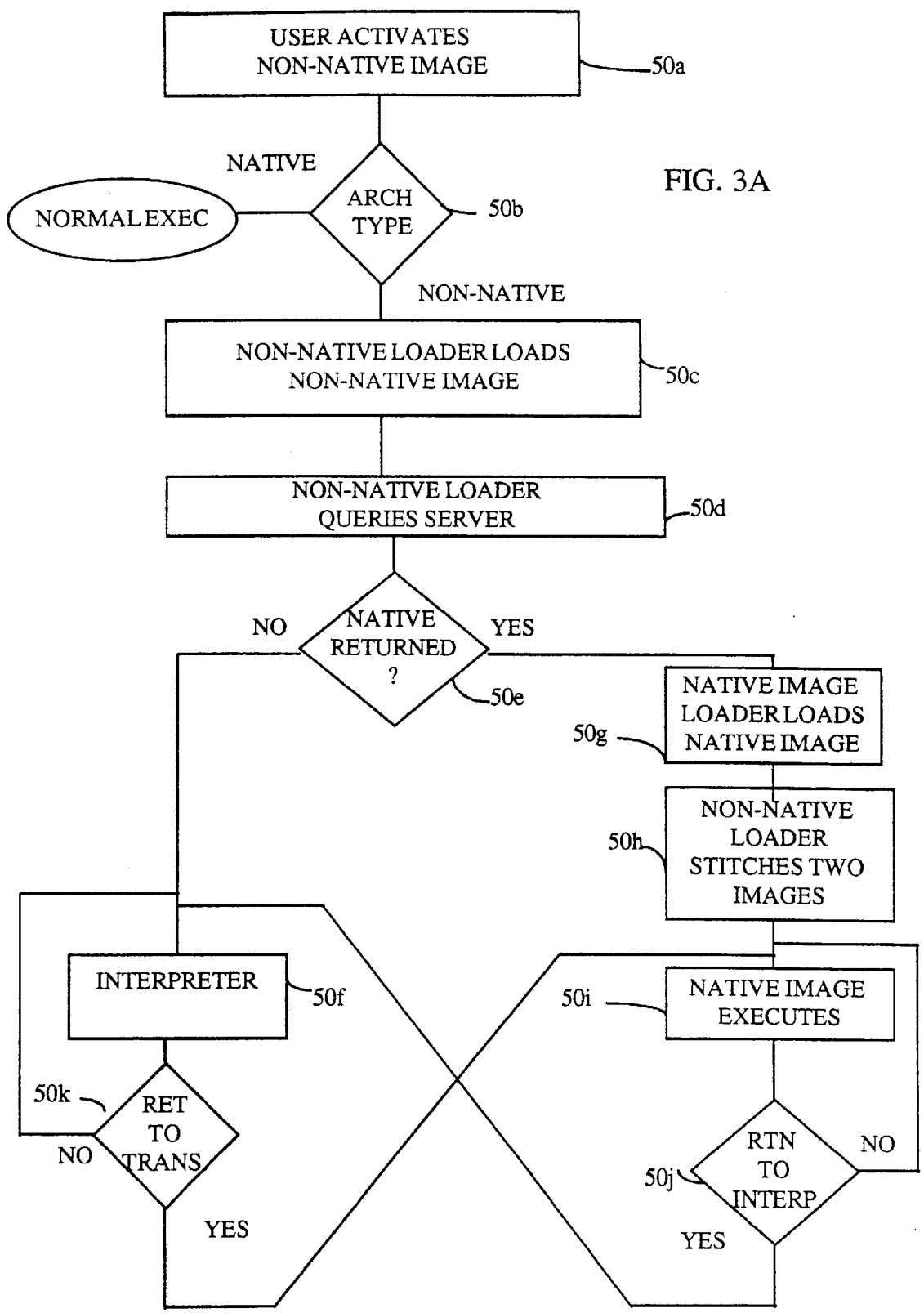
FIG. 3A is a flow chart depicting the steps performed at run-time to execute a non-native image on the system of FIG. 1.

Referring now also to FIG. 3A, at the initiation of an execution of the program stored in segment 17b, (via selection of the appropriate icon) (step 50a) the native loader 43 determines whether an architecture number associated with the non-native image is a native or a non-native image. If the image is a native image execution continues as normal. If however the image is a non-native image, the native loader 43 calls the non-native loader 42 at step 50b. The non-native loader 42 loads the non-native image at step 50c and also recognizes that this architecture number associated with the program represents an application program written for a non-native instruction set. The non-native loader starts the binary image conversion system 16. The non-native loader 42 initially queries the server 36 at step 50d to respond with native code to accelerate execution of the image represented by the code stored in 17b. It should be appreciated that the function of the native loader 43 and the non-native loader 42 can be combined into a single loader.

If this is the first time running the application, the server 36 responds at step 50e by indicating that there is no corresponding native image to execute in place of the non-native image. Therefore, the non-native loader 42 instructs the interpreter 44 to begin an interpretation at step 50f of the instructions from the non-native image. The interpreter 44, for each instruction, determines the length or number of bytes comprising the instruction, identifies the opcode portion of the instruction, and determines the resources needed by the instruction. The interpreter maps the non-native instruction to a native instruction or a native sequence of instructions based upon inter alia the opcode. These instructions are executed by the computer system 10 in the address space 20 (FIG. 3). The run-time interpreter 44 collects data resulting from the execution of the instructions as will be described in conjunction with FIG. 6. These "profile statistics" are stored by the server 36 on the logical disk drive 17'.

The run-time interpreter 44 examines and analyzes the instructions to determine the proper native instruction sequence to replace for the non-native instructions provided from the executable image 46a. These native instructions as they are executed continue to generate profile statistics which are collected and stored in logical disk drive storage 17c'. This process continues until execution of the program 17b is terminated by the user.

After termination of the execution of the non-native program, a background process 34 is initiated (not shown). Alternatively, the background process 34 could be initiated to steal execution cycles from the run-time process 32 or alternatively could be used to substitute into the run-time process translated native image code for routines which are subsequently called during execution of the program 17b, as explained above. The exact sequence of which the background processor is used in conjunction with the run-time processor is an implementation detail.

For subsequent executions of the program the interpreter 44 will only provide interpreter code if the server process 36 does not return a native image equivalent of the sequence which is provided from the background process 34 as will be described.

Thus, if at step 50e the server responds with native code, the native image loader 42 at step 50g loads the native code. After the native image code is loaded, the non-native image loader 42 is called at step 50h to fix up the image. In general the non-native image will provide address tables corresponding to inter alia variables in the non-native image which are needed in the execution of the native image. That is, at step 50h the native and non-native images are stitched together to enable the native image to use information in the non-native image. At step 50i the native code is executed. In general, the native code that is executed corresponds to one or more basic blocks or routines of instruction which terminate by a return statement. After execution, a determination is made based upon characteristics of the return instruction execution and by use of a shadow stack as will be described, whether native image code can continue to be executed. If not then control is transferred to the interpreter. The interpreter continues to interpret and execute until it determines as at step 50k that it can resume using native code.

As also shown in FIG. 3, a jacketing routine 48 is used to jacket functions leaving the execution address space 20 to the native execution space of the computer process of computer system 10 as well as those arising from the native execution space of the computer processor 10 into the execution address space 20 as will be further described in conjunction with FIGS. 27–40.

Figure 4:
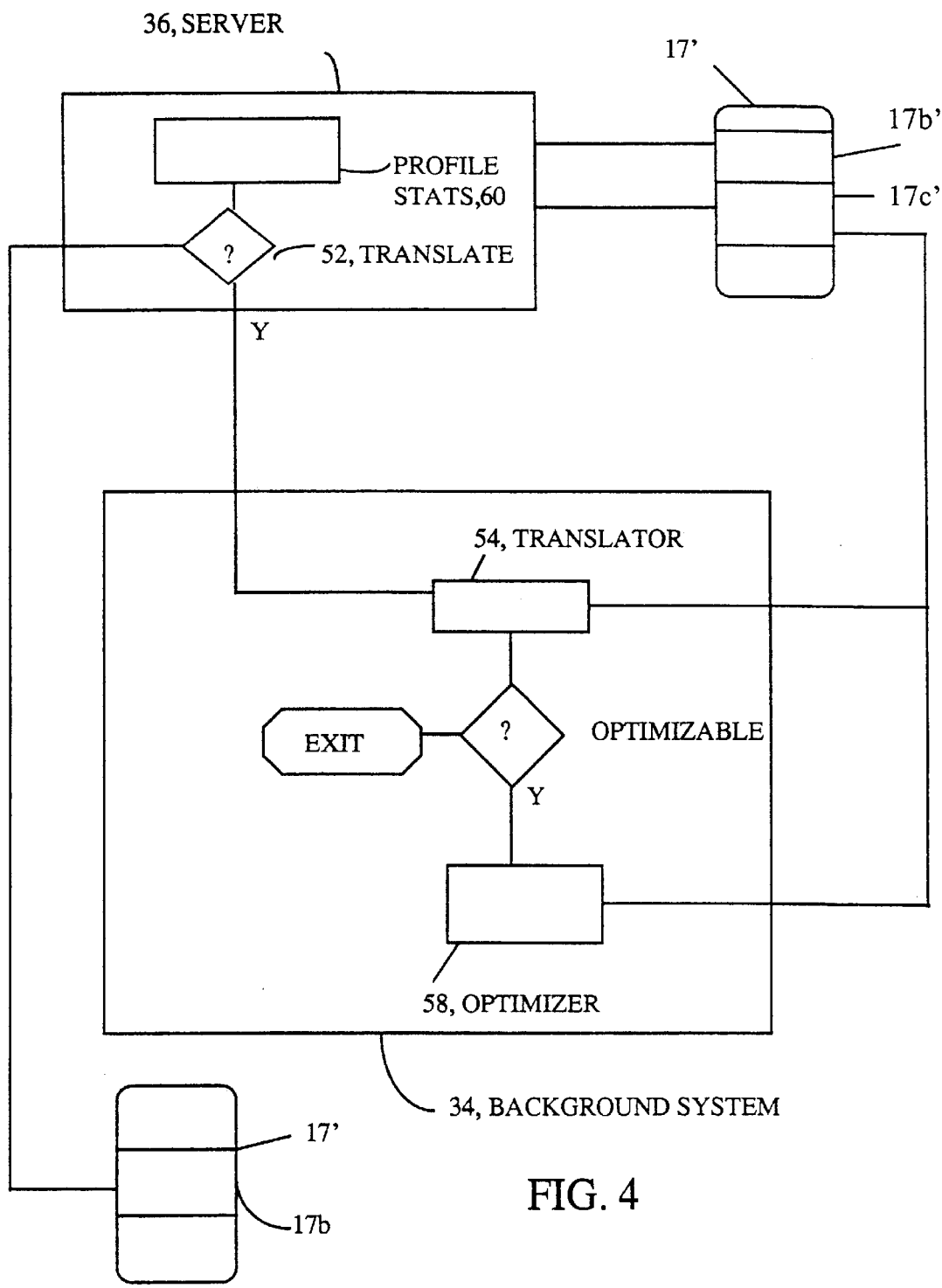
FIG. 4 is a more detailed block diagram of a binary translator used in the background system portion of the conversion system of FIG. 2.

Referring now to FIG. 4, a preferred embodiment of the background system 34 is shown under the control of the server 36 (FIG.1). The server 36 determines, responsive to the profile statistics data provided from the server 36, via logical disk drive 17', whether to initiate a translation process in the background. Preferably, the background system 34 translates only portions of the non-native instructions of the application program which were actually executed (via the interpreter 32) in responsive to a session invoking the program.

The non-native image code is examined at 52 in the server and if the code is the type that should be translated, it is fed to the translator 54. In a preferred environment, the translated code 54 is also fed to an optimizer 58, and again, if the type of code is of a type which can be optimized, it is fed through to the optimizer 58 or else, the process exits or terminates to await the submission of new code from executed portions of the non-native image stored at 17b. Other, techniques for performing translation and translation/optimization will be described. After the translator process 54 and/or the optimization processor 58, either translated code is stored in segment 17b' or optimized translated code is stored in segment 17b'.

PROFILE FILE DATA STRUCTURE

Figure 5:
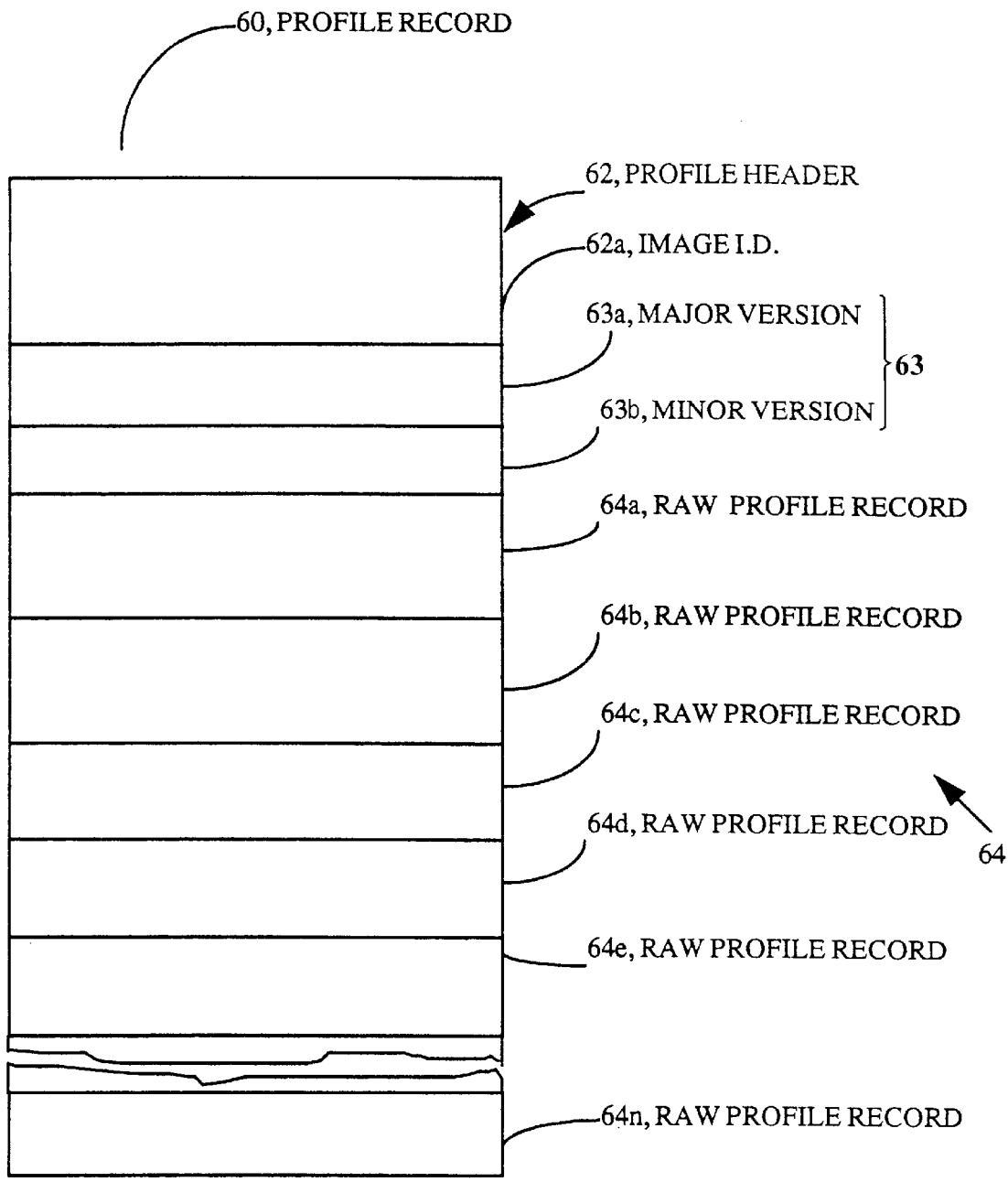
FIG. 5 is block diagram of a data structure representing a profile record structure.

Referring now to FIG. 5, a profile file data structure 60 used to store information gathered at execution time by instructions in the interpreter 34 is shown. The data structure 60 has records which contain information about the execution of a non-native architecture program when the program executes control transfer instructions. The profile record can include other information. That is, the profile records contain information about a target address encountered in the non-native image.

The data structure 60 is shown to include two principal sections. The first section is a profile header section 62 which comprises an image key field 62a. The image key field 62a is used to store information regarding the ID or identification of the profile record. The information in this field 62a is used to associate the profile statistics with a corresponding non-native image and its associated translated code, if any. Thus, the image key field 62a corresponds to the image ID or key field as mentioned above. The profile header 62 also includes a version field 62b comprised of a major version field 62b' and a minor version field 62b". The major version field 62b' and minor version field 62b" are each here 16 bit or 2 bytes in length and their union provides a resulting 32 bit version field 62b. The version fields are used to keep track of which version of the interpreter was used to generate the profile statistics in the table and the profile file format.

The profile file 60 also includes a plurality of raw profile records, here $64_a$–$64_n$. Each of the profile records $64_a$–$64_n$ maintains information about run-time execution of control transfer instructions in the non-native image. Each of these records are variable length records as is each of the unique profile files 60. Thus, for each control transfer encountered during execution of the non-native image in the interpreter 34 a raw profile record is produced. The interpreter 34 will place into the raw profile record information regarding the execution of the control transfer instruction. The information which is included in the raw profile record is as described below. Suffice it here to say, however, that the raw profile records are used by the server process to provide a profile record which is then used during translation of the associated routines in the background system.

Figure 6:
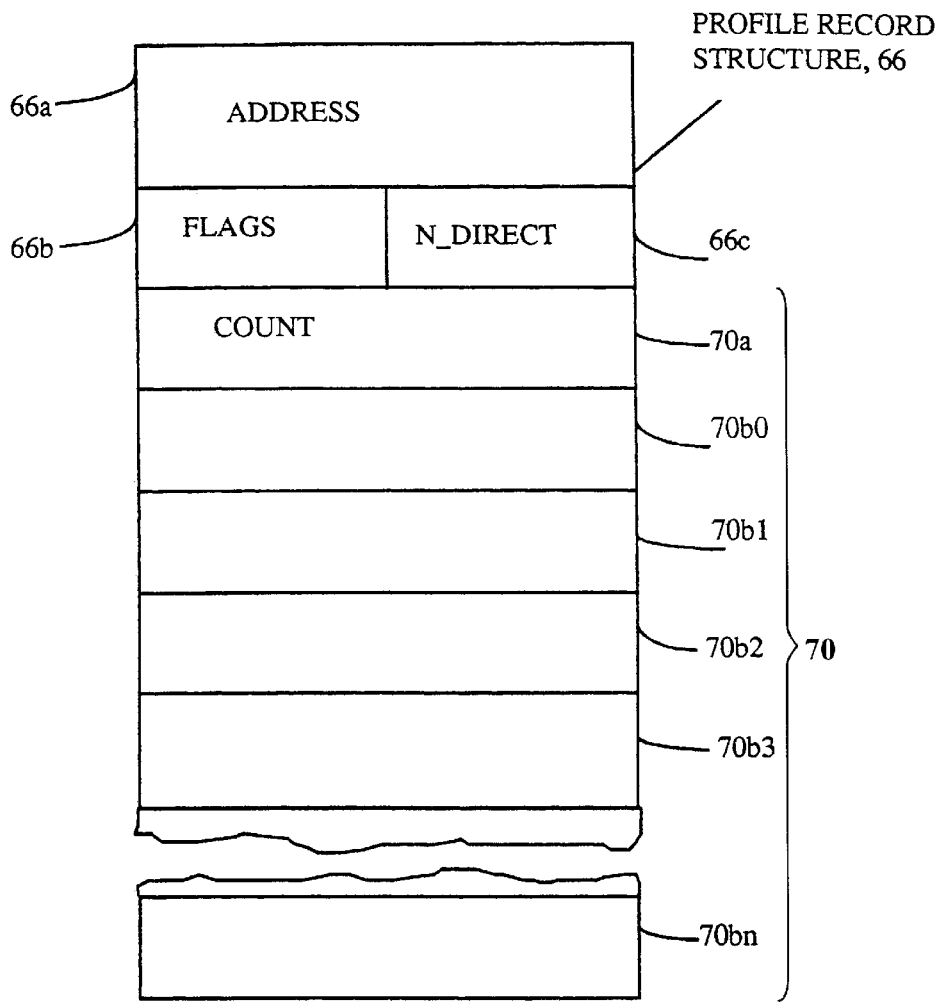
FIG. 6 is a block diagram of a representative profile record of the profile record structure of FIG. 5.

Referring now to FIG. 6, an exemplary one of the raw profile records here $64_n$ is shown. The raw profile record $64_n$ includes a profile record structure 66 including an address field 66a, a flag field 66b and a count field which tracks the number of indirect targets of control transfer 66c. The address field 66a contains the actual target address in the non-native image, as determined by the interpreter 44. This address is the actual target address of the instruction that caused a control transfer during execution of the non-native image. The address field 66a is generally the address length of the non-native architecture or here 32 bits or 4 bytes long. The flags field 66b contains the states of the flags at the target address. The flags field 66b is here 2 bytes or 16 bits long. The n_direct field 66c is a counter field which keeps track of the number of indirect target or computed target addresses contained in the remainder of the profile record $64_n$ as will be described below.

There are additional optional fields 70 which comprise the record. One field is a count field 70a which corresponds to either the number of times a control transfer occurred to the address contained in field 66a or a count branch taken field counter which keeps track of the number of times a branch was taken by the instruction corresponding to the address contained in field 66a. Fields $70b_0$–$70b_n$ correspond to addresses which are the targets of the control transfer and are cumulatively maintained in the profile record structure.

The optional fields 70 are used to keep track or maintain a count of the targets of the control transfer instruction in the image. The count field 70a is either a control transfer field count of the number of times control was transferred to the target address or a branch taken field corresponding to the count of the number of times a conditional control transfer of a branch instruction was taken. The type of field 70*a* is determined by the flags field 66*b* being "ANDED" or masked with a value which tests the state of the associated flag. This test determines whether the target address was a result of a control transfer instruction or a branch instruction. This optional field is also a long word.

The target of control transfer fields 70*b*$_1$–70*b*$_n$ are the target addresses of the control transfer which occurred at the control transfer instruction. These fields keep track of the addresses for indirect transfers, that is, transfers to a run-time computed target address.

The profile statistics are managed by the server process 36. The profile statistics are collected by the interpreter 44 during the course of execution of the emulated code. For each execution the server 36 searches for a profile record corresponding the target address. The server 36 merges the new run-time statistics with the existing statistics to produce a new profile file.

The server 36 makes use of a software cache and hash table (not shown) to keep track of the profile records. For an address which needs to be looked up, the address is looked up in the cache in 4 different locations that is by using a four way associative cache (not shown). If the address is not there it is looked up in a conventional hash table. The information in the hash table is the count values for the fields.

RUN-TIME INTERPRETER

Details of an interpreter used to convert non-native instructions to native instructions and provide profile or run-time statistics will now be described. In particular the interpreter 44 interprets instructions of the so-called X86 architecture by Intel Corporation San Francisco, Calif.) into ALPHA instructions by Digital Equipment Corp. will be described.

Figure 7:
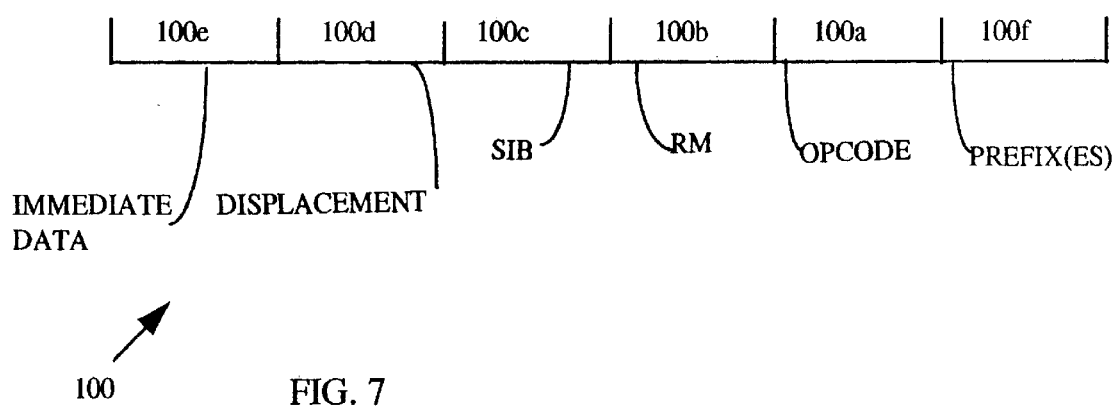
FIG. 7 a diagram showing a typical arrangement for a instruction for a complex instruction set computer (CISC)

Referring now to FIG. 7, an X86 instruction 100 is shown to include as many as six different fields. These fields are an opcode 100*a*, an rm byte 100*b*, a scaled index and base (sib) byte 100*c*, a displacement 100*d*, any immediate data 100*e*, and any one of six types of prefixes 100*f*.

The opcode 100*a* defines the task or operation which will be executed by the instruction 100. The rm byte 100*b* is an effective address specification and is used in conjunction with the opcode 100*a* to specify a general operand as a memory or register location and, in some cases, also participates in defining the operation. The sib byte 100*c* is used in conjunction with the rm byte 100*b* to provide additional flexibility in addressing memory locations. The displacement field 100*d* provides a displacement from the base register or from virtual zero of a segment. The immediate data field 100*e* provides immediate data to the opcode 100*a*.

The prefixes 100*f* are located before the opcode 100*a* in the instruction 100. Possible prefixes 100*f* are a segment override which implements a second (or multiple) addressing space, a repeat specifier value to repeat a specific instruction n times, a lock assertion for synchronization in multiple CPU environments, an address size prefix which selects between 16 and 32 bit addressing, an operand size prefix which selects between 16 and 32 bit operands, and an opcode prefix which selects an alternative opcode set.

From the opcode 100*a* it can be determined whether an rm byte 100*b*, an unconditional displacement, or the immediate data field is provided in the instruction 100. It can be determined from the rm byte 100*b* whether a sib byte 100*c* and/or a conditional displacement field 100*d* is included in the instruction 100. As all fields are not required by each Intel instruction 100, Intel instructions are not of a fixed length, but rather are of varying lengths.

The run-time interpreter 44 (FIG. 3) is, in the preferred embodiment, implemented on a computer system 10 (FIG. 1) which conforms to the Alpha architecture. An Alpha architecture computer system operates using the Alpha instruction set which is comprised of fixed length instructions. The run-time interpreter 44 operates on a single Intel instruction at a time. For each Intel instruction a single Alpha instruction or multiple Alpha instructions forming a corresponding Alpha routine, is provided which is an operational equivalent to the Intel instruction.

To transparently emulate the execution of an Intel or other non-native instruction 100 the run-time interpreter 44 should be capable of emulating the operation of the Intel or non-native memory, registers, condition codes and a program counter which, on a 32 bit Intel machine is referred to as an extended instruction pointer, EIP. In this way, a result of the execution of the instruction 100 is recorded accurately.

The run-time interpreter 44 uses the same memory space for data while executing Alpha routines corresponding to Intel instructions as is used when executing native Alpha instructions. This is possible because the strict standards to which Win32 software applications adhere allow for differences in calling conventions but not in the representation of the data. The maintenance of the Intel registers, condition codes and EIP are discussed below.

Referring now to FIG. 8, a table 101 depicting Intel or non-native values assigned to the registers of computer system 10 is shown to include eight registers which are assigned to emulate the operation of the eight Intel integer registers, EAX 104*a*, EBX 104*b*, ECX 104*c*, EDX 104*d*, EDI 104*e*, ESI 104*f*, EBP 104*g*, and ESP 104*h*. A single register, CONTEXT 105, is assigned to serve as a pointer to the emulator state context maintained in memory which is used to manage each thread executing in a multitasking environment. An additional register, FSP 106, stores a floating point stack pointer for addressing an eight entry stack of floating operands.

Three registers, CCR 107*a*, CCS 107*b*, and CCD 107*c* are assigned to store information which allow condition code bits to be maintained in an unevaluated state by the run-time interpreter 44. The SHADOW 108 register provides a pointer to the shadow stack (as will be described) which maintains activation records for translated code. The SEG-OFF 109 register maintains an offset from address zero in the native architecture memory permitting the native architecture to emulate multiple addressing spaces which are possible in the Intel architecture and other non-native architectures. Four additional registers T0 110*a*, T1 110*b*, T2 110*c* and T3 110*d* are assigned as temporary registers.

The frame 112 register identifies the activation record at the most recent activation of the run-time interpreter 44. The Emulator's Return Address, ERA 114, register stores the return address when the run-time interpreter 44 calls a private sub-routine. The Effective Address, EA 116, register stores the result of evaluating an RM byte 100*b* and to specify a memory address to a memory access routine.

Seven of the remaining registers, NXTEIP 118*a*, NXTQ_LO 118*b*, NXTQ_HI 118*c*, NXTJMP 118*d*, Q0 118*e*, Q1 118*f* and QUAD 120 retain values which are used by the run-time interpreter 44 to identify a complete Intel instruction 100 from the instruction stream and to provide pipelining capabilities.

To identify an Intel instruction 100, the run-time interpreter 44 assembles an eight byte (64 bit) snapshot of the instruction stream beginning at the start of the current Intel instruction number. This quadword is retained in QUAD 120.

To assemble QUAD 120, the run-time interpreter 44 captures two quadwords of information from the instruction stream. The run-time interpreter 44 uses the address in the instruction stream identified by the next extended instruction pointer, NXTEIP 118a, as the starting address for the first quadword. NXTEIP 118a identifies a random byte in the instruction stream at which the next instruction to be executed begins. Here, computer system 10 (FIG. 1) requires a quadword aligned address for this initial capture. Accordingly, if NXTEIP 118a is not a quadword aligned address, the three low order bits are first zeroed thus forcing the capture to occur beginning at a quadword boundary. The quadword captured beginning at this quadword aligned address is stored in register Q0 118e. By executing the capture in this manner, the quadword stored in register Q0 118e will at least provide the low byte of the next instruction.

The second quadword capture occurs at an address identified by NXTEIP 118a incremented by seven bytes. Here again, computer system 10 requires a quadword aligned address for this second capture. If the address identified by NXTEIP 118a incremented by seven bytes is not quadword aligned, the run-time interpreter 44 forces the three low order bits to zero thus forcing the address to be quadword aligned. From this quadword aligned address, the capture is performed and the quadword is stored in register Q1 118f. Here, the quadword stored in register Q1 118f contains at least the high order byte of the quadword beginning at the next instruction as identified by NXTEIP 118a.

To extract the low order bytes of the quadword beginning at NXTEIP 118a, the run-time interpreter 44 executes an instruction which, using the three low bits of NXTEIP 118a, determines a byte in register Q0 118e which is identified by NXTEIP 118a, whether or not this byte is quadword aligned. The data in register Q0 118e is copied to register NXTQ_LO 118b and shifted right to locate the byte identified by NXTEIP 118a in the low order byte register NXTQ_LO 118b. The high order bytes of NXTQ_LO 118b which, after the shift, no longer contain valid information are zeroed.

The three low bits of the address identified by NXTEIP 118a incremented by seven bytes is used to determine the high order byte of the quadword beginning at NXTEIP 118a. Here, the data in register Q1 118f is copied to register NXTQ_HI 118c shifted left to locate the byte identified by NXTEIP 118a incremented by seven bytes in the high order byte of register NXTQ_HI 118c. Here, the low order bytes of NXTQ_HI 118c which no longer contain valid information as a result of the shift are zeroed. The result of ORing the contents of registers NXTQ_LO 118b and NXTQ_HI 118c is stored in QUAD 120.

Figure 9:
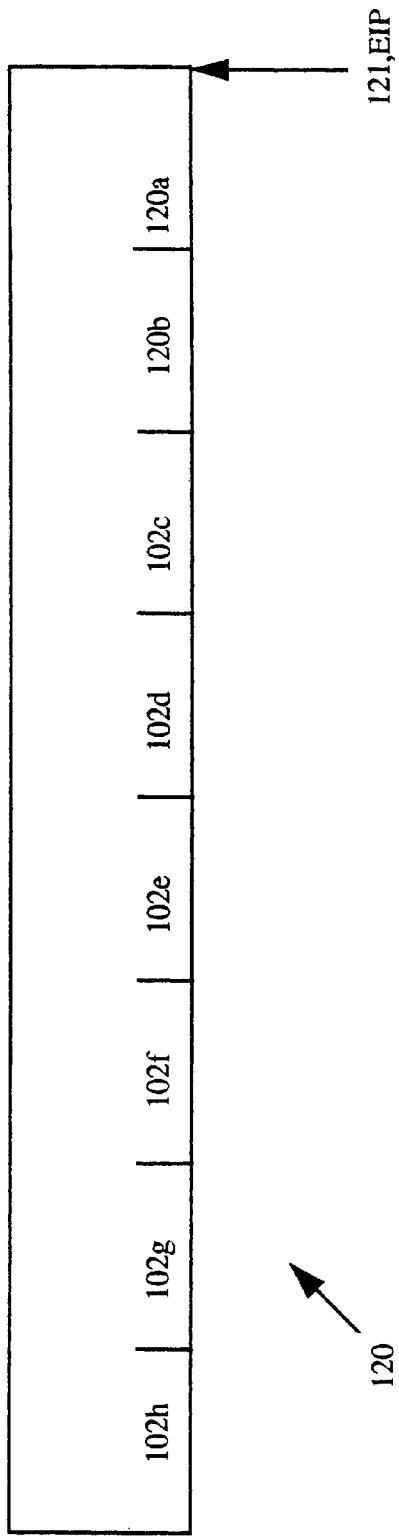
FIG. 9 is a diagram showing a typical construct for one of the registers in the register file of FIG. 8

Referring now to FIG. 9, the low bit of QUAD 120 is shown to be aligned with an Extended Instruction Pointer, EIP 121. In an Intel machine, the EIP 121 identifies a location in the instruction stream which corresponds to the beginning of the current instruction. As each instruction in the instruction stream is executed, the EIP 121 is incremented in the instruction stream to point to the beginning of the next instruction. QUAD 120, therefore, holds a quadword of information beginning at the byte identified by EIP 121.

To determine the operation of the Intel instruction 100 and a corresponding Alpha routine which performs the operational equivalent of the Intel instruction 100, the interpreter uses the information contained in QUAD 120. Typically, the first byte of an Intel instruction is the opcode 100a as shown in FIG. 7. The run-time interpreter 44 extracts the first and second low bytes 120a, 120b of QUAD 1002 to provide a two byte instruction fragment 122. From this two byte instruction fragment 122, a corresponding Alpha routine and the length of the instruction 100 are determined.

Figure 10:
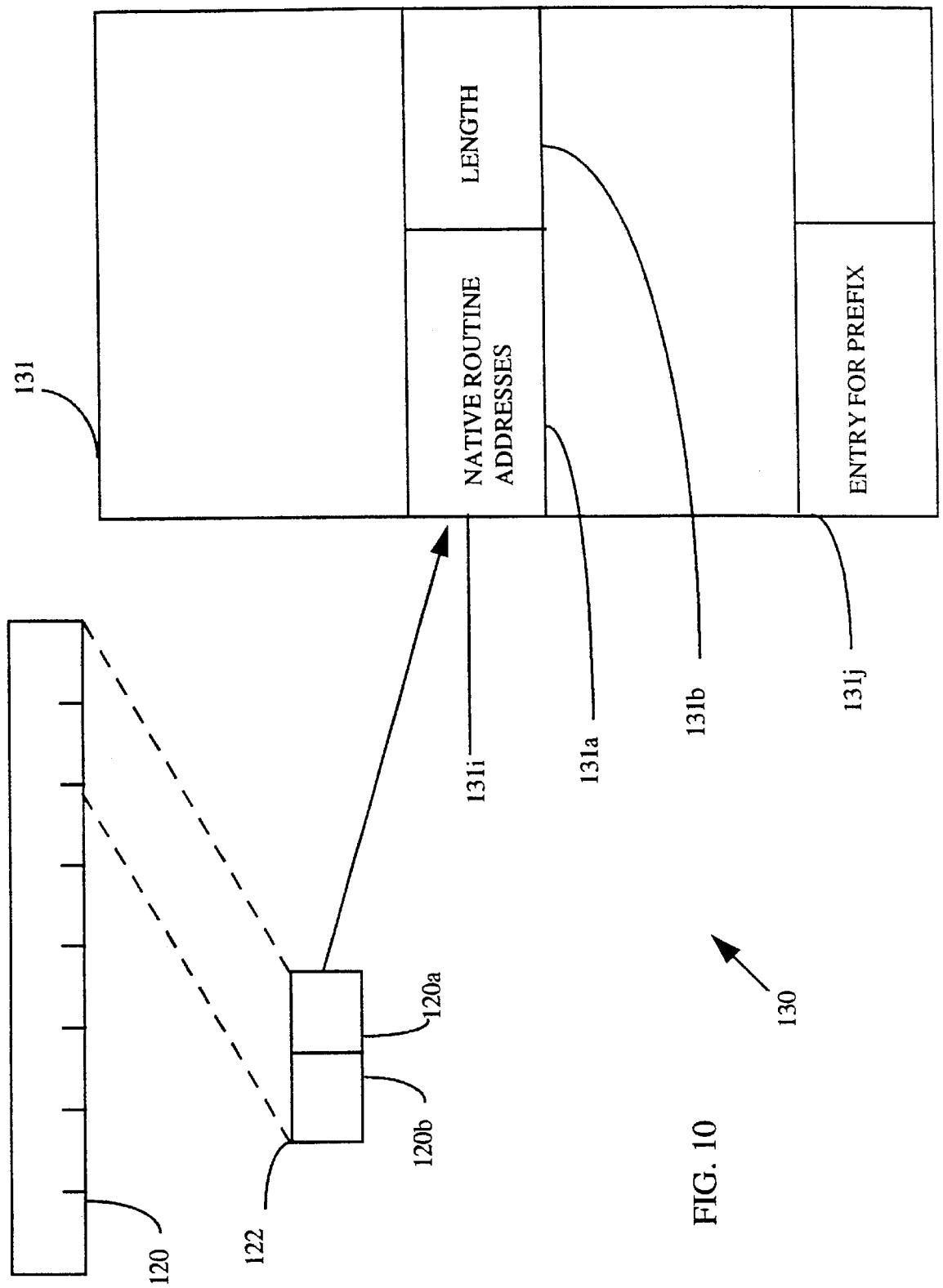
FIG. 10 is a pictorial representation of connections of various data structures including a dispatch table to determine an equivalent routine for the interpreter.

Referring now to FIG. 10, an arrangement 130 to determine the length of the Intel instruction 100 and the corresponding Alpha routine which implements the operational equivalent of the Intel instruction 100, is shown. The arrangement 130 extracts the two low bytes 120a, 120b from QUAD 120 to provide the two byte instruction fragment 122. This two byte instruction fragment 122 is used as an index into a dispatch table 131 which resides in system memory 14 (FIG. 1).

The dispatch table 131 includes $2^{16}$=64K (65536), 32 bit entries of which entry 131i is representative. Each entry corresponds to each instruction in a set of instructions available in the Intel instruction set. The contents of these 32 bit entries 131i include a field 131a containing an address at which the corresponding Alpha routine resides in system memory 14 as well as a field 131b containing the length of the instruction.

The dispatch table 131 is generated by a tool which identifies each instruction in the Intel instruction set such that the two byte instruction fragment 122 is sufficient information to identify the proper entry which corresponds to the current Intel instruction 100. The tool also provides the complete length of the Intel instruction 100 and includes this information in the dispatch table in the length field 131b along with the location of the Alpha routine which will provide the functional equivalent of the Intel instruction 100 in the address field 131a. The run-time interpreter 44 chooses among eight dispatch tables based upon the sequence of prefix elements 100f preceding the actual opcode 100a.

As discussed above in conjunction with FIG. 7, an Intel instruction 100 may be comprised of multiple elements 100a–100f. Multiple dispatch tables are provided by run-time interpreter 44 to handle the different values and combination of values which can be selected by the prefix element 100f. As discussed above, three possible prefixes 100f are addressing size (16 or 32 bits), operand size (16 or 32 bits) and two byte opcode, which selects an alternative opcode set. Any one or combination of these prefixes 100f may be present in an Intel instruction 100.

The addressing size prefix toggles between an addressing size for the Intel system which truncates address arithmetic to 16 bits or to 32 bits. Typically, the address size is 32 bits. The operand size prefix is similar wherein an operand expected by the system is 16 bits under a 16 bit operand size or 32 bits when the operand size is set for 32 bits. Here again, the typical operand size is 32 bits. The final prefix toggles between two alternative opcode sets. The first is a one byte opcode set and the second is a two byte opcode set. Here, a one byte opcode set is typically selected. A dispatch table similar to the dispatch table 131 in FIG. 10 is provided in system memory 14 for each of the eight possible combinations of prefixes 100f, the default dispatch table is dispatch table 131 having a 1 byte opcode with a 32 bit addressing size and a 32 bit operand size.

In addition to an entry for each instruction, also included in dispatch table 131 is an entry for each prefix 100f and prefix 100f combination. The 32 bit entry 131j, corresponding to a prefix 100f, activates a different dispatch table in memory 14 in which the subsequent opcode 100a in the instruction stream and its corresponding two byte instruction fragment 122 may be used to index the proper 32 bit entry 131i.

Figure 11:
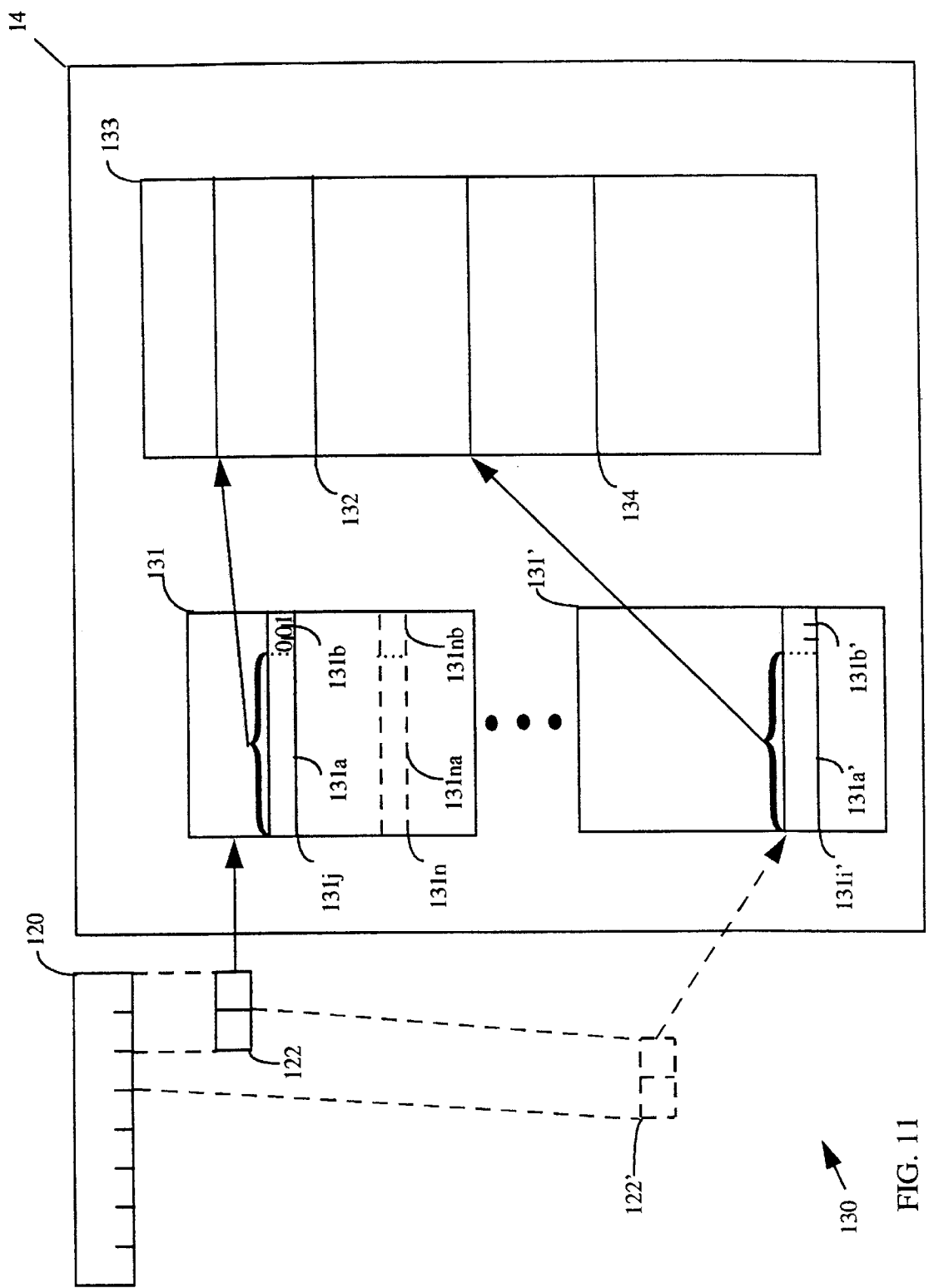
FIG. 11 is a pictorial representation of the process for activating an alternate dispatch table.

Referring now to FIG. 11, a process for activating an alternate dispatch table 131' is shown to include extracting a two byte instruction fragment 122 from QUAD 120. The two byte instruction fragment 122 is used as an index into the dispatch table 131.

Here, the two byte instruction fragment 122 identifies an entry in the dispatch table 131j. The dispatch table entry 131j includes a native routine address 131a in memory 14 and the length 131b of the Intel instruction 100 which here, is 001 or one byte. The first byte of the two byte instruction fragment 122 is a prefix 100f to instruction 100 which selects 16 bit addressing. Accordingly, the native routine 132 identified by the native routine address 131a, instructs the run-time interpreter 44 to activate the dispatch table 131' which corresponds to an instruction set implementing 16 bit addressing.

The length 131b of the Intel instruction 100 is provided to the run-time interpreter 44 which increments EIP 121 one byte in QUAD 120 to identify the beginning of the next instruction. A new two byte instruction fragment 122' is extracted from QUAD beginning at the new location identified by EIP 121. This two byte instruction fragment 122' identifies an entry 131i' in dispatch table 131'. Again, the two portions of the dispatch table entry 131i' identify the native routine address 131a' in memory 14 of the native routine 134 which is the operational equivalent of the Intel instruction 100 and the length 131b' of instruction 100.

The run-time interpreter 44 executes the native routine 134 which provides the operational equivalent of Intel instruction 100. Once complete, the on-line interpreter activates the default dispatch table 131 for 32 bit addressing and operands and one byte opcodes. While the run-time interpreter 44 is executing the native routine 134 for Intel instruction 100, the process just described allows the run-time interpreter 44 to identify the beginning of the subsequent instruction by incrementing EIP 121. In addition, the entry in the active dispatch table 131 which corresponds to the subsequent instruction is also identified. From this entry 131n, the address of the native routine 131na corresponding to the subsequent instruction as well as the length 131nb of the subsequent instruction are determined. This arrangement allows the on-line interpreter to operate in a pipelined fashion, executing multiple instructions in parallel.

Figure 12:
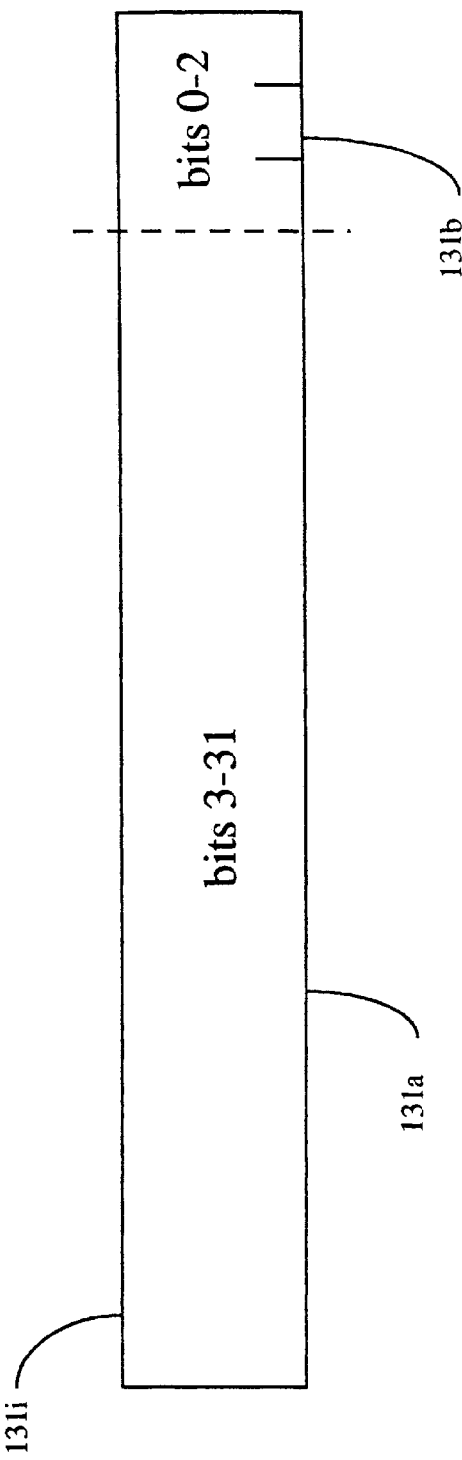
FIG. 12 is a diagram showing an arrangement of an entry from the dispatch table of FIG. 10.

Referring now to FIG. 12, a 32 bit entry 131i from dispatch table 131 is shown to be divided into two sections, the first section 131a corresponding to bits 3–31 of the 32 bit entry 1012 and the second section 131b corresponding to bits 0–2 of the 32 bit entry. Bits 3–31, section 131a are used to address the Alpha routines which execute the operational equivalent of the Intel instruction 100 and bits 0–2 131b signify the length of the Intel instruction 100.

The dispatch table targets are aligned on quadword boundaries. That is, the Alpha instructions which the entries in the dispatch table 131 point to and execute the operational equivalent of Intel instruction 100, are located in system memory 14 on quadword boundaries. In this way, bits 0–2 of the address of the Alpha instructions are always zero. As a result, bits 0–2 131b' may be used to convey additional information about the instruction as here, where these bits are used to signify the length of the instruction. As the addresses of the Alpha routines are always 000 in bits 0–2 field 131b', a full 32 bit address is recreated by appending these zeros to bits 3–31 1012a to provide a complete 32 bit address.

As control is passed to the Alpha routine identified by the 32 bit address, bits 0–2 are used to increment EIP 121 so that EIP 121 is pointing to the beginning of the next instruction. Here, if the length of the Intel instruction 100 is from 1–6 bytes in length, QUAD 120 contains sufficient information to form a second, two byte instruction fragment 122 which may be used to index the current dispatch table to determine the corresponding Alpha routine for the next Intel instruction. This arrangement allows the run-time interpreter 44 to pipeline instructions and thus execute the application program more quickly and efficiently. While an Alpha routine is being accessed corresponding to a current instruction, the run-time interpreter 44 is able to determine the address and length of the next Intel instruction 100 in the instruction stream. A value of zero returned from bits 0–2 field 131b of the 32 bit entry 131i for the length of the Intel instruction 100 however, indicates that the instruction was longer than 6 bytes and hence, pipelining is not possible for this Intel instruction and accordingly, the EIP 121 is not incremented. It is then the responsibility of the Alpha routine to increment EIP 121 and to refill the pipeline.

CONDITION CODE PROCESSING

Figure 13:
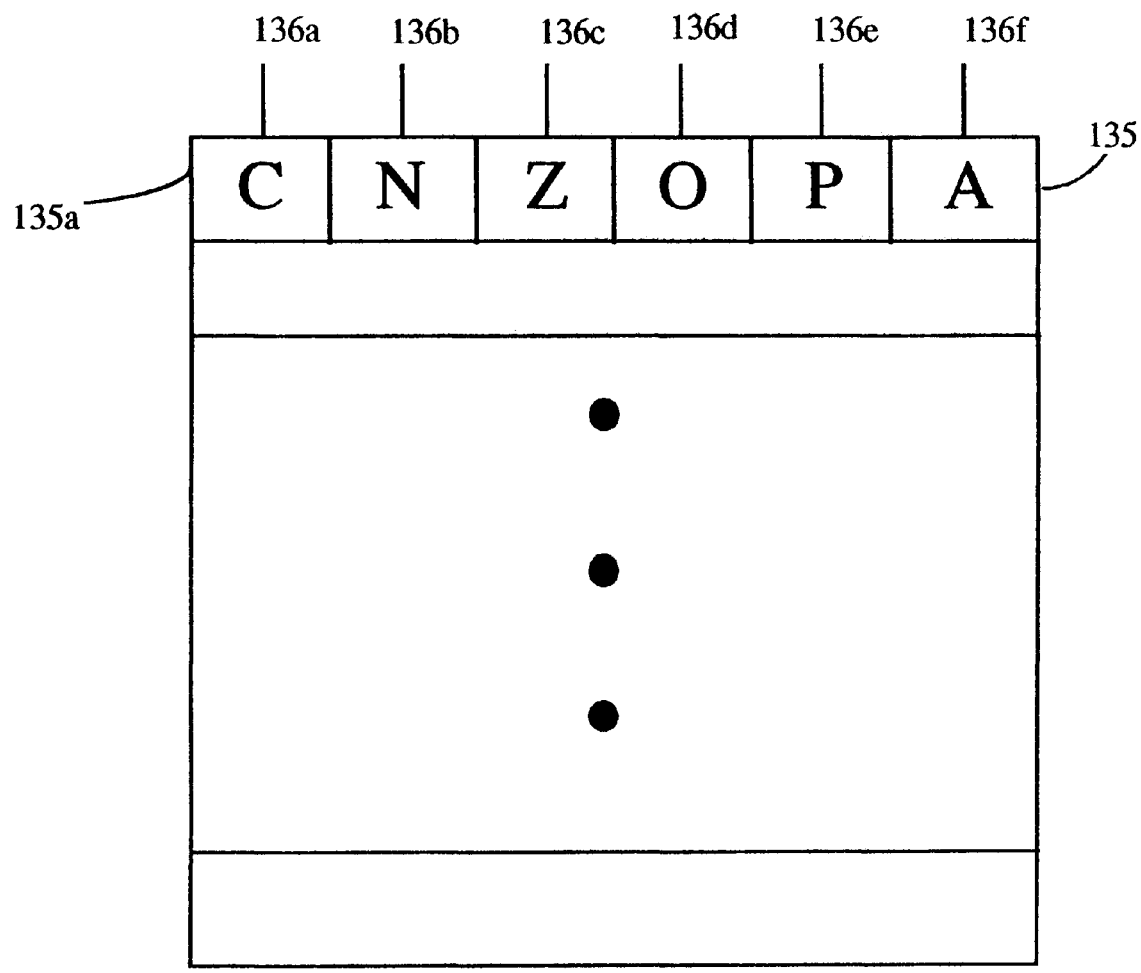
FIG. 13 is diagram showing a typical arrangement of condition codes of a CISC architecture which implements condition codes.

Referring now to FIG. 13, general purpose registers 135 of an Intel X86 machine are shown to include a single register, EFLAGS 135a, in which condition codes are maintained. This register, EFLAGS 135a, maintains the six condition code bits, the Carry bit 136a (C), the Negative bit 136b (N), the Zero bit 136c (Z), the Overflow bit 136d (O), the Parity bit 136e (P), and the Low Nibble Carry bit 136f (A). Each of these bits may be cleared or set as a result of the execution of an Intel instruction 100. To completely emulate the operation of the Intel application, the run-time interpreter 44 also maintains, in an unevaluated state, the current state of the condition codes resulting from the execution of an Alpha routine which corresponds to the Intel instruction 100.

As is often the case in systems which maintain condition codes, a subsequent condition code modifying instruction may be executed, thus overwriting the changes made to the condition code bits by a prior condition code modifying instruction, before the state of the condition codes is required by a subsequent instruction. In addition, many of the condition code modifying instructions effect only a partial set of the condition code bits. Accordingly, a complete evaluation of the condition code bits after execution of every condition code modifying instruction would be wasteful at CPU time. Nevertheless, the state of the condition code bits needs to be readily ascertainable throughout the execution of the X86 image should the current state of the condition codes be required.

Figure 14:
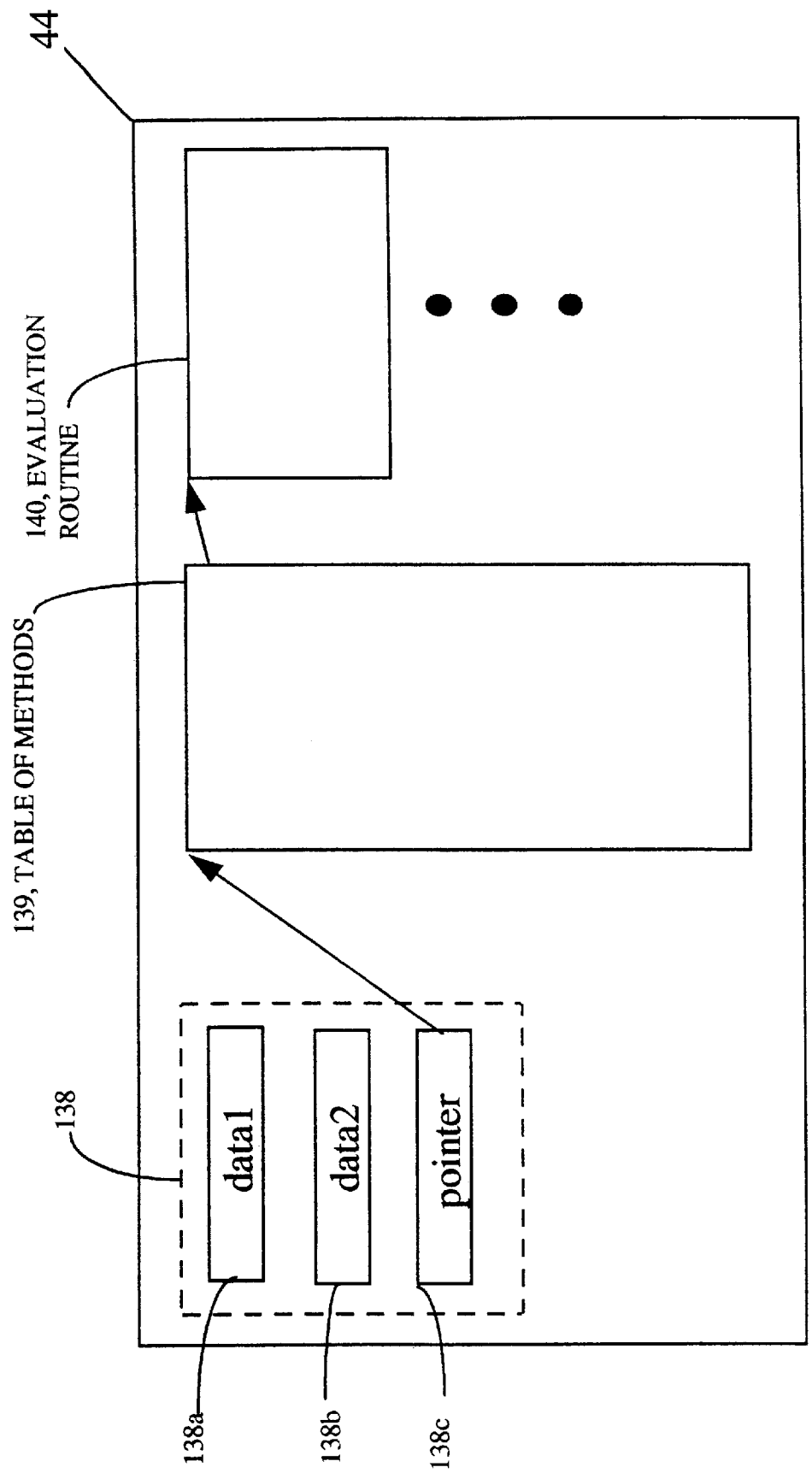
FIG. 14 is a block diagram of an arrangement to determine evaluation routines for condition codes.

Referring now to FIG. 14, the run-time interpreter 44 is shown to include a set of data storage locations 138, a table of methods 139, and evaluation routines 140 which are used to emulate the X86 condition codes during execution of an X86 image in computer system 10.

The set of data storage locations 138 is shown to include three locations 138a, 138b, 138c which are updated upon execution of an instruction which would have modified the condition codes in an X86 system. The first location, data1 138a, and the second location, data2 138b, store data used in the execution of the instruction, for example, an operand and a result of the instruction. This information is used later during execution of the application program should it become necessary to evaluate the condition codes.

The third location, pointer 138c, contains a pointer to the table of methods 139 which is a dispatch table used to evaluate the condition codes should the system require the current value of the condition codes. The table of methods 1022 contains an entry for each of the eight predicates available in X86 conditional branches (and equivalent SETcc instructions), an entry to obtain the nibble carry, A 136f, bit and an entry to obtain a complete image at the EFLAGS 135a register. The set of methods includes one for each of the six condition codes.

Each entry in the table of methods 139, identifies an evaluation routine 140 which evaluates the condition described in the method table entry. Data1 138a and data2 138b are provided to the evaluation routines to determine the state of the condition code bits should a subsequent instruction require the current state of the condition codes.

When an Alpha routine is executed for an Intel instruction which would have modified one or more of the condition codes, the run-time interpreter 44 stores zero to two pieces of information from the instruction in the first two storage locations, data1 138a and data2 138b. These pieces of information, possibly an operand and a result of the operation, are used by the evaluation routines to compute the condition codes. In the third storage location, pointer 138c, a pointer is placed which, in accordance with the type of instruction which was executed, identifies the entry in the table of methods 139 which will identify the evaluation routines 140 which are to be called if and when the condition codes are evaluated.

The table of methods 139 is specific to the type of instruction executed. That is, if the instruction modifies all of the condition codes, the table of methods includes an entry pointing to a routine for each of the six condition codes. If the instruction modifies only the C bit, the only entry in the table of methods 138 is a entry pointing to an evaluation routine which will evaluate the C bit. Other possibilities include instructions which modify all of the condition code bits except for the C bit (ALL_BUT_C) instructions which modify only the Z bit (ONLY_Z) and instructions which modify only the C and O bits (C_AND_O). The table of methods 139 for instructions of these types would include entries pointing to routines which correspond to all but the C bit, only the Z bit and only the C and O bits respectively.

Each entry in the table of methods 138 identifies a separate evaluation routine 140 which computes that specific condition code predicate or image of EFLAGS 135. Because these routines are only executed when necessary, the condition codes are maintained in an unevaluated state and accordingly, only minimally effect the execution speed of the application. Data1 138a and data2 138b are provided to the evaluation routine 1024 to determine the effect the instruction had, or should have had, on the condition codes. Later, when a subsequent instruction is encountered by the run-time interpreter 44 which requires the current value of one or all of the condition code bits as input to the instruction, for example, as a condition in a conditional instruction, the run-time interpreter 44 uses the information provided in the data storage locations 138a and 138b, the table of methods 139 and the evaluation routines 140 to determine the current values of the condition code bits.

As discussed above, an Intel instruction can modify all condition code bits, or a subset of those bits. If the current instruction which modified the condition code bits modifies only the C bit and the previous instruction modified all of the condition code bits it would be wasteful to gather the data necessary to evaluate all but the C bit and copy it into the table of methods 139 which is provided for the current C bit modifying instruction. As a result, the run-time interpreter 44 maintains information to evaluate the previous state of the condition code bits based upon a previous condition code modifying instruction as well as the current condition code modifying instruction.

Figure 15:
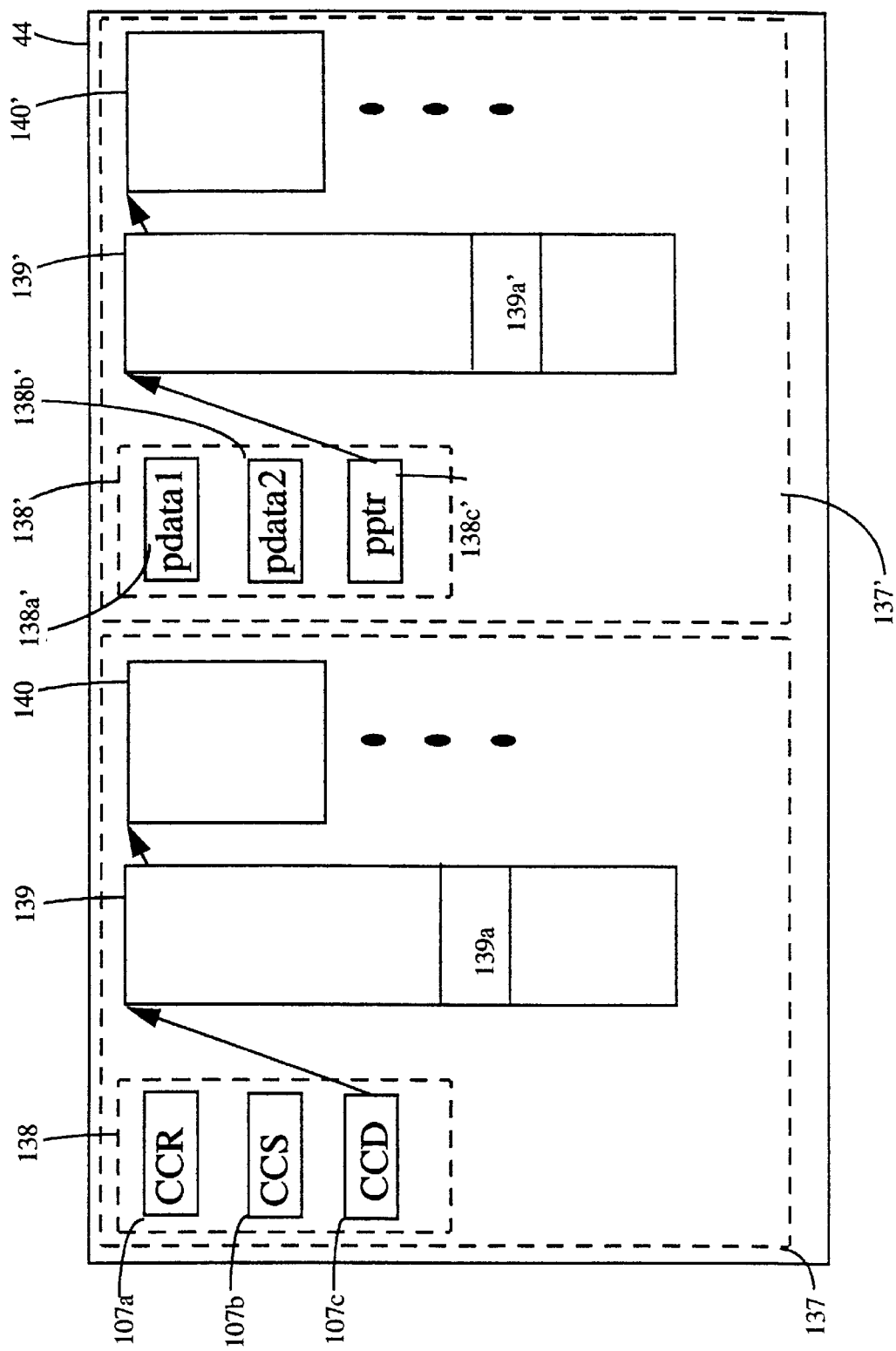
FIG. 15 a block diagram of an arrangement to determine evaluation routines for current and previous values of condition codes.

Referring now to FIG. 15, the interpreter is shown to include two sets of data storage locations 138 and 138', two corresponding tables of methods 139 and 139' and corresponding evaluation routines 140 and 140'. A first condition code evaluation grouping 137 corresponds to a current condition code modifying instruction and a second condition code evaluation grouping 137' corresponds to a previously executed condition code modifying instruction. Further, a finite state machine (FSM) is provided which determines how the previous and current states of the condition codes are maintained. The states and transitions of the FSM are the five types of condition code updates: ALL_BUT_C, ONLY_C, C_AND_O, ONLY_Z and ALL. Each transition has associated with it one of three actions: replace, push or resolve.

Provided below is a table, TABLE 1, which describes the action taken to maintain the condition code bits. The action is contingent upon which condition code bits the current instruction will modify as well as which condition code bits were modified by a previously executed condition code modifying instruction. In addition, the actions have been carefully selected to provide an action for the transition which entails a minimal amount of work yet still provides the run-time interpreter 44 a complete up-to-date set of condition code bits at any time.

In a replace action, the contents of the current condition code evaluation grouping are replaced by the values resulting from the next instruction. That is, the contents of the data storage locations 138, the corresponding table of methods 139 and the evaluation routines 140 are replaced with values which will enable the run-time interpreter 44 to evaluate the condition codes modified as a result of the next instruction. A replace action does not modify the contents of the previous condition code evaluation grouping. A replace action is appropriate when the set of condition code bits modified by the next condition code modifying instruction includes at least all of the condition code bits in the set of condition code bits modified by the most recent condition code modifying instruction.

A push action however, replaces the contents of the previous condition code evaluation grouping 137' with the contents of the current condition code evaluation grouping 137. The current condition code evaluation grouping 137 is used to provide the necessary information to evaluate the condition code bits modified by the next instruction. A push action is appropriate when the set of condition code bits modified by the next condition code modifying instruction does not include all of the condition code bits in the set of condition code bits modified by the most recent condition code modifying instruction. In addition, a union of the two condition code bit sets results in a complete set of condition code bits.

The final action is a resolve. The resolve is the most complicated of all the actions. In a resolve, the state of the condition codes, as represented by the current and previous condition code evaluation groupings 137 and 137', is evaluated resulting in a complete set of condition code bits, or an ALL, in the current condition code evaluation grouping 137. A push is then performed for the next instruction. A resolve action is appropriate when more than two condition code evaluation groupings would be necessary to maintain a complete set of condition code bits.

TABLE I

| Next CC State | Most Recent CC State | | | | |
|---|---|---|---|---|---|
| | ALL_BUT_C | ONLY_C | C_AND_O | ONLY_Z | ALL |
| ALL_BUT_C | replace | push | push | replace | push |
| ONLY_C | push | replace | resolve | resolve | push |
| C_AND_O | push | replace | replace | resolve | push |
| ONLY_Z | resolve | resolve | resolve | replace | push |
| ALL | replace | replace | replace | replace | replace |

As mentioned above, the first condition code evaluation grouping 137 maintains in an unevaluated state the state of the condition codes corresponding to the execution of a current instruction. The second condition code evaluation grouping 138 maintains in an unevaluated state the state of the condition codes corresponding to the execution of a previous instruction.

The first set of data storage locations 138 here, registers CCR 107a, CCS 107b and CCD 107c retain three values. CCR 107a and CCS 107b contain data used by the current, non-native instruction such as an operand and a result of the instruction. CCD 107c contains a pointer to the dispatch table 139 provided to evaluate the state of the condition codes which are modified as a result of the execution of the current instruction. The second set of data storage locations 138' retain similar values corresponding to a previous condition code modifying instruction.

Here, each condition code evaluation grouping 137, 137' is shown to include a location in the respective table of methods 139, 139' which indicates the category of instruction which was executed. That is, whether the instruction modifies all of the condition code bits or a subset of the condition code bits. Using this value and the information in the FSM of TABLE I, the run-time interpreter 44 maintains in an unevaluated state, the complete set of condition code bits.

To illustrate how this works, an example is provided in conjunction with FIG. 15, in which a current instruction modifies all of the condition code bits (ALL) and a next instruction modifies only the C bit (ONLY_C). In this simple example, the contents of the second condition code evaluation grouping 137', which provides the previous condition code state, is immaterial as will be shown.

As the current instruction modifies all of the condition code bits, the category location 139a of dispatch table 139 would indicate an ALL value. Accordingly, an entry for each of the six condition code bits is provided in dispatch table 139a to access evaluation routines 140 for each condition code bit.

When the corresponding Alpha routine for the next instruction is executed, the category location 139a of the current dispatch table is accessed to determine the category of the previous instruction. Using the category information provided and the information contained in TABLE 1 the run-time interpreter 44 manipulates the contents of each condition code evaluation grouping 137, 137' accordingly.

Here, the category of the most recently executed instruction is ALL while the category of the next instruction is ONLY_C. As shown in TABLE I, when the most recent condition code state is an ALL and the next instruction is an ONLY_C, the action which is to be taken is a push. Here, a push is an appropriate action because the set of bits modified by the next condition code modifying instruction, {C}, does not include all of the bits modified by the most recently executed condition code modifying instruction, {C, N, O, P, A}. Moreover, a union at the two condition code bit sets results in a complete set of condition code bits, {C, N, Z, O, P, A}.

The information retained in the current condition code evaluation grouping 137 is pushed or copied into the storage locations for the previous condition code evaluation grouping 137'. That is, the data in CCR 138a and CCS 138b are copied to data1 138a' and data2 138b' respectively and CCD 138c is copied to pptr 138c'. The current condition code evaluation grouping 137 is then used to store the data used to evaluate the C bit which is the only condition code bit modified by the next instruction. An example is provided below in conjunction with FIGS. 16 and 17 which describes a resolve action.

Referring now to FIG. 16, a set of condition code state diagrams 150 includes a condition code state 152 diagram for a previously executed condition code modifying instruction, a condition code state 154 diagram for a most recently executed condition code modifying instruction and a condition code state 156 diagram for a next condition code modifying instruction. Here, the previous condition code state 152 is ALL_BUT_C in which all but the C bit is modified. The most recent condition code state 154 is C_AND_O in which only the C and O bits are modified as a result of the execution of the most recently executed condition code modifying instruction. The next condition code state 156 is ONLY_C in which only the C bit is modified.

Referring back to TABLE 1, it may be seen that when the most recent state is C_AND_O and the next state is ONLY_C the appropriate action to be taken is a resolve action. It can be seen from FIG. H a replace action would not preserve the most recent state of the O bit as the current condition code state would be overwritten by information only capable of determining the C bit. A push however would lose the information necessary to determine the most recent values of the N, Z, P and A bits. As discussed above, more than two condition code evaluation groupings would be required to fully preserve the current states of each of the condition code bits. Accordingly, the information stored in the first and second condition code evaluation groupings 137, 137' is resolved resulting in a complete set of condition code bits.

Referring now to FIG. 17, the most recent condition code state 154' diagram is shown to contain a complete set of condition code bits. As a result of the resolve action, the most recent condition code state 154' is ALL and the next condition code state 156' is an ONLY_C. Referring again to TABLE 1, the appropriate action to be taken is a push when the most recent condition code state is ALL and the next condition code state is ONLY_C. Accordingly, the run-time interpreter 44 can push the condition code information resulting from execution of the next instruction without losing any condition code bit information.

Figure 18:
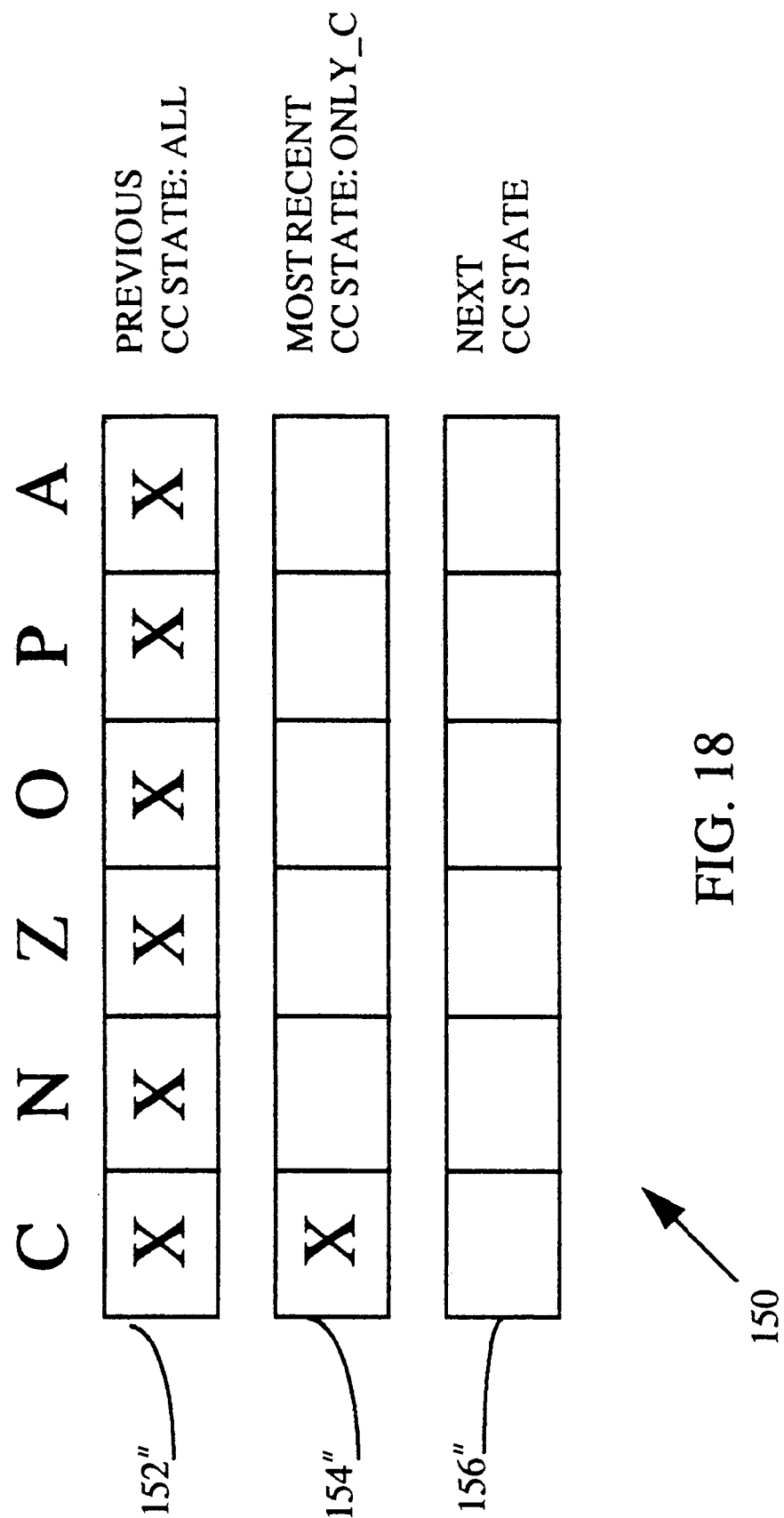

Referring now to FIG. 18, the previous condition code state 152" diagram is shown to indicate a complete set of condition code bits which was pushed from the most recent condition code state 154' in FIG. 17. The most recent condition code state 154" diagram of FIG. 18 now indicates execution of a condition code modifying instruction which modified only the C bit. As may be seen, all information relating to the most current state of each of the condition code bits has been preserved.

MULTIPLE ADDRESS SPACES

Figure 19:
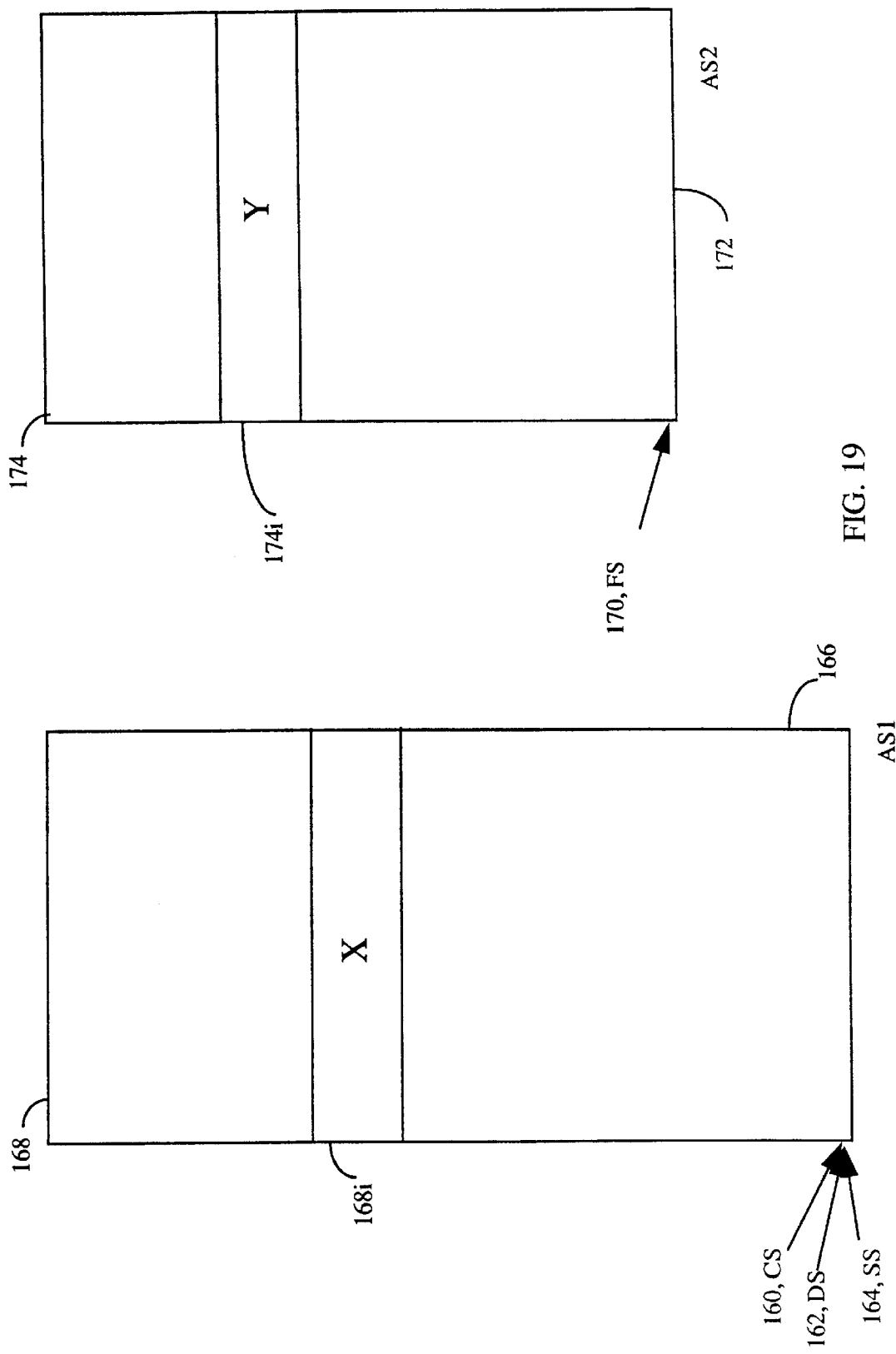
FIGS. 19 and 20 are diagrams showing relationship between address spaces.

Referring now to FIG. 19, an implementation of multiple address spaces on an Intel machine is shown to include segments CS 160, DS 162, and SS 164 identifying address 0 166 of a first address space 168 and segment FS 170 identifying address 0 172 of a second address space 174. Data X 168i is located within the first address space 168 and data Y 174i is located within the second address space 174.

It should be noted that the first address space 168 and the second address space 174 exist independently from each other. Accordingly, there is no relationship between the location identified by segments CS 160, DS 162, and SS 164 and segment FS 170. Nor is there any relationship between the address of the location of data X 168i in the first address space 168 and address of the location of data Y 174i in the second address space 174.

Figure 20:
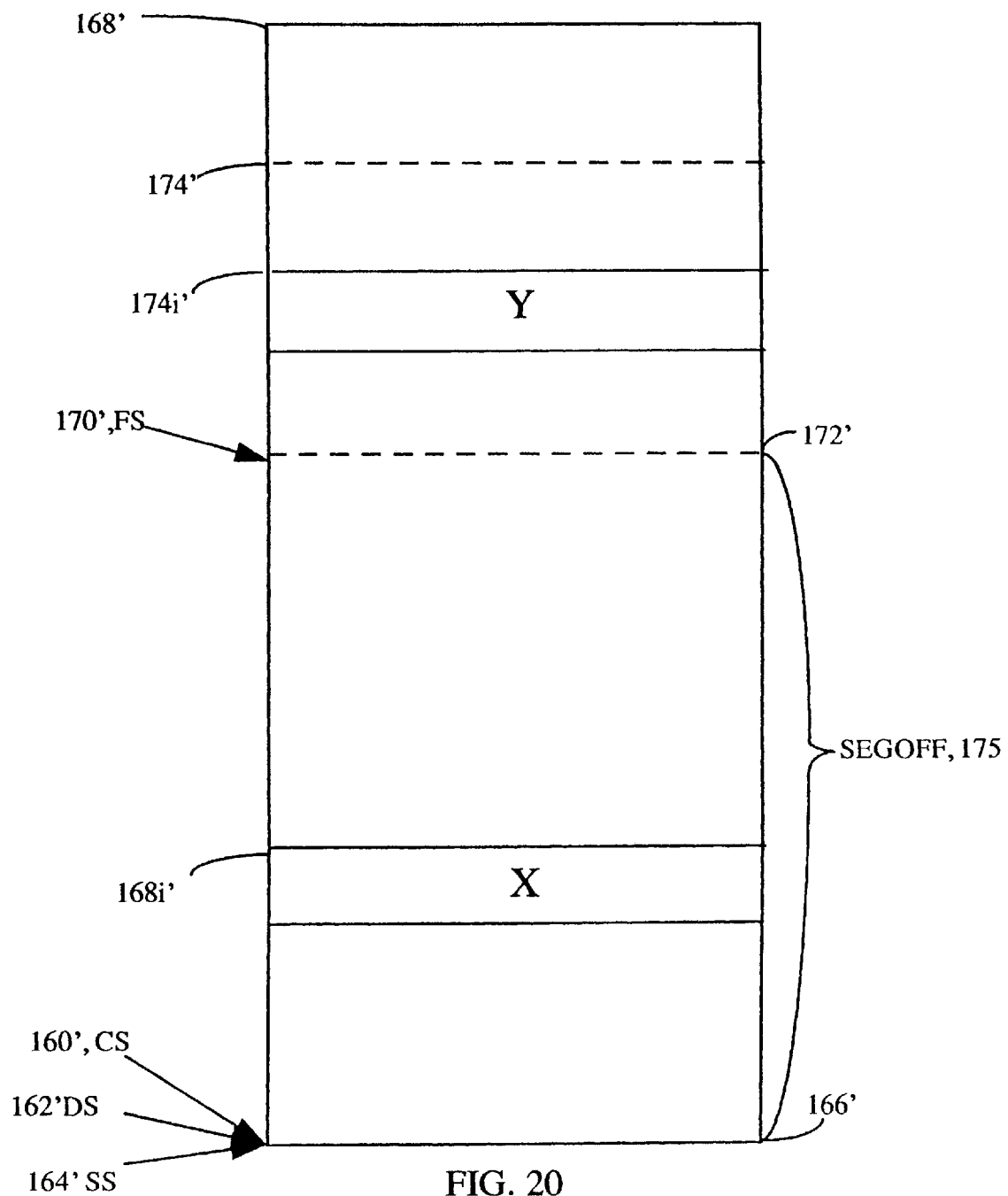

Referring now to FIG. 20, emulation of multiple address spaces on a native architecture is shown to include segments CS 160', DS 162', and SS 164' identifying address 0 166' of a first address space 168' and segment FS 170' identifying address 0 172' of a second address space 174' where segment FS 170' has an offset 175 from address 0 166' of the first address space 168'. The value of the offset 175 is stored in SEGOFF 109 (FIG. 8).

CONTEXT DATA STRUCTURE

Figure 21:
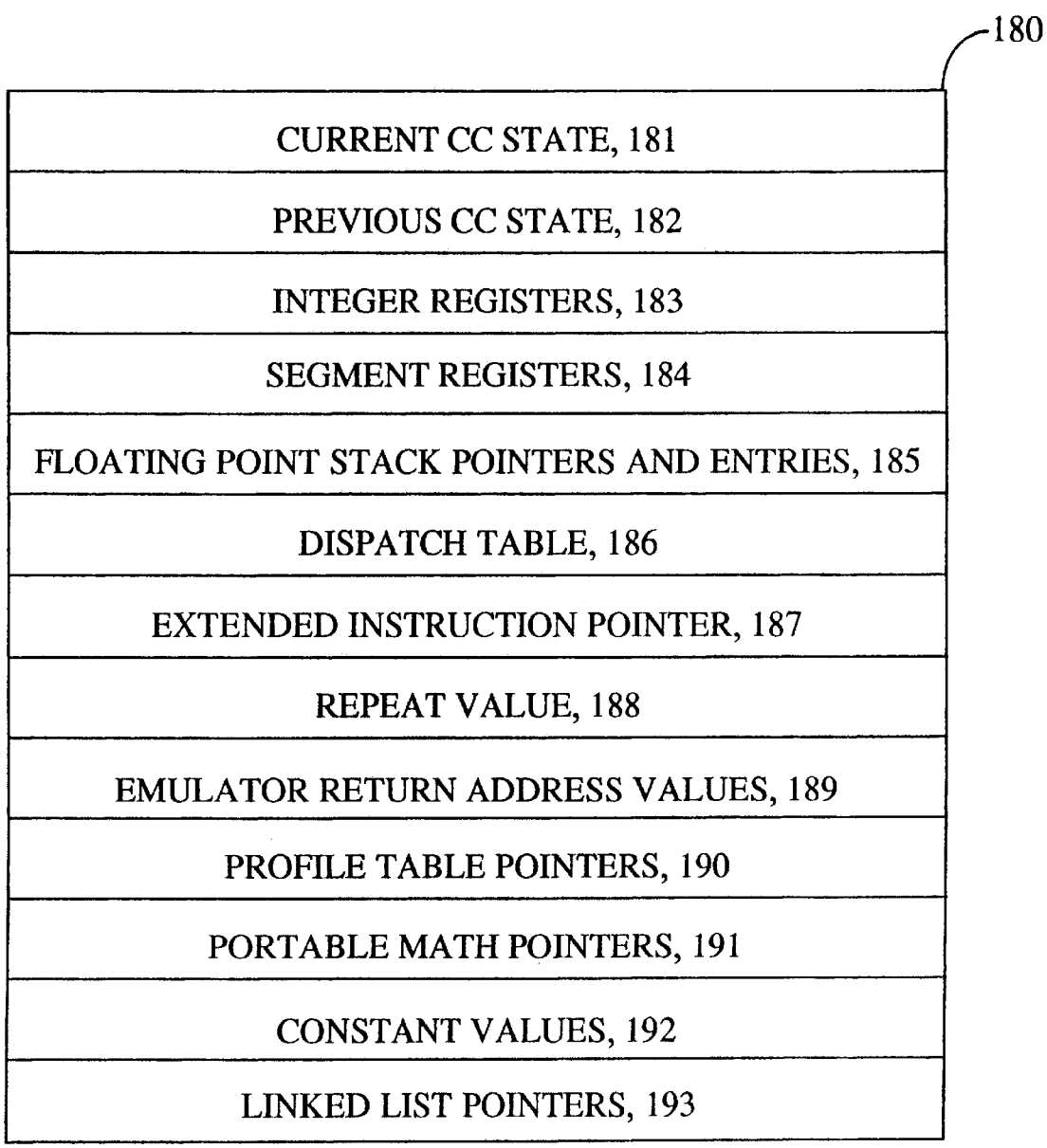
FIG. 21 is a diagram of a context data structure used in the interpreter of FIG. 4.

Referring now to FIG. 21, a context data structure 180 which resides in memory is shown. The context data structure 180 is used by the run-time interpreter 44 to handle multitasking capabilities of the non-native software application. When, due to multitasking, an additional thread is executed during operation of the non-native software application, a snap-shot of the current state of the run-time interpreter 44 is saved in a context data structure 180. The context data structure 180 is used by the new thread to provide the run-time interpreter 44 executing in the new thread the state of the run-time interpreter 44 executing in the thread which initialized the new thread.

Values which are saved in the context data structure 180 include the current condition code state in field 181. Thus, this field includes subfields (riot shown) to provide copies of the values stored in registers CCR 138a, CCS 138b and CCD and 138c. Values are provided in field 182 to store the previous state of the condition code bits. The context data structure also includes copies of the integer registers EAX 104a, EBX 104b, ECS 104c, EDX 104d EDI 104e, ESI 104f, EBP 104g and ESP 104h in field 183.

In field 183 values for the six segments (seldomly used in WIN32 applications) are provided. The six segments, four of which are depicted in FIGS. 19 and 20 are cs, ds, es, fs, gs and ss. A copy of the floating stack pointer 106 (FIG. 8) is also provided in field 185 in addition to a starting value for the floating stack pointer as well as the floating stack entries.

Field 186 of the context data structure 180 provides pointers to each of the eight possible dispatch tables. Exemplary dispatch tables 131 and 131' are depicted in FIGS. 10 and 11. The context data structure 180 also provides in field 187 the Extended Instruction Pointer, EIP 121.

A repeat specifier value, as designated by one of the possible prefixes 100f (FIG. 8), is provided in field 188. Values relating to the Emulator Return Address, ERA 114, register are stored in field 189. In fields 190 and 191 pointers used to maintain the profile table as well as pointers to portable math routines are also provided respectively. Values of selected constants are also provided in the context data structure 180 in field 192 while pointers to maintain a linked list of context data structures is provided in field 193.

An additional aspect of a preferred embodiment includes structuring the order of the software which implements the run-time interpreter 44 such that critical blocks of the software code exist in a single cache block. In this way, the run-time interpreter 44 is able to execute more efficiently as the portions of the interpreter 44 which are executed most often are resident in the cache.

NON-NATIVE RETURN ADDRESS STACK AND SHADOW STACK

Referring now to FIG. 22, a return address stack arrangement 210 is shown to include a non-native return address stack 211 and a shadow stack 212. The non-native return address stack 211 is an address stack which is produced as if the non-native image were executing in the non-native environment. The non-native return address stack 211 comprises a plurality of frames 219, each of said frames including a corresponding one of non-native return address fields 213a–213c, as well as fields 215a–215c for local storage, as shown. The non-native return address stored in locations 213a–213c corresponds to the routine return address that is pushed onto the stack by the program when it executes a call instruction. That is, the non-native program when executing in a native environment would place on the stack 211 a particular return address corresponding to the address space as if the non-native program was executing in its native environment.

As also mentioned, the return stack arrangement 210 also includes a shadow stack 212. The shadow stack 212 likewise is comprised of a plurality of frames 214, each of said frames 214 comprising a header field 216a–216c and corresponding or associated local storage fields 218a–218c.

The return address arrangement 210 also includes a pair of stack pointers, one for the non-native return stack 211 and one for the shadow stack 212. The non-native return address stack pointer 217 also referred to as SP points to the bottom or most recent entry in the non-native return address stack. Here the non-native return address stack 211 has an initial address $A_0$ of <7FFFFFFF>. The initial address of <7FFFFFFF> insures that as the stack pointer SP is decremented, the largest stack pointer value will not be sign extended by an LDL instruction as will be described. Likewise, the shadow stack 212 has a stack pointer 221 referred to as SSP and has an initial address $A_0$ =<0000000077FFFFFF>.

The header portion 216a–216c of the shadow stack frames 214 here comprises four sub-fields. The first sub-field 220a also referred to as SP is the contents of the non-native stack pointer 17 corresponding to the return address in the non-native stack pointer for the particular shadow stack frame 214. Here the non-native stack pointer corresponds to the size of the emulated operating system. Thus, for a 32 bit operating system, the non-native stack pointer 220a would comprise four bytes.

The second entry 220b in the header 216a–216c is the non-native instruction pointer value 220b. The non-native instruction pointer is the address that is pushed onto the non-native return address stack 211. This address also comprises the same number of bytes as the number of bytes supported in the operating system. Thus, again for a 32 bit operating system, the number of bytes is 4.

The third entry 20c in the header portion 216a–216c is a native return address field 220c. The native return address field 220c comprises the native return address which is placed on the shadow stack if a translated routine executes a call instruction. This corresponds to the address of the native instruction which is to resume execution in the translated routine after the called routine has completed.

The fourth entry in the header 216a–216c is the native dynamic link 220d. The native dynamic link field is a pointer to the previous shadow frame header 214. Thus, in FIG. 22, the value stored in the field "dylnk" corresponds to the location of the next shadow frame header 216b. This value is preferably included in the shadow stack 212 to allow the shadow stack 212 to make provisions for a variable amount of local storage in fields 218a–218c. In situations where the local storage fields are not provided or their size is fixed, it is not necessary to have a dynamic link field.

The local storage fields 215a–215c in the non-native register stack 211 comprises routine calls and routine arguments of the non-native system and is provided to faithfully replicate that which would occur in the non-native system were it being executed on its native architecture. The routine locals and routine arguments stored in the non-native return stack are passed to translated routines via the translation process described above and as will be further described in detail below. In the shadow stack 212, however, provision is also provided for local storage in fields 218a–218c. For example, often when a compiler is used to compile a program, the actual instructions of the program use more logical registers than physically exist in the machine on which the program is to be executed. Accordingly, the compiler often provides temporary storage for logical register manipulations and uses the program stack to store these registers.

NON-NATIVE RETURN STACK AND SHADOW STACK MANAGEMENT

The non-native return address stack 211 is managed exactly as dictated by the non-native code being emulated in the interpreter 44. When the interpreter 44 is executing the non-native or non-native code of a particular thread, there is only one native frame on the shadow stack 212 for the interpreter. This permits the interpreter to transfer execution into translated code in the event that there is corresponding translated code to be executed. The interpreter does not push frames onto the shadow stack 212. Further, when transferring into and out of translated routines, the interpreter does not push data onto the native system stack. Rather, when transferring into and out of translated routines, shadow frames 214 are pushed onto the shadow stack 212 to record the state associated with the translated routines.

The shadow stack 212 tends to be synchronous with the routine frames on the non-native return stack. Although calling jackets (48 FIG. 3) may cause another instance of the interpreter 44 to be produced if a callback is performed, and thus push another interpreter frame onto the non-native return address stack 211, once the jacketed operation has been completed this extra frame is removed from the non-native or non-native stack 211.

With a translated routine, however, a shadow frame 214 is pushed onto the shadow stack 212 each time a translated routine is called. The shadow frame 214 includes the space necessary for the translated routine's locals such as the spilled registers mentioned above, and the shadow frame header.

Figure 23:
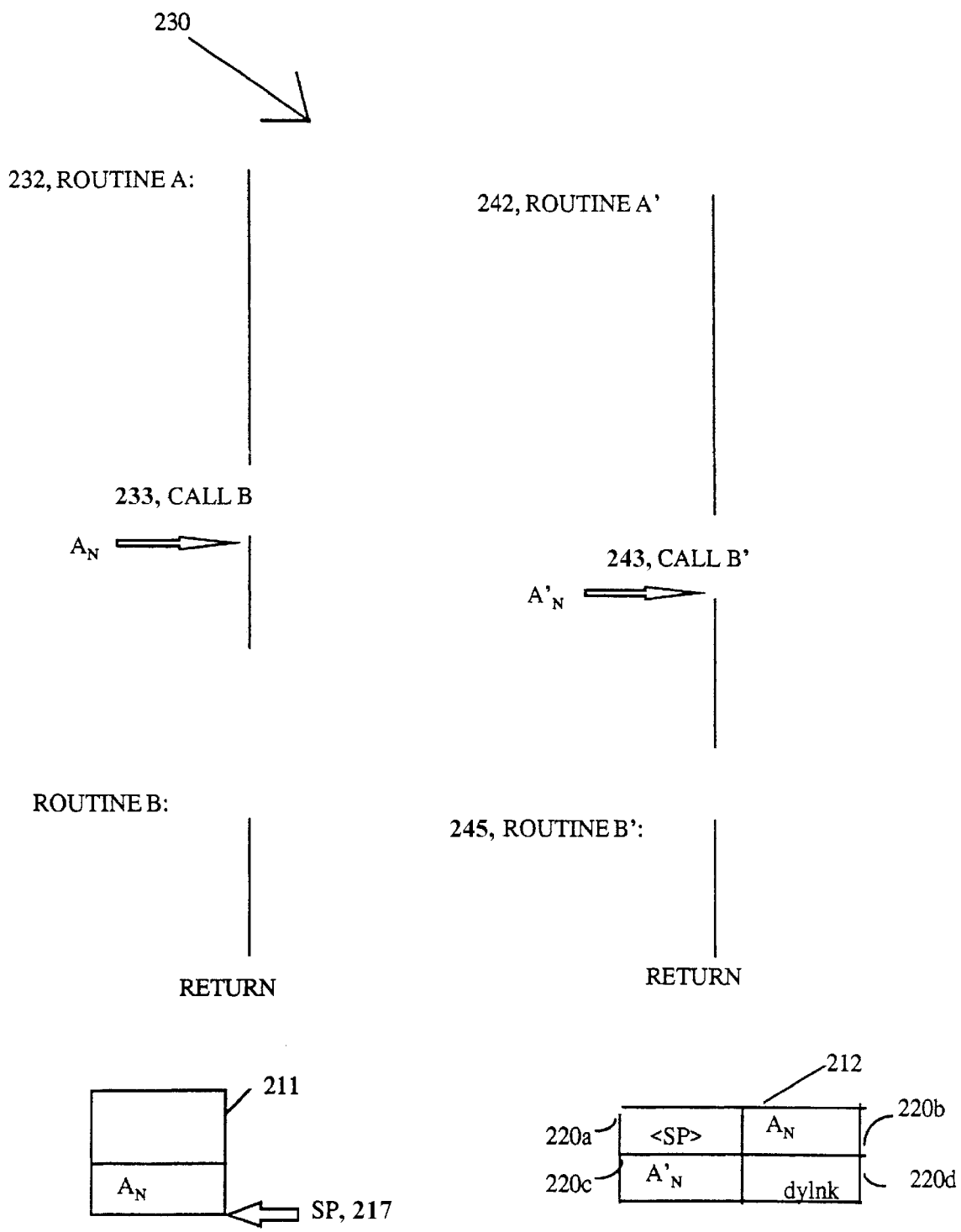
FIG. 23 is a diagram showing the relationship between the data structures of FIG. 22 and execution of non-native and native routines with calls into corresponding non-native and native routines.

Referring now to FIG. 23, an example of the operation of the shadow stack 212 is shown. The program 230 includes a routine A which has a plurality of instructions, one of which is a call to a routine B (call B) at 233. Routine B, likewise, has a plurality of instructions with the last instruction being a return instruction RET. Program flow 230 represents a program flow for the non-native program executing in its native environment. In routine A, when the Call B instruction 233 is executed, it causes the next instruction at address $A_N$ to be pushed onto the non-native return address stack 211, as shown. The stack pointer for the non-native instruction stack 211 is incremented to the next value, thus pointing to the entry for $A_N$. Routine B is called by routine A and executes its instructions causing at the last instruction (RET) a return which causes a pop from the non-native return address stack 211. The pop delivers the address $A_N$ on the location of the next instruction to be loaded into the program counter for execution.

Were routine A and routine B translated as mentioned above to provide corresponding translated routines A' and B' (242 and 245) during execution of translated code in the native architecture, an instruction Call B' would be encountered at 243. The shadow frame is allocated at the beginning of a routine for all calls that the routine can make. The instruction Call B' causes the shadow stack to be provided with a shadow stack frame 14 which comprises the four above-mentioned fields 20a–20d and the optional fields for local storage. Thus, in field 20a is provided the contents $A_N$ of the stack pointer (SP) 17 of the non-native return stack 11. This value corresponds to the location where the return address stored in the non-native return address stack 211 for the corresponding native instruction execution will be found.

Likewise, stored in field 220b is a copy of the non-native return address that was pushed on the non-native stack by the execution of the call instruction. The non-native return address is provided by the translated image and corresponds to the non-native call for the particular call in the native or translated image. Here the non-native extended instruction pointer has a value corresponding to $A_N$. Likewise, stored in field 220c is the value of the native return address $A_N'$. The dynamic link is stored in field 220d which corresponds to the address of a preceding shadow stack frame header. A new dynamic link is produced by saving the value of the shadow stack pointer prior to allocating a new frame. In location 218 is provided local storage for allocated variables provided during the translation of the corresponding routines A' and B' from the translator as mentioned above.

Both the interpreter 44 (FIG. 3) and the translator 54 (FIG. 4) use the shadow stack 212 for determining the next instruction to be executed upon the processing of a return instruction. When translated code is executed in the computer system and a return instruction is encountered, a check is made to determine whether the code that followed the native call in the translator routine was well behaved.

That is, two assumptions are tested. The first is that the non-native code was well behaved with respect to the depth in the non-native return address stack 211. The second assumption is that the code was well behaved with respect to the return address. If both of these conditions are not satisfied then the code following the translated call cannot be executed and the instruction flow has to revert back to the interpreter for continuing execution until such time as it encounters another call or return instruction or possibly a computed jump instruction.

These two conditions are determined by examining the value of the contents of the non-native stack pointer SP as stored in location 220*a* to determine whether it is equal to the contents of the non-native stack pointer 217. As mentioned above the non-native stack pointer 217 corresponds to the current location on the non-native return address stack 211. Thus this test is a measure of whether the non-native stack 211 and the shadow stack 212 are at the same depth. The second check is to determine whether the return address stored in location 220*b* corresponds to the return address stored in the location in the non-native return address stack 211 pointed to by the value of the SP pointer 217.

This check thus determines that the return address for the non-native instruction is the same in the non-native stack 211 as well as the shadow stack 212. If this condition is not satisfied then the interpreter changed the value of the return address. If either condition is not satisfied, then execution is continued in the run-time interpreter 44 until such time as another call or return or computed jump instruction is encountered.

CALL ADDRESS TRANSLATION TABLE

Figure 24:
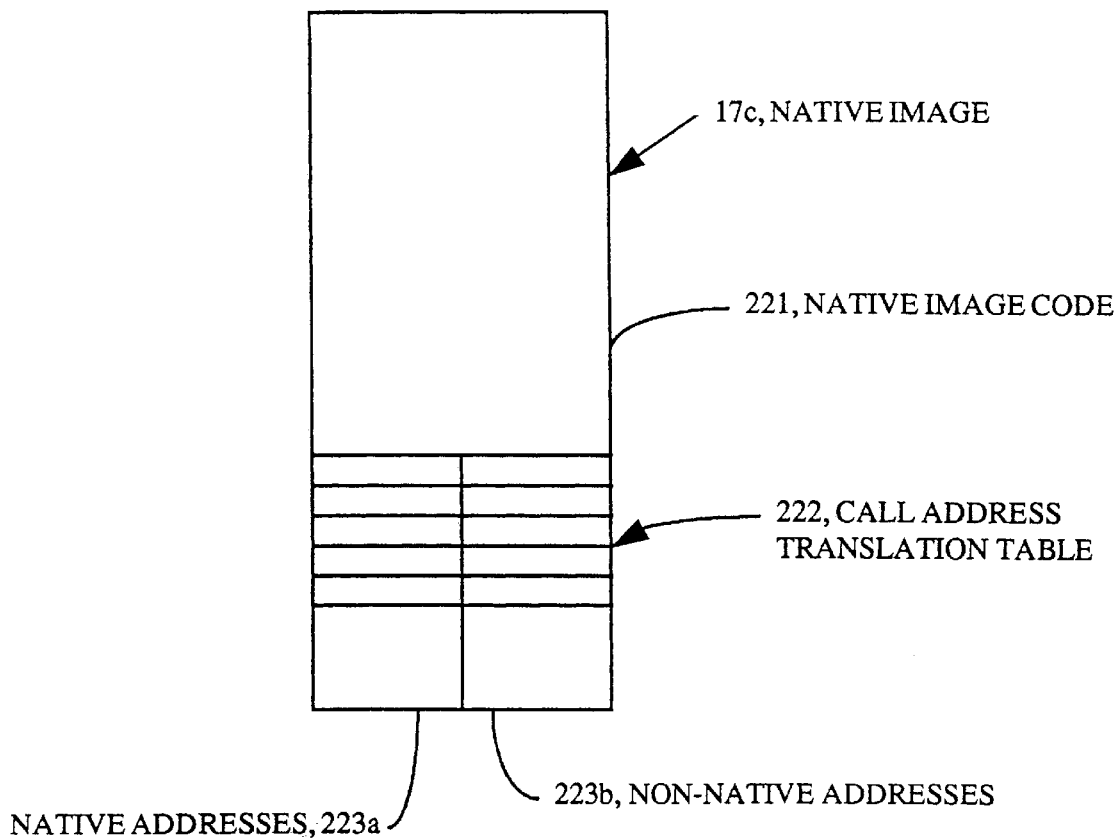
FIG. 24 is a diagram of a data structure including translated or native-image routines and call address translation table.

Referring now to FIG. 24, a call address translation table 222 is produced during translation of non-native code. As shown the call translation table 222 is appended to the translated code as in field 221. The translated code 221 and the call address translation table 222 provide the image 17*c* referred to in FIG. 3. The table 222 includes a pair fields one field 223*a* corresponds to addresses or more particularly to address offsets from the starting address of calls for translated code routines and the other field 223*b* corresponds to address offsets to the corresponding starting address in the non-native architecture. The table 222 is here appended to the end of the translated image 221 as mentioned above.

Figure 25:
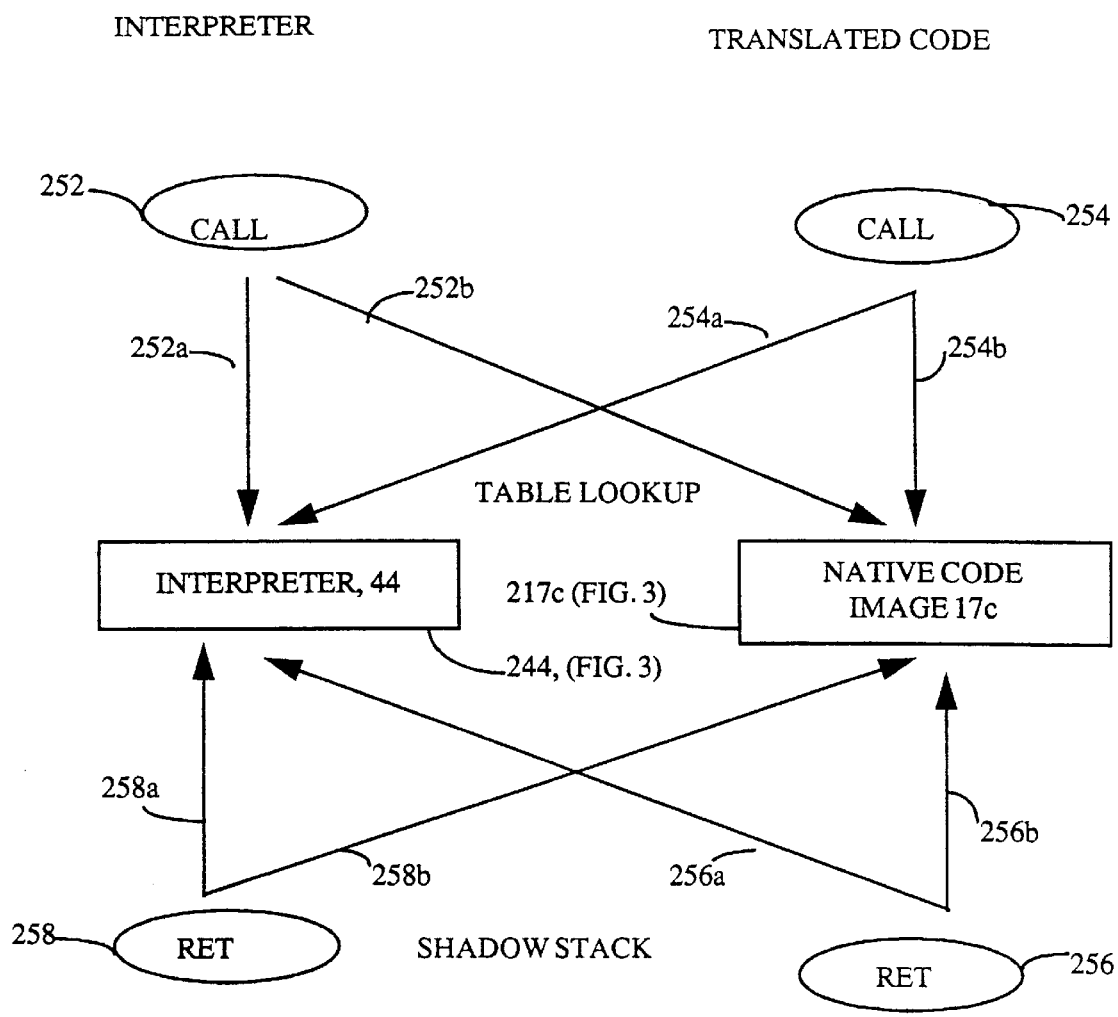
FIG. 25 is a diagram depicting the relationship of the routine call tables in the translated image and the shadow stack to the on-line and background systems.

Referring now to FIG. 25, the use of the shadow stack 212 as well as a call address translation table as mentioned above is illustrated. As shown in FIG. 25, both table look-ups and shadow stack manipulations are used in the run-time interpreter 44 or a run-time translation system as well as in the execution of translated code. Table look-ups are used for each instance of a call instruction by the interpreter 44 or for each instance of execution of translated code. The shadow stack 212 is used during the processing of return instructions for the interpreter 44 as well as during execution of calls in the translated code.

During execution of translated code there are two possibilities resulting from execution of a return instruction (RET). The first possibility shown as path 256*b* is that the afore-mentioned test or check is passed and thus the return instruction can safely return and continue execution of translated code. The second possibility shown as path 256*a* is that if either one of the two checks fails, then execution returns to the possibly updated address in the non-native stack and execution continues or proceeds within the interpreter 44 until such time as a call, computed jump or a second return instruction is encountered.

Similarly, when the interpreter is executing native code in emulation mode, the interpreter likewise performs a check. A first path 258*a* would be if 1here is no corresponding translated code available to be used by the interpreter. The second path 258*b* would be taken if the interpreter encounters a return address in which there is a valid corresponding translated routine. Thus, the shadow stack 212 permits the interpreter to return to execution of translated code without requiring any corruptive or invasive modification of the non-native return address stack 211.

Similarly, with table look-ups when a call 252 is encountered, the interpreter 44 will perform a table look-up which, if there is a corresponding translated routine, will permit the translated code to execute via path 252*b*. Otherwise, the interpreter 44 will continue execution via path 252*a*. Similarly, the translated code when it performs a call 254 will determine if there is a corresponding translated routine for the call and, if so, will permit execution via path 254*b*. Otherwise, control will be transferred back to the interpreter via path 254*a*.

By providing a shadow stack 212 which runs synchronous to the non-native return address stack 211, several advantages are provided. The first advantage is that since the shadow stack 212 provides storage for native return addresses and other information required in the native system, it is not necessary to place this information on the non-native return address stack 211. Thus, the non-native return address stack 211 is not violated or remains true to that which would occur during normal execution of the non-native program in the non-native architecture. Amongst other things maintaining a true uninterrupted non-native stack 211 permits a non-native exception handler to execute without any complex manipulation to remove native return addresses. In general, when an exception occurs during execution of the native instructions the exception handler in the native architecture only expects to encounter native architecture instruction addresses. And similarly a non-native exception handler only expects to encounter non-native instruction addresses.

Moreover, the shadow stack 212 being accessible to both the translated code and the interpreter 44 permits the interpreter to return control back to translated code since the interpreter can use the shadow stack to determine a valid native return address which will continue execution of translated code. Without the shadow stack 212, therefore, it would be necessary either to place the native return addresses onto the non-native return stack which is undesirable as mentioned above or to make the unit of translation be limited to a basic block. As will be described below this latter option is undesirable since it limits the opportunities for optimization of the translated code. Further, by having a non-native stack 211 and shadow stack 212, non-native return addresses can be separately managed from the native return addresses. This permits exception handlers for each image to properly handle problems which caused an exception since the exception handlers do not have to deal with return addresses associated with foreign code.

Figure 26:
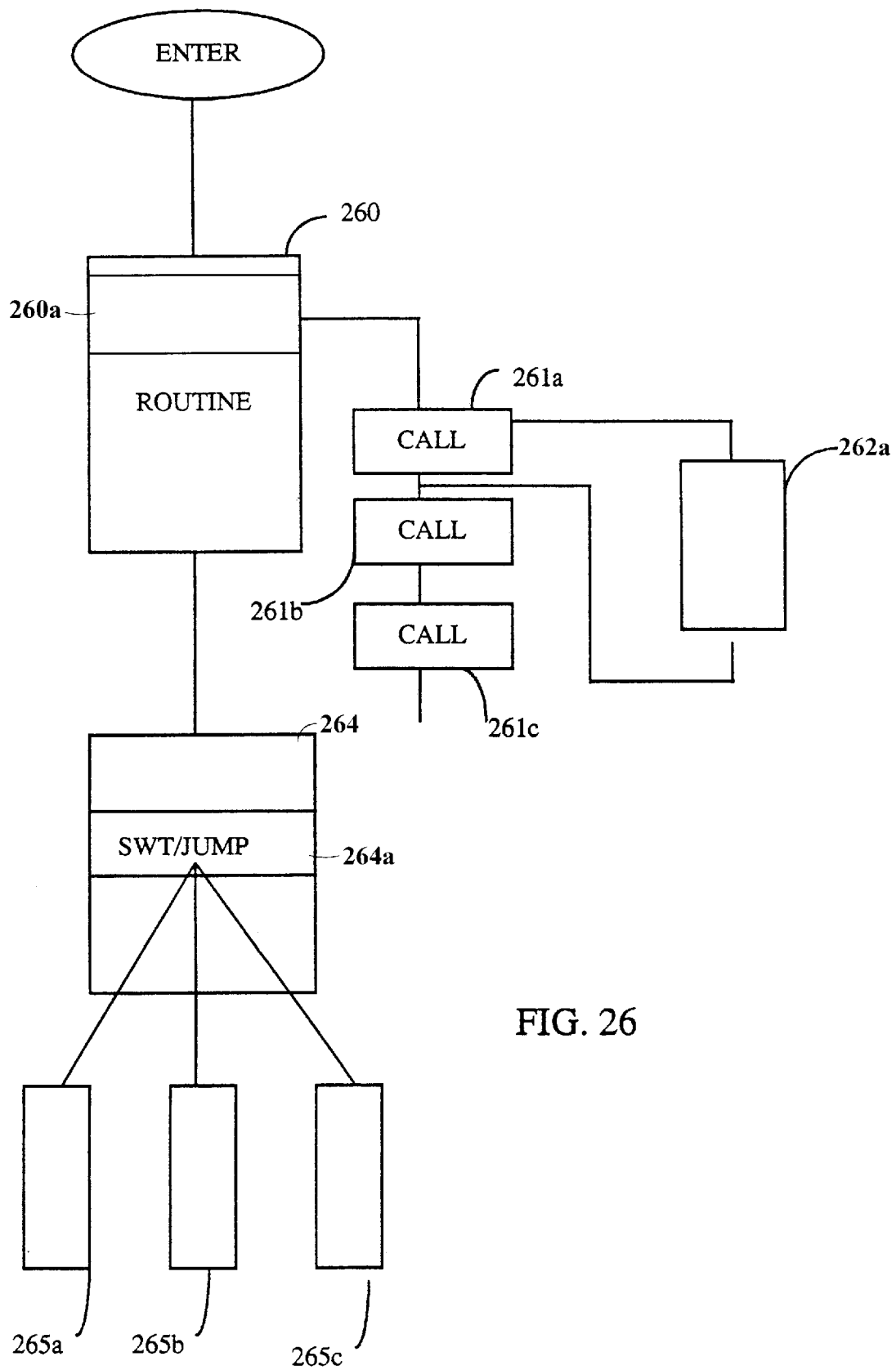
FIG. 26 is a flow diagram of a typical application program instruction sequence used to illustrate aspects of the invention.

Referring now to FIG. 26, a translated routine 260 can have a call 260*a* which in turn has other calls 261*a* to 261*c* to other translated routines such as 262*a*. Also in a translated routine 264, the routine can encounter a switch/jump instruction 264*a* which is a computed branch or jump to another routine such as routines 265*a* to 265*c*. Management of the shadow stack 212 in conjunction with execution of translated code, execution in an original interpreter and activation of a new interpreter will now be described.

SENTINEL SHADOW STACK FRAME

When a new interpreter activation initializes its native frame for the shadow stack, it pushes a sentinel shadow stack frame header onto the shadow stack 212. The stack pointer address is set at 7FFFFFFF, the largest stack pointer possible, a value which will not be extended by an LDL instruction. This frame is needed for interpreter processing of return instructions. The shadow stack frame return address field 220c is set equal to 1 (a non-zero value) but is never used. The shadow dynamic link field 220d is set equal to 0 to indicate that this is the initial or sentinel frame on the shadow stack. The shadow stack extended instruction pointer is set to 0 and is never used.

During normal interpreter operation, that is, while the interpreter is executing instructions, it does not follow the stack pointer for the shadow stack. Thus, it does not push or place shadow frame entries onto the shadow stack 212 even if the interpreter interprets non-native calls that modify the non-native return address stack 211. If the interpreter encounters a non-native instruction call that calls a non-native instruction routine that has been translated, however, then the interpreter stores the instruction program counter onto the non-native return address stack 211 as in normal operation and into the shadow stack 212. The interpreter 44 also performs a jump to the translated routine's interpreter entry point. The translated routine returns to the interpreter 44 by jumping through one of its entry points as will be described below.

Every translated routine has two entry points. One entry point is called when the interpreter calls it and the other one is called when another translated routine calls it. The entry points only differ in the additional prologue or preparation that is performed when the routine is entered from another translated routine. When a translated routine is entered from another translated routine, the following occurs: The register which contains the native return address is stored into the return address field in the shadow stack for the particular shadow frame header by executing an instruction STL R26, 4(sp)

This instruction is executed before the shadow stack 212 is extended so that the return address in the shadow stack 212 is always valid for all shadow frames 214 except the top one. This arrangement is required when the shadow frames 214 are discarded as a result of an exception or because execution had to resume in the interpreter. Next the execution falls through to the interpreter entry point.

TRANSLATED ROUTINE ENTERED FROM INTERPRETER

When a translated routine is entered from the interpreter, the following happens: A shadow frame is produced for the translated routine. The size of the frame is 16 plus bytes where 16 is the number of bytes needed to represent the header and the additional number of bytes are those used to represent the local storage associated with the translated routine. The shadow frame header dylink field 220d is set to the original stack pointer. The following instructions are executed:

MOV SP, T1
SUB SP, #<16+size>,sp
STQ T1, (sp)

The shadow stack frame is produced using the above sequence.

When a translated routine executes a return instruction to return control to its caller routine, the following occurs. Noting that the current value of the non-native stack pointer points to the non-native return address, the non-native return address is popped off of the non-native return stack 211 into the non-native instruction pointer. If a "Return N" instruction is being performed then also a pop of N argument bytes from the non-native return stack is performed. The following instructions are used to execute these routines MOV ESP, T1
LDL EIP, (esp)
ADDL ESP, #<4+arg_bytes>, ESP The previous shadow stack frame is located and the contents of the dynamic link are evaluated. Next the native code determines whether the non-native stack pointer and the instruction pointer are the same as expected by the caller. That is, the native code determines that the value of SP is equal to the contents of SP in the stack pointer 17 and the value of IP is equal to the value of the return address stored at the location pointed to by the stack pointer 17.

If these values are correct then the translated routine can return control to the return address stored in the caller's shadow frame (i.e., return control to another translated routine). If either of these checks fail however, then either the call was from the interpreter or the non-native stack has been modified. In either case, execution is resumed in the interpreter after a potential clean-up of the shadow stack 212. The following instructions are used to perform the two checks:

| | |
|---|---|
| LDQ T2, 8(T$_0$) | Loads both gEIP and gBSP |
| SLL T1, #32, T1 | The actual ESP before popping the non-native return address |
| OR EIP, T1, T1, | The actual EIP and ESP in a quad word |
| SUBQ T1, T2, T1 | Load the native return |
| LDL T3, 4(T$_0$) | address in case it is needed |
| BNE T1, $1 | Actual discarded shadow frame |
| MOV T0, SP | |
| RET (T3,) | | where T0, T1, T2 and T3 are available registers in the native architecture which would not interfere with the state of registers in the non-native system.

TRANSLATED ROUTINE CALLS ANOTHER TRANSLATED ROUTINE

When the translated routine calls another translated routine, the following occurs. The non-native return address is loaded into a register and 1the register is pushed onto the non-native return stack 211 and the non-native stack pointer is loaded into the non-native stack pointer field in the shadow stack 212. A jump to subroutine instruction is executed to the translated routine entry point placing the native return address in a register. The translated routine executes until the routine returns to its caller.

It is possible that the translated routine may never return to its caller, for example, if the translated routine detects that the non-native stack 211 has been modified. In this case, if the non-native stack 21. has been modified the interpreter 44 will be entered to clean up the shadow stack 212 and resume execution as mentioned above. If, however, the translated routine does return to its caller, the translated routine will have left the non-native state valid including the non-native stack pointer and will also have left the shadow stack 212 valid insuring that it is in synchronization with the non-native stack 211. Thus, the called translated routine can continue executing.

If a translated routine calls a routine that has not been translated, it then enters the interpreter. The non-native return address is passed to a register in the interpreter 44 and the contents of the register are pushed onto the non-native return address stack 211. This corresponds to the non-native return address. The contents of the register are also loaded into the non-native extended instruction pointer field in the shadow stack 212. The extended stack pointer 217 which points to the non-native return address just pushed onto the non-native return stack is itself loaded into the non-native extended stack pointer field 20a in the shadow stack 212. The non-native address of the routine being called is then loaded into the non-native instruction pointer and a jump to subroutine instruction is executed to the interpreter entry point. A look-up call entry is performed placing the native return address in stack pointer 217. The interpreter stores the stack pointer 217 in the native return address field 220c of the shadow stack 212 and executes until the interpreter 44 interprets a return instruction.

TRANSLATED ROUTINE CALLS JACKETED ROUTINE

If a translated routine calls a jacketed routine, the following occurs. A jump to subroutine instruction to the jacketed routine entry point is performed placing the non-native return address in the non-native stack pointer 217. The jacketed routine produces a native frame and executes the native routine. Since only operating system supplied entry points are jacketed, these are known to be well-behaved and thus will not alter their return address. Therefore, the non-native stack pointer or the non-native instruction pointer in the shadow stack are not saved and there is no check performed on them before returning from the jacketed routine.

If the jacketed routine performs a call back, then another interpreter activation native frame will be produced and a separate shadow stack will be managed. When the call back returns, the interpreter activation native frame will be removed together with the now empty shadow stack. When the jacketed call returns, it will remove its native frame leaving the stack frame pointing again to the top shadow frame of the previous interpreter activation. As with the above, the jacketed routine may never return to its caller. For example, an exception may occur that causes the call back interpreter to be exited and non-native frames discarded. This will cause the shadow stack 212 to be cleaned up. If, however, it does return to its caller the jacketed routine will have left the non-native state valid including the non-native stack pointer 217. It will also have left the shadow stack 212 valid insuring that it is in sync with the non-native stack 211. Therefore, the caller translated routine can continue executing.

ENTRY TO INTERPRETER DUE TO INDIRECT JUMP OR SWITCH

A translated routine can also enter the interpreter due to an unknown indirect jump. If translated code performs a jump to a target that is not statically known, for example, indirect jump to a target not listed in the profile information, then the translated routine is abandoned and execution continues in the interpreter 44.

RETURNING TO TRANSLATED CODE

The interpreter also makes decisions as to whether it can return to translated code. The interpreter also checks when interpreting a return instruction that returning to a translated routine is valid. The interpreter saves the current value of the non-native stack pointer that points to the non-native return address on the non-native stack 211 and pops the non-native return address from the non-native stack 211 into the non-native instruction pointer. If a Return N instruction is being performed then it also pops N number of argument bytes from the non-native stack 211. The interpreter then checks the value of the non-native stack pointer and the non-native instruction pointer to determine that they are the same as those stored in the shadow stack frame 214. If they are the same then control can be returned safely to the return address which is stored in the shadow stack 212 and execution of translated code can resume. If they are not the same, then the shadow stack 212 needs to be cleaned-up and control returned to the interpreter. If no translated code exists in the shadow stack, then the sentinel shadow stack frame ensures that control remains in the interpreter and there is no need to clean up the shadow stack.

SHADOW STACK FRAME CLEAN-UP

The interpreter clean-up shadow stack frame routine is invoked on re-entry from translated code when it is detected that the shadow stack 212 is out of synchronization with the non-native stack 211. The clean up shadow stack frame routine discards orphaned shadow stack frames 214. The approach is to discard shadow stack frames 214 until the value of the extended stack pointer stored in the non-native extended stack pointer field 220a is greater than the value of the extended stack pointer.

OBJECTS AND OBJECT MANAGEMENT BETWEEN DISSIMILAR ENVIROMENTS

Object oriented programming systems support the definition and use of "objects." An object in such a system is a data structure combined with a set of "methods" or "functions" available to manipulate the data stored within that data structure.

Figure 27:
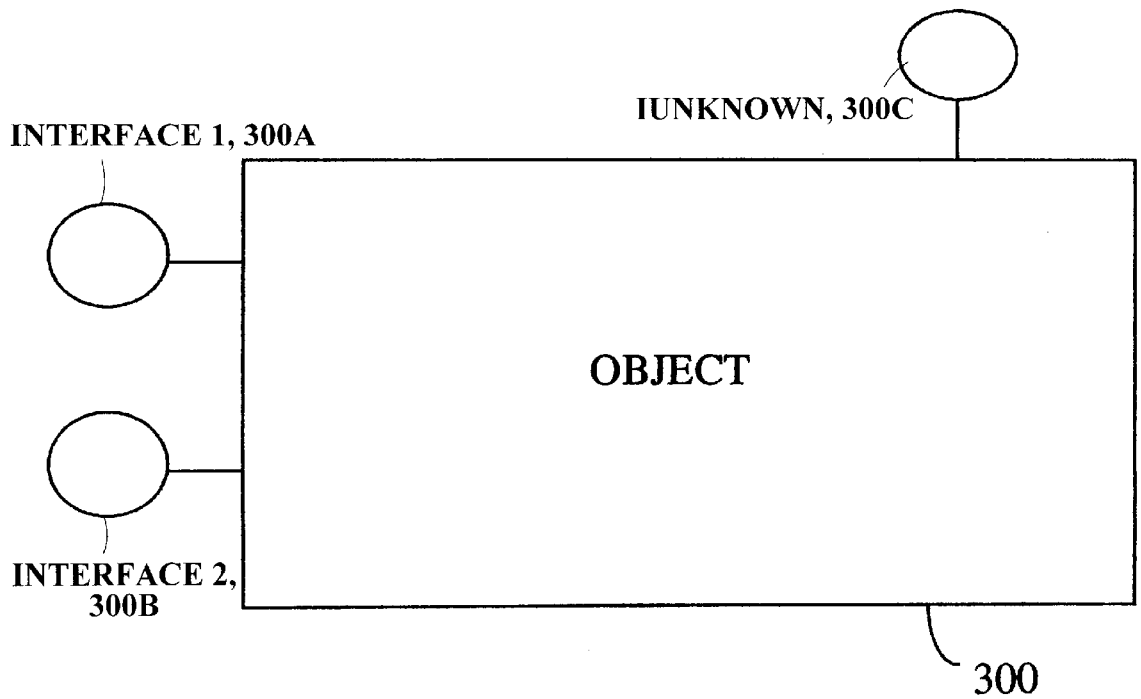
FIG. 27 is a block diagram showing an example of an object.

Referring now to FIG. 27, an example of an object 300 is shown including a first interface, Interface 1 300A, a second interface, Interface 2 300B and a third interface, IUnknown 300C. The interfaces to the object are drawn as plug-in jacks. When a client wishes to use the object 300, it must do so through one of the interfaces shown. The actual contents of the object being manipulated can only be accessed through one of the interfaces provided for that object. Each of the interfaces 300a and 300b are also objects themselves.

Figure 28:
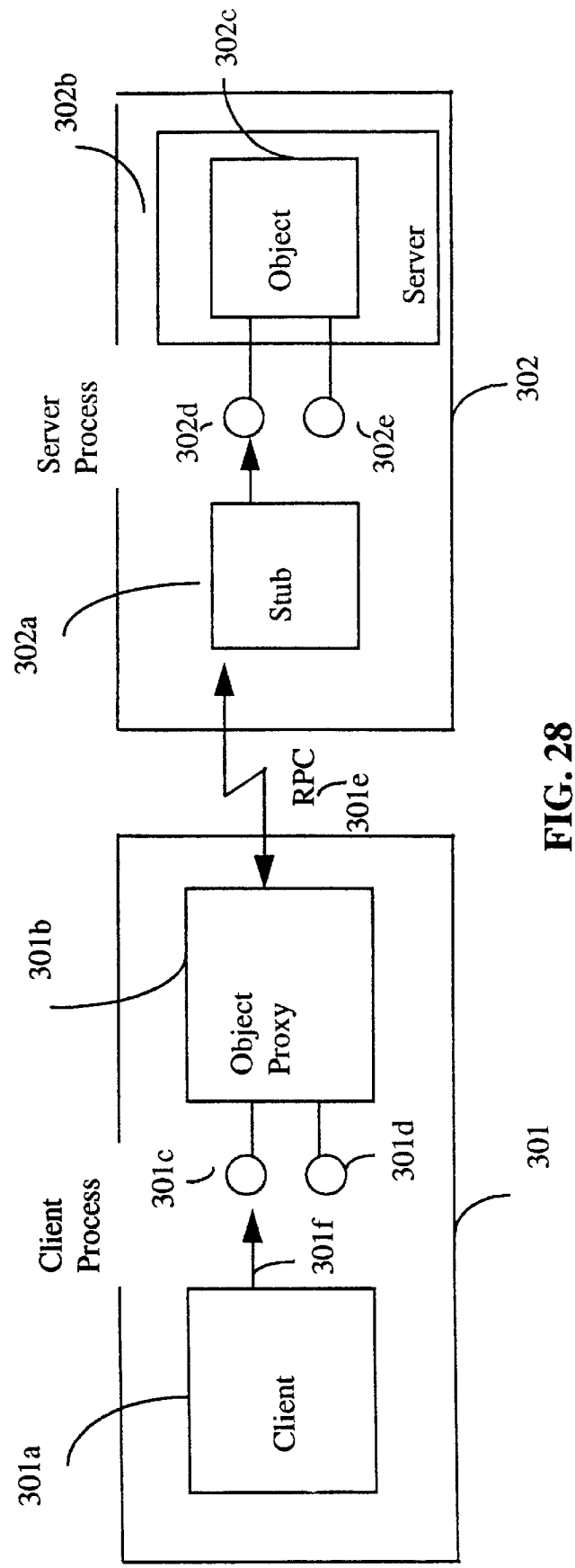
FIG. 28 is a block diagram showing an example of cross process calling of object methods.

Referring now to FIG. 28, there is shown an example of a client 301a (which can be another process running on the system 10 or another system such as in a networked system not shown) accessing an interface of an object 302c. FIG. 28 shows the client 301a calling an object interface of the object 302c. The client 301a obtains a pointer 301f to an interface 301c of an object proxy 301b. For an example of how a pointer to an interface object is obtained see FIG. 30. Information regarding the interfaces of an object is obtained through a query function defined or provided by the service architecture. For example the function QueryInterface in the OLE® (Object Linking and Embedding product of Microsoft Redmond Wash.) service architecture is used for this purpose.

The present system supports operations on objects that are either in-process, local or remote with respect to the client. The address space of the client is the set of all possible addresses provided by the operating system to the process in which the client executes. An in-process object therefore is an object located within the same address space as the client. A local object is an object located on the same computer system as the client, but not in the same address space. A remote object is an object that is located on a different computer system than that which the client is located on.

In the example of FIG. 28, the object being referenced is local or remote to the client. The interface 301c is an in-process implementation of the desired interface as part of an in-process object proxy 301b. In an alternative example of operation of the present system, where the object being referenced is in-process, the in-process implementation referenced by the client is the object implementation of the interface itself. In that alternative example the call by the client to the desired object interface is a local call to the object implementation of the interface.

During operation of the example embodiment shown in FIG. 28, the client process 301 communicates with a server process 302 by an inter-process communication facility, for example a remote procedure call facility 301e. Within the client process 301 there is shown a client 301a, which uses an interface 301c to access an object proxy 301b. The object proxy is further shown having a second interface 301d.

The server process 302 is shown including an object 302c and a stub routine 302a which accesses the object 302c through an interface 302d. The stub routine 302a processes client requests received via the inter-process communication facility. The stub routine 302a further executes a local procedure call within the server process 302 to the object interface 302d. The object 302c is also shown having an interface 302e. The interfaces 302d and 302e include object functions which are used by the client 301a to operate on the data included in the object 302c itself.

The client 301a accesses the object interface 302d by referencing the object proxy 301b through the interface 301c. The object proxy 301b uses the remote procedure call function 301e to send a message to the stub routine 302a. The stub routine 302a uses object functions within the interface 302d to operate on the actual object within the server process 302b. The stub routine 302a sends the results of operations on the object 302c back to the object proxy 301b through the remote procedure call utility 301e. The object proxy 301b returns the results of the operations on the object 302c to the client 301a through the interface 301c.

Also during operation of the elements shown in FIG. 28, when the client 301a calls a function of the interface 301c, the object proxy 301b takes all the arguments to that function of the interface 301c, and packages them in a portable data structure. The stub routine 302a in the server process 302 maintains an interface pointer to the object 302c and receives the call through the remote procedure process 301e. Stub routine 302a pushes the arguments from the call onto the server process stack as needed and makes the call to the implementation of the function called by the client in the actual object 302c through the interface 302d. When that call returns, the stub routine 302a packages the return values and any out-parameters and sends them back to the object proxy 301b. The object proxy 301b then unpacks the information and returns it to the client 301a.

An "execution engine" is an implementation of a computer architecture on which code for that computer architecture may be executed. A first example of an execution engine is a hardware implementation, such as a microprocessor or CPU implementing the processor architecture for which the code was designed and developed. A second example of an execution engine is a software emulation of a processor architecture, referred to as a "simulator" or an "emulator". In another example of an execution engine, non-native program code is translated by interpreter software at run-time into code that is executable on the underlying hardware system and then executed on the underlying hardware system.

MULTICODE EXECUTION ENVIROMENTS

In a multi-code execution environment, where native code for a first computer architecture is executing such as the computer system 10 (FIG. 1) as well as non-native code for a second computer architecture such an a non-native image interpreted by the interpreter 44 (FIG. 3), the client process 301 and the server process 302 may be executing on execution engines for dissimilar architectures. For example, the client process 301 may be executing on the system 10 in native mode, while the server process 302 may be executing in the interpreter 44 (or other emulation environment), or vice versa.

Figure 29:
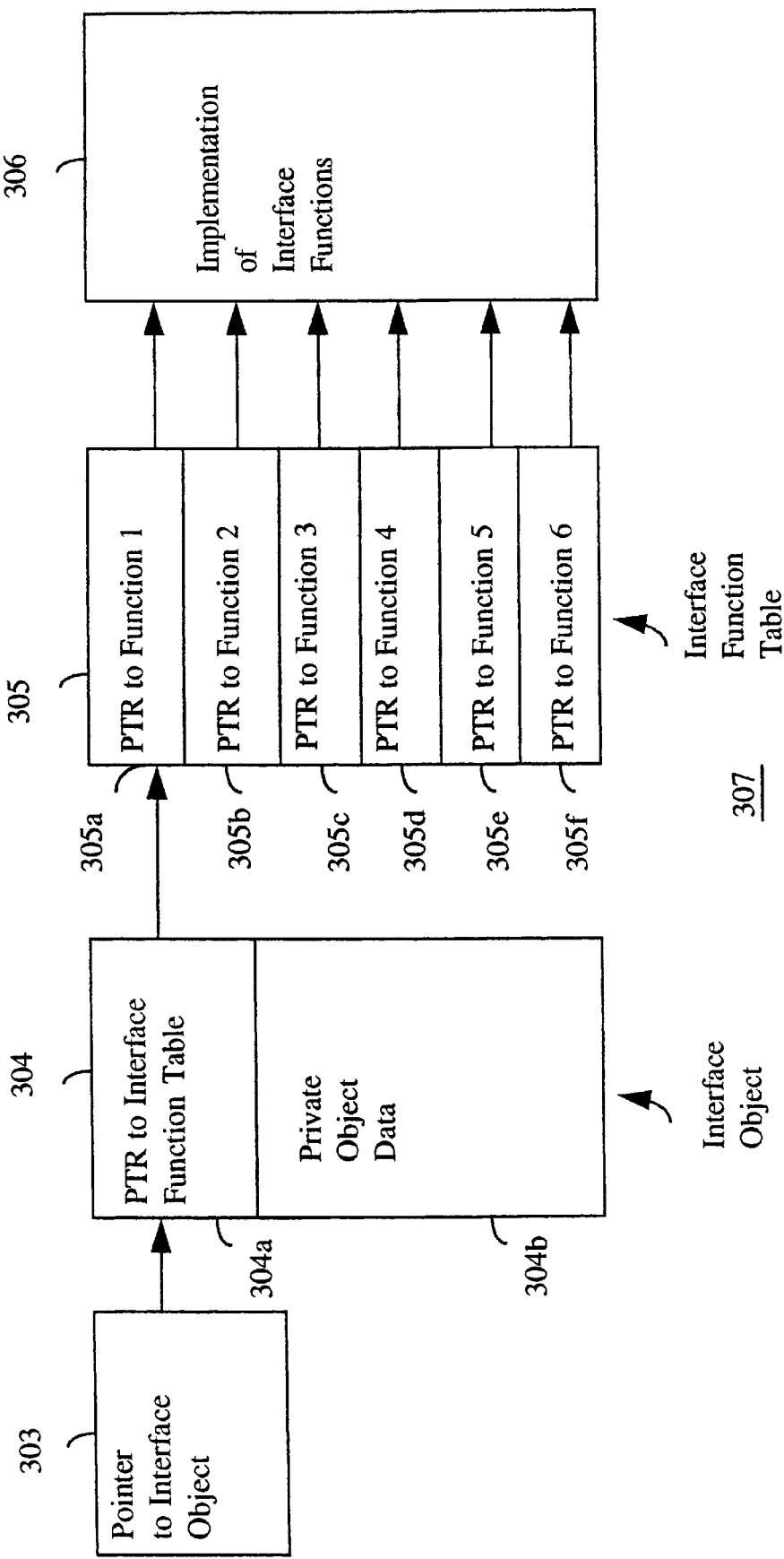
FIG. 29 is a block diagram showing an example of an interface structure.

Referring now to FIG. 29, an interface structure 307 for an object is shown. The interface structure 307 provides an implementation of each of a plurality of member functions through an array of pointers to the member functions. The array of function pointers is referred to as the "vtable" or "virtual function table".

In FIG. 29 a pointer 303 is shown pointing to an interface object 304. The interface object 304 includes a pointer 304a to an interface function table 305 and a private object data region 304b. The interface function table 305 is shown having pointers 305a through 305f to functions 1 through 6. The pointers 305a through 305f in interface function table 305 point to implementations of the interface functions 306. The number of pointers shown here six (6) is for purposes of example only, and other numbers of functions may be used for various specific interfaces.

In a multicode execution environment, the user of a given interface function accesses that interface function using the pointer 303 to the interface object 304. However, the implementation of interface functions 306 may be for an architecture dissimilar to the architecture which the execution engine of the user or client of the object supports.

The interface function table 305 is shared among all instances of an interface object. In order to differentiate each interface instance, an object allocates according to the object's internal implementation a second structure that contains private object data 304b for each interface instance. In the example of FIG. 29, the first four bytes of interface object 304 are a 32-bit pointer to the interface function table 305, followed by whatever private data 304b the interface object has. The pointer 303 to the interface object 304, is thus a pointer to a pointer to the interface function table 305. It is through the pointer 303 to the interface object 304, referred to herein also as an "interface pointer" or "pointer to an interface", that a client accesses the object implementation of the interface methods, also referred to herein as the "interface member functions".

The client may not access the interface object's private data 304b. The elements of FIG. 29 are an example of a structure that C++ compilers may generate for a C++ object instance. To access an interface to an object, and thus apply the interface functions to an object instance, a client must obtain a pointer to the interface, for example interface pointer 303.

OPERATION IN OBJECT ORIENTED SERVICE SYSTEM

Figure 30:
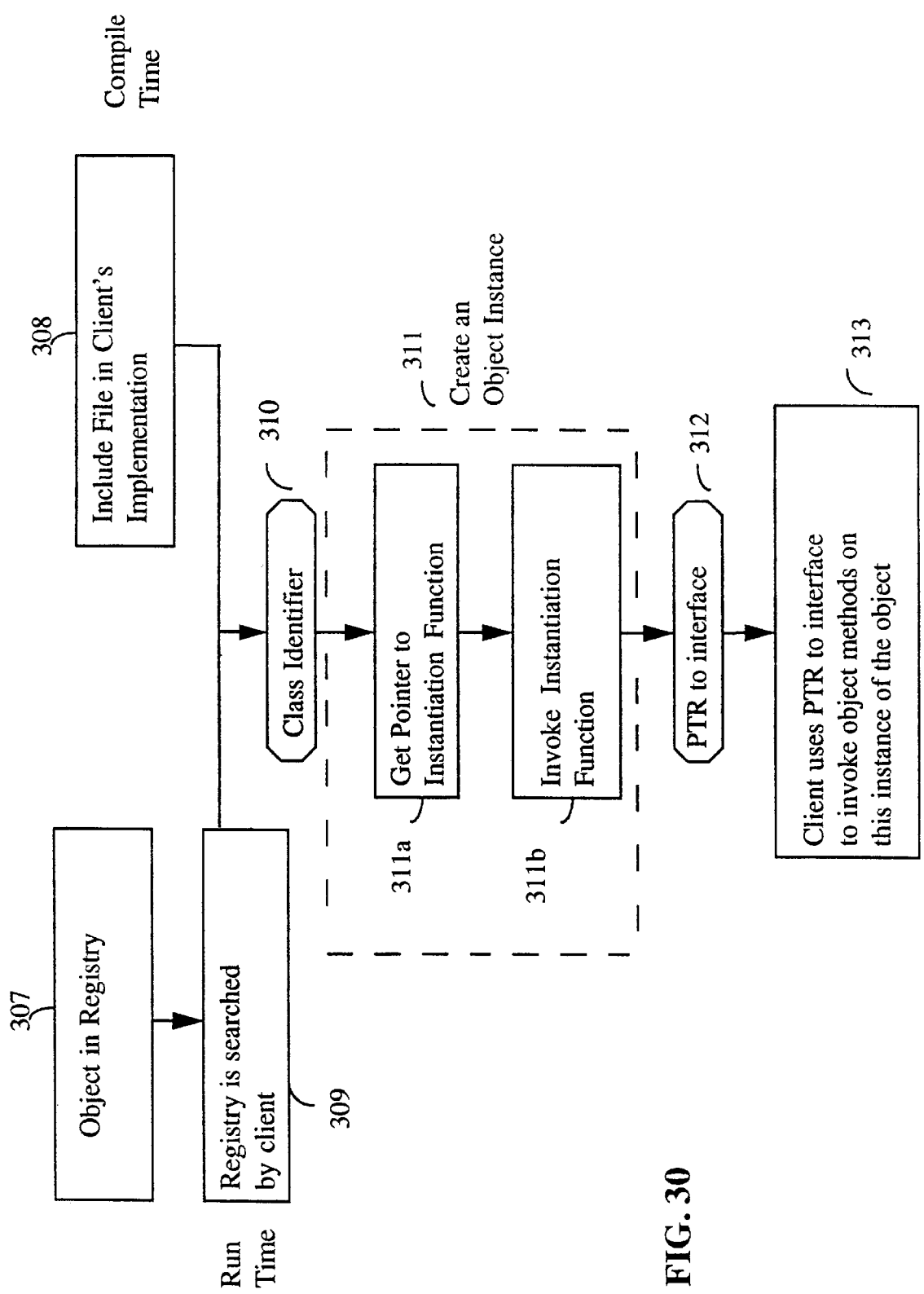
FIG. 30 is a flow chart showing an example of steps leading to the use of an object in an object oriented service system.

Now referring to FIG. 30, a sequence of steps to use an object in an object oriented service system is shown. In step 307 an object is entered into a system registry. The system registry may for example be part of the operating system (not shown) of the computer system on which the client is executing. Step 307 may occur for example either at run time or at system build time. If the entry is made at build time, then the object is known by the system registry prior to the client starting up. This is known as "static registration". Where the object class is established at run time and is known locally to the client process this is known as "dynamic registration". For example, dynamic registration is accomplished by a call to a dynamic registration service function, as in the OLE service architecture by use of the CoRegisterClassObject function.

Following step 307, in step 309, if the registration from step 307 is static, the registry is searched based on a user input to obtain a class identifier ("ClassId"). For example, a user may provide an input through a graphical user interface (GUI) indicating to the system that the registry should be searched for information regarding a previously registered object class. If the registration from step 307 is dynamic, then the ClassId of the object class is known by the client as a result of a call to the dynamic registration service function for the service architecture.

Alternatively to steps 307 and 309, a client may have information regarding the object class in question included in an "include file" within the client's implementation in step 308. For example this information may be a class identifier for a particular class of objects which the client wishes to instantiate and access at run time. Step 308 occurs at compile time.

The output of steps 307 and 309, or alternatively step 308, is a class identifier 310. The class identifier 310 is used by the client to obtain an instance of an object for the client to use. Step 311 shows an example embodiment of the steps required to obtain an object instance. In substep 311a a pointer is obtained to an interface used to create instances of the object identified by the class identifier 310. For example in the OLE service architecture an interface known as IClassFactory is used to obtain instances of an object. In the OLE system, for purposes of example, a pointer to IClassFactory is obtained by calling the OLE service OleGetClassObject in substep 311a. The interface to IClassFactory is then used to create an object instance of a particular class identified by the class identifier 310.

Subsequent to substep 311a, in substep 311b the client creates an instance of the object by invoking a function of the interface obtained in substep 311a. In OLE, for example, the function invoked is IClassFactory::CreateInstance. The output of substep 311b is a pointer to an interface. The interface pointer is shown as 312 in FIG. 30. In OLE the interface pointer obtained is a pointer to the IUnknown interface, which is required to be present in all OLE object interfaces.

After obtaining the interface pointer 312, the client uses the interface pointer to learn and invoke object methods on the instance of the object created in step 311. As shown in FIG. 30, in order to use an object a client first obtains a class identifier, either through a registration system, or through compile time information such as include files. The next step necessary for a client to use an object is for the client to create an object instance. Once the object instance is created, for example, in step 311, a pointer to an interface of the object is then available to the client. The interface pointer is necessary for the client to access the object, since an object may only be accessed through one of its interfaces. Finally, after a client has obtained an interface pointer, that interface pointer may be used to invoke object methods on the object instance in step 313.

JACKETTING AND INTERFACE STRUCTURE REPLACEMENT

Figure 31:
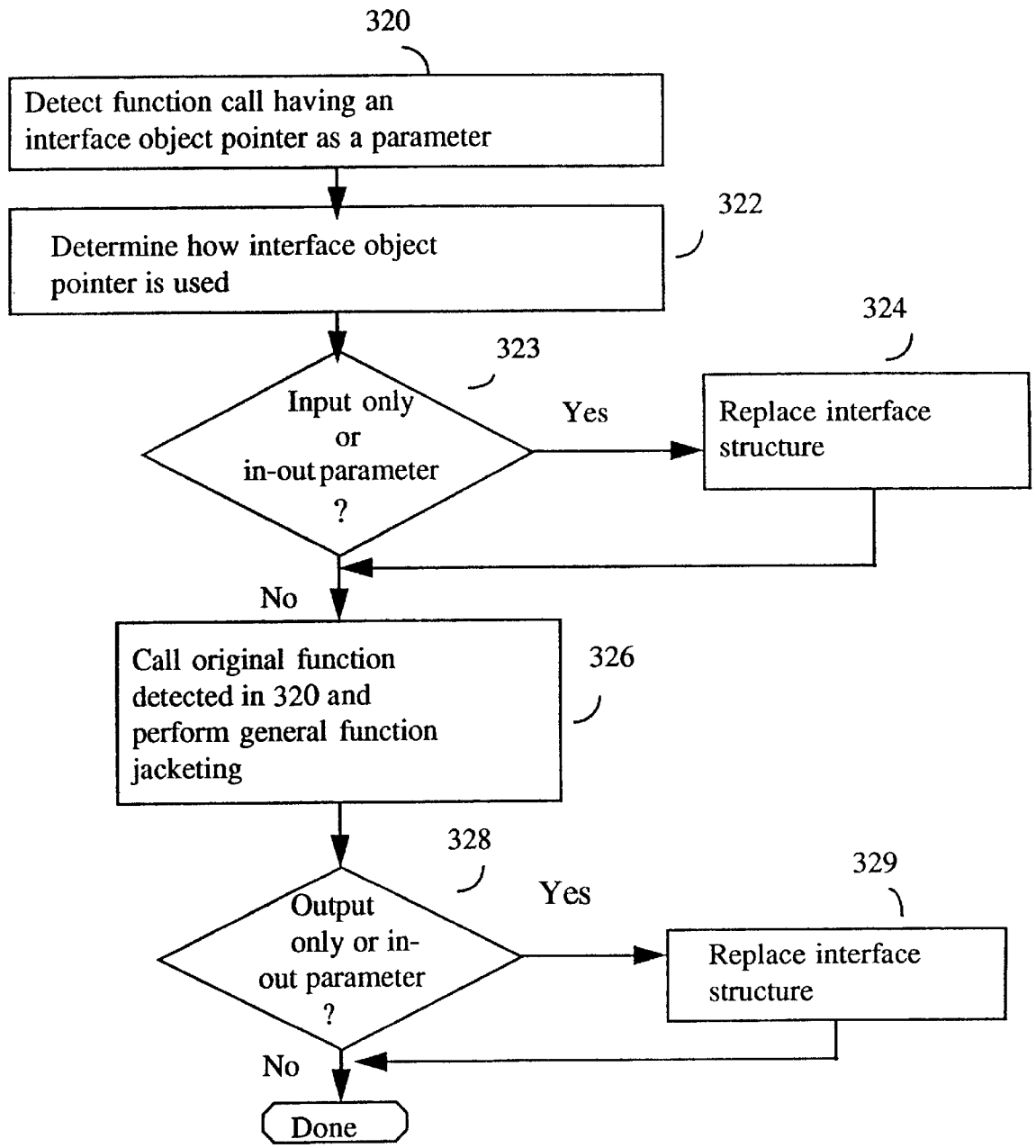
FIG. 31 is a flow chart showing steps in an example embodiment of a method for intercepting functions to perform interface structure replacement.

Referring now to FIG. 31, steps in an example embodiment of a method for intercepting functions in order to perform interface structure replacement are shown. The steps are performed to replace the interface structure shown in FIG. 29 with a replacement interface structure shown in FIG. 32. The steps of FIG. 31 further perform general function jacketing with respect to the intercepted function. In an example embodiment, the steps of FIG. 31 are performed by the jacketing routine 48 (FIG. 3).

At step 320 the jacketing routine 48 detects a function call having an interface object pointer as a parameter. The set of function calls having an interface object pointer as a parameter is determined prior to run time. In an example embodiment of FIG. 31, the set of function calls having an interface object pointer as a parameter, and which therefore are detected by the jacketing routine 48 in step 320, include all OLE Application Programming Interface calls (OLE APIs) and all calls to OLE Standard Interface functions. The names of the OLE APIs and OLE Standard Interface functions are determined and passed to the jacketing routine 48 prior to run time. For example the names of the function calls having an interface object pointer as a parameter are built into the jacketing routine 48, for example at compile time through an include file. The names and descriptions of functions having an interface object pointer as a parameter may be determined from documentation available from the manufacturer, dealer or developer of the object based service architecture. The run time addresses of these functions are made available to the jacketing routine 48 and the jacketing routine 48 is invoked upon any transfer of control to one of these functions in step 320.

Other examples of function calls detected by the jacketing routine 48 in step 320 are those functions in the object service architecture which enter an object class into a system registry, functions which search the system registry and return a ClassId of an object class, or functions which create an object instance. These functions include those shown in FIG. 30 as 307, 309, and 311 respectively. Thus in step 320 functions which have an interface object pointer as a parameter are detected so that interface structure replacement can be performed. If a function call is intercepted in step 320 which does not take an interface object pointer as a parameter, no interface structure needs to be replaced and therefore no replacement is performed by the jacketing routine 48.

In step 322, following step 320, the jacketing routine 48 determines how the interface object pointer parameter is used by the function call detected in step 320. The exact usage of the interface object pointer parameter for each function having an interface object pointer parameter is determined prior to run time and incorporated into the jacketing routine 48. For example, the jacketing routine 48 may include a list of argument templates describing the format and use of arguments in the function calls intercepted in step 320. Such argument templates may for example be developed a priori from information regarding the function calls intercepted in step 320 contained in documentation or source code from the manufacturer, dealer or developer of the object based service architecture. In an alternative embodiment, the argument templates are developed at run time based on information obtained regarding the function calls intercepted in step 320 from a type information service provided by the object service architecture.

In an example embodiment each argument template describes whether the interface object pointer is an "input-only", "input-output", or "output-only" parameter. An input-only parameter is passed to the function, but is not modified or passed back from the function. An input-output parameter is passed to the function and replaced or modified before the function completes. And an output-only parameter is written or passed back from the function call without regard to its input value. In step 322 of FIG. 31 the jacketing routine determines whether the interface pointer parameter is input-only, input-output, or output-only, based on information in the argument template for the intercepted function.

At step 323 the jacketing routine 48 branches to step 324 if the interface pointer parameter is input-only or input-output. If the interface pointer parameter is not input-only or input-output, step 323 is followed by step 326. In step 324 the interface structure indicated by the interface pointer parameter is replaced with the replacement interface structure shown in FIG. 32.

In step 326 the original function detected in step 320 is called by the jacketing routine 48. During step 326 general function jacketing is performed by the jacketing routine 48. General function jacketing is described in FIG. 40.

At step 328 the jacketing routine 48 branches to step 329 if the interface object pointer parameter was either output-only or input-output. If the interface object pointer parameter was not output only or input-output, then the jacket function 48 is done for this intercepted function after step 328. In step 329 the jacketing routine 48 replaces the interface structure of the interface pointed to by the interface object pointer parameter with the replacement interface structure shown in FIG. 32.

REPLACEMENT INTERFACE STRUCTURE

Figure 32:
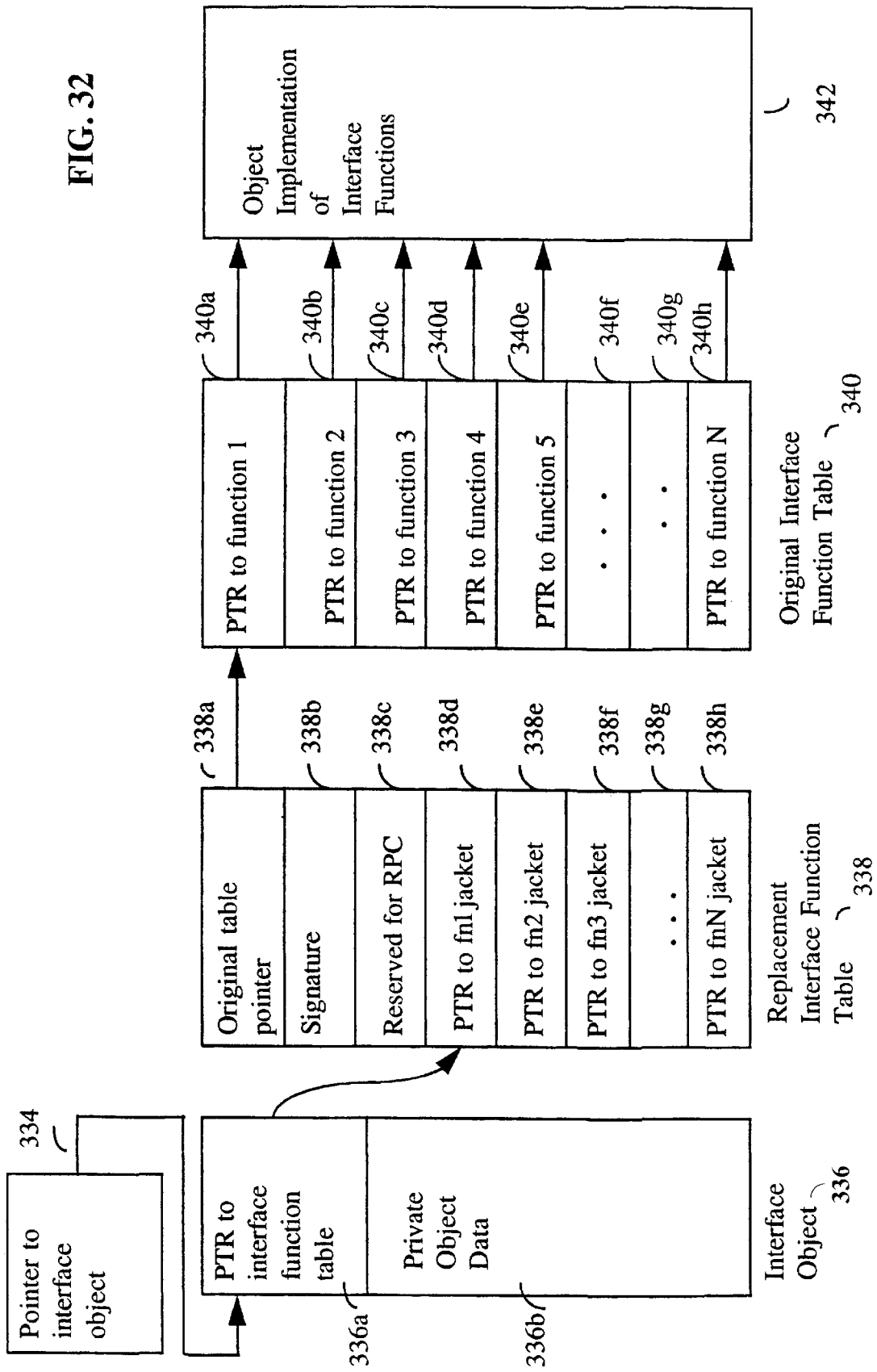
FIG. 32 is a flow chart showing an example replacement interface structure.

Referring now to FIG. 32, an example embodiment of the replacement interface structure provided by the jacketing routine 48 as described in steps 324 and 329 in FIG. 31 is shown. The example shown in FIG. 32 includes an interface pointer 334, pointing to the top of an interface object 336. The interface object 336 includes a pointer 336a to an interface function table, as well as private object data 336b. The pointer 336a points to the first of one or more jacket functions, for example 338d, within a replacement interface function table 338.

The replacement interface function table 338 includes a pointer to the original function table 338a, a signature 338b indicating the processor architecture for which the object was originally created, an area 338c reserved for use by a system wide remote procedure call utility, a pointer 338d to a jacket function for function 1 in the original interface function table, and pointers 338e through 338h to jacket functions for other functions in the original interface function table. The pointer 338a to the original interface function table points to the top of the original interface function table shown as 340. The original interface function table contains pointers 340a through 340h to the object implementation of the interface functions 342.

During operation of the jacketing routine 48 shown in FIG. 3, the replacement interface structure shown in FIG. 32 is used to replace the original interface structure based on the function interception described in connection with FIGS. 31, 38 and 39. Subsequent to replacement with the replacement interface structure, clients executing in a first architecture (Architecture A), for example system 10 on which the code is being executed, may invoke functions for objects implemented in a second architecture (Architecture B), for example non-native code. Similarly, non-native code may invoke functions for objects created in native code. During operation of the disclosed system the replacement interface structure shown in FIG. 32 allows for multi-code operation of object methods that is transparent to the user.

The following "Interface Signatures Table" (TABLE II) shows replacement interface structure signatures in the middle column, and indicates the functionality of jacket functions pointed to by replacement interface function tables for each replacement interface structure signature:

TABLE II

| Code Environment Where Interface Referenced | Replacement Interface Signature | Code Environment Where Interface Created |
| --- | --- | --- |
| Architecture B | PAJB | Architecture A |
| Architecture A | PAJB | Architecture A |
| Architecture B | PBJA | Architecture B |
| Architecture A | PBJA | Architecture B |

The replacement interface structure signatures in the Interface Signatures Table are shown eLs character strings for purposes of example, and other encodings are possible. The left most column indicates the architecture of the execution engine from which an interface is referenced. The middle column shows the signature of the replacement interface function table for that interface. The signature in the middle column indicates the functionality of jacket functions pointed to by the replacement interface function table.

The right most column indicates the processor architecture for which the interface and its object functions was originally created. The present system determines the processor architecture for which the interface was originally designed as follows: When a call is intercepted to a function having a parameter equal to a pointer to an interface object, the intercepting process of the present invention, for example the jacketing routine 48, determines whether the interface structure has already been replaced. This determination is made by checking the signature field in the interface structure. If the signature field contains either the string PAJB or PBJA, then the interface structure has been replaced, and no further replacement is performed.

If no interface replacement has been performed, then a replacement is performed. When an interface structure is replaced the replacing process determines the signature of the replacement interface structure based on the processor architecture of the execution engine from which the call having a parameter equal to an interface object pointer was made. If the call was made from an execution engine for Architecture A, and no replacement has previously been made, then the object interface functions were designed and developed for use on the execution engine for Architecture A. This follows because an object instance must initially be created in order for operations to be performed on object data within the instance, and object creation involves use of functions that are intercepted by the present system.

The first two rows in the Interface Signatures Table show the case in which the processor architecture for which the interface was originally created is Architecture A. The middle column entries in those rows indicate that when a replacement interface function table is provided for an interface that was designed for Architecture A, the signature string for that replacement interface function table is "PAJB". Thus when an object interface was originally designed for Architecture A, the jacketing routine 48 in FIG. 3 writes a signature code of "PAJB" into the signature field of a replacement function table provided as described in steps 324 and 329 in FIG. 31.

The signature code indicates the functionality of the jacket functions pointed to by the replacement interface function table. If the signature code in a replacement interface table is "PAJB" then if a subsequent reference is made to the interface object from code executing in an execution engine for Architecture B (as in the first row of the table), the call to the original interface function is jacketed (through general function jacketing) by the jacket function. If the reference to the object is made from code executing under the execution engine for Architecture A (as in the second row), then the original interface function is passed through to the execution engine for the code making the reference. Passing the original interface function through permits it to execute at maximum speed without general function jacketing overhead. The signature code PAJB is an acronym standing for "Pass Through A—Jacket B".

In rows 3 and 4 of the table, the replacement interface signature is PBJA, an acronym for "Pass Through B, Jacket A". This interface signature is included in a replacement interface function table when the code environment the interface was designed for is Architecture B. If the interface is subsequently referenced by code executing on an Architecture B execution engine (as in the case shown by row three), then the jacket functions pointed to by entries in the replacement interface function table pass through the original function to the Architecture B execution engine in order that it may execute at maximum speed without unnecessary general function jacketing. If the interface is referenced from an Architecture A execution engine (as in row four), then the jacket function performs general function jacketing on the call to the original interface function in order that the original interface function may execute correctly.

MULTI-ARCHITECTURE INSTRUCTIONS

Figure 33:
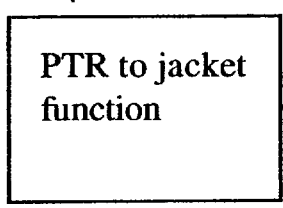
FIG. 33 shows an example embodiment of a template for a jacket function.

In FIG. 33 there is shown an example design template for a jacket function. A pointer 350 to a jacket function is shown, corresponding to the pointers shown in FIG. 32 as elements 338d through 338h. The pointer 350 points to the entry point label From_Table 352. Two other entry point labels are shown, specifically ARCHB 355 and 354 ARCHA.

At the entry point From_Table 352, there is shown a "multi-architecture instruction" 353 (Instruction X) which is executable by execution engines for both Architecture A and Architecture B. In an example embodiment of the invention, where Architecture A is an Alpha system, and Architecture B is an X86 type system, the binary value of the multi-architecture instruction INSTX 353 is 0×23FFxxEB. In an Alpha system this binary value defines the following Alpha instruction:

LDA R31, {{ARCHB-{From_Table+2}&255}<<8 }+0×EB(R31)

This "LOAD ADDRESS" instruction consumes 4 bytes and is an operation which has no effect (referred to as a "NO-OP") because it writes ("loads") register 31 generates no exceptions, and does not access memory. In the Alpha architecture, register 31 is hardwired to zero, and writes to register 31 have no effect. Accordingly the value of the bytes "xx" are not relevant when the instruction executed by the Alpha execution engine. Thus when executed by the Alpha execution engine the multi-architecture instruction INSTX 353 has no effect on the value of register 31, which is always zero. Control passes to the next instruction following the multi-architecture instruction INSTX 353 at the entry point label ARCHA 354.

The above instruction INSTX 353 is defined by the X86 processor architecture as the jump instruction below:

JMP xx where ARCHB is a predetermined byte offset for the "JUMP IMMEDIATE BYTE" instruction having opcode EB (hex). The predetermined byte offset is calculated to result in a jump to the entry point ARCHB.

When the instruction INSTX 353 is executed by an Architecture B (Intel) execution engine, it is an unconditional branch immediate instruction causing a branch of control to an instruction located at an offset from the current instruction address. The byte displacement for the branch is found in the next to lowest byte, and is shown for purposes of example as the "xx" bytes. Therefore the value of the "xx" bytes is made equal to the offset of the entry point ARCHB 355. The entry point ARCHB 355 is thus "xx" bytes lower (if the offset is negative), or "xx" higher (if the offset is positive) than the multi-architecture instruction 353. After the multi-architecture instruction 353 is executed by the Architecture B execution engine, control is passed to the instruction located at the ARCHB entry point 355.

In an alternative embodiment, the multi-architecture instruction Instruction X is one which generates an exception when executed by either the Architecture A or Architecture B execution engine. For example Instruction X may be an instruction which causes an access violation by attempting to access an out of bounds memory location. Or Instruction X may be a binary value containing an illegal instruction resulting in an illegal instruction exception. In this alternative embodiment, the exception handler(s) for the exception generated by Instruction X determines that the cause of the exception was attempted execution of Instruction X. The exception handler then determines which execution engine was executing at the time of the instruction. If the execution engine was for Architecture A, then the exception handler transfers control to the entry point ARCHA. If the execution engine was for Architecture B, then the exception handler transfers control to the entry point ARCHB.

The functionality of the code following the ARCHB entry point 355 and the multi-architecture instruction 353 (ARCHA) depends on whether the original object (and its interface functions) was developed for Architecture A or Architecture B. The various combinations of steps found in these sections of code are described in FIGS. 34 to 37.

Figure 34:
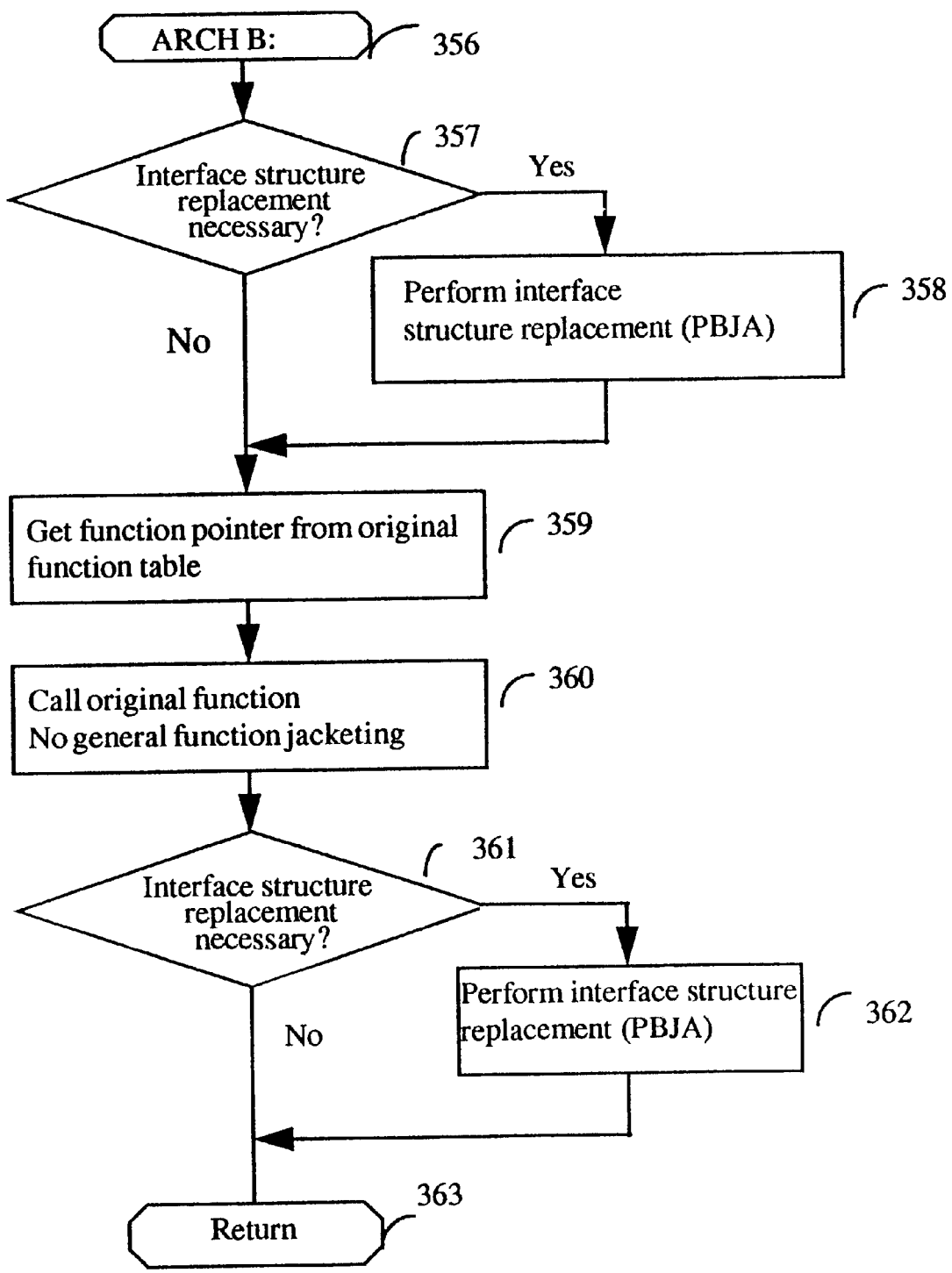
FIG. 34 is a flow chart showing steps performed in an example embodiment of a PBJA jacket function when called from non-native code.

FIG. 34 shows steps performed by the code in a PBJA jacket function at the entry point ARCHB shown as element 355 in FIG. 33. The steps of FIG. 33 "pass through" the original call to the execution engine of the caller without performing general function jacketing. In step 356 the code begins at the entry point ARCHB. The jacket function is therefore being called from code executing on an Architecture B execution engine. As described above the processor architecture of the caller may be determined using a multi-architecture instruction as shown in FIG. 33.

In step 357 the jacket function determines whether the original function being called is one that takes an interface object pointer as either an input-only or input-output parameter (as in steps 320 through 323 in FIG. 31). This determination is made for example based on a predetermined list of functions which take an interface object pointer as a parameter, as well as associated argument templates for each of the listed functions describing how the arguments to the function are used. In an alternative embodiment, the argument template may be obtained at run time from an object type information service provided by the object based service architecture.

If the original function takes an interface object pointer as either an input-only or input-output parameter, then the jacket function determines whether the signature field of the interface structure contains either PBJA or PAJB. If the signature field of the interface structure does not contain either PBJA or PAJB then the interface structure has not been replaced and replacement is performed. Accordingly if replacement is performed step 357 is followed by step 358. Otherwise, step 357 is followed by step 359. In step 358 the interface structure of the interface object pointer parameter is replaced with a PBJA replacement interface structure as shown in X+5. The signature is PBJA because the code making the reference is executing on the Architecture B execution engine, and therefore the interface was designed for execution on an Architecture B execution engine.

In step 359 the jacket function reads the pointer to the original function from the original function table. A pointer to the original function table is contained in the replacement interface function table. In step 360 the jacket function calls the original function. No general function jacketing is performed in step 360.

In step 361 the jacket function determines whether there is an interface object pointer parameter to the original function that is either an output-only or input-output parameter (as in step 328 in FIG. 31). This determination is made for example based on a predetermined list of object methods or functions which take an interface object pointer as a parameter, as well as associated argument templates for each of the listed functions describing how the arguments to the function are used. For example where the object based service architecture for the system is OLE, then the list of OLE Standard Interface functions is used to construct the predetermined list of object methods having an interface object pointer as a parameter. In an alternative embodiment, the argument template may be obtained at run time from an object type information service provided by the object based service architecture.

If the original object function takes an interface object pointer as either an output-only or input-output parameter, then the jacket function determines whether the signature field of the interface structure contains either PBJA or PAJB. If the signature field of the interface structure contains either PBJA or PAJB then the interface structure has not been replaced and replacement is performed. Accordingly, if replacement is performed then step 361 is followed by step 362 in which the interface structure for the interface object pointer parameter is replaced by a PBJA replacement interface structure. Otherwise, step 361 is followed by step 363 which returns to the original caller.

Figure 35:
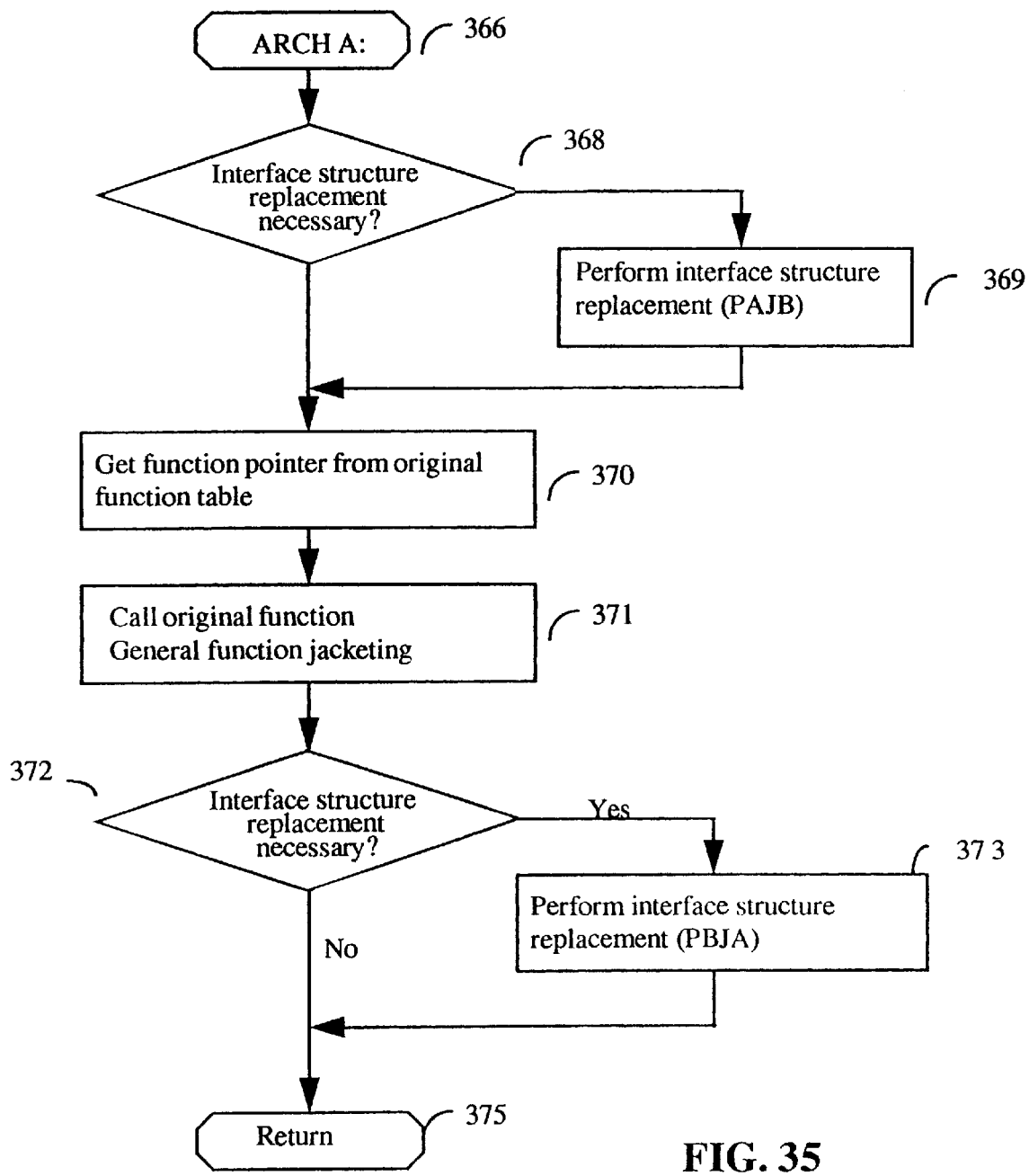
FIG. 35 is a flow chart showing steps performed by an example embodiment of a PBJA jacket function when called from native code.

FIG. 35 shows the steps performed by a jacket function pointed to by a pointer in a replacement interface function table, where the replacement interface function table signature field value is "PBJA." The steps are performed by software following the entry point ARCHA: as shown in FIG. 33.

The software performs general function jacketing. General function jacketing is further described in connection with step 326 in FIG. 31 above. The label ARCHA: is shown as element 366 in FIG. 35.

At Step 368 the jacket function determines whether it is necessary to perform interface structure replacement. Step 368 determines whether interface structure replacement is necessary by determining whether any of the parameters to the function associated with the jacket function are pointers to interface objects, and are either input-only or input-output. This determination is made for example based on a predetermined list of standard interface functions which take an interface object pointer as a parameter, as well as associated argument templates for each of the listed functions describing how the arguments to the function are used. An example of the predetermined list of standard interface functions would include the OLE Standard Interface functions. In an alternative embodiment, the argument template may be obtained at run time from an object type information service provided by the object based service architecture.

If the original function takes an interface object pointer as either an input-only or input-output parameter, then the jacket function determines whether the signature field of the interface structure contains either PBJA or PAJB. If the signature field of the interface structure does not contain either PBJA or PAJB then the interface structure has not been replaced and replacement is performed. Accordingly if replacement is performed step 368 is followed by step 369.

In step 369 the PBJA jacket function performs interface structure replacement, replacing the interface structure of the interface object pointed to the by the interface object pointer parameter with a replacement interface object structure as shown in FIG. 32, and having a signature value equal to "PAJB". The signature value is PAJB because the code referencing the interface was executing on an Architecture A execution engine.

In step 370 the PBJA jacket function reads the function pointer of the original function from the original function table. The original function table is accessed through a pointer to the original function table in the replacement interface function table. In step 371, the PBJA jacket function calls and performs general function jacketing on the original function.

In step 372 the PBJA jacket function determines whether interface structure replacement is necessary as to any of the output parameters of the original function. Interface structure replacement is necessary for any interface object pointer parameters to the function that are output-only or input-output. This determination is made for example based on a predetermined list of standard interface functions which take an interface object pointer as a parameter, as well as associated argument templates for each of the listed functions describing how the arguments to the function are used. In an alternative embodiment, the argument template may be obtained at run time from an object type information service provided by the object based service architecture.

If the original function takes an interface object pointer as either an output-only or input-output parameter, then the jacket function determines whether the signature field of the interface structure contains either PBJA or PAJB. If the signature field of the interface structure contains either PBJA or PAJB then the interface structure has not been replaced and replacement must be performed. Accordingly, if replacement must be performed then step 372 is followed by step 373. Otherwise step 372 is followed by Step 375.

In Step 373, the PBJA jacket function performs interface structure replacement by replacing the interface structure of the object pointed to by the output interface object pointer parameter to the function with the replacement interface structure shown in FIG. 33, and including the signature "PBJA" into the signature field of the replacement interface function table. The signature is PBJA because the interface was returned (output) from an execution engine for Architecture B in step 371. At step 375 control is passed to the original caller of the function.

Figure 36:
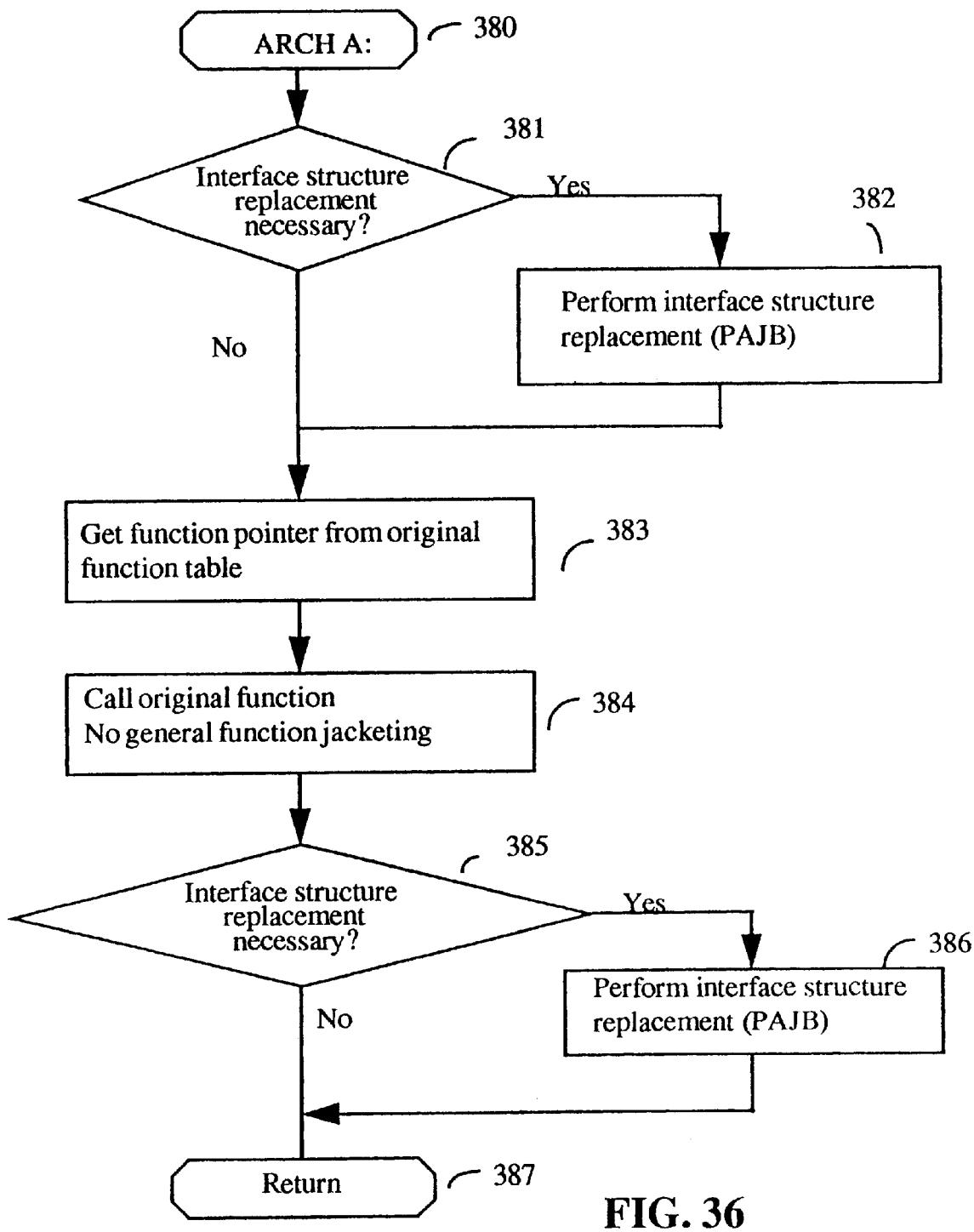
FIG. 36 is a flow chart showing steps performed by an example embodiment of a PAJB jacket function when called from native code.

FIG. 36 shows the steps performed by a jacket function in a "PAJB" replacement interface structure. The steps are performed by software in a jacket function following the entry point ARCHA: as shown in FIG. 34. The entry point ARCHA: 380 is followed by step 381. In step 381 PAJB jacket function determines whether interface structure replacement is necessary. Interface structure replacement is determined to be necessary at step 381 if the original function takes an interface object pointer as an input-only or input-output parameter. This determination is made for example based on a predetermined list of standard interface functions which take an interface object pointer as a parameter, as well as associated argument templates for each of the listed functions describing how the arguments to the function are used. In an alternative embodiment, the argument template may be obtained at run time from an object type information service provided by the object based service architecture.

If the original function takes an interface object pointer as either an input-only or input-output parameter, then the jacket function determines whether the signature field of the interface structure contains either PBJA or PAJB. If the signature field of the interface structure does not contain either PBJA or PAJB then the interface structure has not been replaced and replacement is performed. If interface structure replacement is determined to be necessary in step 381, step 381 is followed by step 382. Otherwise step 381 is followed by step 383.

At step 382 the PAJB jacket function performs interface structure replacement by replacing the interface structure for the interface object pointer parameter with a replacement interface structure as shown in FIG. 32 having signature field value equal to "PAJB". The signature is PAJB because the interface was referenced from code executing on an Architecture A execution engine and the interface was determined to not have been previously replaced by examination of the signature field. In step 383, the PAJB jacket function reads the function pointer to the original function from the original function table. The original function table is located through a pointer to the original function table contained in the replacement interface function table.

In step 384, the PAJB jacket function calls the original function. No general function jacketing is performed in step 384. The original function executes on the Architecture A execution engine.

In step 385 the PAJB jacket function determines whether interface structure replacement is necessary following the return of the call to the original function. The determination of step 385 is made by checking to see if the original function had an interface object pointer parameter that was either output-only or input-output. This determination is made for example based on a predetermined list of standard interface functions which take an interface object pointer as a parameter, as well as associated argument templates for each of the listed functions describing how the arguments to the function are used. In an alternative embodiment, the argument template may be obtained at run time from an object type information service provided by the object based service architecture.

If the original function takes an interface object pointer as either an output-only or input-output parameter, then the jacket function determines whether the signature field of the interface structure contains either PBJA or PAJB. If the signature field of the interface structure contains either PBJA or PAJB then the interface structure has not been replaced and replacement must be performed. Accordingly, if replacement must be performed then step 385 is followed by step 386. Otherwise, step 385 is followed by a return 387 to the original caller.

In Step 386 the PAJB jacket function performs interface structure replacement by replacing the interface structure for the output interface object pointer parameter with a replacement interface structure as shown in FIG. 32 having a signature field value equal to "PAJB". The signature is PAJB because the interface had not been replaced and the code returning (outputting) the object pointer was executing on an Architecture A execution engine.

Figure 37:
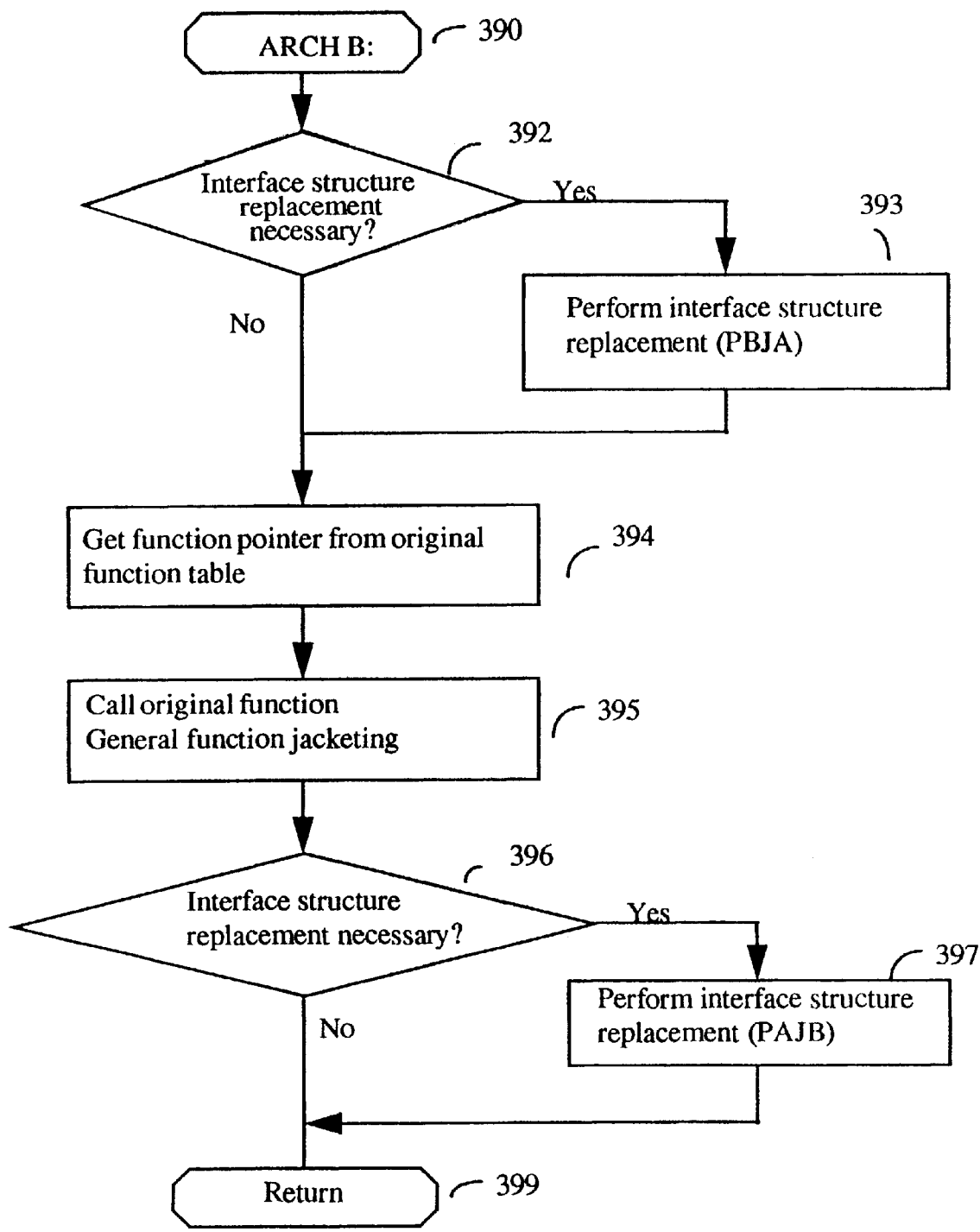
FIG. 37 is a flow chart showing steps performed by an example embodiment of a PAJB jacket function when called from non-native code.

FIG. 37 shows the steps of the code executed by a jacket function in a replacement interface structure having a signature field value equal to "PAJB", when a function in the interface is called from code executing under an execution engine for Architecture B. FIG. 37 includes steps performed by software stored following entry point ARCHB:.

In step 392, the PAJB jacket function determines whether interface structure replacement is necessary. The PAJB jacket function makes this determination by determining whether the originally called function includes a parameter that is an interface object pointer which is either an input-only or in-out parameter. This determination is made for example based on a predetermined list of standard functions which take an interface object pointer as a parameter, as well as associated argument templates for each of the listed functions describing how the arguments to the function are used. In an alternative embodiment, the argument template may be obtained at run time from an object type information service provided by the object based service architecture.

If the original function takes an interface object pointer as either an input-only or input-output parameter, then the jacket function determines whether the signature field of the interface structure contains either PBJA or PAJB. If the signature field of the interface structure does not contain either PBJA or PAJB then the interface structure has not been replaced and replacement must be performed. Accordingly if replacement must be performed step 392 is followed by step 393. Otherwise step 392 is followed by step 394.

In step 393 the PAJB jacket function performs interface structure replacement by replacing the interface object structure pointed to by the interface object pointer parameter with a replacement interface structure as shown in FIG. 32 and having a signature field value equal to "PBJA". The signature is PBJA because the interface had not been replaced and the code making the reference to the interface was executing under the Architecture B execution engine.

In step 394 the PAJB jacket function obtains the function pointer to the original function from the original function table. The original function table is accessible to the PAJB jacket function through a pointer to the original function table found in the replacement function table. In step 395 the PAJB jacket function performs general function jacketing and calls the original function for the interface.

In step 396 the PAJB jacket function determines whether interface structure replacement is necessary after the return of the original function. If the original function took as a parameter an interface object pointer that was either an output-only or input-output parameter, then interface structure replacement is necessary. This determination is made for example based on a predetermined list of standard interface functions which take an interface object pointer as a parameter, as well as associated argument templates for each of the listed functions describing how the arguments to the function are used. In an alternative embodiment, the argument template may be obtained at run time from an object type information service provided by the object based service architecture.

If the original function takes an interface object pointer as either an output-only or input-output parameter, then the jacket function determines whether the signature field of the interface structure contains either PBJA or PAJB. If the signature field of the interface structure does not contain either PBJA or PAJB then the interface structure has not been replaced and replacement must be performed. Accordingly if replacement must be performed step 396 is followed by step 397. Otherwise step 396 is followed by step 399.

In Step 397 the PAJB jacket function performs interface structure replacement by replacing the interface structure for the interface pointed to by the interface object pointer parameter with a replacement interface structure as shown in FIG. 32 and having a signature field value equal to "PAJB". The signature is determined to be PAJB because the pointer to the interface object was returned (output) from the Architecture A execution engine.

Thus it is seen that where a PAJB jacket function is invoked by a call from code executing under an Architecture A execution engine, or where the PBJA jacket function is invoked by a call from code executing under an Architecture B execution engine, no general function jacketing steps as described in connection with step 326 of FIG. 31 are performed. In this way the present invention provides for efficient execution of original interface functions without unnecessary general function jacketing when an interface function is invoked by code executing on an execution engine for which the interface was designed and developed.

LOAD TIME SUPPORT FOR INTERCEPTION OF FUNCTIONS

Figure 38:
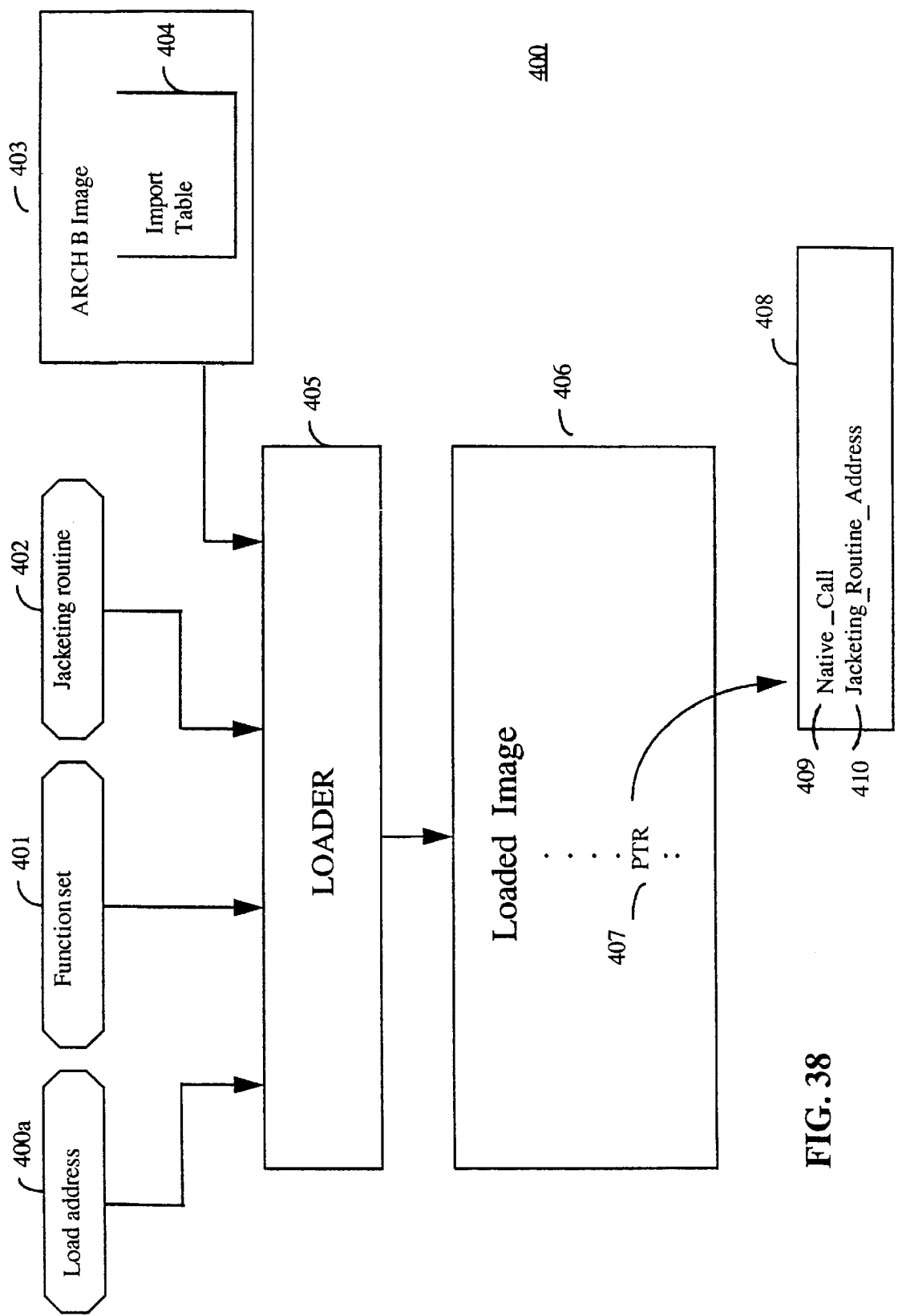
FIG. 38 is a block diagram showing an example of a system for load time processing to support interception of functions which take a pointer to an object as a parameter.

Referring now to FIG. 38, an example of a system 400 for load time processing to support interception of predetermined service architecture functions or standard interface functions known to take a pointer to an object is shown. The system includes a loader 405 having inputs of a load address 400a, a predetermined function set 401, an address of a jacketing routine 402, and a code image to be loaded 403. The load address 400a is a location in memory where the code image is to be loaded. The function set 401 is a list of functions which take an interface object pointer as a parameter. The list 401 may be in symbolic or binary address form. The jacketing routine address 402 is for example an address of the program code implementing the jacketing routine 48 as shown in FIG. 3. The code image 403 is for example a non-native code image developed for an Architecture B, and including an import table 404. The import table 404 includes a list of functions or routines which are invoked from the image 403, but which are not implemented within the image 403.

During operation of the elements shown in FIG. 38, the loader 405 creates a loaded image 406 beginning at the load address 405 in memory. The loader 405 replaces the call address of all calls to functions contained within the function set 401 with a pointer 407 to the replacement code 408. The call addresses of functions contained in the function set 401 are for example contained within the import table 404.

The replacement code 408 invokes a Native_Call routine which is developed to execute under the Architecture B execution engine, and which passes control to an Architecture A execution engine. The Native_Call routine further retrieves the Jacketing_Routine_Address 410 (from input jacketing routine address 402) and invokes the jacketing routine to execute on the Architecture A execution engine. Thus the loaded image 406 is provided by the loader 405 such that each call to a function within the function set 401 is replaced with a call to Native_Call, which in turn invokes the jacketing routine.

Figure 39:
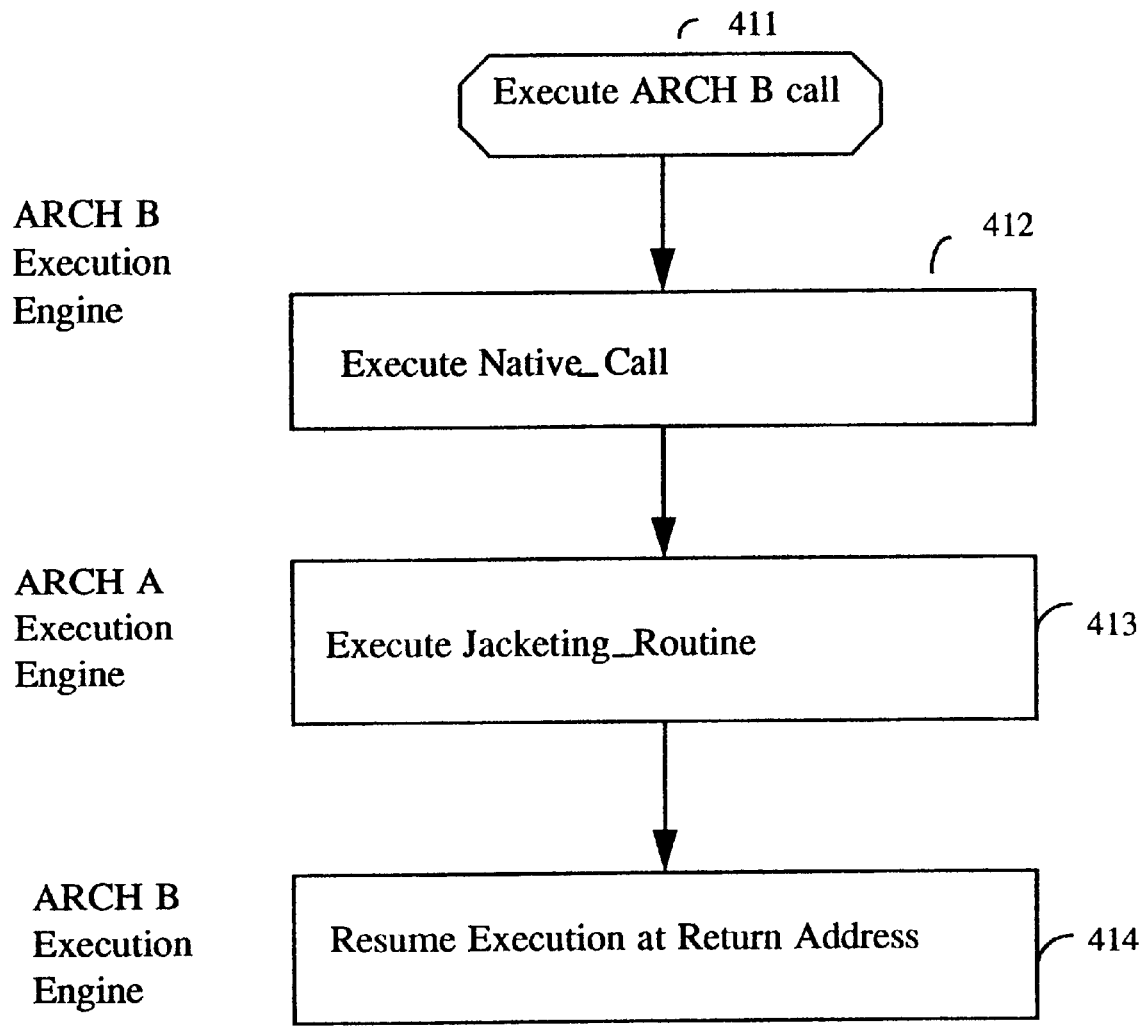
FIG. 39 is a flow chart showing an example of steps performed at run time to support interception of functions which take a pointer to an object as a parameter.

FIG. 39 shows an example of steps performed at run time to support interception of functions known to take a pointer to an object. At step 411, a loaded image, such as for example shown as element 406 in FIG. 38, reaches a point in it execution where a call had originally been placed to a function taking a pointer to an object. Since the image is an Architecture B image, it is executing on an Architecture B execution engine at step 411. As a result of the activity of the loader 405 in FIG. 38, the original call was replaced at load time with a call to Native_Call, followed by the Jacketing_Routine_Address as shown in replacement code 408 in FIG. 38.

At step 412 the Native_Call routine is called and executed on the Architecture B execution engine. The Native_Call routine gets the Jacketing_Routine_Address, and invokes the jacketing routine to run on the Architecture A execution engine. In an example embodiment where Architecture A is implemented in the underlying hardware, the jacketing routine is developed in native code, and accordingly executes advantageously fast on the hardware implemented Architecture A execution engine. At step 413 the jacketing routine executes, for example performing the steps described in relation to FIG. 31. At the end of the jacketing routine in step 413, a Native_Return routine is called, which returns control to the Architecture B execution engine at the return address following the Jacketing_Routine_Address in the loaded image. At step 414 execution thus resumes on the Architecture B execution engine at the return address in the loaded image.

GENERAL FUNCTION JACKETTING

Figure 40:
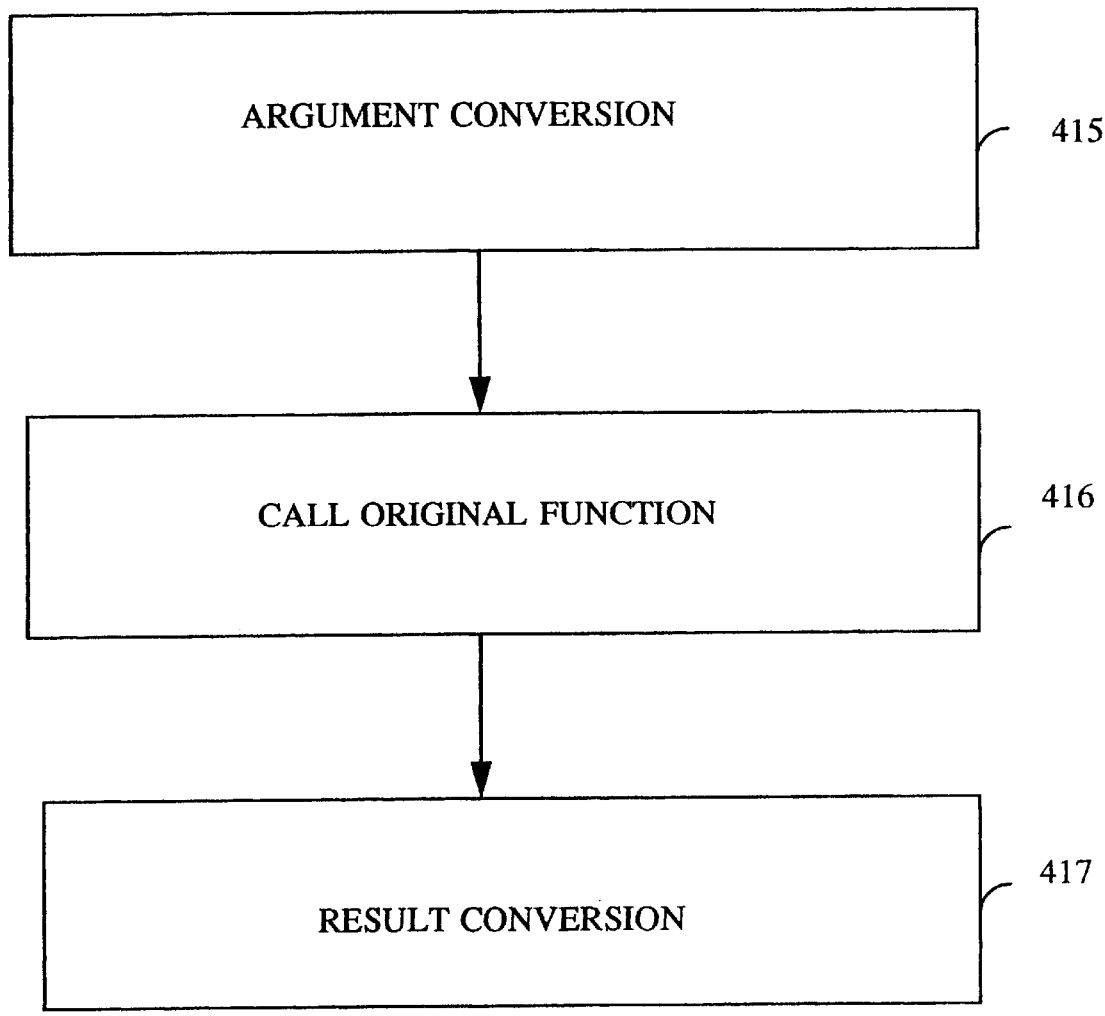
FIG. 40 is a flow chart showing an example embodiment of steps performed during general function jacketing.

FIG. 40 shows the steps performed to accomplish general function jacketing. At step 415 argument conversion is performed. The arguments to the original function are converted and/or reordered to compensate for differences between the calling and argument conventions of the processor architecture of the execution engine from which the object function is being called and the architecture for which the original object function was designed. Call back addresses are also modified as necessary.

For example where the caller is executing on an Architecture A execution engine, and the called function is developed for Architecture B, and where Architecture A is the Alpha architecture, and Architecture B is an X86 architecture, the caller has placed the arguments into argument registers as is required by the ALPHA architecture. However, the X86 architecture requires arguments to be passed on the stack. Therefore during 415 in this case the arguments are moved from the registers of the Architecture A execution engine onto the Architecture B execution engine stack for processing by the Architecture B execution engine.

Similarly, in an example implementation where Architecture A uses different floating point representation or length than Architecture B, then floating point arguments are converted into the representation for Architecture B in step 415. Other example functionality for step 415 includes byte swapping where there is a different byte ordering required by Architecture A with respect to Architecture B.

At step 416 the original function is called on the execution engine for which it was developed. For example where the original function was developed for Architecture B, and is called from Architecture A's, execution engine, at step 416 the address of the original function is passed to the Architecture B execution engine. Control is passed to the Architecture B execution engine at step 416 to execute the original function.

At step 417 result conversion is performed. The jacketing routine accommodates differences in return argument or result conventions between the calling architecture and the architecture on which the original object function was executed.

CONSIDERATIONS FOR BINARY TRANSLATION

The background optimizer 58 performs optimizations using a binary image as input. Generally, the optimizations reduce execution time and reduce system resource requirements. Optimizations are typically classified into the following four levels: peephole optimizations, basic block optimizations, procedural or global optimizations, and interprocedural optimizations. The number of assumptions regarding program structure generally increases with each level of optimization, peephole optimization assuming the least and interprocedural optimizations assuming the most regarding program structure.

A peephole optimization uses a window of several instructions and tries to substitute a more optimal sequence of equivalent instructions. A basic block optimization is performed within a basic block of instructions. Generally, a basic block is a group of instructions in which the first instruction is an entry point to the basic block, the last instruction is an exit point of the basic block with a guarantee that no instruction between the first and last instructions is itself a control transfer. A procedural or global optimization is performed upon a group of instructions forming a procedure or routine. An interprocedural optimization is performed amongst or between procedures.

Existing methods of performing procedural and interprocedural optimizations, as those typically implemented in an optimizing compiler, generally make underlying assumptions about the structure and properties of the code being optimized. For example, a method for a procedural optimization assumes that a called routine is entered via a call instruction. The code corresponding to the called routine is executed via a routine call made from another routine to the called routine using a standard routine linkage, as typically defined in a calling standard. As part of the standard routine linkage, the called routine includes a beginning sequence of prologue instructions executed prior to the code comprising the routine body.

Difficulties arise when performing procedural and interprocedural optimizations on a binary image, because traditional assumptions cannot be made about its structure. Such assumptions are made by existing source code optimizers because they typically process only structured input having predetermined properties, such as a "filtered" intermediate representation of a program produced by a compiler of a high-level language. Usually, the intermediate representation includes well-defined structures, such as a routine, and the compiler's optimizer makes assumptions regarding properties and structure about the input. When the input is a binary image, such structural assumptions cannot be made because of the possible intermixing of machine instructions (code) and data.

As a result, a new set of problems evolves when implementing procedural and interprocedural optimizations in the background optimizer 58 that optimizes a binary image since assumptions about its structural cannot be made. Existing procedural and interprocedural optimization techniques typically implemented in an optimizing compiler cannot readily be employed in the background optimizer 58 because properties and program structure about the code included in the binary image input cannot be assumed.

Here in order to implement procedural and interprocedural optimizations, such as register allocation, local and global data flow optimizations, code motion and constant value propagation, in the background optimizer 58 a basic unit of translation analogous to a routine using image information available to the background optimizer is determined. The image information may include information comprising the binary image itself, and information ascertainable from the binary image and its execution.

One problem is determining the general characteristics or parameters that define the basic unit of translation. Another problem is, given a binary image, determining an efficient method to collect or obtain values for the parameters. The values are used to determine basic units of translation comprising the binary image upon which procedural and interprocedural optimizations can be performed.

DETERMINING TRANSLATION UNITS

Figure 41:
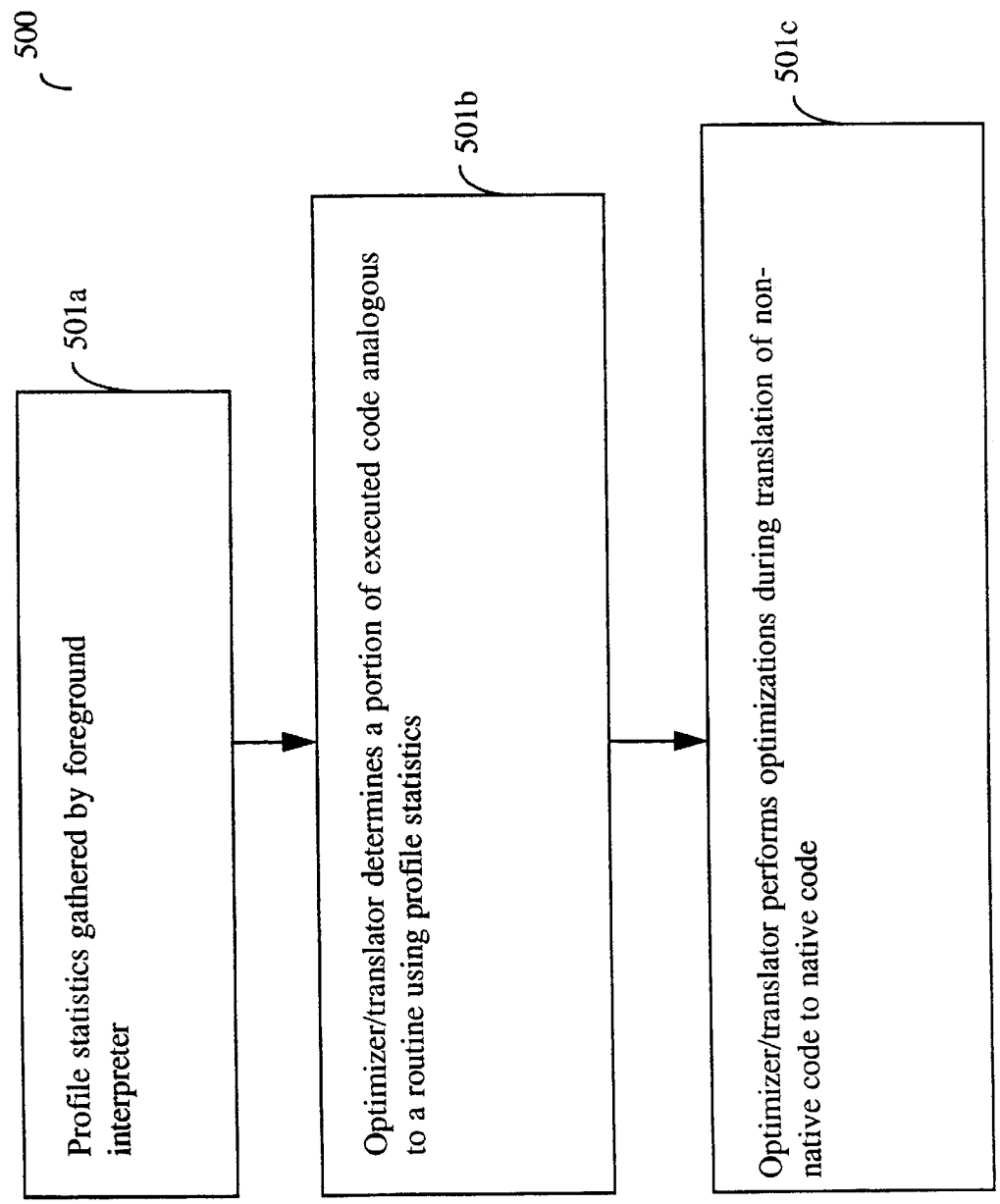
FIG. 41 is a flow chart showing steps to determine and use translation units when performing a binary translation.

Referring now to FIG. 41, a portion of the translator 54 and optimizer 58 included in the background system 34 that determines and uses translation units from a binary image input is shown, e.g., the translation unit determiner 500 is shown. The translation unit determiner derives a unit of translation that is similar to the traditional notion of a routine. At step 501a, execution or run-time information is gathered by the run-time interpreter 44. Specifically, the run-time interpreter gathers execution information stored as profile statistics 17c while interpreting code. At step 501b, the optimizer or translator forms a unit of translation by determining a portion of the executed code that is analogous to a routine using the profile statistics 17c. In turn, at step 501c, the optimizer or translator can perform traditional procedural and interprocedural optimizations, such as register allocation, upon the portion of non-native executed code that is analogous to a routine. The optimizations are performed during the translation of non-native code to native code by the background system 34. A detailed definition of the unit of translation and the method for forming the unit of translation is described in following paragraphs.

The steps of FIG. 41 can be performed by a translator, an optimizer, or a combined unit performing the functional steps typically employed by both an optimizer and a translator depending on the particular implementation of the binary translation system. As will be discussed in the ordering of the steps comprising translation and/or optimization vary and affect whether the steps of FIG. 41 are performed by a translator, an optimizer, or a combined unit.

Profile statistics, as mentioned above include execution information about a non-native image executed in the run-time system 32. Typically, profile statistics are stored by and associated with each binary image. The run-time system 32 notifies the server 36 as to the location of the profile statistics 17b, for example in a particular file stored on disk, so that the server communicates the profile statistics to the background optimizer 58 included in the background system 34.

The run-time interpreter classifies non-native machine instructions which are executed into two general classes based on execution flow control. The first class of instructions is a straight-line execution class and includes instructions that do not alter the flow of execution control. Upon executing a first instruction stored at a first memory address belonging to the first class, the next instruction executed is stored at a second memory address contiguously following the first instructions. An example is an 'add' instruction or an instruction which loads a register with the contents stored at a memory address.

The second class of instructions is a flow-alteration class and includes instructions that, either conditionally or unconditionally, alter the flow of execution control. Typical machine instructions included in the second class are conditional and unconditional branch instructions, and jump instructions. The interpreter gathers run-time information about instructions comprising the second class. The run-time information is stored as profile statistics in disk segment 17c by the run-time interpreter.

An assumed property of a routine is that the code corresponding to the routine is entered via a routine call. One method of forming a unit of translation analogous to a routine uses a target address to which control is transferred upon execution of a routine CALL. The profile execution statistics gathered by the run-time interpreter include the target address to which control is transferred by a routine CALL, for example, from another code section.

Detecting a transfer of control that is a routine CALL generally includes detecting the occurrence of a particular instruction that transfers control to another instruction and belongs to the flow-alteration class. A routine CALL is detected by the run-time system. As an example, a calling standard defines a routine CALL to include a series of three (3) machine instructions to load a register with a target address and subsequently transfer control to the target address. The last machine instruction in the series of instructions is an indirect jump instruction, such as "JMP @R27", belonging to the flow-alteration class. Instructions prior to the jump instruction load a general register, "R27", with the target address. The jump instruction, "JMP @R27", then uses the contents of the register to obtain the target address. The jump is "indirect" in that the register "R27" is not the target address. Rather, the register is a pointer in that the register contains the target address. The "JMP @R27" instruction is a flow-alteration instruction comprising the CALL and is detected by the run-time interpreter. The target address of the last machine instruction, e.g., "JMP @R27", is stored as an execution or run-time profile statistic 17c.

The step of forming a translation unit 501b (FIG. 41) in the translation unit determiner 500 operates over the binary image to provide one or more translation units.

Figure 41A:
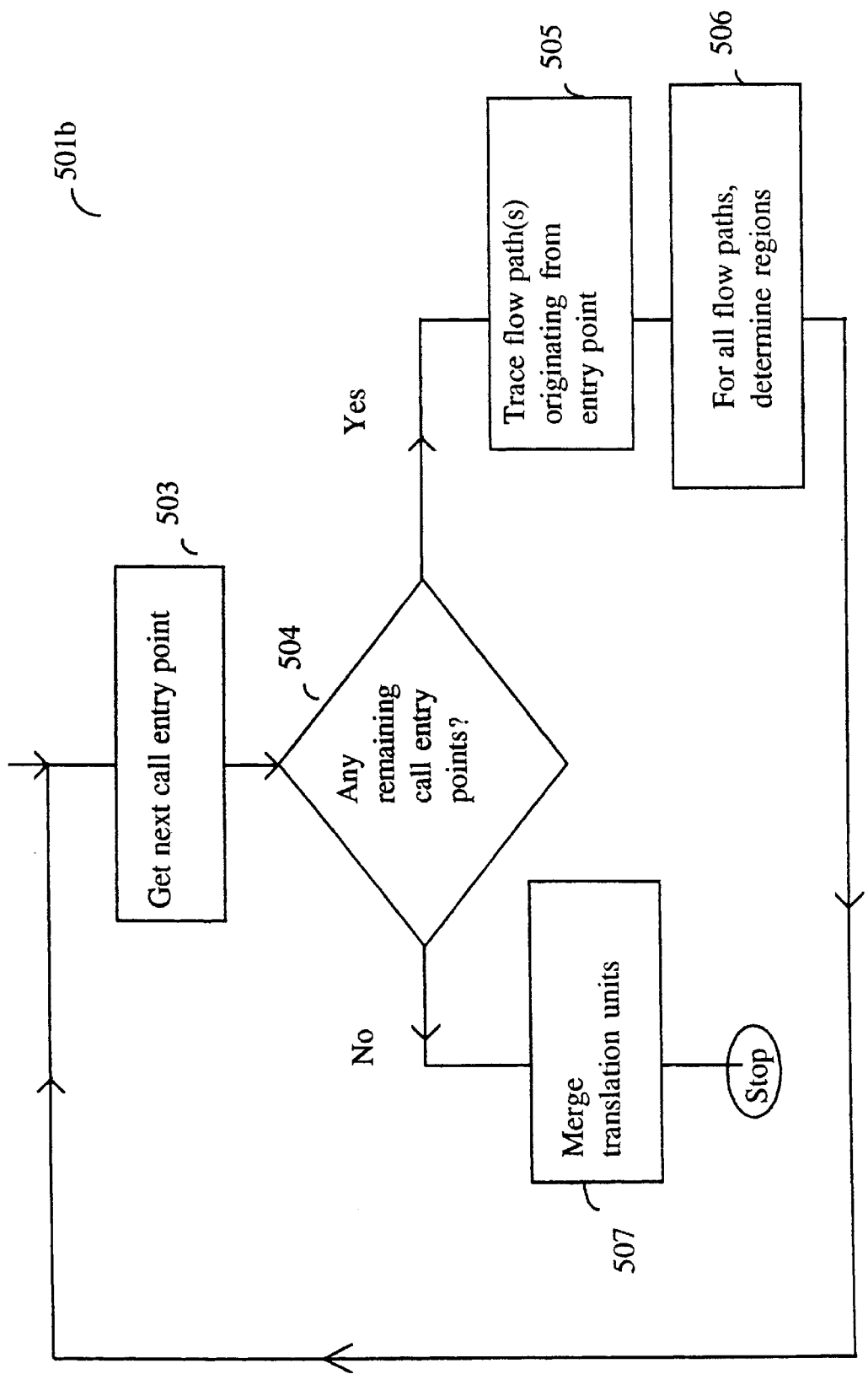
FIG. 41A is a flow chart showing steps to form translation units of a non-native binary image.

Referring now to FIG. 41A, the steps for forming a translation unit are shown. At step 503, determining a translation unit analogous to a routine begins by using a target address of a routine CALL as a starting point or entry point. The CALL entry point is read from the profile statistics 17c previously recorded by the run-time interpreter. The CALL entry point (also referred to as "entry point")is analogous to a routine entry point. A determination is made, as in step 504, as to whether there are any remaining CALL entry points. If there is a remaining CALL entry point, the execution control flow or flow path is traced, as in step 505. A flow path is a series of instructions that can be executed by the CPU depending on the evaluation of various run-time conditions affecting the evaluation. A flow path originates from the CALL entry point. The flow paths originating from the CALL entry point are traced by examining machine instructions beginning with the instruction located at the CALL starting point or entry point. When an instruction transfers execution control to one or more target locations depending upon run-time conditions and values, the execution flow is also traced for each of these target locations.

For all execution or flow paths originating from the entry point, bounded "regions" of code within the binary image associated with the current translation unit are determined, as in step 506. A translation unit is formed for each CALL entry point, until, at step 504, it is determined that all entry points have been processed. Subsequently, at step 507, translation units are merged, as needed, to form another combined translation unit.

A translation unit comprises one or more unique regions of code. A region is defined as sequence of one or more machine instructions stored at consecutive non-native memory addresses. There are no "holes" or "breaks" in the memory area occupied by the machine instructions or code comprising a region. Parameters that characterize a region include, for example, a starting and an ending address representing the boundaries of the code associated with a region. Regions, translation units, and the interrelations between them will be discussed throughout in the following text.

Figure 42:
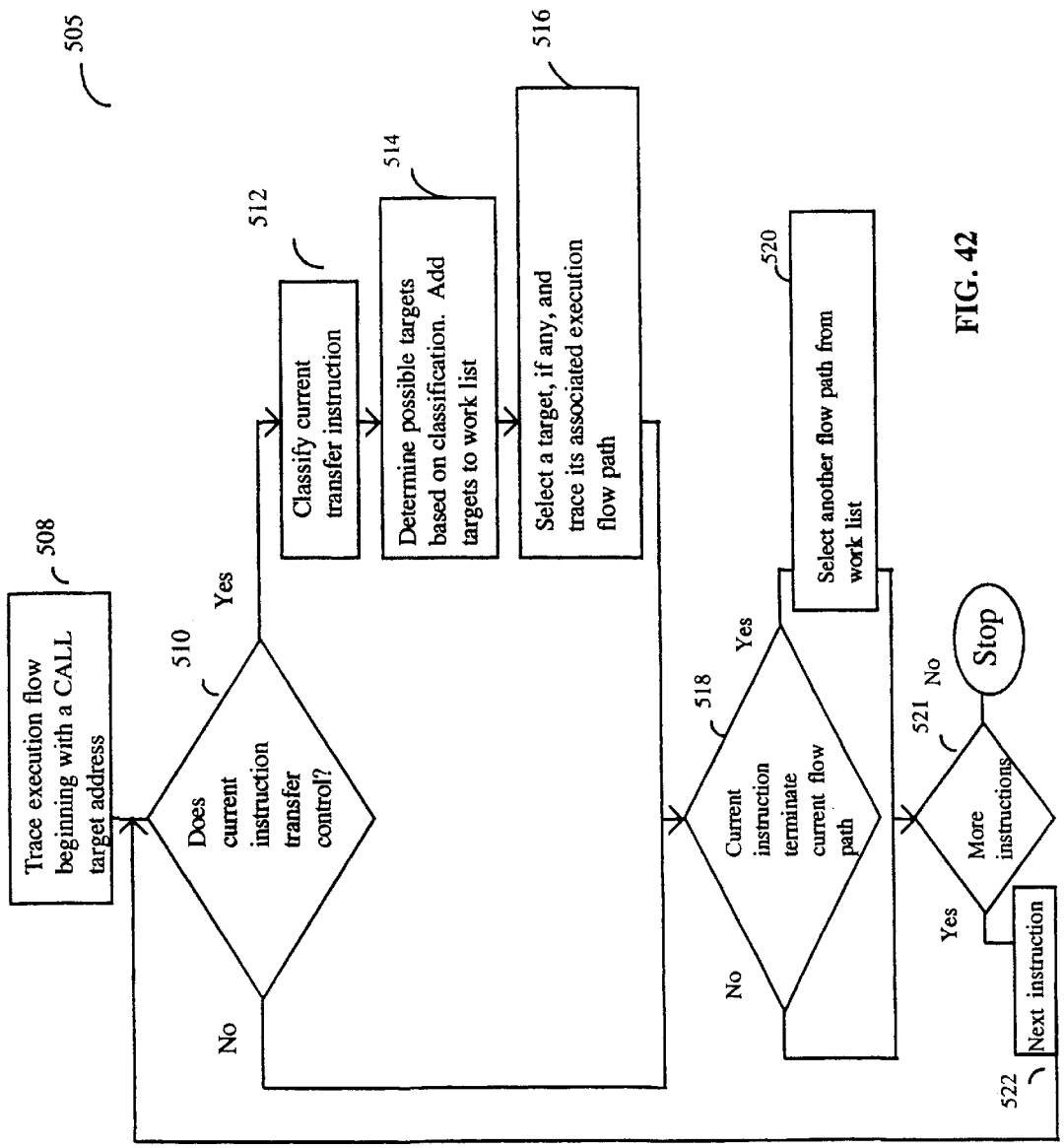
FIG. 42 is a flow chart showing steps of flow path determination.

Referring now to FIG. 42, a method of performing flow path determination of step 505 of FIG. 41A is disclosed. As in step 508, flow path determination commences by obtaining an entry point address that is a CALL target address from the profile statistics 17c. The current instruction located at the current address is examined, as in step 510, to determine if it transfers control to another address altering the current straight-line execution. A determination is made as to whether the current instruction belongs to the first or second aforementioned class of instructions.

If the current instruction belongs to the aforementioned second class of instructions and transfers control to another instruction thereby altering the straight-line execution, the instruction is also referred to as a transfer instruction. The transfer instruction is classified, at step 512, as either i) an indirect or computed transfer of control, or ii) a direct or program-counter relative (PC-relative) transfer of control. As in step 514, the technique used for determining the possible target locations to which control is transferred depends upon the classification of the transfer instruction.

An indirect transfer of control uses a dynamic run-time value to determine, as in step 514, its target address or addresses. For example, a computed jump instruction, such as "JMP @R5", uses a run-time value stored in a register of the computer system. The target address is determined at run-time using the value stored in the register "R5"when the jump "JMP" instruction is executed. The possible targets are determined using dynamic run-time information which typically changes with each execution of the jump instruction. Such dynamic information is included in the profile statistics 17c and is recorded by the run-time interpreter to determine the possible target(s) of the jump instruction. A method for determining the possible target locations is discussed in more detail in conjunction with FIG. 42A.

Using a direct or PC-relative transfer of control, the possible target location or locations can be determined, as in step 514, using offsets relative to the current instruction. The offset is included in the binary image and additional run-time information, such as with an indirect transfer of control, is not needed to determine the target locations. These targets are added to a cumulative work list of targets having flow paths to be traced. For example, a conditional branch instruction branches to a first address if a condition is true. If the condition is not true, the next consecutive instruction is executed. The first address is calculated by adding a fixed offset to the current program counter. The current program counter identifies a memory address of the current instruction. An example of a fixed offset is a byte offset encoded in the binary image at or near the current branch instruction. Thus, all possible targets can be determined using the current program counter (PC) and the offset included in the binary image. The possible target addresses in the foregoing example are the first address and the address of the next instruction consecutive to the current branch instruction.

Each memory address to which control can be transferred is a target address (also referred to as "target" or "transfer location"). If there are multiple possible target or transfer locations, each execution path associated with each target is traced one at a time. As in step 516, the background optimizer 58 chooses one of the possible targets and continues tracing that branch of the flow path.

Consecutive instructions in each flow path are sequentially examined until it is determined, as in step 518, that the current instruction is the last instruction in the current flow path, i.e., terminates the current flow path.

A flow path terminates when one of several conditions is detected. When a routine RETURN is detected, a flow path terminates. A routine RETURN is similar to a routine CALL in that it is typically dependent upon a machine instruction set defined for a particular computer system architecture. For example, a routine RETURN includes a particular machine instruction which terminates tracing of the current flow path branch.

A flow path also terminates, as in step 518, when there is insufficient run-time execution information to enable tracing to continue. In this case, the current flow path terminates when the current instruction is an indirect transfer instruction having an indirect target for which no run-time information has been obtained. Steps 514 and 516 have just been executed and resulted in no targets being determined and, therefore, no target selected. For example, an instruction is classified as an indirect transfer of control which uses run-time information to determine the possible target(s). Typically, the run-time interpreter 44 records the various target addresses for the indirect transfer of control. However, if the instruction that accomplishes the indirect transfer of control is not executed, the run-time interpreter 44 is unable to determine and record associated run-time information in the profile statistics. The background optimizer terminates tracing the current execution path because it has insufficient run-time information, i.e., a null target.

Upon determining in step 518 that the current flow path is terminates, another flow path or branch flow path is selected, at step 520, for example a branch flow path associated with another target determined at step 514 is selected from the work list.

At step 521, a determination is made as to whether there are any remaining instructions to be examined, i.e., whether all flow paths or branches thereof have terminated. If there are no remaining instructions determined in step 521, tracing flow paths for the current translation unit terminates. If at step 521 there are remaining instructions, another instruction is examined by advancing to the next instruction at step 522.

Generally, the method of FIG. 42 determines all possible flow path extensions or branches originating from a main flow path with the currently selected CALL entry point. Each branch of the flow path associated with each target of transfer of control within a translation unit is traced until the branch terminates.

Figure 42A:
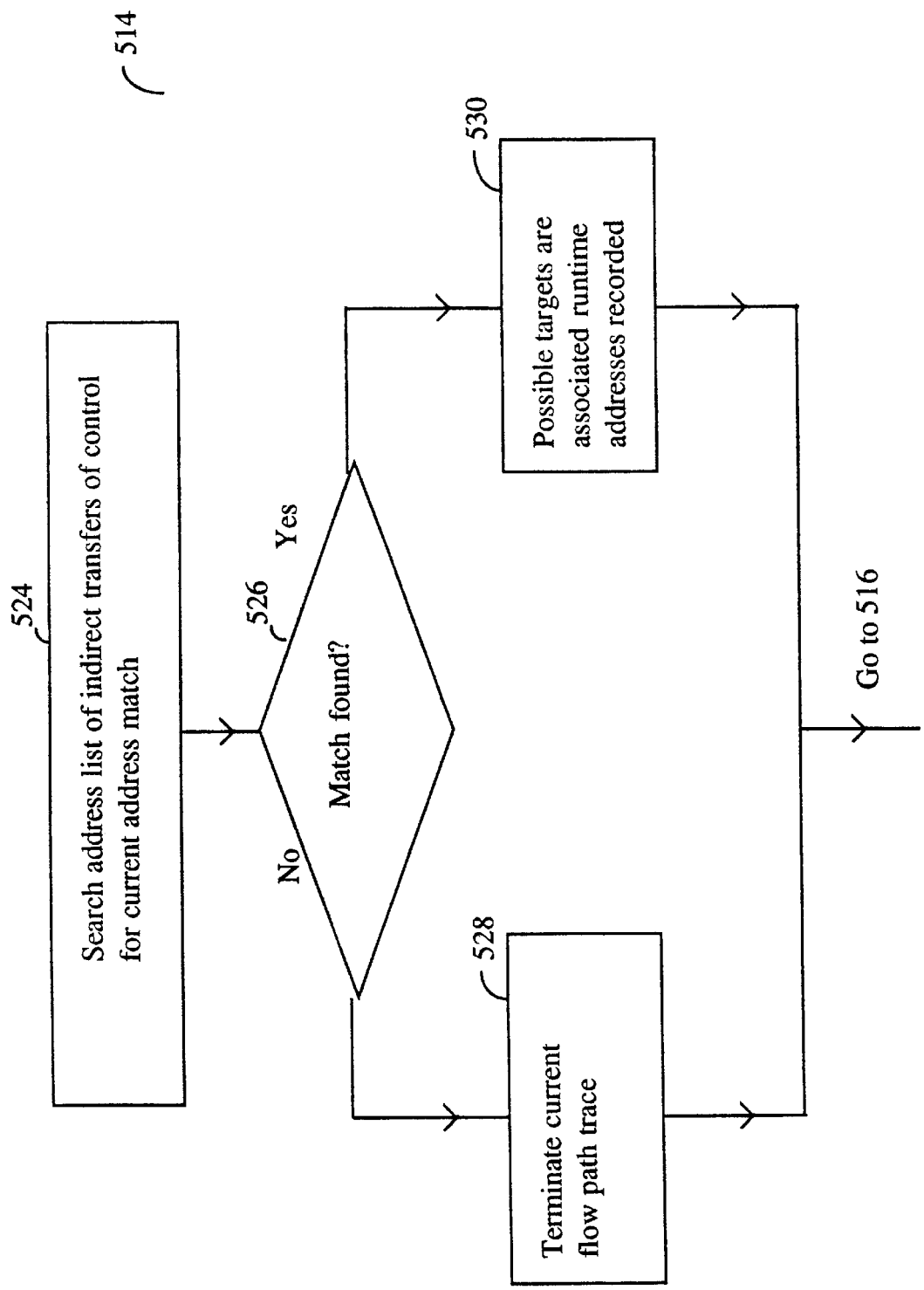
FIG. 42A is a flow chart showing steps to determine transfer of control target locations for an indirect transfer instruction.

Referring now to FIG. 42A, a detailed description of step 514 of FIG. 42 is shown when a transfer instruction is classified as an indirect transfer of control. For determining all possible targets, the background optimizer 58 uses run-time information stored as profile statistics 17c by the run-time interpreter. The profile statistics include, for an indirect transfer instruction stored at a non-native address, all target addresses to which control is transferred via the indirect transfer instruction. In one implementation in which the profile statistics 17c are organized in a hash table, the non-native address of the transfer instruction is used to determine a hash key corresponding to the record entry in the hash table containing the non-native address and the associated target addresses.

At step 524, entries comprising the profile statistics 17c are searched to locate a record entry corresponding to a first non-native address of a current instruction, for which targets are being determined at step 514. The precise method of searching performed at step 524 is dependent upon the organization of the profile statistics 17c. At step 526, it is determined whether a match for the first non-native address of the current instruction is found in the profile statistics. If no match is found, as in step 528, the trace of the current flow path terminates. As previously described, this condition can occur if a flow path comprising the current instruction has not been executed at run-time. Therefore, the run-time interpreter is unable to gather run-time information about the current instruction.

If a match is found, as in step 530, the background optimizer 58 reads the target addresses and determines, as by adding the target addresses to a list, that the flow paths or branches associated with the target addresses need to be traced. Execution proceeds to step 516 in which a target, if any, is selected for tracing its associated flow path.

Other organizations of the target addresses included in the profile statistics 17c are possible. Access and search methods, such as retrieval of target addresses for an associated indirect transfer of control, may vary with implementation and depend upon the organization of the profile statistics 17c.

Figure 43:
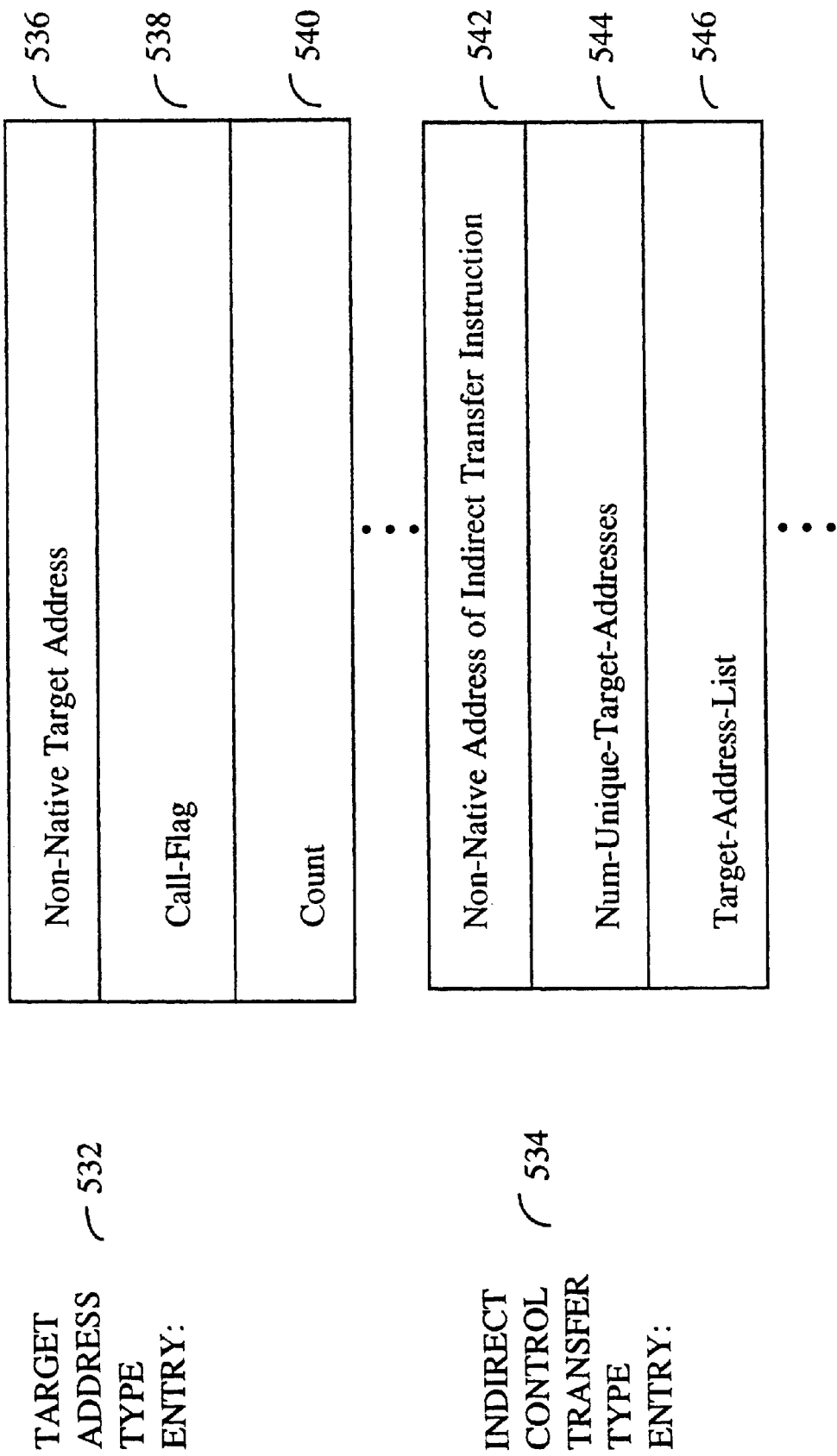
FIG. 43 is a block diagram showing two types of entries included in the profile statistics.

Referring now to FIG. 43, two types of example entries in the profile statistics 17c used to determine translation units of a routine are shown. The first entry type is a TARGET ADDRESS TYPE ENTRY 532 comprising a NON_NATIVE_TARGET_ADDRESS tag 536, a CALL_FLAG 538 and a COUNT 540. Each entry of this type comprises a unique non-native address 536 which is the target of a transfer of a control. In toto, a list of these entries is used to represent all the locations to which control has been transferred at run-time as recorded by the run-time interpreter in the profile statistics. Each entry is unique from every other entry of the list. The NON_NATIVE_TARGET_ADDRESS 536 functions as an identification tag or search index when searching for an entry amongst the profile statistics, as previously described, for example when the profile statistics are organized in a hash table. The CALL_FLAG 538 is a boolean flag set to TRUE when the associated NON_NATIVE_TARGET_ADDRESS has been the target of a routine CALL. Otherwise, CALL_FLAG is FALSE. COUNT 540 is an integer representing the total number of times control has been transferred to the associated NON_NATIVE_TARGET_ADDRESS. For example, if an instruction set comprises four instructions that transfer control, COUNT represents the number of times the associated NON_NATIVE_TARGET_ADDRESS has been the target address to which control has been transferred by the four instructions.

When determining the translation units comprising a binary image, the translation unit determiner 500 examines each entry of the list comprising TARGET_ADDRESS_TYPE_ENTRIES. The background optimizer 58 would determine the CALL entry points, as used in step 503 of FIG. 41 and step 508 of FIG. 42, by examining the CALL_FLAG field 538. A CALL entry point is one whose CALL_FLAG is TRUE. The translation unit determiner 500 traces the execution or flow paths originating from each CALL entry point using the method steps of FIG. 42.

The second entry type of FIG. 43 is an INDIRECT CONTROL TRANSFER TYPE ENTRY 534 comprising a NON-NATIVE_ADDRESS_OF_INDIRECT_TRANSFER_INSTRUCTION tag 542, NUM_UNIQUE_TARGET_ADDRESSES 544 and a TARGET_

ADDRESS_LIST 546. An entry of this type is made for each indirect transfer of control. The NON_NATIVE_ADDRESS_OF_INDIRECT_TRANSFER_INSTRUCTION tag is the address at which the indirect transfer of control instruction is located, and, as described previously with the NON_NATIVE_TARGET_ADDRESS 536, can be used to determine a corresponding entry in the profile statistics 17c. NUM_UNIQUE_TARGET_ADDRESSES is an integer representing the number of unique values which have been a target address for the associated instruction stored at NON_NATIVE_ADDRESS_OF_INDIRECT_TRANSFER_INSTRUCTION. TARGET_ADDRESS_LIST is a list of non-native addresses. Each entry in the TARGET_ADDRESS_LIST represents a unique run-time value corresponding to a target address of the associated instruction stored at NON_NATIVE_ADDRESS_OF_INDIRECT_TRANSFER_INSTRUCTION. For example, the indirect transfer instruction "JMP @R5" transfers control to the address designated by the contents of a register "R5". This instruction is located at address "X" and is executed five (5) times wherein each of the five times transfers control to a different target address. The run-time interpreter recorded 5 unique target address values to which control was transferred from this instruction. The INDIRECT_CONTROL_TRANSFER_TYPE_ENTRY corresponding to this indirect transfer instruction is as follows:

| Field Name | Value: |
|---|---|
| NON-NATIVE_ADDRESS_OF_INDIRECT_TRANSFER_INSTRUCTION | X |
| NUM_UNIQUE_TARGET_ADDRESSES | 5 |
| TARGET_ADDRESS_LIST | $Y_0\ Y_1\ Y_2\ Y_3\ Y_4$, each $Y_n$ representing a target address |

A list of INDIRECT_CONTROL_TRANSFER_TYPE_ENTRIES represents indirect transfer instructions and associated run-time target addresses. An implementation including an indirect transfer list performs the method steps of FIG. 42A. The profile statistics are searched to determine if the NON_NATIVE_ADDRESS_OF_INDIRECT_TRANSFER_INSTRUCTION field of an entry, if any, corresponds to a first non-native address of an instruction. As previously described, the search method and technique is dependent upon the organization of the profile statistics 17c. Upon finding a matching list entry, the optimizer 58 adds the associated target addresses from TARGET_ADDRESS_LIST to a list of target addresses whose associated execution paths need to be traced.

In addition to tracing the flow paths originating from a CALL entry point, regions comprising the translation unit are also determined. A region and its associated beginning and ending boundaries are determined while tracing the flow of execution, as in performing the method steps of FIG. 42.

Figure 44:
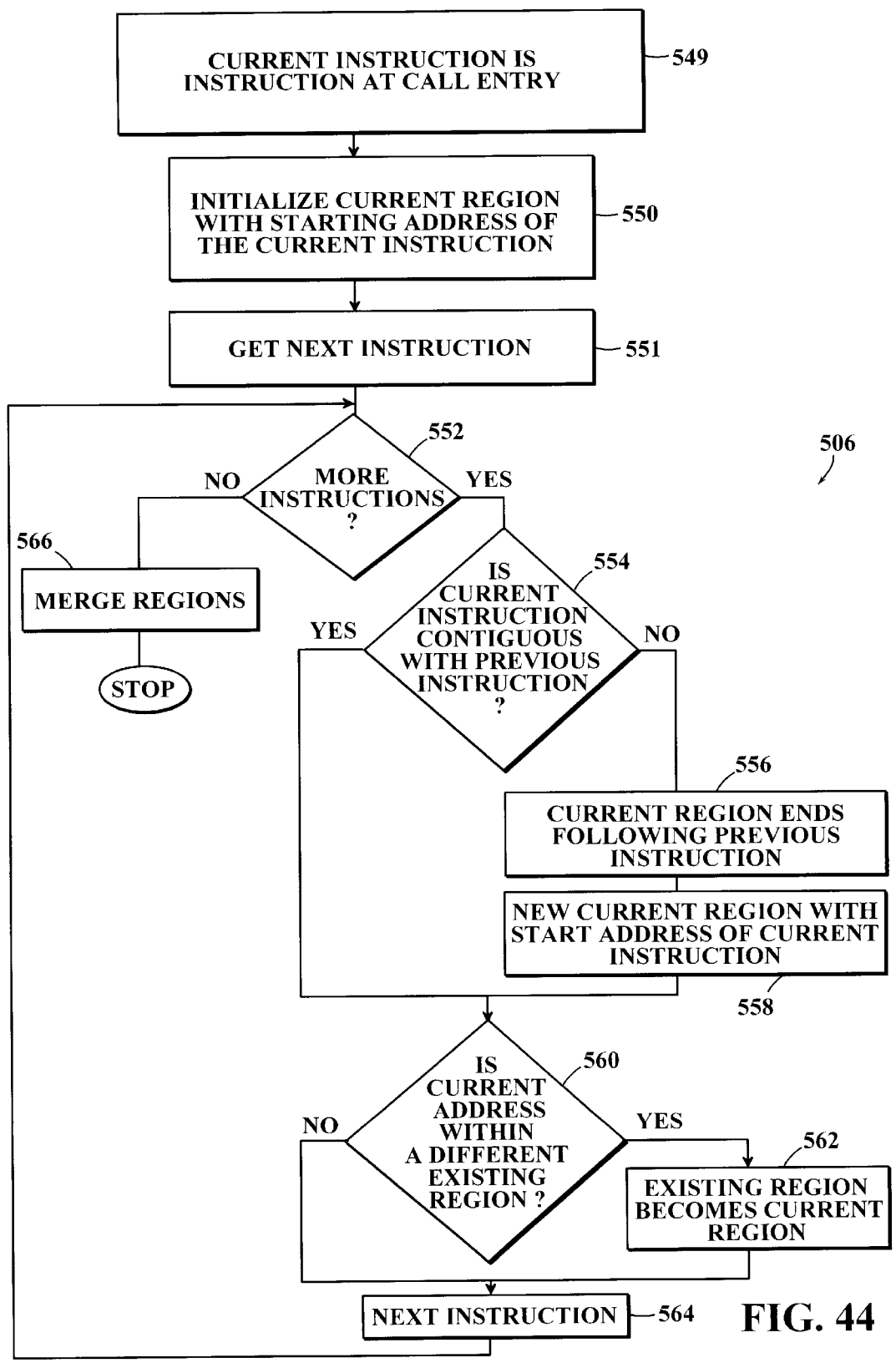
FIG. 44 is a flow chart showing steps for determining regions.

Referring now to FIG. 44, steps for determining the regions comprising a translation unit, as at step 506 of FIG. 41A, are shown. Generally, the regions are determined by tracing the execution flow of instructions as described by performing the steps of FIG. 42, examining each of the instructions, determining a relation of the current instruction to the previous instruction, and recording information.

At step 549, the current instruction located at a CALL entry defining the beginning of a translation unit is examined. A current region is initialized at step 550 with a starting address of the current instruction. At step 551, the next instruction, as from the instruction sequence produced by executing the method of FIG. 42, is examined. A determination is made at step 552 as to whether this is the last instruction in the translation unit, i.e., all flow paths have been traced. If there are more instructions, a determination is made, at step 554, as to whether the current instruction is contiguous with respect to the immediately preceding instruction examined.

If the current instruction is not contiguous, the address following the end of the previous instruction is recorded, as in step 556, as the ending address of the current region. The ending address is the address of the previous instruction plus an offset equal to the size of the previous instruction. As in step 558, a new current region is defined with the starting address corresponding to that of the current instruction.

A determination is made at step 560 as to whether the current address is within the boundaries of an existing region other than the current region. If so, the existing region and the current region are combined to form a new combined current region, as in step 562, representing a region combining the existing region with the previous current region. The starting and ending addresses of the new combined current region are determined by examining the address boundaries defined for the existing region and the previous current region. The address boundaries of the new combined current region generally define a region including the union of instructions in the existing region and the previous current region. For example, the starting address of the new combined current region of step 562 is the smaller of starting addresses of the existing current region and of the previous current region.

The next instruction is examined at step 564 and control proceeds to the top of the loop formed by step 552. According to the method previously described for tracing the execution flow as in FIG. 42, the next instruction will be contiguous to the current instruction if step 510 evaluates to "NO", and the current instruction is not the last instruction in the current flow path. Otherwise, the next instruction will not be contiguous with respect to the location of the current instruction.

Each instruction comprising a flow path originating from the CALL entry point of the current translation unit is examined until, at step 552, it is determined that all instructions in the current translation unit have been examined. Subsequently, at step 566, the regions are merged. One way in which regions are merged is by examining the starting and ending boundary addresses of each region. If, through examination of boundary addresses, two regions are contiguous, the two regions are then merged to form a combined region. For example, if the ending boundary address of a first region is the starting boundary address of a second region, the first and second regions are combined to form a third combined region with a starting address of the first region and an ending address of the second region.

The stream of instructions examined in the method of FIG. 44 are produced by executing the method steps of FIG. 42. The method steps of FIGS. 42 and 44 are integrated and performed in an implementation of the translation unit determiner 500 in one of a variety of ways. For example, prior to performing step 521, the translation unit determiner subsequently performs steps 554, and conditionally, steps 556 and 558, of FIG. 44.

Depending upon the order in which the method steps of FIGS. 42 and 44 are performed, the order in which instructions are examined may vary with implementation. Additionally, depending upon the ordering of the foregoing method steps in an implementation, modifications to the foregoing method steps may prove beneficial to the particular implementation. For example, when performing the method steps of FIG. 44, a particular implementation may find it beneficial to purposefully order the instructions examined, as by increasing address, and accordingly make beneficial modifications to the method steps of FIG. 44.

When recording an ending boundary address, as in step 556, there may be an existing boundary address as a consequence of step 562. An update to an existing boundary address should result in the larger of the new or existing value. A region does not get smaller. Rather, a region grows as more execution paths or branches are traced. Consider the following example below of a pseudo-code representation of machine instructions in a binary image to be translated from non-native machine instruction to native machine instructions:

ENTRY_1::
Z: BEQ R1, 10, X; IF R1 is 10 goto X
Y::
X: RETURN

"ENTRY_1" is a CALL entry point at which flow path tracing commences, as in step 508 of FIG. 42, with "X", "Y", and "Z" being symbolic references to non-native addresses. "Z" is the address of a direct or PC-relative conditional transfer instruction which transfers control to the instruction at address "X" if the contents of "R1", register 1, is 10. "Y" refers to the instruction contiguously located following instruction "Z". The method steps of FIGS. 42 and 44 are integrated so that the regions are being determined while tracing the flow paths. Specifically steps 554 through 562 of FIG. 43 are performed sequentially and immediately prior to step 521 of FIG. 42. However, in the following description only significant execution occurrences of steps 554–562 will be mentioned. Occurrences of ":" in the example pseudo-code above represent an instruction that neither transfers control nor terminates the current flow path.

The instruction at address "ENTRY_1" is examined causing steps 510 and 518 to evaluate to "NO". A new current region, "REGION_1", is defined with the starting address "ENTRY_1", as in step 550 of FIG. 44. After step 522, the current instruction becomes the "BEQ" instruction located at address "Z". The current region is "REGION_1" for which no ending address has yet been determined.

A determination is made at step 510 that "BEQ" is a transfer instruction. Step 512 classifies "BEQ" as a PC-relative transfer instruction. In determining the possible targets for step 514, no run-time information is needed from the profile statistics 17c. Two possible targets are determined as "X" and "Y". At step 516, the background optimizer selects "X" as the target whose flow path is currently being traced.

Step 518 determines that the current instruction, the transfer instruction located at "Z", does not terminate the current flow path. Step 521 determines that there are more instructions in the current flow path and the current instruction is updated, at step 522, to the instruction located at "X".

With the instruction located at address "X", step 510 evaluates to "YES". However, processing done by steps 512, 514, and 516 are moot when 518 evaluates to "YES". Step 520 results in the current flow path being terminated. Step 520 selects the remaining flow path with the target address "Y".

Step 554 determines "X" is not contiguously located in memory with respect to "Z". "REGION_1" ends, at step 556, following the previous instruction located at address Z. A new current region, "REGION_2", is defined with the starting address of "X", the current instruction.

Step 521 evaluates to "YES" and the current instruction is updated, in step 522, to the instruction located at address "Y". Steps 510 and 518 evaluate to "NO". Step 554 evaluates to "NO" since "Y" is not contiguously located in memory with respect to "X". Step 556 causes "REGION_2" to have an ending address following the instruction at "X". Another region, "REGION_3", is produced with a starting address of "Y".

Step 521 evaluates to "YES" and step 522 updates the current instruction to be the "RETURN" instruction located at address "X". Step 554 evaluates to YES since "X" is contiguously located with respect to "Y". Step 560 evaluates to "YES" since the current instruction's address, "X" is within the boundaries of another region, "REGION_2". Step 562 causes "REGION_2" and "REGION_3" to merge and become a combined region, an updated "REGION_2" with a starting address of "Y" and an ending address following the instruction located at address "X".

Continued processing results, at step 566, in regions "REGION_1" and "REGION_3" being further combined into a single region beginning at "ENTRY_1" and having an ending address following the instruction located at address "X".

Upon completing the formation of two or more translation units for a binary image, translation units are merged, as in step 507 of FIG. 41A. A translation unit comprises one or more unique regions. No region belongs to more than one translation unit. Therefore, when forming a translation unit and determining its boundaries, if two translation units have a common region, the two translation units are merged and considered a single translation unit. A "FORTRAN" routine having multiple entry points is an example of when two translation units are merged.

The foregoing technique for forming translation units of a binary image affords a new and flexible way to determine a translation unit analogous to a routine enabling components of the background system 34, such as the background optimizer 58, to perform procedural and interprocedural optimizations in binary image translations. The methods of forming the translation units, as previously described, and binary image optimizations are performed in the background system which is further characterized in the following text. Therefore, translation unit formation and optimizations, which are typically computer resource intensive, are accomplished without adversely impacting the performance of a computer system.

Typically, components of the background system 34, such as the background optimizer 58, employ techniques, such as optimizations, that are expensive in terms of computer resources, such as CPU or system memory usage, to produce optimized translated native code. Components of the run-time system 32 cannot usually afford to employ such methods that are expensive because the run-time system is constrained to perform its activities such that system performance is not impacted, such as during a peak or heavy computer system usage time.

A component of the background system can perform tasks during non-peak usage computer usage times when there is usually less contention with other system tasks for computer resources. Additionally, since the background system does not typically involve user interaction, it is not necessary to employ methods that emphasize performing optimizations and translations quickly. It is generally more important for the resulting native translation to perform better at run-time than for a method employed by the background system to produce a resulting native translation quickly.

The foregoing methods described are flexible in that they can be used when performing a binary translation without placing restrictions and making undue assumptions regarding a binary image being translated. This flexibility allows the foregoing technique to be applied to generally to all binary images rather than restricting application of the foregoing translation unit determination technique for use with a small subset of binary images, such as those binary images satisfying a particular set of conditions or properties.

SAMPLE IMPLEMENTATION

Included below is C++-style pseudo-code representation of how a particular implementation integrates the previously described steps for determining a translation unit, as previously described. See Appendix A for an illustrative example. Following is an overview describing what is contained in the Appendix A example.

The example in Appendix A includes pseudo code describing the foregoing technique for generating a set of Translation Units given an Execution Profile (Profile statistics). The set of Translation Units returned has the property that every location which is recorded as a call target in one of the execution profiles is also an entry point of exactly one of the Translation Units. In addition, any location in the binary image is covered by at most one Region in one Translation Unit. The method works by following the control flow of the binary image starting with the locations which were the targets of calls in an execution of the binary image. (This information in recorded in the Execution Profile.)

The main loop of the method is in the routine find_translation_units. The routine build_translation_unit follows the control flow starting from a called location which is one of its parameters. Build_translation_unit follows the control flow using a work list to keep track of locations which are the targets of control transfers that remain to be explored. The actual parsing of source instructions in performed in the routine visit_region. The method used by build_translation_unit is basically a standard graph walk.

Build_translation_unit provides a database of regions built up while following the control flow. The interface to this database is described by the class Region_Db. The set of region in this database have the property that together they cover all the locations for which the control flow has been followed and no two of the regions cover the same location. No location which has not been found to be reachable from a Translation Unit entry is covered by a region in the region database.

As the control flow for a given call target is explored, it may be determined that a region is reachable from the entries of two different translation units. In this case the translation units are merged to maintain the property that no location is covered by the regions of more than one translation unit. Whenever two adjacent regions are found to belong to the same translation unit, they are merged to preserve the property that all the regions of a translation unit of as big as possible.

INTERMEDIATE REPRESENTATION

During translation, the background translator reads instructions in the first instruction set comprising a translation unit from the binary image, builds an intermediate representation (IR) semantically equivalent to the instructions, and then modifies the IR to produce a final version of the IR that corresponds to instructions in the second instruction set. In the example that will now be described, the first instruction set is associated with a complex instruction set computer or CISC. The second or resulting instruction set is associated with a reduced instruction set computer (RISC).

Translating CISC instructions to RISC instructions typically includes "breaking down" one CISC instruction into one or more corresponding RISC instructions. Thus, for a given CISC instruction, the IR generally includes one or more units of the IR which correspond to the "broken-down" CISC instruction.

One implementation of the IR uses a code cell as a basic atomic unit for representing instructions in the IR. The IR comprises one or more code cells connected, such as in a linked list representation. The IR is semantically equivalent to the CISC instructions input to the background translator.

Figure 45:
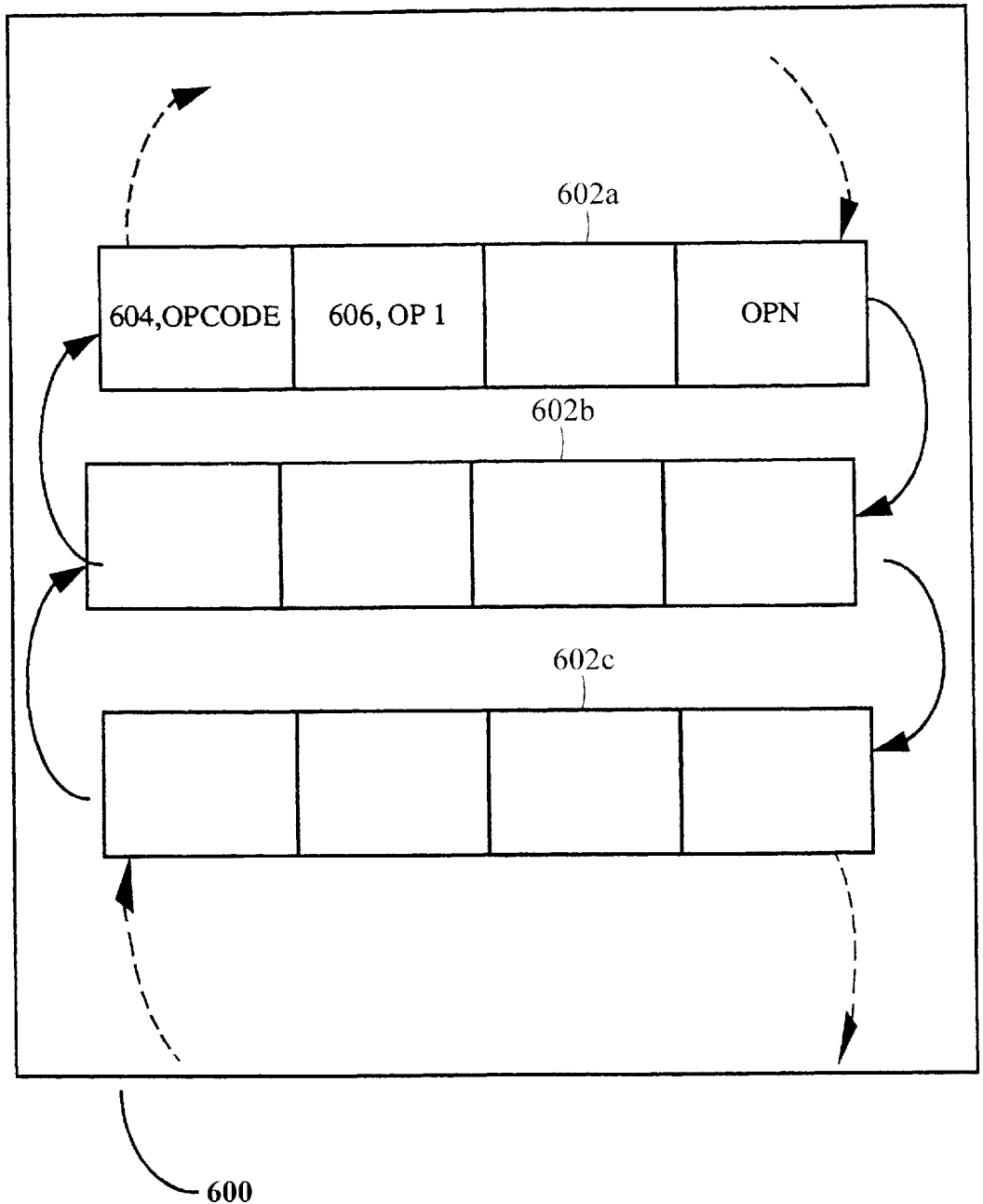
FIG. 45 is a block diagram of a list of code cells.
Figure 46:
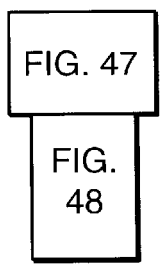
FIG. 46 is a diagram which shows the relationship between FIGS. 47 and 48.

Referring now to FIG. 45 a list of code cells 600 include one or more code cells 602a–c. Typically, each code cell is a data structure has one or more fields. Code cell 602 includes an opcode field 604 corresponding to an operation upon one or more operands 606. The fields within a code cell and their uses may vary with implementation and the first and second instruction sets.

In one implementation of the IR, the IR opcodes of the binary translator are a union of both the instructions from a first non-native instruction set or source instruction set and a second native instruction set or target instruction set. The code cells can include some pseudocode instructions which are instructions that are neither in the source nor the target instruction set. Rather, a pseudocode instruction is included in the IR representation to annotate the IR or support an intermediate state of the IR transformed from source to target instructions.

Initially, the IR typically includes instructions in the source or non-native instruction set. At the end of the binary translation, the IR typically only comprises code cells of target or native instructions. In the process of performing the binary translation, the IR is transformed from its initial form comprising only source instructions to its final form comprising target instructions. During the binary translation the IR itself may comprise any combination of source, target or destination, and pseudocode instructions.

There are many ways in which the background system 34 in the embodiment of the code transformer 800 (FIGS. 58A to 71C) intermixes the steps of translation and optimization. As a result, the IR upon which an optimization may be performed can comprise any combination of source, target, and pseudocode instructions. Therefore, an optimization technique, such as data flow analysis, used in binary translation should be flexible enough to handle any form of the IR.

As a result of intermixing translation and optimization, constraints such as amount of available memory will vary depending on when the optimizations are performed. A technique used in performing optimizations should be flexible enough to trade-off optimization execution time for storage space or memory as needed during the translation and optimization steps. For example, at one point global data flow information may be needed to perform an optimization, but local data flow information is not needed. The technique for performing the optimization should not incur additional overhead associated with the local data flow analysis, such as storage of the local data flow information, when only global data flow information is needed.

The background optimizer 58 processes the list of code cells 600 to perform optimizations using a binary image as input. Generally, optimizations reduce execution time and reduce system resource requirements of a machine executable program.

DATA FLOW ANALYSIS

One process typically performed as part of optimization processing is data flow analysis in which information is gathered about data values or data definitions. Data flow analysis generally refers to examining a flow graph or flow of control within a routine and collecting information about what can be true at various points in the routine.

Prior to performing data flow analysis, control flow analysis is typically performed which includes identifying one or more basic blocks comprising a routine, as mentioned above. Data flow analysis, as typically performed by an optimizing compiler, is a two level process including local and global data flow analysis information. Local data flow analysis produces information about what is true within a basic block, such as the data dependencies within a basic block. Global data flow analysis produces information about what is true between or amongst basic blocks, such as the data definition dependencies between basic blocks.

EXAMPLE

Figure 47:
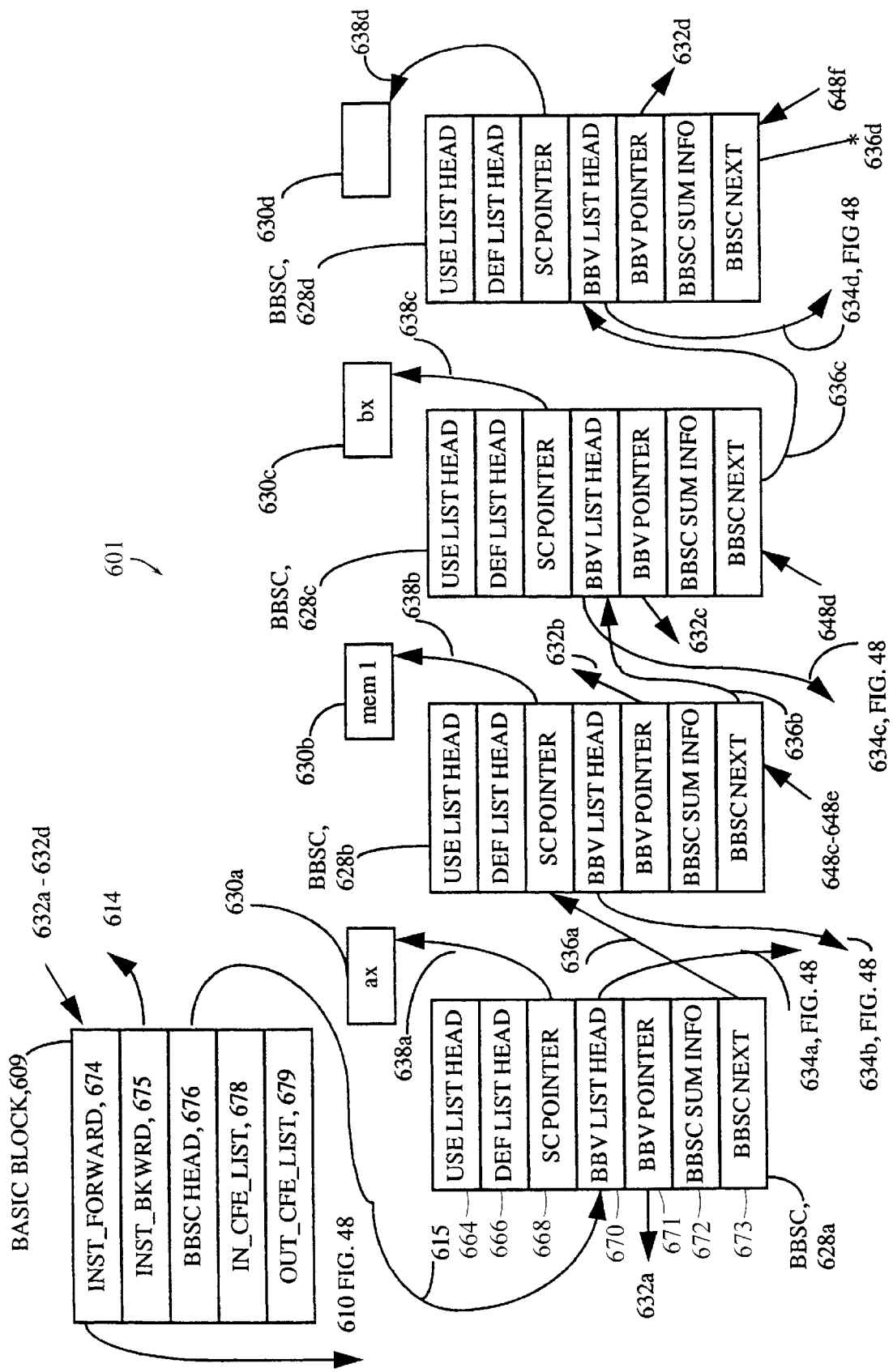
FIGS. 47 and 48 are block diagrams which illustrate an arrangement of local data flow analysis information.
Figure 48:
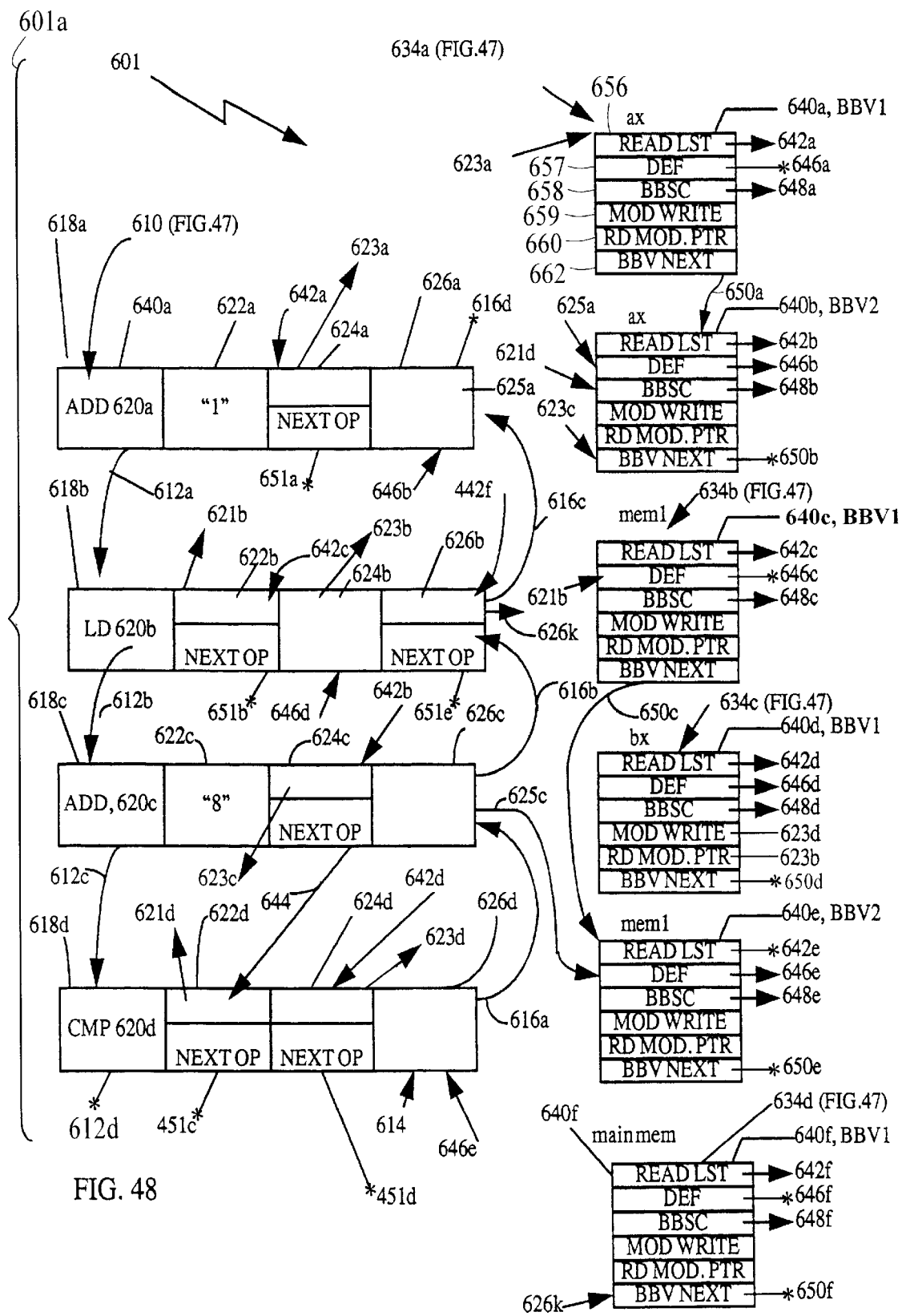

Referring now to FIG. 47 and FIG. 48, a data structure 601 which is an instantiation of the IR 600 during translation of the non-native image is shown. The data structure 601 represents local data flow analysis information for the IR code cells as shown in 601a. The statements below correspond to opcodes, operands and other data as may be present in the code cells 601a. The digits in the left hand corner are for referencing the code cell in text which follows.

1. add 1, ax, ax
2. ld [mem1], bx
3. add 8, ax, mem1
4. cmp ax, bx

The IR 601 is an intermediate version of an initial IR further transformed into a final IR as will be described below in conjunction with FIGS. 58A to 71C.

As shown above, the first statement (1) which corresponds to the first code cell adds the constant "1" to the contents of register "ax" and places the result in register "ax". The second statement (2), corresponding to the second code cell, loads the contents from memory location whose address is in register "mem1" into register "bx". The third statement (3), corresponding to the third code cell, adds the constant "8" to the contents of register "ax" placing the results in register "mem1" indicating an address in main memory. The fourth statement (4), corresponding to the fourth code cell, compares the contents of register "ax" to the contents of register "bx".

The foregoing four (4) statements are depicted as IR code cells 601a in the data structure 601. A basic block comprises four (4) code cells 618a–618d which respectively correspond to the four (4) IR code cells above. In this example, the data structure 601 includes, in addition to the IR code cell data structures 601a, a basic block (BB) data structure 609, basic block value (BBV) data structures 640a–640f, basic block state container (BBSC) data structures 628a to 628d and state container (SC) data structures 630a–d. The basic block value (BBV) 640a, BB basic block (BB) 609, and basic block state containers (BBSC) 628 will now be described in more detail.

BASIC BLOCK VALUE DATA STRUCTURE

The BBV, such as 640a, is a data structure included in the IR and abstractly represents a data value, its definition (if any) and any references to that data value by instructions within the basic block. A BBV such as 640a comprises six fields, a read_list_head (READ_LST) 656, a definition (DEF) 657, a BBSC pointer (BBSC) 658, a modify-write boolean (MOD.WRITE) 659, as well as two other fields, a read-modify pointer (RD.MOD.PTR) 660 and a pointer to the next BBV (BBV NEXT) 662. The read_list_head 656 is a pointer to the first operand which does a read of the data value associated with a BBV. The definition field 657 is a pointer to the operand which does a write or defines a data value. The BBSC pointer 658 points to a BBSC that is associated with a state container. All BBVs associated with a particular state container within a given basic block are "threaded" on a linked list with its list head in the corresponding BBSC. That is, all BBVs associated with the particular state container are connected in a linked list where the $n^{th}$ element of the list points to the $n^{th+1}$ element of the list. This connection is established by the BBV next field 662 which points to the next consecutive BBV associated with a state container. The remaining two fields, modify-write boolean 659 and read-modify pointer 600, will be discussed in following text in conjunction with other figures.

BASIC BLOCK STATE CONTAINER DATA STRUCTURE

A BBSC data structure, such as 628a, comprises seven (7) fields: a USE LIST head (USELIST HEAD) field 664, a DEF LIST head (DEFLIST HEAD) field 666, an SC pointer (SC POINTER) 668, a BBV list head field (BBV LIST HEAD) 670, a BB pointer (BB POINTER) 671, a BBSC summary information (BBSC SUM INFO) 672 and a pointer to the next BBSC (BBSC NEXT) 673. The USE LIST head 664, DEF LIST head 666 and BBSC summary information 672, and are discussed later in conjunction with global data flow analysis. The SC pointer field 668 contains a pointer from the BBSC to the state container (SC) associated with the data values. The BBV list head field 670 contains a pointer to the first BBV associated with a state container. A BB pointer 671 contains a pointer from the BBSC to the basic block data structure or BB data structure with which this BBSC is associated. Finally, the BBSC next field 673 contains a pointer to the next BBSC associated with the basic block designated by field 671.

BASIC BLOCK DATA STRUCTURE

Five (5) data fields comprise the basic block (BB) data structure 609 are also shown to include the Inst_forward (INST_FORWARD) field 674, Inst_backward (INST_BACKWARD) field 675 and BBSC head pointer (BBSC HEAD) field 676, as well as In_CFE_list (IN_CFE_LIST) 678 and Out_CFE_list (OUT_CFE_LIST) 679. The In_CFE_list is a pointer to the head of the list of control flow edges or CFEs into a basic block 609. The Out_CFE_list is a pointer to the head of a list of control flow edges out of a basic block 609. These two (2) fields and their uses will be discussed in more detail with global data flow analysis. The Inst_forward field is connected via a pointer 610 to the first code cell 618a of the basic block. Pointer 610 and connecting pointers 612a–612c enable a forward traversal of the linked list of code cells comprising the basic block 609. Similarly, the Inst_backward field is connected to code cell 618d, which is the last code cell in the list, by pointer 614.

Use of pointer 614 combined with pointers 616a–616d enable a backward traversal of the linked list of code cells comprising the basic block. The third field BBSC head is connected 615 to a list of basic block state containers (BBSC) associated with the basic block.

CODE CELL DATA STRUCTURE

A code cell in this IR comprises an opcode field and multiple operand fields. For example, code cell 618a comprises an opcode field 620a and operand fields 622a, 624a and 626a. Similarly, each of code cells 618b–618d each comprise an opcode field and three operand fields. The opcode comprising the opcode field 620 can be represented either as a textual mnemonic or as a numeric value associated with a certain instruction. An operand in this implementation can represent a literal, a register operand or a memory location. An operand such as 622a which is a literal is denoted in the diagram as a constant value stored within the operand field of the code cell. An operand can also correspond to a memory location or a register operand. In either of these cases, an operand field of a code cell designates a register or memory operand by being associated with a basic block value (BBV) having a corresponding data definition. For example, field 626c is the third operand of code cell 618c. The third operand is associated with a register used to identify a main memory address through pointer 625c connecting field 626c with BBV2 for a register "mem1" 640e.

USE OF BBV

There is one BBV per computed value for a given data value. If another definition within a basic block is given to, for example, register "ax" such as a destructive reassignment of a new value to register "ax", there would be another BBV for register "ax" since there are two distinct data values or definitions for the same register "ax". Therefore, each BBV provides direct connectivity to all corresponding code cells which define and reference the data value associated with the BBV.

An example of a data value having two data definitions is shown in FIGS. 47 and 48. The second operand field 624a of code cell 618a references register "ax". Operand field 624a is associated with BBV1 of register "ax" through pointer 623a which connects the operand field 624a with BBV1 of register "ax" 640a. The second operand field is reading a value from register "ax" adding one (1) or incrementing it, and assigning the result back into register "ax". The third operand field 626a writes the result to register "ax" producing a new data value by this reassignment of an incremented result to register "ax". A second BBV of register "ax" 640b is associated with the third operand field 626a of code cell 618a. This connection is denoted by pointer 625a.

BBVs 640a–640f represent a general class of data values about state information that may be referenced or modified by an IR instruction. State information includes for example, registers, condition codes, and main memory locations. What comprises state information varies with implementation and the first instruction set being translated to a second instruction set.

STATE INFORMATION

Each piece of state information is denoted by a state container (SC) as depicted by elements 630a–630d. Five pieces of state information are affected by IR code cells 618a–618d. Specifically, these pieces of state information are: register "ax" 630a, register "mem1" 630b, register "bx" 630c, condition codes (not shown) and main memory 630d. In the IR data structure 601 all of main memory 601 is treated as a single piece of state information. For example, a modification (write) to any memory location is shown in the IR as a data interaction affecting a subsequent use (read) of any memory location. Other embodiments of the IR may divide main memory into multiple parts, each part being analogous to a different piece of state information. Note that FIGS. 47 and 48 are a snapshot of the IR during binary translation prior to converting condition codes to state containers, as explained above. Each of the BBVs 640a through 640f is connected to the appropriate state container to which the BBV refers through the basic block state container (BBSC) data structures 628a to 628d. The BBSC data structures 628a to 628d complete the direct global connectivity between code cells which define or use, e.g., read, or write, to the corresponding state container in multiple basic blocks.

DATA FLOW (LDF) INFORMATION

As shown in FIGS. 47 and 48, pointer 642a establishes a connection between BBV1 of register "ax" 640a and the first operand 624a which does a read of register "ax". Pointer 642a connects the read list head field of BBV1 of register "ax" 640a to the second operand of code cell 618a. The next_op field of operand 624a contains a pointer to the next operand which does a read of BBV1 of register "ax". In this example, there is no next operand which does a read of the value associated with BBV1 of "ax", therefore, the next_op field of 624a is null denoted by 651a* representing a null pointer, e.g., that this is the end of the list. If there were more than one operand which did a read of this data value of register "ax", pointer 651a would designate the next consecutive operand rather than a null value. The Def (definition) field of BBV1 of register "ax" 640a contains a null pointer 646a. This is because the definition used by the first code cell is not defined within the basic block. Therefore, the definition for this BBV is denoted by a null pointer indicating that it is not defined within this basic block. The definition of the data value associated with BBV1 for register or state container "ax" exists in another basic block and is a global data value. This is discussed in the following text in conjunction with global data values. Within the basic block there is no local definition provided for the state container. An example of a local data definition is pointer 646b of BBV2 of register "ax" 640b. Pointer 646b connects the Def field of 640b to the third operand 626a of code cell 618a. The BBSC field of BBV1 of register "ax" 640a points to BBSC of register "ax" 628a of FIG. 47 as denoted by pointer 648a. The first BBV of "ax" 640a is connected to the second BBV for register "ax" 640b by pointer 650a.

FIGS. 47 and 48 illustrate by example the connections established by the mentioned BBSC data structure fields. The BBSC of register "ax" 628 comprises the four (4) fields BB pointer 671, SC pointer 668, BBV list head 670 and BBSC next 673. Pointer 632a designates a connection between BBSC of "ax" 628a and BB 609. Pointer 638a establishes a connection between the SC field of BBSC of "ax" 628a and state container "ax" 630a. The BBV list head field has a pointer 634a to BBV1 of "ax" 640a. Remaining BBVs associated with the state container "ax" are threaded on a linked list headed by the BBSC. For example, BBV1 for register "ax" 640a is connected to the second BBV for register "ax" 640b by pointer 650a connecting the BBV next field of 640a to BBV2 of register "ax" 640b. Pointer 636a connects the BBSC for register "ax" with the next BBSC 628b for state container "mem1". All of the BBSCs associated with the basic block are also connected on a threaded link list wherein the next field of $BBSC_n$ points to $BBSC_{n+1}$.

IR OPCODE TABLE

Referring now to FIG. 49, an IR opcode table 680 is depicted as comprising various opcodes and associated information. An implementation can store the various opcodes used in code cell fields 620a–620d in an IR opcode table. Table 680 as shown has five (5) columns of information. Opcode column 682 is a list of all of the opcodes used within the IR. Specifically, the opcodes 682a and 682b can appear in the opcode field of an IR code cell. In one implementation, the opcodes are represented as ASCII text which map ASCII text appearing in the opcode field of a code cell in the IR. If an implementation represented an opcode appearing in the opcode field of an IR code cell as a numeric value or integer quantity, this table may contain an additional column associating the numeric value or opcode number with an IR opcode instruction mnemonic comprising ASCII text. Column 683, the operand count, contains an integer quantity that represents the number of operands for the associated opcode appearing on the same line in column 682. The IR opcode table 680 comprises three operand fields 684–686, respectively. The operand count field will designate how many of the succeeding operand columns 684–686 contain valid operand information associated with the corresponding opcode. Each of the operand fields 684–686 contain information about the type of access that operand performs on a state container or data value. For example, opcode 682a is an ADD instruction with three (3) operands. The first operand 684a reads a data value associated with a state container. Similarly, the second operand 685a also reads a data value associated with a state container. However, the third operand 686a performs a write and actually provides a data definition for a data value associated with a state container.

Opcode 682b is an increment (INC) opcode having one (1) operand as designated by the operand count 683b. The operand count of one (1) associated with the increment instruction 682b means that operand fields 685b and 686b contain no information relevant to the opcode. Operand 1 has read-modify write access 684b to a data value. In this example, read-modify write means that the increment instruction, even though it has one (1) operand, reads the data value associated with the operand, modifies the data value by incrementing it, and then writes the updated data value back to the state container. This is one example with only one operand where both a read and a write is performed to a state container. This increment instruction also exemplifies a case in which a first data value associated with one BBV is read and a data definition associated with a different second BBV is also provided with a single operand single instruction.

Figure 50:
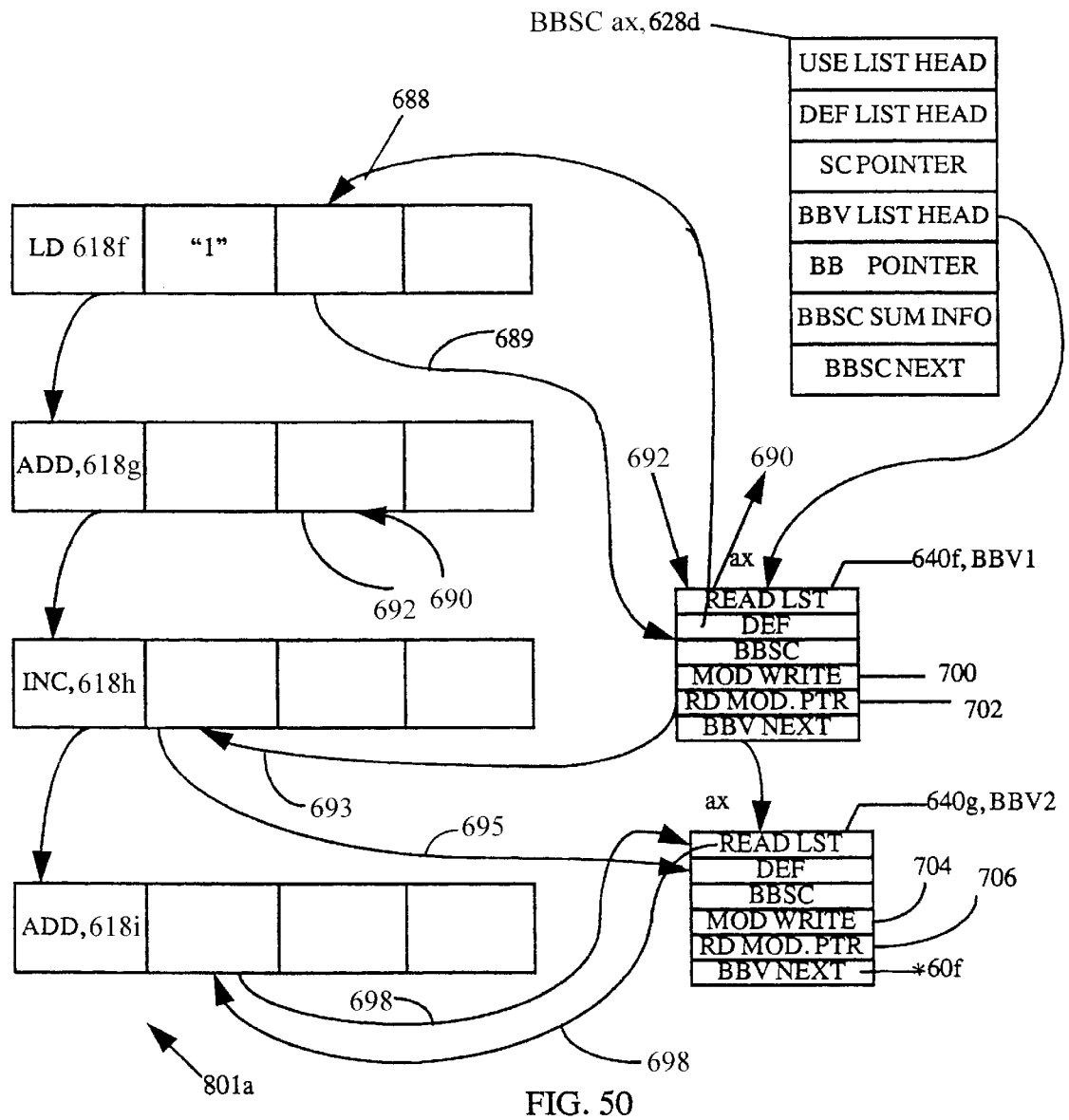
FIG. 50 is a block diagram of a data flow analysis arrangement illustrating the use of read-modify and modify-write fields of the basic block value (BBV) data structure of FIG. 47.

Referring now to FIG. 50, an example use of the increment instruction or INC instruction is shown. FIG. 50 depicts an example using two fields of the BBV not previously described. These fields are the modify-write boolean 659 and read-modify pointer 660 of BBV 640. For the sake of clarity, FIG. 50 contains only those pointers relevant to highlighting the use of these two (2) BBV fields in conjunction with the code cells and BBSCs. In particular, these two (2) BBV fields are used in conjunction with IR opcodes such as the increment instruction 682b of FIG. 49 which has a read-modify write operand performing both a read and a destructive write operation to the same state container. Thus, an operand of the increment opcode will refer to two BBVs for the same state container.

In FIG. 50, code cell 618h is an increment (INC) instruction. Code cell 618h increments the contents of register "ax" and then rewrites that value to the state container register "ax". To represent this local data flow information using the BBV, BBSC and code cell data structures, pointer 693 connects the read-modify field of BBV1 of register "ax" 640f with the first operand of code cell 618h. The first operand of the increment instruction also performs a write to the state container register "ax" by incrementing the value of the contents of register "ax". This produces a second data value for register "ax". FIG. 50 contains a second BBV of register "ax" 640g. The definition for the second data value is indicated by pointer 694 which connects the DEF (definition) field of BBV2 of register "ax" 640g to the first operand of the increment codecell 618h. The second BBV for register "ax" has the field modify-write set to TRUE. Modify-write is a boolean value which is true when the definition associated for that data value is the result of a read-modify write as in this case with the increment instruction of code cell 618h. Otherwise, modify-write is FALSE. Overall FIG. 50 contains four (4) code cells 618f–618i. FIG. 50 highlights the use of two (2) fields of the BBV, the read-modify field and the modify-write field, used to indicate data flow analysis information regarding a read-modify operand and the two associated BBVs for the modify state container. Note that for efficient memory use, an implementation may choose not to allocate unused operand fields, as shown in the last two operand fields of codecell 618h of FIG. 50.

The foregoing data structures and figures illustrate a representation of local data flow analysis information which is efficient and provides direct connectivity to those instructions or code cells which perform reads and writes to a state container. Data structures as those pictured in FIG. 47 and FIG. 48 and FIG. 50 are built by traversing a list of code cells off of a basic block. For example, referring again to FIG. 47 and FIG. 48, the list of code cells is traversed beginning with the first code cell pointed to by pointer 610 of BB 609. For a given opcode such as the ADD opcode of code cell 618a, the IR opcode table 680 can be used to obtain information regarding the type of access of its operand and the number of operands for the given opcode. Using this information, the BBVs and the BBSCs can be built by traversing the list of code cells and establishing necessary connections between operands, for example, and BBVs.

REPRESENTATION OF GLOBAL DATA FLOW INFORMATION

One technique for representing global data flow information is interconnected with the local information just described. Recall that the global data flow information includes upwardly exposed uses or dependencies within a basic block in which the data item is given a value in another basic block. With respect to the basic block which references an upwardly defined data item, these references are also called global references. Global data flow information also includes data definitions within a basic block that are referenced in other subsequent basic blocks. With respect to the basic block which defines the data item globally referenced by other basic blocks, these definitions are referred to as global definitions comprising global data flow information.

One technique for performing global data flow analysis uses local data flow analysis information recorded in a BBSC summary information field 672 of FIG. 17. The BBSC summary information field describes how a basic block accesses an associated state container. In other words, the BBSC summary information describes how BBVs within a basic block manipulate a state container. Since a basic block is associated with one or more BBSCs, all local data flow summary information about the basic block used during global data flow (GDF) analysis can be easily obtained by examining the the BBSCs associated with a basic block.

Referring now to FIG. 51, the BBSC summary information field 672 previously seen in FIG. 47 will now be described. The BBSC summary information field is a single value that represents one of five patterns of access performed within a basic block of the associated state container. FIG. 51 shows these five possible patterns. Read access 708 indicates that only read accesses are performed within a basic block. Any access within this basic block reads a value which is upwardly exposed or defined within another basic block.

A second pattern of access within a basic block to a state container is write access 710. If the first mention or use of the state container within a basic block is a write, e.g., there is a write and no preceding reads of that state container, then the summary information will indicate that write access is performed defining a data value that may be used in another basic block.

A third pattern of access to a state container within a basic block is read-write access 712. The read-write access value indicates that a read is performed within the basic block which is dependent upon an external definition defined within another basic block. That is, when the first mention of the state container within the basic block is a read, read-write access 712 will be set. Additionally, there is also a write access within the basic block giving a newly assigned value to the associated state container. The newly assigned value may be used in another basic block.

A fourth pattern of access to a state container within a basic block is read-modify-write access 714. Recall in conjunction with the fields of the BBV we had a modify-write and read-modify field corresponding to instructions such as the increment instructions which reads and modifies the state container within a single instruction. A read-modify write pattern of access for a basic block implies that all writes to the associated state container are of the nature of the increment instruction, e.g., a read and write to the same state container with the same instruction.

A fifth pattern of access within a basic block to a state container may indicate no local access 716 implying that the associated state container is not accessed, e.g., not actually read or written, within the basic block.

Figure 52:
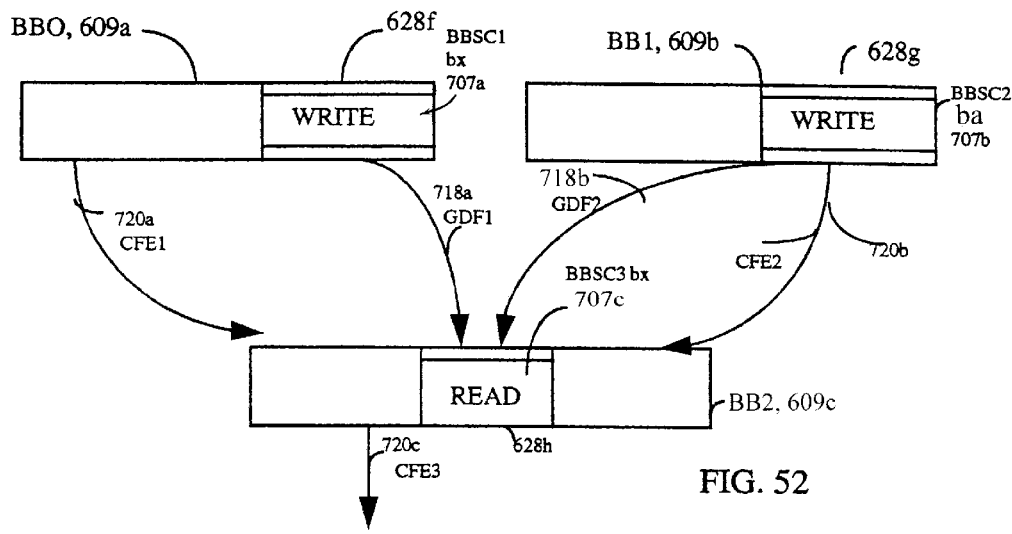
FIG. 52 is a block diagram of an arrangement comprising global data flow analysis information.

Referring now to FIG. 52, an arrangement of the data structures representing global data flow analysis information is depicted. Three basic blocks BB0, BB1 and BB2 are respectively numbered 609a–609c. As shown in FIG. 52, a basic block such as BBO is associated with several BBSCs. For presentation purposes in FIG. 52, this association is represented by enclosing the BBSCs in a bit vector form within a basic block. For example, BB0 609a is depicted as a rectangle enclosing one or more BBSCs, such as BBSC1 628f for register "bx". For the sake of clarity, FIG. 52 only depicts the BBSC summary information field 707a–707c of the BBSC. As indicated in BBSC3 for register "bx", BB2 performs a read of register "bx". This indicates that BB2 has an upwardly exposed read dependency which reads a definition supplied by another basic block. Edges representing global data flow (GDF) connections are GDF1 718a and GDF2 718b each indicating a definition for state container "bx" can originate from a write performed in BB0 or BB1. Examining BBSC1 628f and BBSC2 628g for register "bx", BB0 and BB1 both perform a write access to state container "bx". Pointer or GDF1 edge 718a represents the global data flow connection between BB0 and BB1 in that BB0 can supply a value for state container "bx" read within BB2. Similarly, pointer GDF2 718b represents the global data flow connection between BB1 and BB2 in that BB1 can supply a value or definition for a value of state container "bx" read within BB2.

Control flow on the global level between basic blocks is denoted by control flow edges CFE1–CFE3, respectively 720a–720c. A control flow edge is used to represent the possible execution control flow paths between basic blocks. In FIG. 52, BB0 and BB1 flow into BB2.

DETAILS OF GLOBAL DATA FLOW (GDF) INFORMATION

Figure 53:
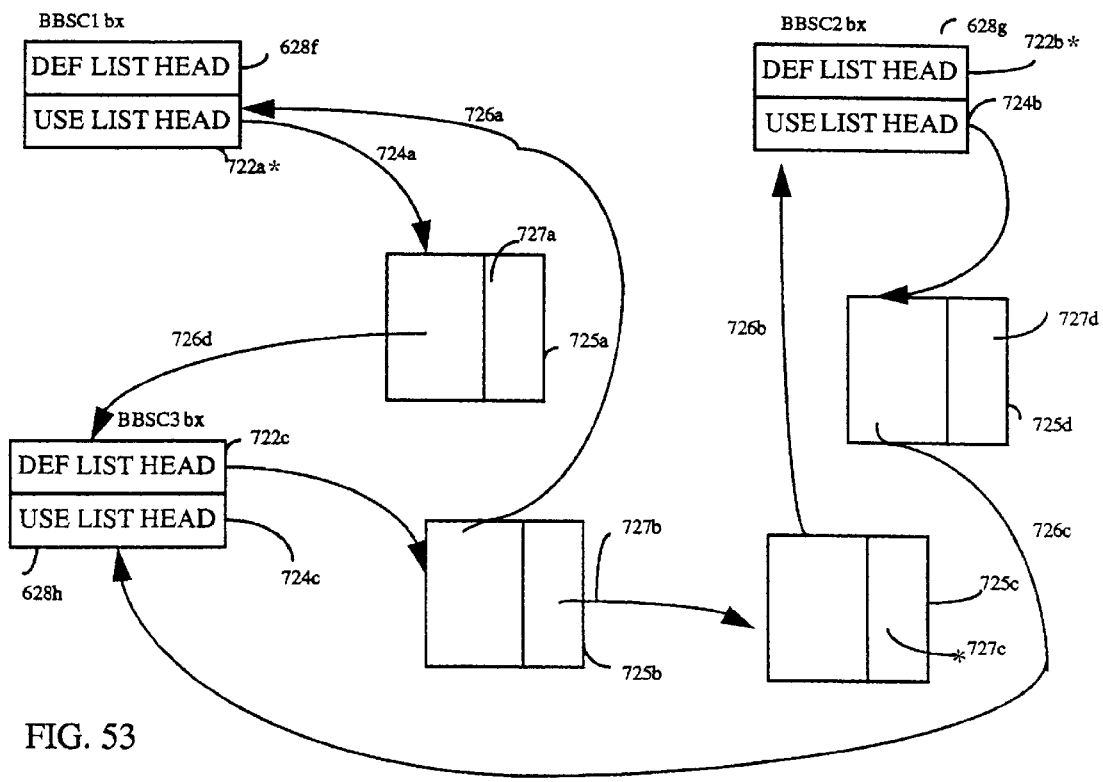
FIG. 53 is a more detailed block diagram of the global data flow connections of FIG. 52.

FIG. 53 details the GDF information represented in FIG. 52 by pointers GDF1 and GDF2. FIG. 53 highlights the DEF list head field 722 and USE list head field 724 of the BBSC and shows how they are used in representing global data flow analysis information. Recall from FIG. 52 that BB2, which is associated with BBSC3, can receive a definition for state container "bx" from either BB0 or BB1, as depicted by pointers GDF1 and GDF2 respectively. The relationship represented by GDF1 and GDF2 is detailed in FIG. 53 by having a DEF list head field of the BBSC 628H for register "bx" connected 722c to a first BBSC connector 725b. The DEF list head pointer 722c points to the beginning of a threaded list of BBSC connectors 725b–725d in which the BBSCs provide a definition for a state container read within the basic block associated with BBSC3 for register "bx". BBSC connector 725b points 726a to BBSC1 for register "bx" 628f. Similarly, BBSC connector 725c points 726b to BBSC2 for register "bx" 628g. Functionally, a first BBSC connector associated with a first basic block points to a list of all global definitions used within the first basic block for a state container defined within another basic block. As indicated by null pointers 722a\* and 722b\*, BBSC1 and BBSC2 for register "bx" do not have any upwardly exposed reads dependent on definitions for register bx defined within another basic block.

FIG. 53 also illustrates the USE list head field 664 as previously mentioned in conjunction with FIG. 48. Functionally, the USE list head field of a first BBSC associated with a first basic block represents a list of external data references of other basic blocks which depend on a value defined within the first basic block. For example, BBSC3 628h for register "bx" is associated with BB2 which reads register "bx" using a data value defined in either BB0 or BB1. The representation of the global definition provided by BB0 uses BBSC1 628f associated with BB0. The USE list head field of BBSC1 for register "bx" points 724a to a BBSC connector 725a which is connected 726d to BBSC3 for register "bx". The dependency of BB2 upon a value written in BB1 is similarly represented. The USE list head field of BBSC2 628g is associated with BB1 providing a second possible data value definition for register "bx" which can be read in BB2. The representation of this data value definition is indicated by pointers 724b, BBSC connector 725d, and pointer 726c. Thus, FIG. 53 indicates the detailed connections of the global data flow connections abstractly represented by GDF1 and GDF2, respectively, 718a–718b, of FIG. 52.

CONTROL FLOW EDGE

Figure 54:
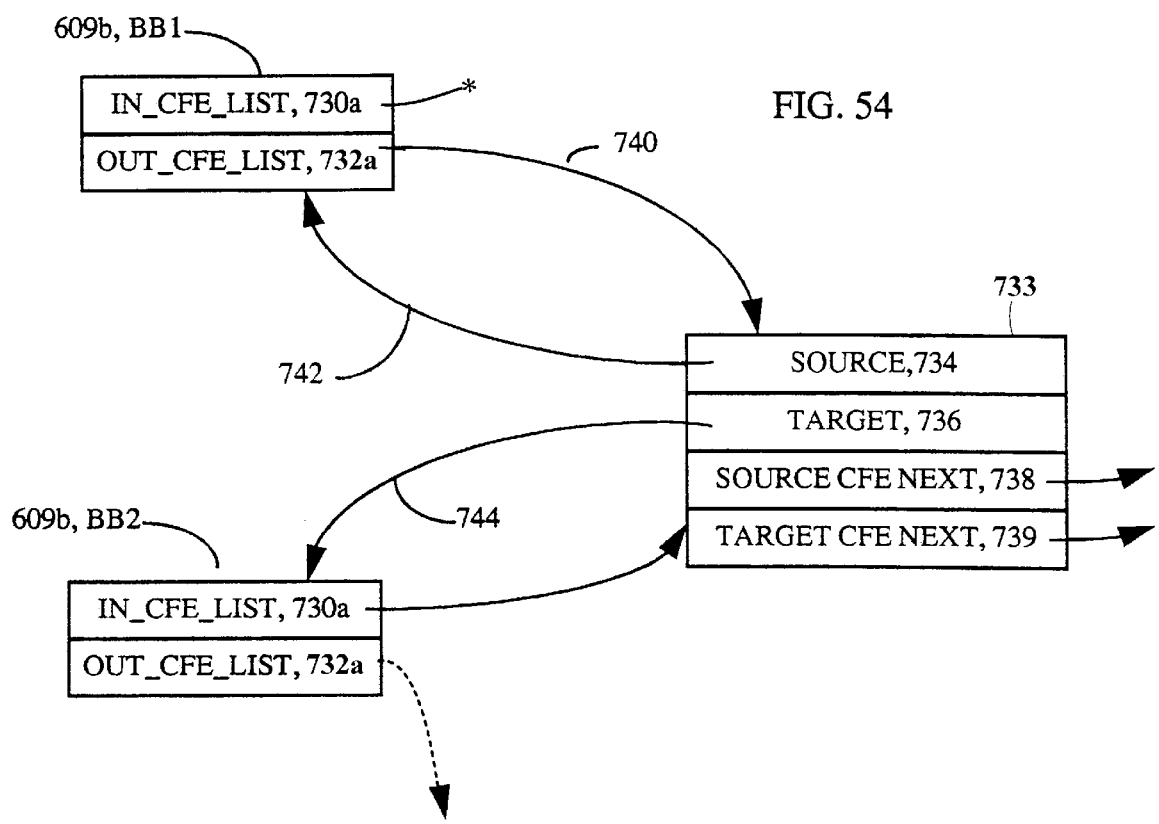
FIG. 54 is a block diagram of the control flow edge (CFE) data structure.

FIG. 54 depicts a detailed view of a control flow edge (CFE). Specifically FIG. 54 is a more detailed description of CFE2 720b representing the control flow edge between BB1 and BB2. FIG. 54 also highlights two basic block fields in In_CFE_list 730 and Out_CFE_list 732 previously mentioned regarding the basic block data structure 609. In_CFE_list points to a list of CFE connectors 733 representing all incoming control flow edges to a basic block. Similarly, the Out_CFE_list 732 functionally represents all outgoing control flow edges from a basic block. Connector 733 connects a source basic block 734 with a target basic block 736. If there are multiple source basic blocks flowing into the indicated target basic block, the source CFE next field 738 points to another CFE connector 733. Similarly, if there are multiple target basic blocks for a given source basic block indicated by 734, the target CFE next field 739 would point to another CFE connector 733 representing information about another target basic block.

The foregoing data structures comprising the global data flow analysis information are typically produced using a method which performs global data flow analysis of a program by performing global data flow analysis upon each routine that is included in the program.

METHOD OF PERFORMING GLOBAL DATA FLOW ANALYSIS

Figure 55:
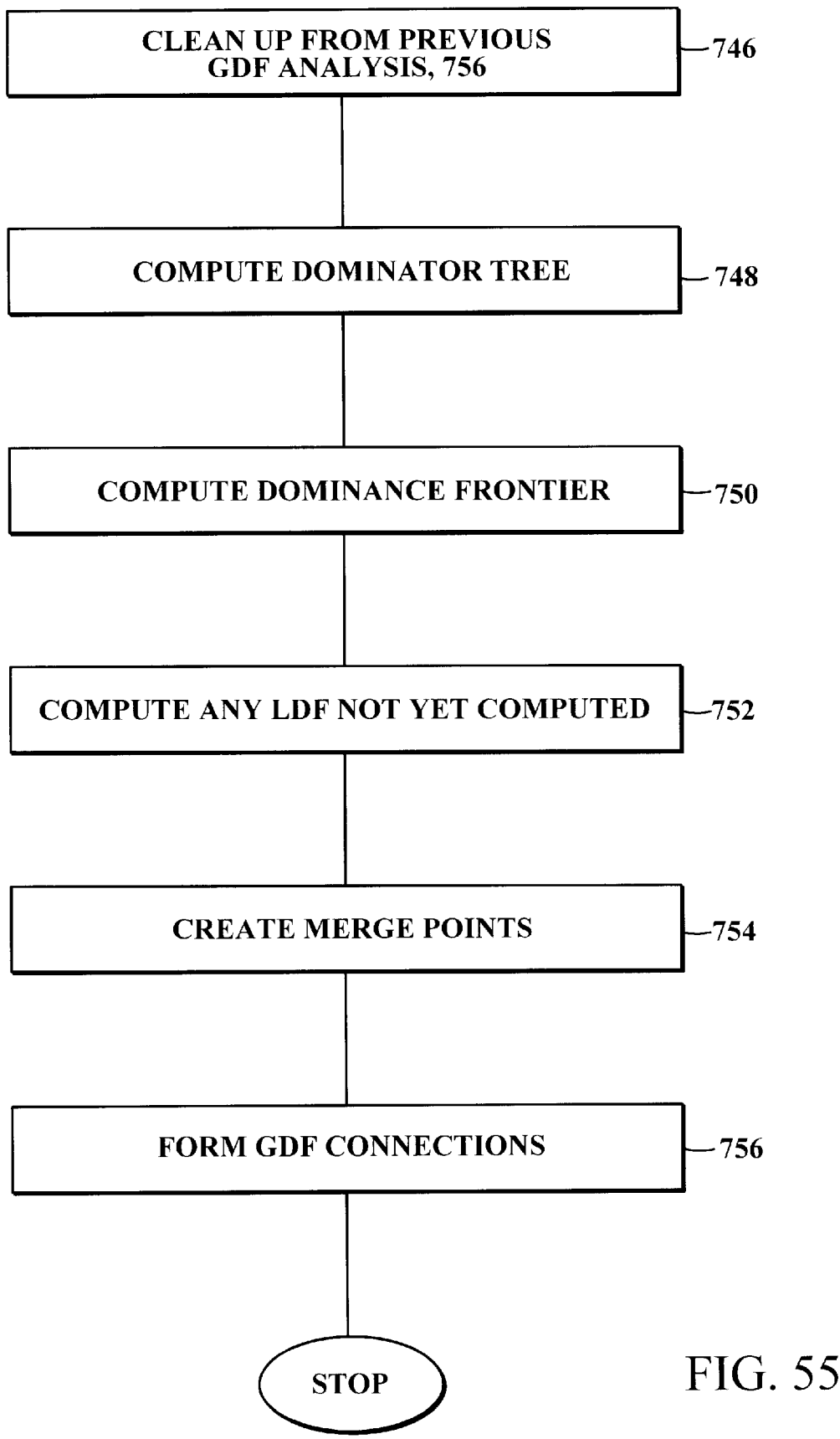
FIG. 55 is a flowchart that sets forth steps of performing a global data flow analysis.

Referring now to FIG. 55, method steps for performing global data flow analysis are described. The method steps of FIG. 55 are based on a method described in "Efficiently Computing Static Single Assignment Form and the Control Dependence Graph", *ACM Transactions on Programming Languages and Systems*, Vol. 13, No. 4, October 1991, Pages 451–490, by Ron Cytron et al. These method steps are performed for each routine comprising a program. Beginning in step 746, any global data flow connections from a prior global data flow analysis are first eliminated. The "dominator tree" is computed as in step 748. A "dominator tree" represents a relationship between basic blocks. A first basic block of a routine "dominates" a second basic block if every path from the initial basic block when tracing the control flow of a program to the second basic block goes through the first basic block. Under this definition, every basic block "dominates" itself and the first basic block of a routine may "dominate" all other basic blocks in the routine assuming that there is only one common entry point to the routine. A useful way of representing dominator information is in the tree called the "dominator tree" in which the initial basic block is the root of the tree and the tree has the property that each node represents a basic block and "dominates" its descendants in the tree. A detailed representation of a "dominator tree" is given in the reference *Compilers, Principles, Techniques and Tools* by authors Aho, Sethi, and Ullmann, and in the reference "Efficiently Computing Static Single Assignment Form and the Control Dependence Graph" by Citrol et al.

After computing the "dominator tree", the "dominance frontier" is computed as in step 750. The concept of a "dominance frontier" and a method for computing the dominance frontier is also detailed in "Efficiently Computing Static Single Assignment Form and the Control Dependence Graph", by Citron et al. X and Y are two nodes in a flow graph of a routine. Each node X and Y are basic blocks in the instant case. If X appears on every path from routine entry to Y, then X "dominates" Y, as previously discussed. If all paths to node Y must strictly and only go through X to reach node Y, X "strictly dominates" Y. Generally, the "dominance frontier" of a node X in the flow graph is the set of all nodes Y in the flow graph such that X "dominates" a predecessor of Y in the flow graph, but does not "strictly dominate" Y. A predecessor of a node Y is a node which precedes Y in the flow graph.

All local data flow (LDF) information is computed for all basic blocks of the routine as in step 752. Merge points for routine are then calculated in step 754. Finally, global data flow connections (GDF) are formed as in step 756. The global data flow connections formed in step 756 create the GDF edges or pointers as depicted in FIGS. 52 and 53.

Figure 56A:
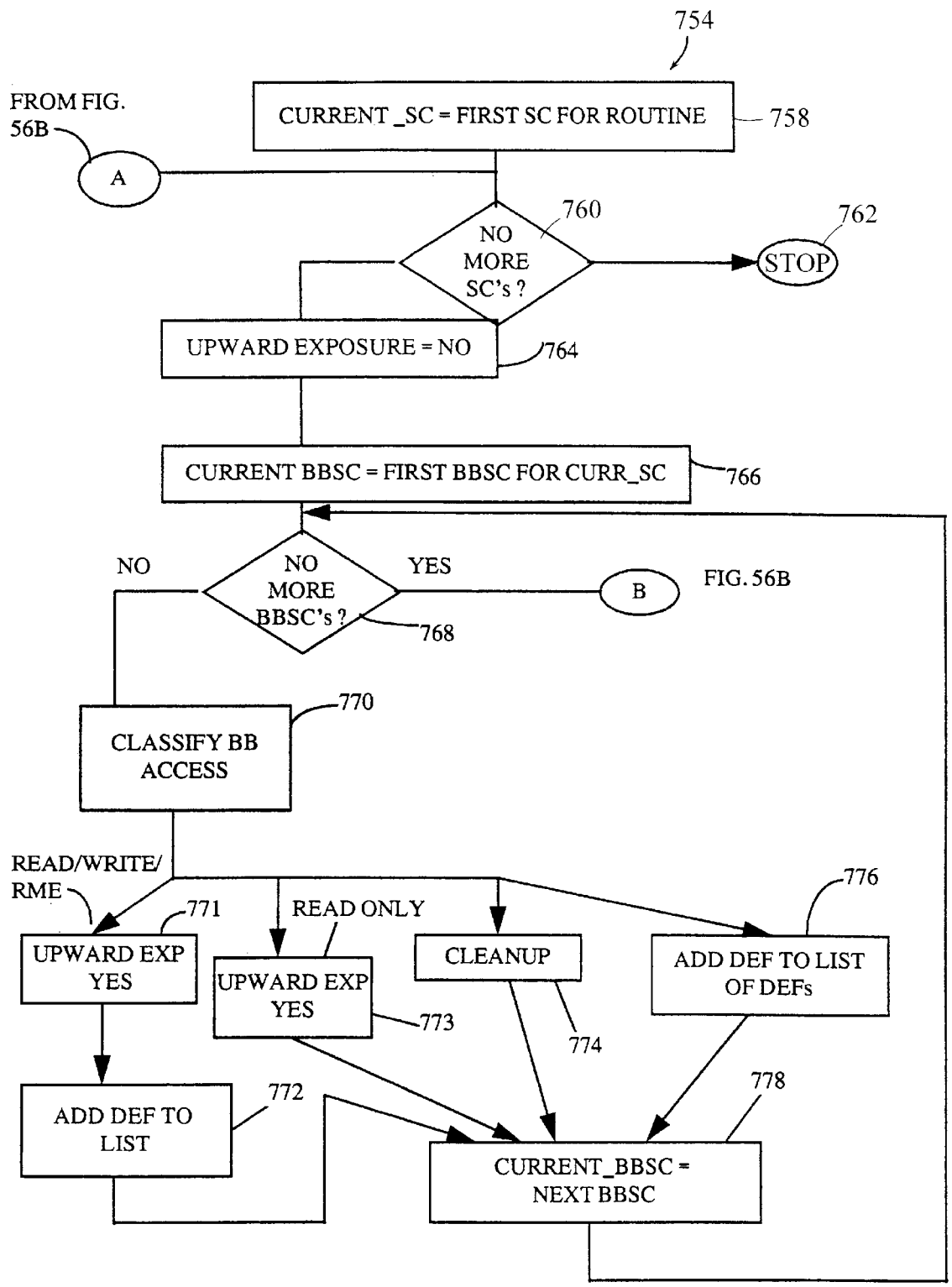
FIGS. 56A and 56B are flowcharts that set forth method steps for determining merge points during global data flow analysis.
Figure 56B:
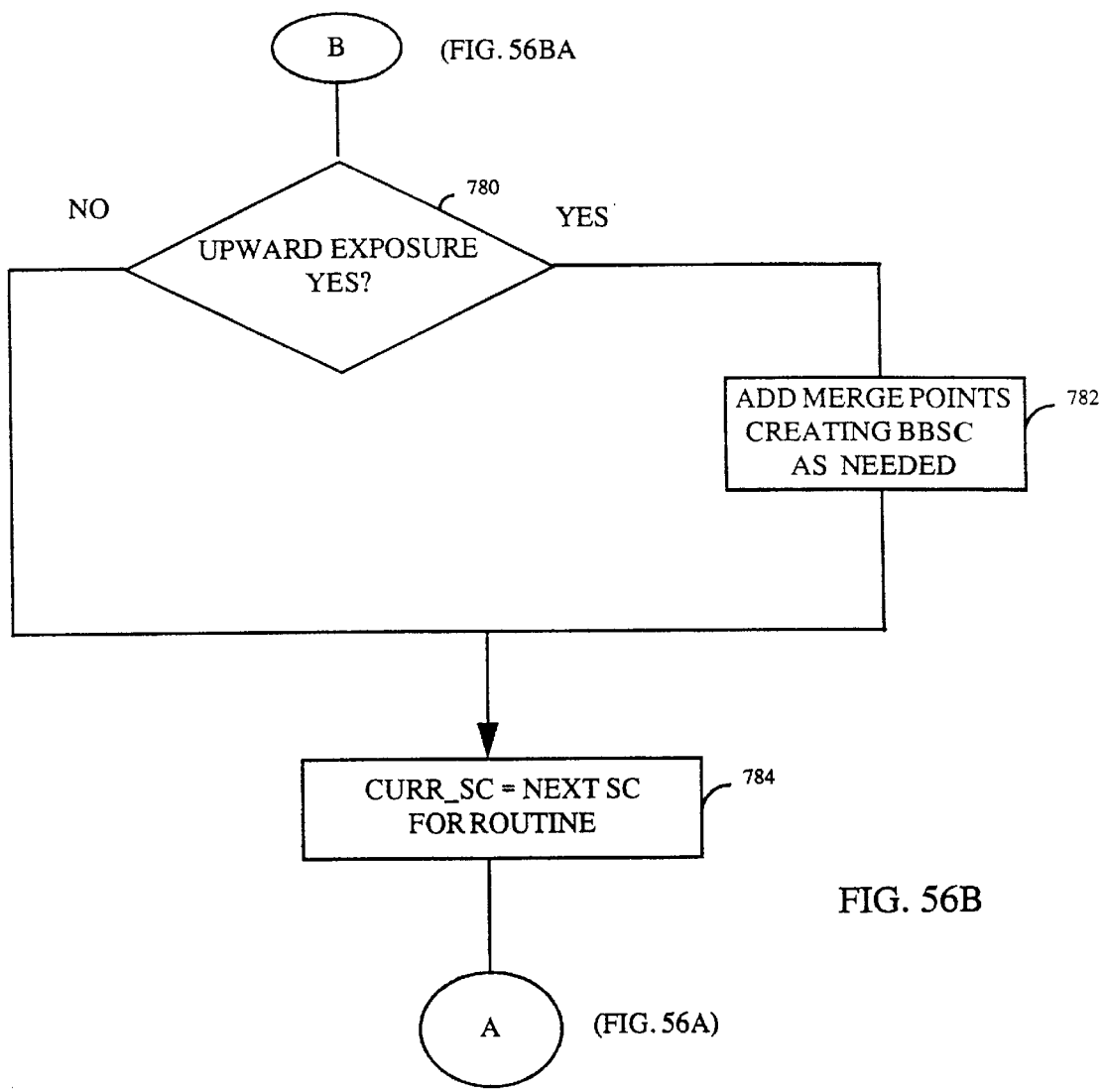

A merge point, as in step 754, is a merge or joining definition point within a routine for multiple definitions of the same state container. Referring now to FIGS. 56A and 56B, detailed method steps 754 for determining merge points are shown. The method described in FIGS. 56A and 56B makes a list of all of the definitions within a routine and then adds merge point definitions using the dominance frontier.

A first state container (SC) for a routine is obtained as in step 758. A determination is made as in step 760 as to whether or not this is the last SC associated with a routine. If it is the last SC, the method stops as in step 762. If this is not the last SC, a boolean flag upward exposure is initialized to null as in step 764. The list of BBSCs associated with a state container is traversed beginning with a first BBSC as in step 766. A determination is made as in step 768 as to whether or not there are any more BBSCs associated with the current state container. If a determination is made that this is not the last BBSC associated with a state container using the BBSC summary information the pattern of local access within the basic block is classified as in step 770.

The access falls into one of four (4) classifications or patterns. If there are read and write accesses or a read-modify-write access within a basic block, upward_exposure is set to "yes" as in step 771 and the definition of the data value created by the write is added to an ongoing list of definitions. If there is only read access, upward_exposure is set to "yes" as in step 773.

If there is no local access at all, as in step 774, merge BBSCs remain from a previous global data flow computation. Therefore, these remaining BBSCs are deleted. Typically, as will be explained in following text, BBSCs are produced representing an artificial definition of a state container to represent merging definitions in a routine. In step 774, if a BBSC exists when there is no local access to a state container within the associated basic block, the BBSC was produced from a previous iteration of the method steps of FIGS. 56A and 56B for finding merge points. These BBSCs are deleted in step 774.

If the basic block local access is determined to be a write only access, that is, there are no reads but only a write access as in step 776, a definition is added to a list of definitions being maintained. Control then proceeds to step 778 where the next BBSC is examined. Control then returns to step 768 for a determination again as to whether there are any more BBSCs associated with the current state container. The loop bounded by steps 768 and 778 is performed until there are no more BBSCs associated with the current state container.

Upon a determination at step 768 that there are no more BBSCs associated with the current state container, control proceeds to step 780 of FIG. 56B where a determination is made of whether or not upward_exposure has been set to "yes". If upward_exposure has been set to "yes", control proceeds to step 782 in which merge points are detected and merge point definitions may be added by creating BBSCs.

Figure 57:
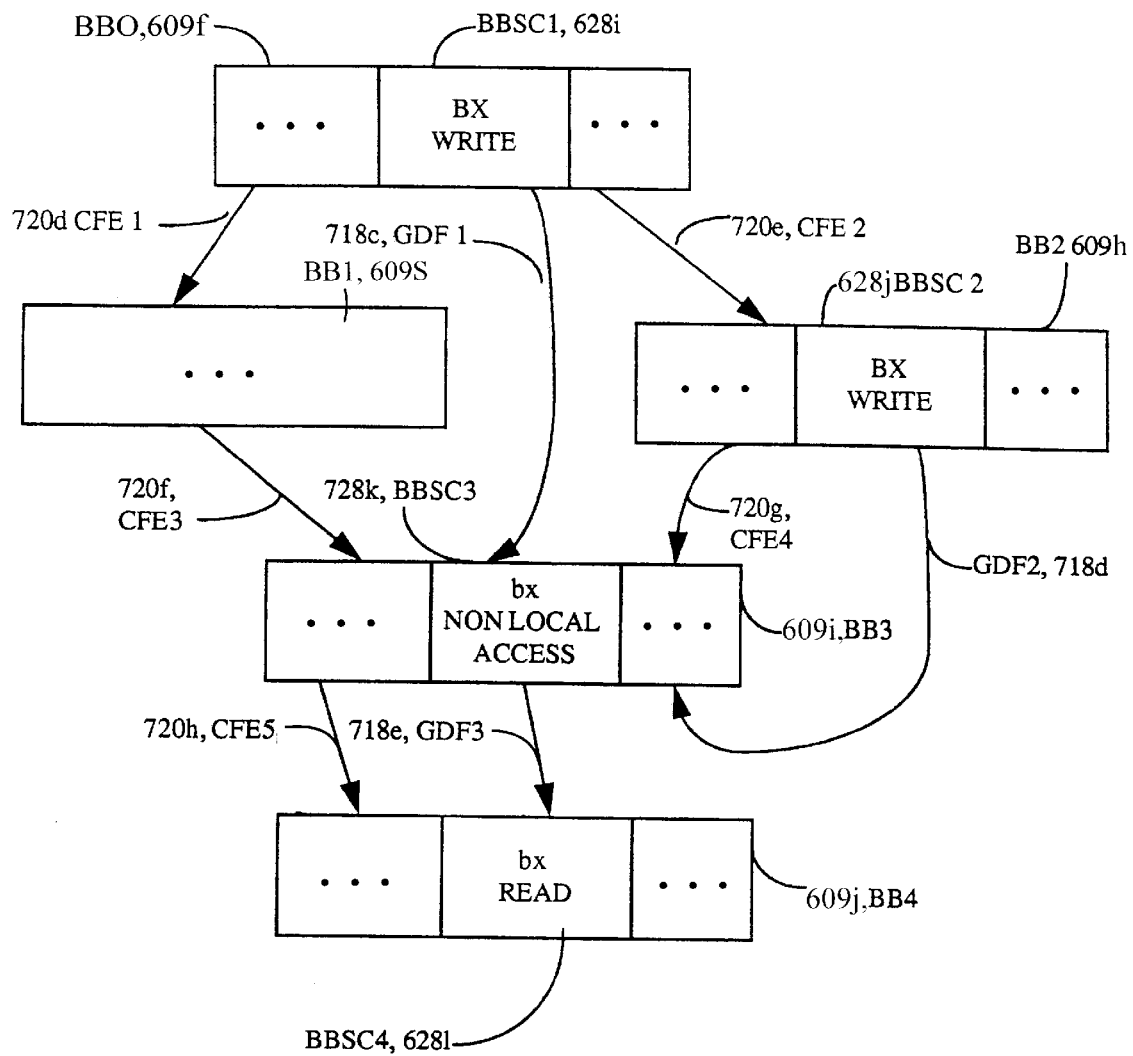
FIG. 57 is a block diagram of a global data flow analysis arrangement illustrating a merge point.

An example of a merge point and the creation of a BBSC for a merge point definition is discussed in following text in FIG. 57. Generally, if a merge point of multiple definitions is determined to be at a basic block X containing no local references or definitions to the strate container, a BBSC representing this merge point is created and associated with the basic block X having the BBSC local summary information indicate "no local access".

From step 782, control proceeds to step 784 where the next state container is examined for the current routine. Control then proceeds to step 760 where the loop bounded by step 760 and step 784 is repeated until a determination is made at step 760 that there are no more state containers associated with the current routine. Note that the use of the boolean upward_exposure in determining merge points provides advantages over the method described in "Efficiently Computing Static Single Assignment Form and the Control Dependence Graph", by Ron Citron et al.

The arrangement uses the boolean upward exposure to determine when an upwardly exposed definition has been detected within a basic block. Accordingly, merge points are only added when there is global access for reference outside of a basic block to a definition defined within another basic block. If there is no upward exposure, there can be no global connectivity even if there are definitions within a basic block. Thus, the steps, of determining merge point definitions and adding needed BBSCs is eliminated from the method.

Below in Appendix B is a pseudo-code description of the method of FIGS. 55, 56A and 56B providing a more detailed description of performing global data flow analysis.

CREATION OF BBSC AT MERGE POINT DEFINITIONS

Referring now to FIG. 57, a global data flow analysis arrangement is illustrated in which a BBSC is produced while performing the foregoing global data flow analysis method. In this arrangement, the BBSC produced acts as a merge point definition for register "bx", as in step 782 of FIG. 56B. As previously represented in other figures, BBSCs associated with a basic block are enclosed within a rectangle. For example, BB0 609f is a rectangular box enclosing BBSC1 628i. FIG. 57 includes five (5) basic blocks with appropriate global data flow edges GDF1–GDF3, respectively numbered 718c–718e and control flow edges CFE 1–CFE 5, respectively numbered 720d–720h. BB0 and BB2 both have write access to register "bx", as indicated in BBSC1 628i and BBSC2 628j. Thus, BBSC1 and BBSC2 each provide a definition for the state container or register "bx" which is read in BB4, as indicated by BBSC 628l.

Using the foregoing method of FIGS. 56A, 56B to create merge points, BBSC3 628k is produced. BBSC3 represents a merge point definition indicating the earliest control flow point within the current routine at which all dependent definitions merge. In this example, BBSC3 represents a merge point or juncture for two definitions of register "bx". Merge points are used, for example, when performing optimization involving data dependency.

The foregoing arrangement for representing local and global data flow analysis information has several advantages over existing arrangements typically used for local and global data flow analysis information.

One advantage is that the hierarchical structure of the local and global data flow analysis information arrangement allows a clear and distinct line to be drawn between local and global data flow information in which the BBSC data structure acts as a wall or a filter between the local and global data flow. The data flow information arrangement provides an advantage in software development and maintainence in that it to easy to identify between data structures as effected by local data flow analysis and data structures as effected by global data flow analysis when performing, for example, a software modification. The fact that local and global data flow analysis information and their data structures can be easily distinguished aids in debugging software affected by the software modification. For example, if an incorrect value is stored to a BBV a developer may typically conclude that there is a coding error within the local data flow analysis code and not the global data flow analysis code.

The foregoing arrangement provides an information rich data structure which interconnects local and global data flow analysis information without requiring a large amount of fixed storage as typically needed when using a bit vector. Additionally, the data flow analysis arrangement of the invention is scalable in that the amount of memory generally increases linearly with program size since the amount of memory used is linearly proportional to the number of definitions and uses within a program.

The foregoing arrangement also provides direct connectivity between definitions and references both locally and globally. For example, for a given basic block it can easily be determined what all of the global references are.

Another advantage is that the foregoing arrangement does not use two different techniques for representing local and global data flow analysis information. Typically, the number of routines common to both local and global data flow information will increase if both local and global data flow information impart similar structural features to their respective data structures and similar techniques are employed in building and maintaining the data structures. Generally, an increase in the amount of code commonly used for local and global data flow analysis results in decreased development costs by typically reducing the amount of code which must be tested and maintained by developers.

The foregoing representation for data flow analysis information also affords flexibility allowing an implementation to interchange and trade-off optimization execution time for storage space. Recall such flexibility is needed within a binary translator due to the different optimizations performed and their varying requirements as to system memory. For example, an optimization may be memory intensive. Upon computing local and global data flow analysis information, the local data flow analysis information may be discarded if not needed in performing the optimization, thus decreasing the amount of required memory for storing data flow analysis information. Additionally, the hierarchical structure previously described provides for easily identifying what data structures comprise the local data flow analysis information that may be eliminated.

The foregoing methods described are flexible in that they can be used when performing a binary translation without placing restrictions and making undue assumptions regarding the binary image.

TRANSLATORS AND OPTIMIZERS

As mentioned in conjunction with FIG. 4 the binary translator 54 is part of a background system 34 which also includes an optimizer 58. The background system 34 is responsive to the non-native image file 17b and profile statistics gathered during a run-time execution of the non-native image by a run-time system such as an interpreter 44.

Figure 58B:
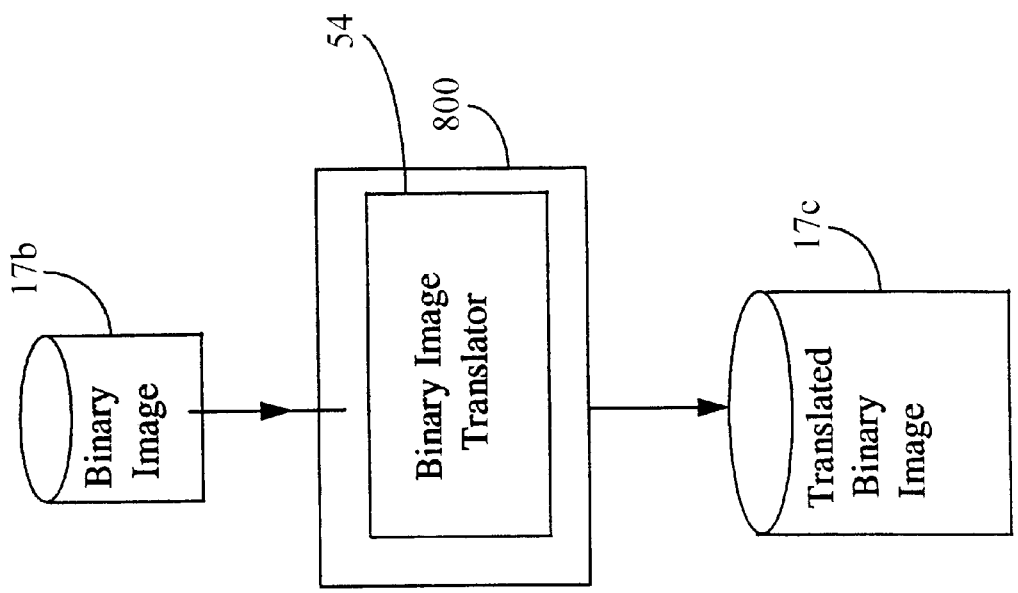
FIGS. 58A–58D are block diagrams depicting different variations of the binary image transformer.
Figure 58A:
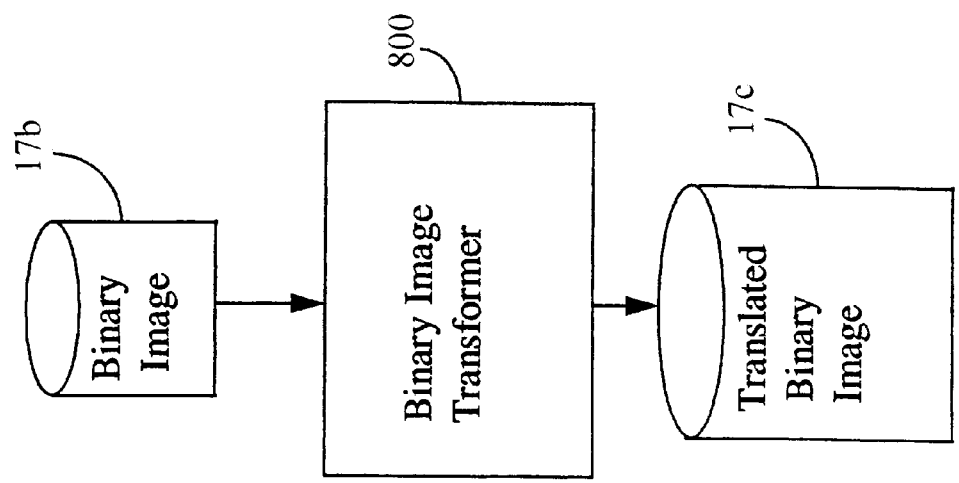

Referring now to FIG. 58A, the binary image transformer 800 which preferably operates as a background process and transforms a non-native binary image from segment 17b in conjunction with run-time profile statistics from segment 17d into a translated binary image 17c is shown. The binary image transformer 800 comprises the translator 54 and the optimizer 58 as depicted in the background system of FIG.

3. The arrangement shown in FIG. 3 comprising an optimizer and a translator is one arrangement for the binary image transformer 800. Generally, the binary image transformer transforms the first binary image or non-native image 17b to a translated binary image or native image 17c.

FIG. 58B depicts another arrangement for the binary image transformer 800 where the transformer comprises only the binary image translator 54 with no optimizer. FIG. 58C depicts the arrangement for the binary image transformer of FIG. 3.

Figure 58D:
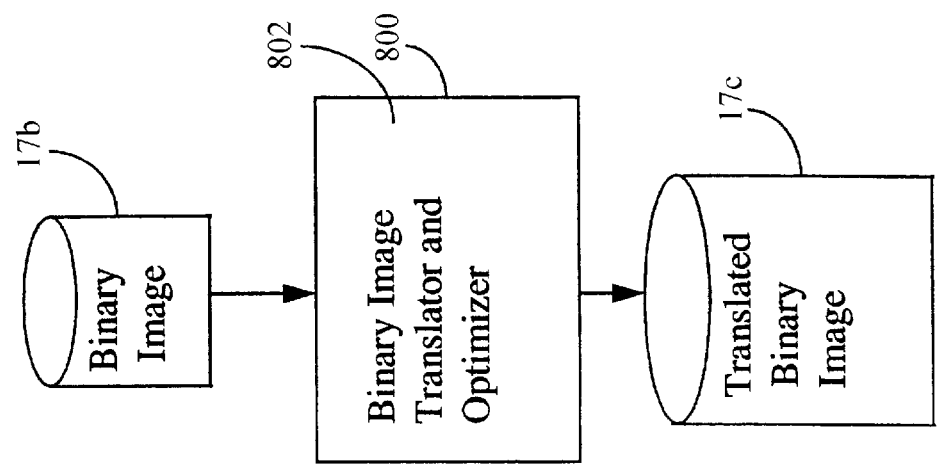
Figure 58C:
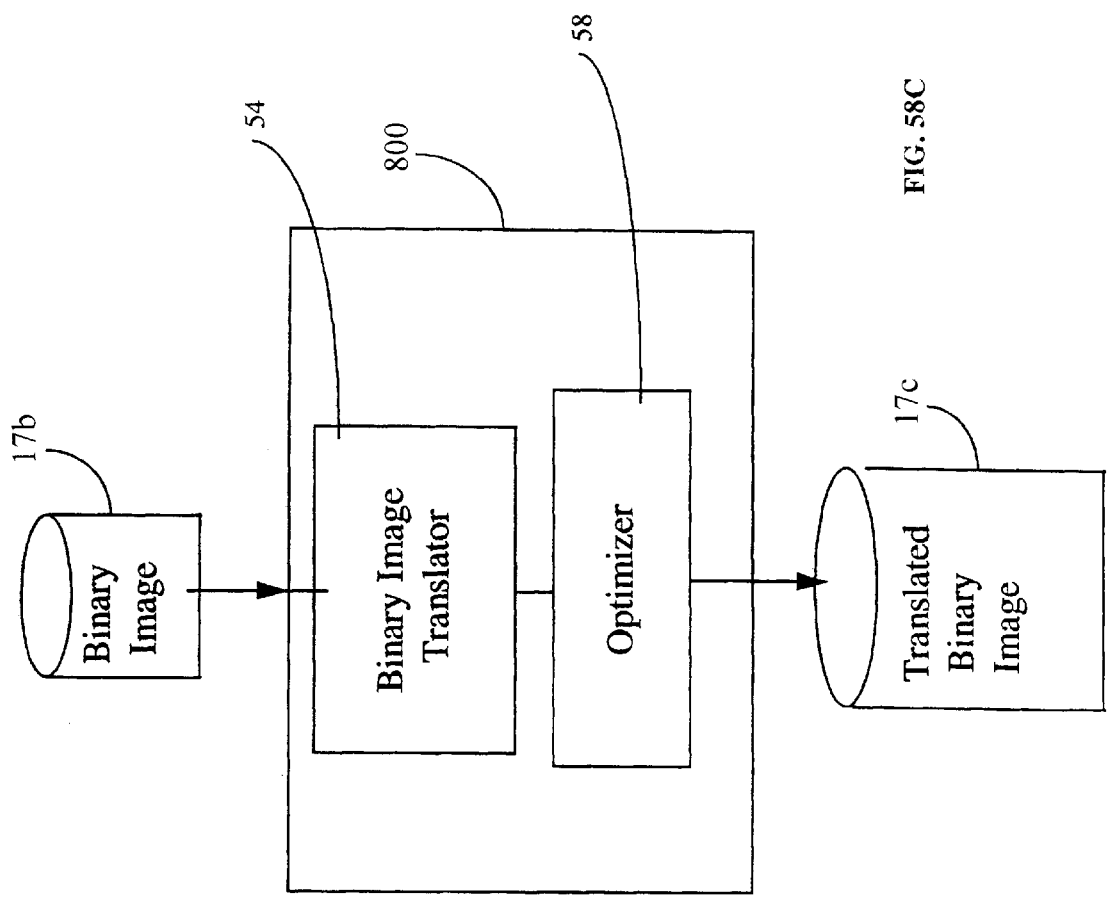

FIG. 58D depicts yet another alternate arrangement for the binary image transformer 800 comprising a binary image translator and optimizer 802 as a combined unit. As an example of the binary image translator of FIG. 58D, translation and optimization are intermixed to improve the efficiency of the translated/optimized code.

It is the arrangement as depicted in FIG. 58D which will now be described in greater detail. Additionally, in the description that follows the first or non-native binary image 17b is an image built to execute in a complex instruction set computer (CISC). The translated binary image or native binary image 17c is built to execute in a reduced instruction set computer (RISC).

INTERMIXED TRANSLATION AND OPTIMIZATION

Figure 59:
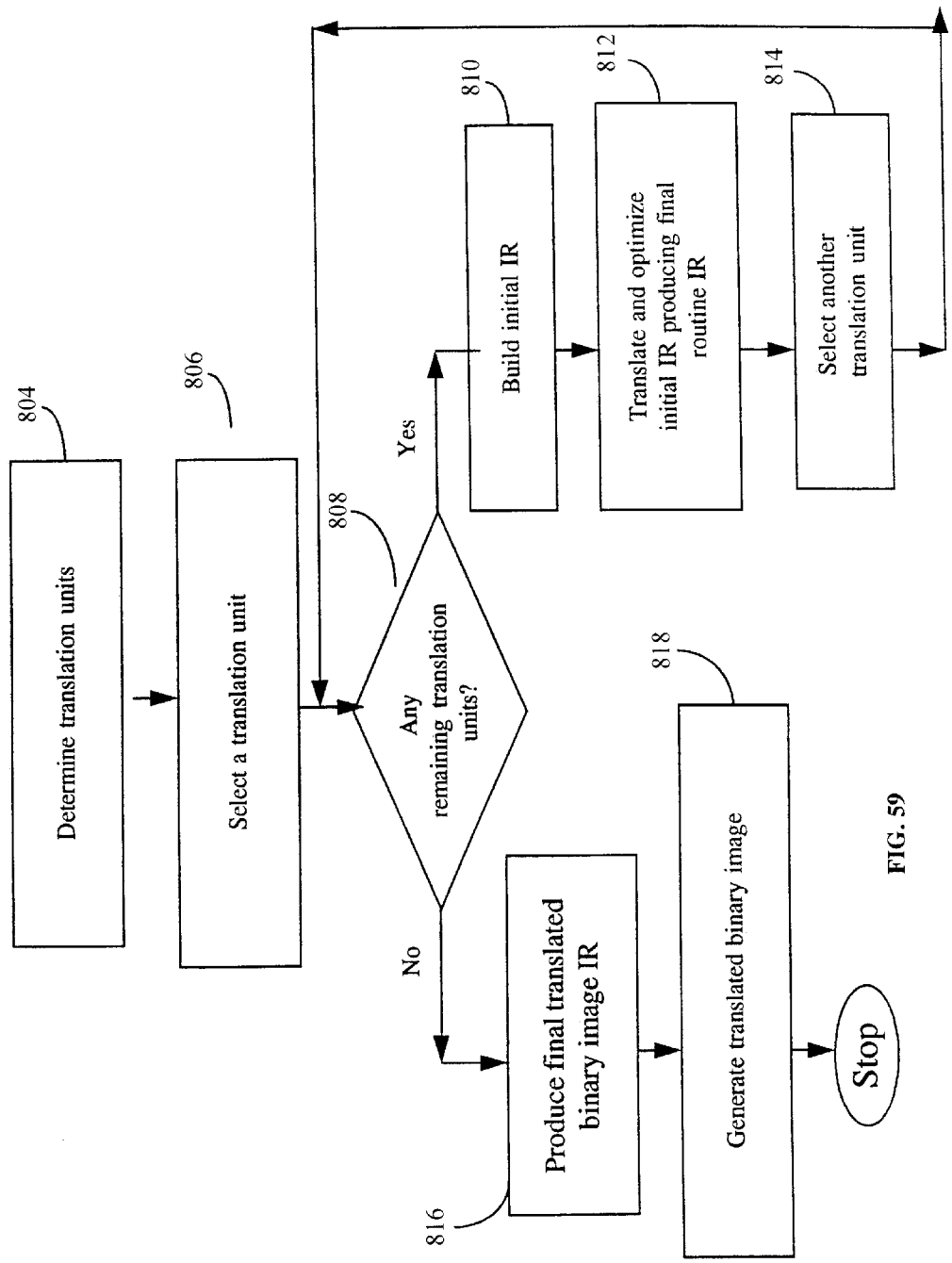
FIG. 59 is a flow chart of steps of translating the binary image.

Referring now to FIG. 59, the steps performed by a binary image transformer 602 (FIG. 58D) to transform a binary image 17b into a translated binary image 17c are depicted. Translation units are determined, as in step 804, as mentioned above in conjunction with FIGS. 41 to 44. One of the translation units is selected, as in step 806. At step 808, a determination is made as to whether or not there are any remaining translation units. If there are remaining translation units, control proceeds to step 810 where an initial intermediate representation (IR) is produced. The initial IR is translated and optimized to produce a final translation unit IR, as in step 812. Control is transferred back to step 806 where another translation unit is selected. Control proceeds to step 808 where a determination is again made as to whether or not there are any remaining translation units.

If a determination is made, as in step 808, that there are no remaining translation units associated with the first binary image to be translated, a final translated binary image IR is produced, as in step 816. The final translated binary image IR combines individual translation unit IRs into one final translated binary image intermediate representation (IR). Using the final translated binary image IR, the translated binary image 17c is then produced, as in step 818.

Prior to performing optimizations or translations, it is necessary, as in step 804, to determine what translation units comprise the non-native binary image 17b. Generally, to be able to perform a wide range of optimizations including local and global optimizations, it is necessary to define a translation unit which does not inhibit the application of existing and new optimization techniques. One such preferred technique for determining a translation unit was previously described in conjunction with FIGS. 41 to 44.

SELECTING TRANSLATION UNITS

Figure 60:
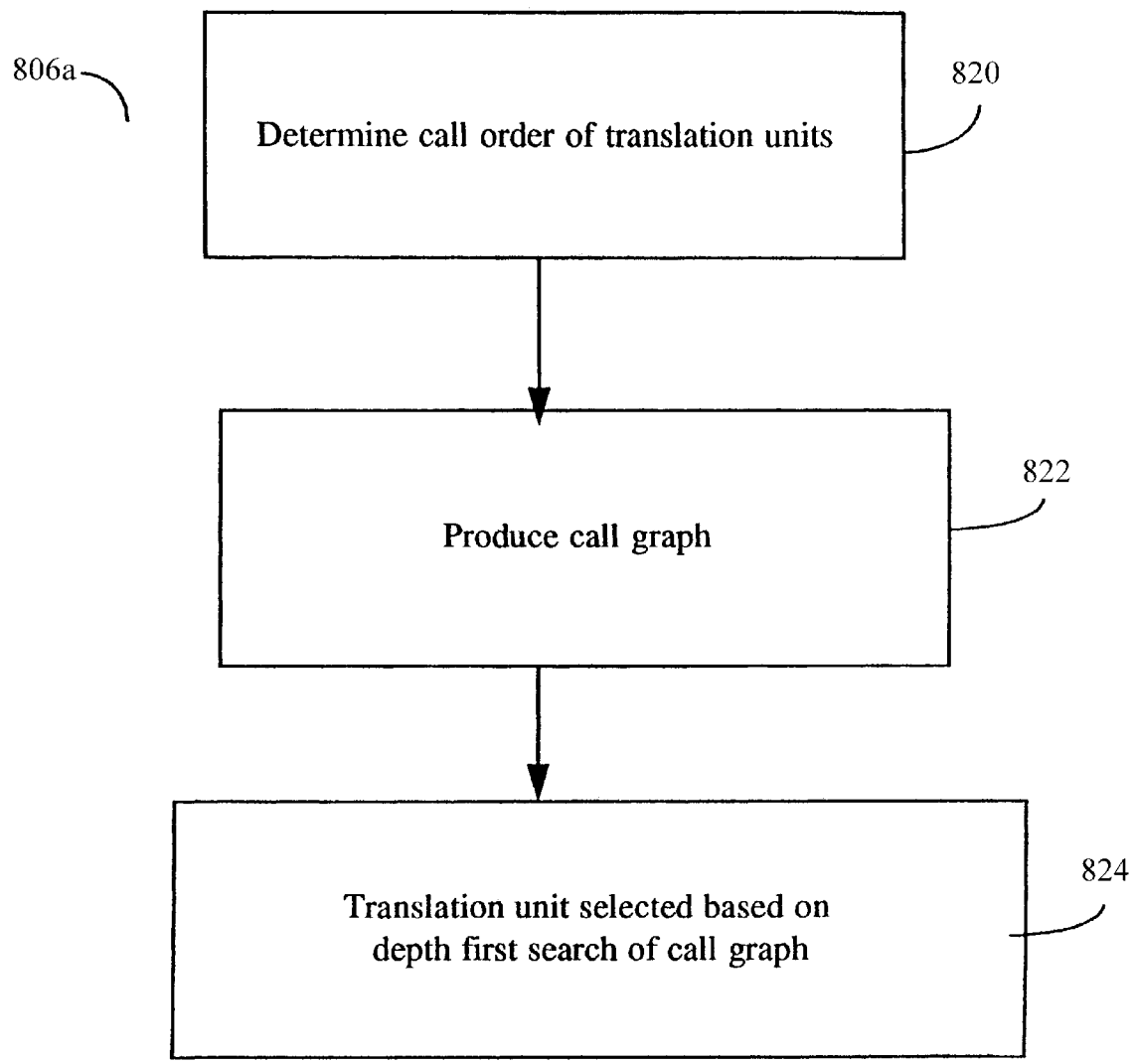
FIG. 60 a flow chart of the step for one method for selecting the translation unit to be processed.

Referring now to FIG. 60, an embodiment 806a of step 806 of FIG. 59 is shown in more detail. In technique 806a, selection of a translation unit begins by determining for the image to be translated, call relationships amongst translation units, as in step 820. A call graph is produced using the call execution order, as in step 822. A translation unit is selected from the call graph based on a depth first search of the call graph, as in step 824.

Tracing the call execution order of the translation units comprising a binary image, as in step 820, includes tracing the run time execution order in which translation units are called. For example, if routine A calls routine B, and then routine B calls routine C, the call execution order of these routines is A, B, C.

Figure 60A:
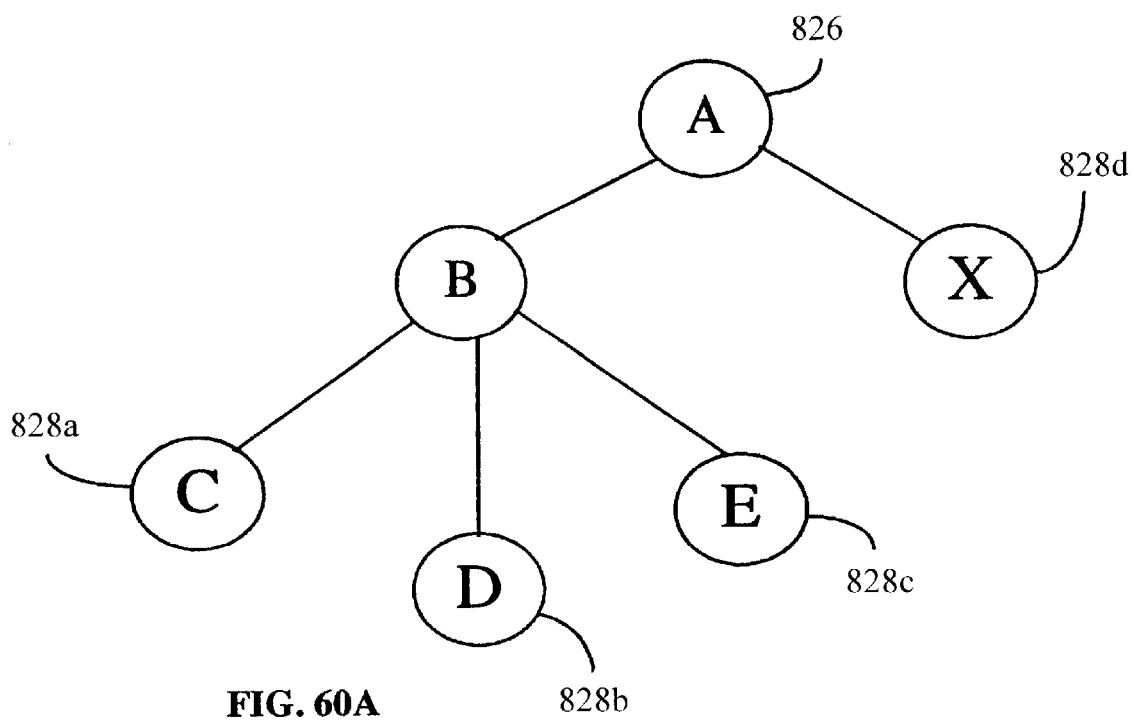
FIG. 60A is a representation of a call graph used in the method steps of FIG. 60.

Referring now to FIG. 60A, an example of a call graph, as produced by step 822 and used in step 824, is shown. The call graph produced as in step 822 represents the call execution order of step 820. Typically, a call graph is a data structure comprising nodes in which each node corresponds to a translation unit or routine called in the execution order. In FIG. 60A, routine A calls routine B. In turn, routine B calls routine C, D and E. Routine A also calls routine X. It can be seen that each node in the graph corresponds to a routine. Nodes at a top level of the graph, such as node A 826, occur earlier in the execution order. The bottom most level of the call graph contains the nodes representing the last routines in the execution order, such as nodes 828a–828d.

In step 824 the depth first search of the graph as in FIG. 60A is performed producing a depth first search order. One depth first search produces an ordering of nodes A, B, C, D, E and X. The order in which the translation units would be selected is in the order produced by the depth first search.

One advantage of using the method described in FIG. 60 is that register preservation and allocation techniques can use the information produced by the call execution order. For example, a register allocator can use the information that routine C does not call routine D, and the fact that both of these routines are called from routine B. A register allocator determines that routines C and D have the same registers available for allocation within the routines.

Figure 61:
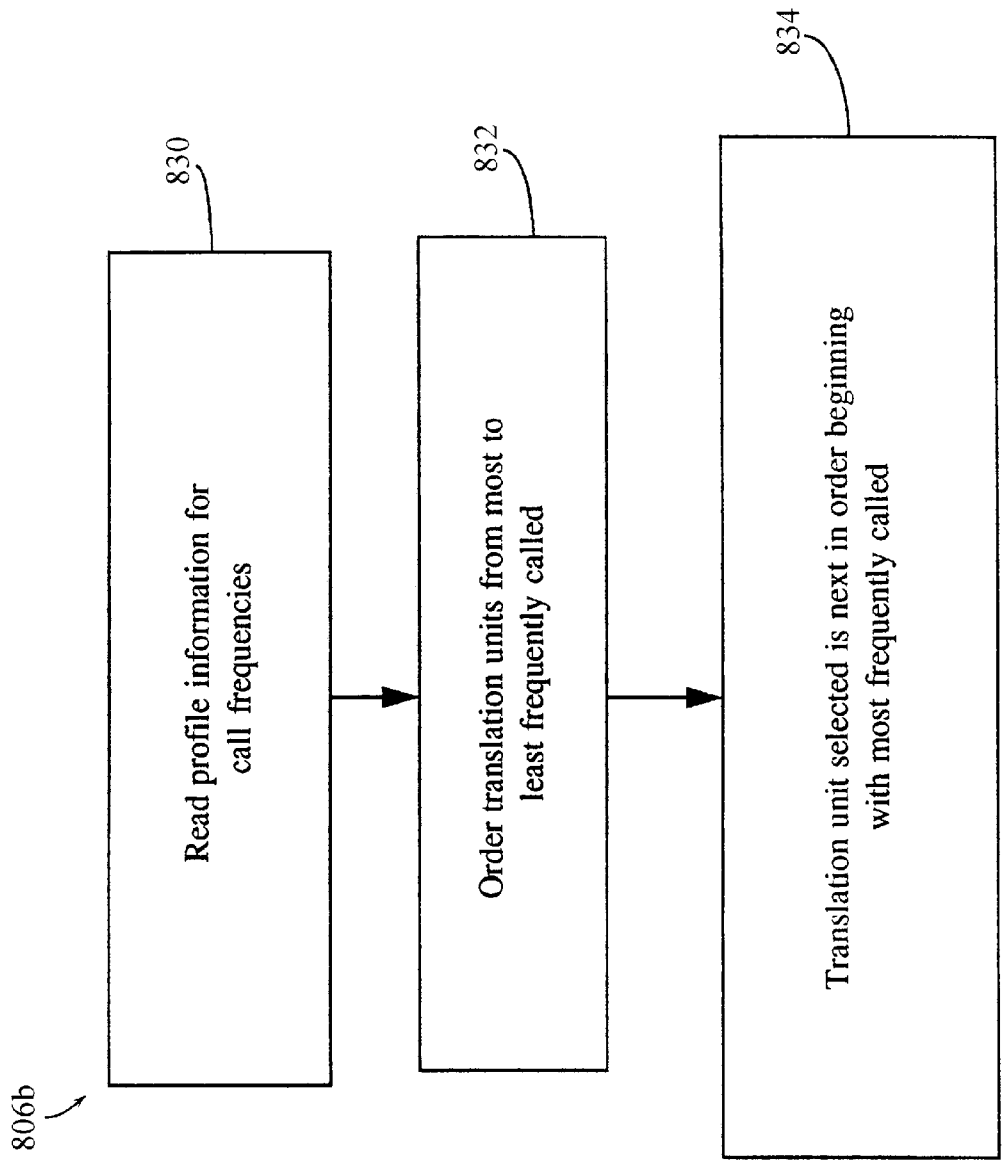
FIG. 61 is a flow chart depicting an alternative method for selecting a translation unit to be processed.

Referring now to FIG. 61, another method 806b for selecting a translation unit is described. The method 806b produces an ordering of translation units to be translated based on how frequently each translation unit is called. As in step 830, the profile information is read. Specifically, the profile information includes information about how frequently translation units are called. As previously described, this profile information is run time execution information gathered by the interpreter 44. Using the information from the profile statistics, the translation units are ordered from most to least frequently called, as in step 832. Each translation unit is selected from the ordering with the most frequently called routine being selected first.

One benefit of using method 806b is apparent when there is a user specified time limit for translation. For example, if the user allots time N to translate the first binary image to the second binary image, it is typically most beneficial in terms of run-time execution efficiency to translate, rather than interpret, those translation units which are called or executed most frequently.

INITIAL INTERMEDIATE REPRESENTATION

Figure 62A:
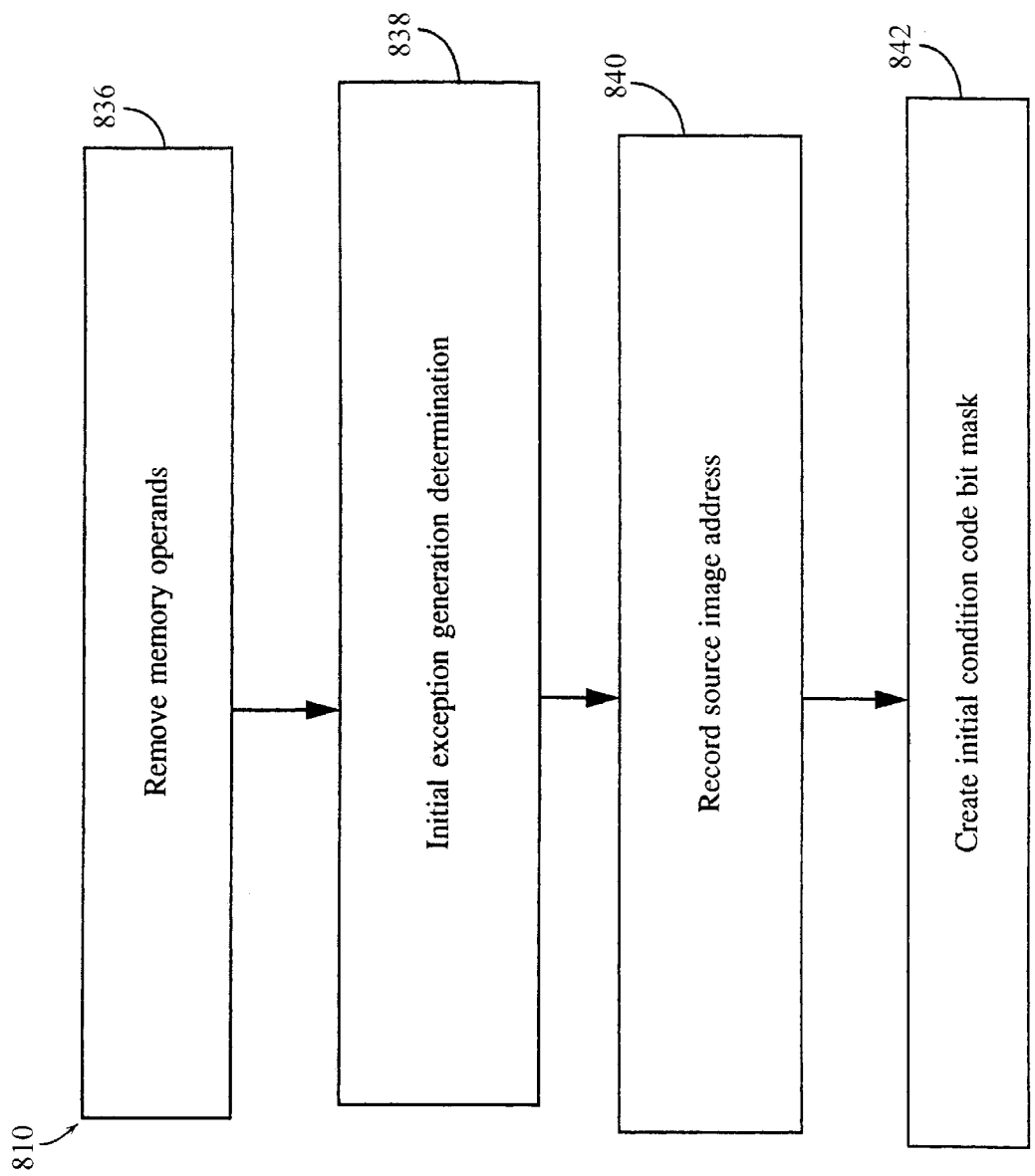
FIG. 62A is a flow chart listing steps for forming an initial intermediate representation (IR) of a binary image.

Referring now to FIG. 62A, steps in a method for building an initial IR 810 are shown. Memory operands of CISC instructions are removed and replaced with register and constant operands, as in step 836. One CISC instruction with memory operands produces one or more IR instruction code cells in the initial IR. In step 838, an initial determination is made as to whether the instruction or instructions which corresponds to the IR instruction code cell can produce a run time exception. Information which is needed in later processing is also stored with each IR instruction code cell. One piece of information which is stored and can be used in later processing is the address of each instruction being translated, as in step 840. Associated with each IR instruction code cell is the address of the corresponding machine instruction in the first binary image which corresponds to that IR instruction code cell. The address represents a location within the first binary image. This address is used, for example, when determining a correspondence between a CISC instruction in a first binary image and IR code cells producing RISC instructions included in a second translated binary image. Also performed at this time are tasks which initialize and create data structures, for example, additional data structures included as part of the IR which are used in later processing stages. One such piece of information which is stored and used in later processing is initialization of condition code masks, as in step 842.

As previously mentioned, the implementation now being described translates a first binary image comprising CISC instructions a second binary image comprising to RISC instructions. Therefore, some of the steps that will be described to build the initial IR are particular to the translation of CISC instructions to RISC instruction.

As to step 836, a CISC instruction typically includes a memory operand referring to a memory location. RISC instructions generally do not have memory operands. Rather, RISC instructions load an address into a register and retrieve contents from memory using the register as an address operand pointing to the memory location. In step 836, the memory operands are removed from instructions. These operands are replaced with a register or a constant value IR operand.

In step 838, an initial determination is made as to whether an IR instruction code cell corresponds to a machine instruction that can generate a run-time exception. A run-time exception can occur, for example, when there is a divide by zero error when executing a floating point instruction. Another example of a run-time exception is when a memory access is attempted using an invalid address with a load or a store instruction. A data structure to maintain track of such instructions is described in conjunction with FIG. 62C.

Another piece of information which is associated with each IR instruction code cell is recording the image address identifying a location within the first binary image 17b currently being translated as in step 840.

Also associated with Each IR instruction code cell also includes a condition code bit mask, as provided in step 842. Generally, a CISC instruction such as the X86 set mentioned above set condition codes to indicate certain conditions that happen as a result of run-time execution of an instruction. Typically a RISC architecture such as the Alpha architecture mentioned above, does not have or use condition codes. As a result, when translating CISC instructions to RISC instructions, condition codes of the CISC instructions are handled as mentioned above in conjunction with FIGS. 7 to 20. When providing the initial IR, a condition code bit mask is initialized and associated with each IR instruction code cell for use in later condition code processing.

The condition code bit mask associated with an IR code cell is initialized indicating those condition codes which can be affected by execution of an instruction corresponding to the IR code cell. One representation of the condition code bit mask reserves one bit in the bit mask for each condition code in the first instruction set associated with the binary image being translated.

Figure 62B:
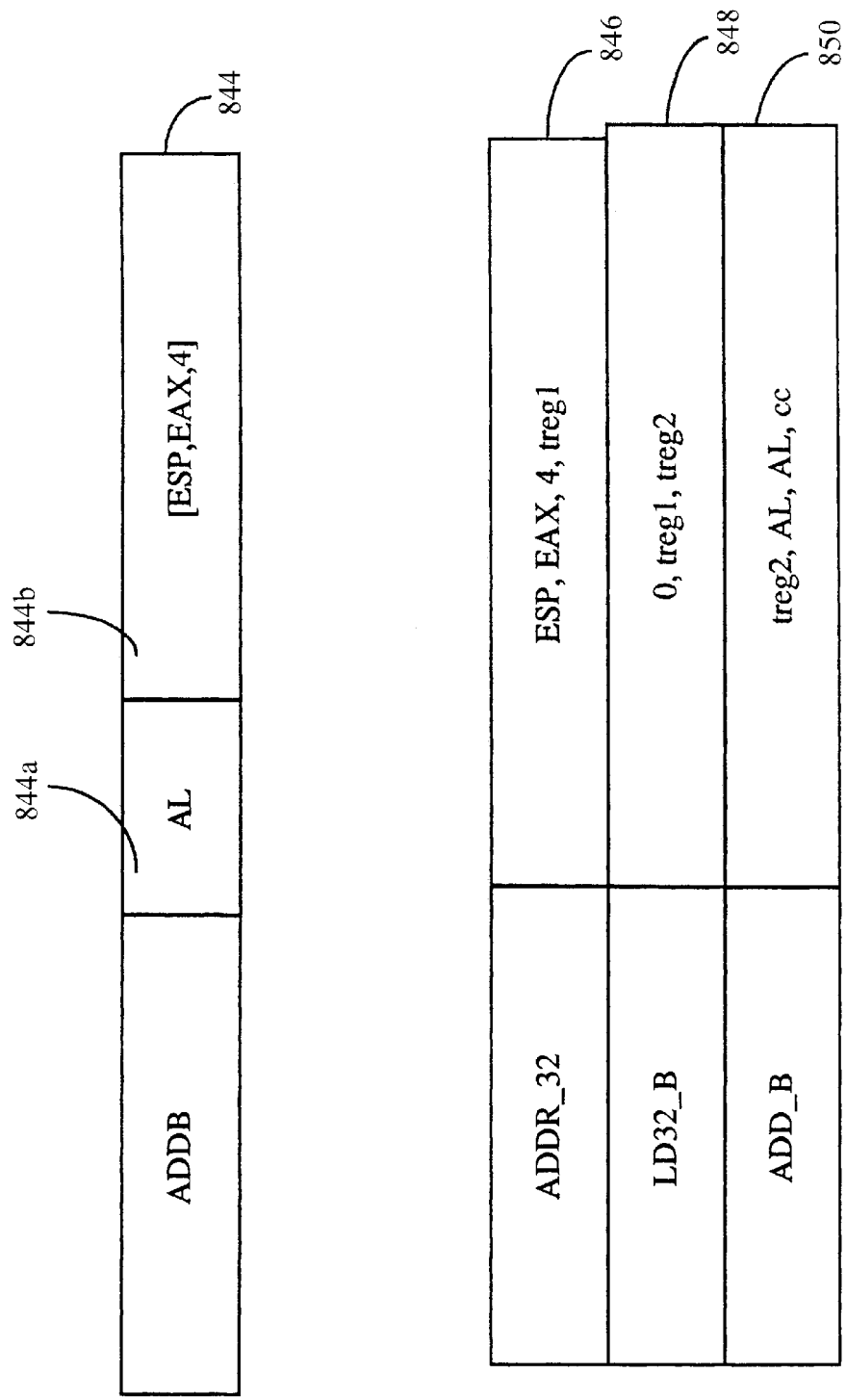
FIG. 62B As a block diagram of a data structure illustrating a transformation of a source instruction to an IR with memory perands removed.

Referring now to FIG. 62B, the initial IR corresponding to a CISC instruction in a first binary image is shown. A CISC instruction 844 ADDB is illustrated. ADDB adds together two bytes of information. One byte of information is in the register AL 844a. The second operand is a memory location 844b whose address is specified by adding the contents of register SP (the stack pointer in the non-native architecture) plus register AX plus 4. The add byte (ADDB) instruction loads the contents from memory specified by address 844b, adds a byte of that memory location to the contents of register AL 844a, and stores the result in register AL. In removing the memory operand in step 836, this CISC instruction operating comprises 3 steps corresponding to 3 IR instruction code cells which will now be described.

IR code cell 846 represents the formation of the address 844b of the second operand. The address is stored in register treg1. The second IR instruction code cell 848 loads from memory the contents of the location specified by treg1. The contents of the memory location are placed in register treg2. Finally, the third IR instruction code cell 850 adds a byte of information from treg2 to register AL storing the result in register AL. Thus, the IR instruction code cell 844 includes the address formation of an operand corresponding to IR instruction code cell 846, loading the operand from memory corresponding to IR instruction code cell 848, and performing the data operation of the instruction 844, e.g., ADDB, in IR instruction code cell 850. Note that the representation in FIG. 62B is that the operands treg1 and treg2 denote general hardware registers that are allocated or more particularly defined in a later register allocation process. At this point in the translation, the register operands treg1 and treg2 operate as place holders for which a particular register will be determined later in the translation. The original instruction in the first binary image being translated 844 corresponds to 3 IR code cells and has an image address. The image address of the instruction 844 is associated with each of the IR instruction code cells 846, 848 and 850.

TRANSFORMER RUN-TIME EXCEPTION
HANDLING

Figure 62C:
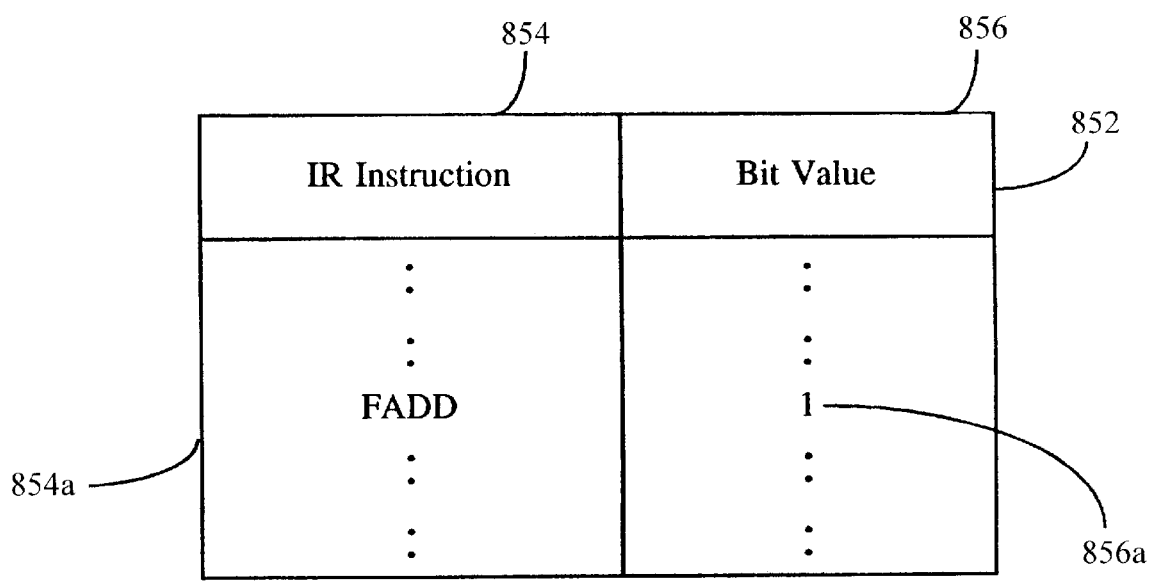
FIG. 62C is a block diagram of a data structure used to indicate whether an IR instruction corresponds to a machine instruction which can generate an exception.

Referring now to FIG. 62C, a table 852 is shown which is used to keep track of initial run-time exception determinations. The table 852 contains two columns. The first column 854 contains an entry for each IR instruction that can be specified within an IR instruction code cell. The second column 856 contains an entry corresponding to an IR instruction appearing in column 854. Column 856 contains a bit value indicating whether a machine instruction, corresponding to an IR instruction in column 854, when executed can produce a run time exception. For example, the floating point add instruction (FADD) 854A can produce a run time floating point exception as indicated by the bit value here "1"856a. A bit value is associated with each IR instruction code cell.

The initial IR, which is built as a result of processing at step 810 of FIG. 59, is an intermediate representation of the machine instructions comprising the translation unit currently being processed. As previously discussed, one IR comprises a list of IR instruction code cells. Each IR instruction code cell comprises an IR instruction opcode followed by one or more operands associated with that instruction opcodle. In particular, the IR which is produced as a result of step 810 and used in the remaining translation and optimization steps is similar to the IR discussed in conjunction with two level data flow analysis. Different portions of the IR are constructed during various portions of the translation and optimization steps. It is the IR construction of step 810 which constructs an initial list of IR instruction code cells corresponding to machine instructions comprising the translation unit.

As part of the initial IR processing of step 810, state containers are incorporated into the IR as needed to accurately represent IR operands. As previously described in conjunction with two level data flow analysis, an IR state container is added to the IR for each piece of state information. Typically, as a result of initial processing in step 810, state containers are added, for example, for each register, partial register, and memory operand. As later processing steps are performed, the IR will be updated to accurately reflect the later processing steps. As an example, after partial register operands are replaced with register operands, as will be described in register processing in step 854 of FIG. 63, IR state containers and references to them are accordingly updated to reflect the register processing.

Referring back to FIG. 59, after constructing an initial IR as in step 810, the initial IR is translated and optimized to produce a final routine IR as in step 812.

Figure 63:
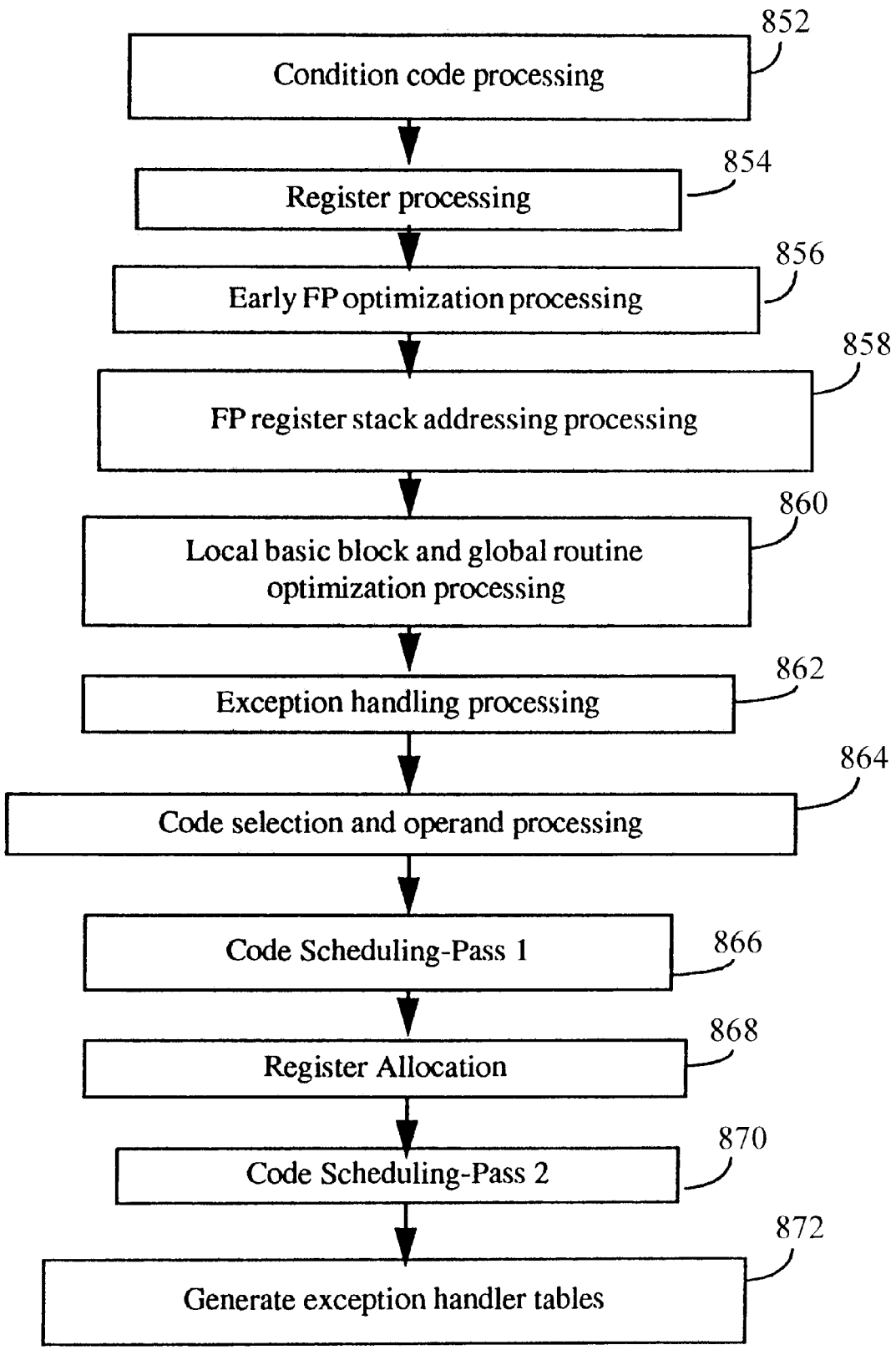
FIG. 63 is a flow chart showing steps for translating and optimizing an initial IR to produce the final IR for a given translation unit.

Referring now to FIG. 63, details of the step 812 for translation and optimization of the initial IR are set forth. Condition code processing is performed, as in step 852, to represent condition codes and their uses into a form which readily transforms into RISC instructions of the translated binary image. Register processing is performed, as in step 854. In particular, the Intel CISC instruction set includes partial register operands which use a portion of a register as an operand. Special processing is needed to convert the partial register operand and their uses into a representation in the IR enabling translation into RISC instructions.

Early optimization processing is performed, as in step 856. When translating a particular CISC instruction set to a particular RISC instruction set, it may be advantageous to perform some optimization steps prior to performing some translation steps in order to more efficiently performed the later translation steps. A particular implementation, as in step 856, performs early floating point optimization processing. This particular floating point optimization processing includes performing peephole optimizations to reduce the number of IR instruction code cells used in later translation and optimization steps. Another translation step, particular to translating Intel CISC instructions to Alpha RISC instructions, includes processing the Intel instructions which use floating point (FP) register stack addressing, as in step 858.

In sum, the processing performed by step 852 through 858 of FIG. 63 represents special processing particular to the CISC instruction set being translated, such as the Intel instruction set. An implementation which translates a different CISC instruction may use the same or different processing step tailored for the CISC instruction set comprising the binary image being translated. The processing performed by steps 852 through 858 typically work on translating and transforming the IR including operands into a form which more closely resembles the RISC instruction set that will comprise the translated binary image 17c produced as a result of the binary image translation.

At step 860, local basic block and global routine optimization processing is performed. Exception handler processing is performed, as in step 862, to enable proper handling of a run time exception which occurs when executing the translated binary image. The code selection and operand processing, as in step 864, perform final transformation of the IR code cells. In particular, if the machine instruction set comprising a binary image being translated 17b has 32 bit operands and the machine instruction set of the translated binary image 17c has 64-bit operands, part of the code selection processing insures that all operands are 64 bits in length. If the entire set of IR opcodes includes opcodes which correspond to machine instructions in both the source and destination instruction sets, code selection processing insures that no opcodes corresponding to machine instructions in the source instruction set of the binary image 17b exist in the IR at the completion of step 864.

The first code scheduling optimization pass, as in step 866, is performed on the IR. At this point, the IR is generally in a one to one correspondence with instructions that will comprise the translated binary image. Optimizations, such as code scheduling which are highly dependent upon the machine instruction set of the translated binary image 17c, are performed. Code scheduling typically rearranges sequences of instructions into a more optimal sequence due to resource contentions within the computer system 10.

Register allocation is performed, as in step 868. Register allocation determines specifically which registers within the machine instruction set comprising a translated binary image will be used to hold what specific operands. For example, recall that in the initial IR representation, temporary registers such as treg1 and treg2 were introduced when transforming a machine instruction from the binary image 17b into the initial IR. These temporary register names are now assigned or bound to particular registers as used with the machine instructions comprising the translated binary image 17c.

A second code scheduling pass is performed, as in step 870. After allocating and binding a specific register to a certain operand, a particular sequence of instructions may be able to be reordered for more optimal performance and efficient use of resources.

Exception handler tables are generated, as in step 872, and comprise the final translated binary image. These tables produced as a result of step 872 enable proper run time behavior of the translated binary image when a run time exception occurs.

CONDITION CODE PROCESSING IN TRANSFORMER

Figure 64:
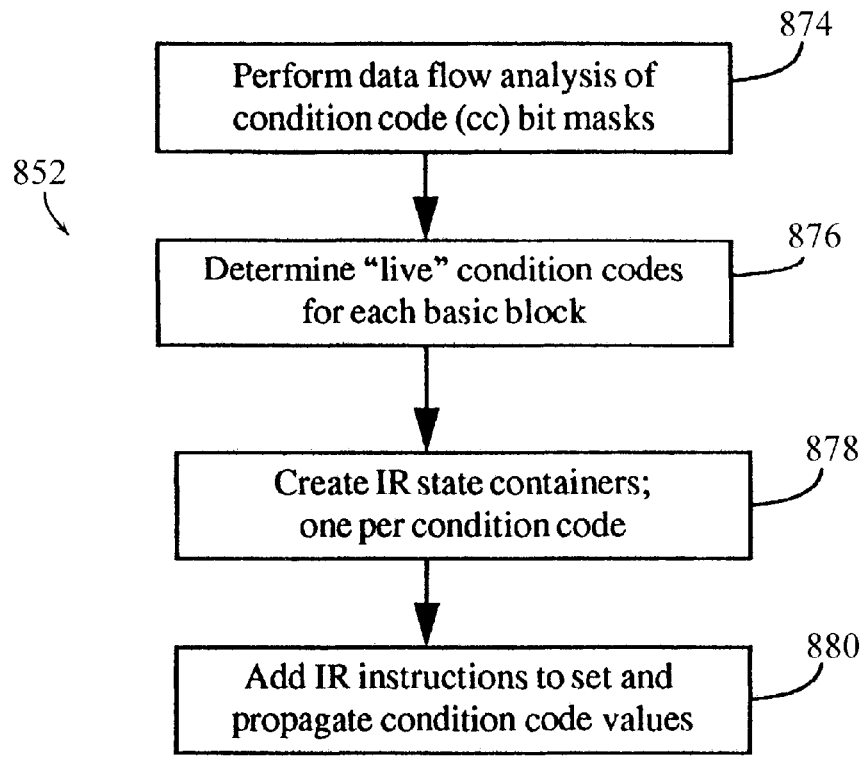
FIG. 64 is a flow chart showing steps for performing condition code processing.

Referring now to FIG. 64, condition code processing 852 of FIG. 63 is described in more detail. Data flow analysis of the condition code bit mask is performed, as in step 874. The condition code bit masks are those bit masks which were initialized and created as a result of building the initial IR in step 810 of FIG. 59. Data flow analysis includes determining reads and writes, respectively references and definitions, to the various condition codes. Local data flow analysis is performed for each basic block to determine "live" condition codes for each basic block, as in step 876. A "live" condition code is one which is defined in one basic block and referenced in another basic block. IR state containers are provided one per condition code, as in step 878. State containers, which represent state information including condition codes, were previously discussed in conjunction with two level data flow analysis and producing an initial IR, as in step 810. IR instructions, which set and propagate condition code values as in step 880, are added.

Figure 65A:
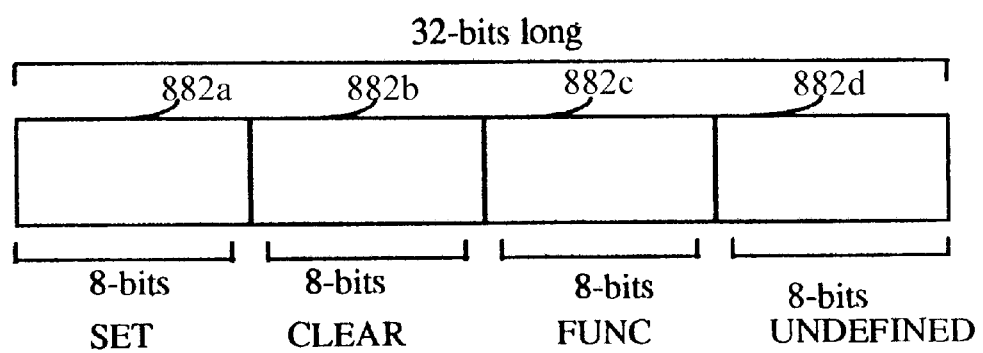
FIG. 65A is a block diagram of a bit mask associated with an IR instruction code cell used to represent condition codes that can be affected by the corresponding IR instruction code cell.

Referring now to FIG. 65A, a condition code bit mask 882 is shown. The condition code bit mask is a 32 bit register mask that is associated with each IR instruction code cell. In this illustration, a maximum of 8 condition codes exist in the first machine instruction set comprising the non-native binary image 17c. Four bytes of information 882a–882d comprising the 32 bit mask are used to represent the four possible states of each condition code. Each condition code can be in one of four states as indicated by the corresponding byte in FIG. 65A: a "set" state 882a in which the condition code has been set due to the run time execution of an instruction, a "clear" state 882b which indicates that this condition code cannot be set or is cleared by the execution of this machine instruction, a "func" state 882c in which the value is determined by the instruction results computed by the corresponding machine instruction, and a fourth "undefined" state 882d in which the value of the condition code as affected by this instruction cannot be determined.

As an example, a particular machine instruction within the non-native binary image 17b can cause a condition code to be set to 1. Its corresponding position within the set bit mask 882a is set to 1. Similarly, if an operation performed by an IR code cell corresponds to a machine instruction whose result determines the condition code, a bit within the func bit mask 882c which corresponds to the condition code would be set to 1.

The condition code bit mask 882 is initialized, as in step 842 of FIG. 62A when building the initial IR. After the initial IR has been built in step 810, the condition code bit mask associated with an IR instruction code cell is initialized to indicate which condition codes can be set upon execution of the machine instruction associated with the IR opcode.

Step 874 of FIG. 64 examines the initialized condition code bit mask associated with each instruction code cell and stores, for each basic block, summary information indicating which condition codes are set in one block and referenced in other blocks. Such a condition code which is defined in one block and referenced in succeeding block is referred to as a "live" condition code, as previously described.

In step 878 of FIG. 64, the IR is modified to contain state containers representing each condition code. As previously described in conjunction with two level data flow analysis, a state container references a piece of state information about a resource used in instructions. In the instant case, CISC instructions are being translated into RISC instructions where the RISC instructions only have immediate constants and register operands. As a result, the state container which represents a condition code is used to map a condition code resource in a CISC instruction to a register in the RISC architecture. Thus, the state containers act as resource map of a resource used in a first computer system associated with the non-native binary image 17b to another resource in a second computer system associated with the translated, native binary image 17c.

As part of performing step 880, when an IR instruction code cell, such as an add or subtract instruction, can set a condition code, other IR code cells are added to set and propagate the proper condition code or, rather as in the instant case, the RISC register associated with the condition code state container. IR instruction code cells are also added where a condition code is referenced or read.

Figure 65B:
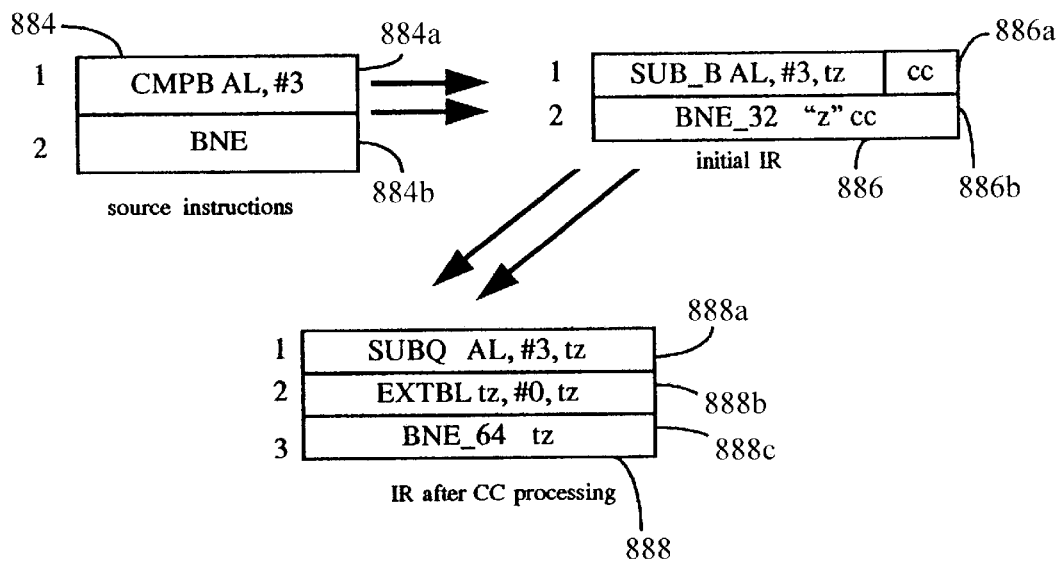
FIG. 65B is a block diagram which depicts an example transformation from source instructions comprising the first binary image as affected by condition code processing.

Referring now to FIG. 65B, a sample transformation of initial source instructions to an IR after condition code (CC) processing will now be described. Source instructions 884 are transformed into the initial IR 886 by performing processing as in step 810. Condition code processing, as in step 852, is subsequently performed using the initial IR 886. The IR resulting after condition code processing is represented as 888. Source instruction 884a performs a byte compare of register AL to the constant 3. Instruction 884b performs a branch if the value contained in the register AL is not equal to 3. For the purposes of the example in FIG. 65B since the focus is on condition code processing, only those elements of the IR which are pertinent to condition code processing have been shown. For example, there is no target of the branch instruction 884b shown.

The initial IR produced as a result of processing source instructions 884 is shown in 886. The first instruction 886a of the initial IR subtracts the value of register AL from the constant 3 storing the result in a temporary register TZ. Additionally note 886c indicates that a condition code in the condition code bit mask is set by the subtract instruction. The IR instruction 886b performs a conditional branch based on the condition code Z bit where the Z bit represents whether or not the operation previously performed as with the subtract instruction 886a produced a zero result.

The instructions shown in 886 are transformed after condition code processing into the IR instruction code cells shown in 888. The first instruction 886a has two corresponding instructions 888a and 883b. Since the target RISC instruction set only comprises a subtract quad word for integer values (SUBQ), the subtract byte instruction (SUBB) of 886a is replaced with a subtract quadword instruction of 888a with the result placed in a register denoted TZ. Although not shown in FIG. 65B, the IR comprises a state container associated with the Z bit condition code which corresponds to a register in the RISC architecture.

To maintain equivalency between the initial IR 886 and the IR after condition code processing 888, a byte is extracted from register TZ as performed by instruction code cell 888b, so that data operations are performed upon a byte quantity as in the original source instruction and the initial IR. The IR instruction code cell 886b which performs a 32 bit branch based on the Z bit condition code has been replaced with the IR instruction code cell 888c which performs a 64-bit branch based on the contents of the register associated with the Z bit condition code state container.

FIG. 65B depicts a typical transformation of an initial IR 886 after condition code processing 888. The condition code in the CISC architecture is associated with a state container since the condition code is a piece of state information. In the translation that occurs in the condition code processing, the state container associated with the condition code is mapped to a register in the RISC architecture. The resulting IR after condition code processing has the register in the RISC architecture associated with the condition code state container as an operand in the IR after condition code processing. Additional instructions, such as 888b, are added to produce equivalent results between IR transformations. References and uses of the condition code are replaced with the register state container associated with the condition code. A state container is produced in the IR for each condition code. The state container maps the condition code, as with the Z bit condition code in this example, to a register in the RISC architecture, as denoted by the temporary register TZ. Within the IR, references to the Z bit will point to the state container and all definitions to the Z bit will point to the state container as well.

The transformation that occurs as a result of condition code processing enables the resulting IR to resemble machine instructions which will comprise the translated binary image. Specifically in condition code processing of step 852, CISC condition codes are mapped to RISC registers. This mapping occurs using state containers. Additionally, new IR instruction code cells, such as 888a–888c have opcodes resembling RISC machine instructions which will comprise the translated binary image.

Another type of processing which occurs when transforming CISC instructions to RISC instructions in which the CISC instructions include partial register operands is register processing, as performed in step 854 of FIG. 63.

PARTIAL REGISTER OPERAND PROCESSING

Figure 66:
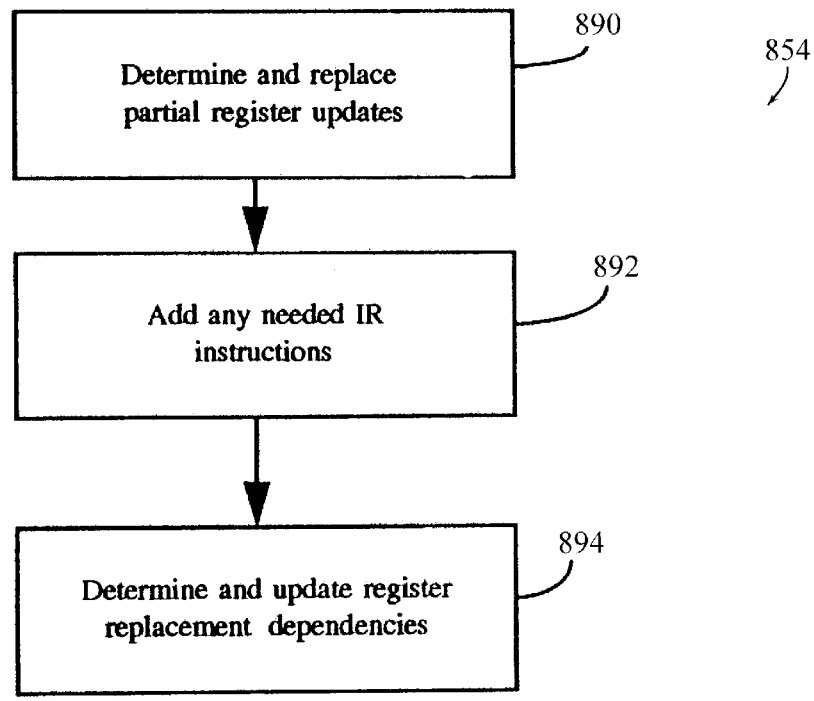
FIG. 66 is a flow chart depicting steps for register processing.

Referring now to FIG. 66, steps performed for register processing transforming the partial register operands are shown. At step 890 all partial register operands are determined and replaced with a corresponding complete register operand. The complete register operand is a register operand as used in other instructions. Needed IR instructions are added, as in step 892, producing a computational result equivalent to the previous IR. At step 894, IR instruction code cells which reference a partial register operand is updated and replaced with a corresponding register operand.

Figure 67A:
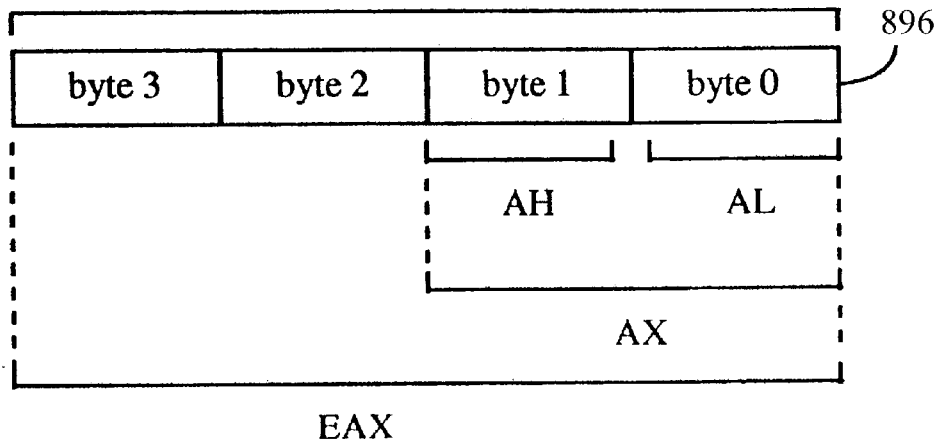
FIG. 67A is a block diagram which depicts a 32 bit register in an architecture which has partial register operands.

Referring now to FIG. 67A, a diagram of partial register operands is shown. A 32-bit register EAX is shown 896. The entire register as an operand in an instruction included in the first binary image is referred to as EAX. Partial register operands which appear in instructions included in the binary image to be translated 17B are operands AH, AL and AX. AX as an operand refers to byte 0 and byte 1 of the contents of register EAX. The operand AH refers to byte 1 of register EAX and similarly the operand AL refers only to byte 0 of register EAX. The partial register operands for register EAX are AH, AL and AX. When translating instructions from a first instruction set including partial register operands to a second instruction set which does not include partial register operands, each partial register operand is mapped to an entity included in the second instruction set. In the instant case CISC instructions are translated to RISC instructions. The RISC instruction set only has registers or constant values as operands. Thus, each partial register operand is mapped to an entire register in the RISC architecture.

Figure 67B:
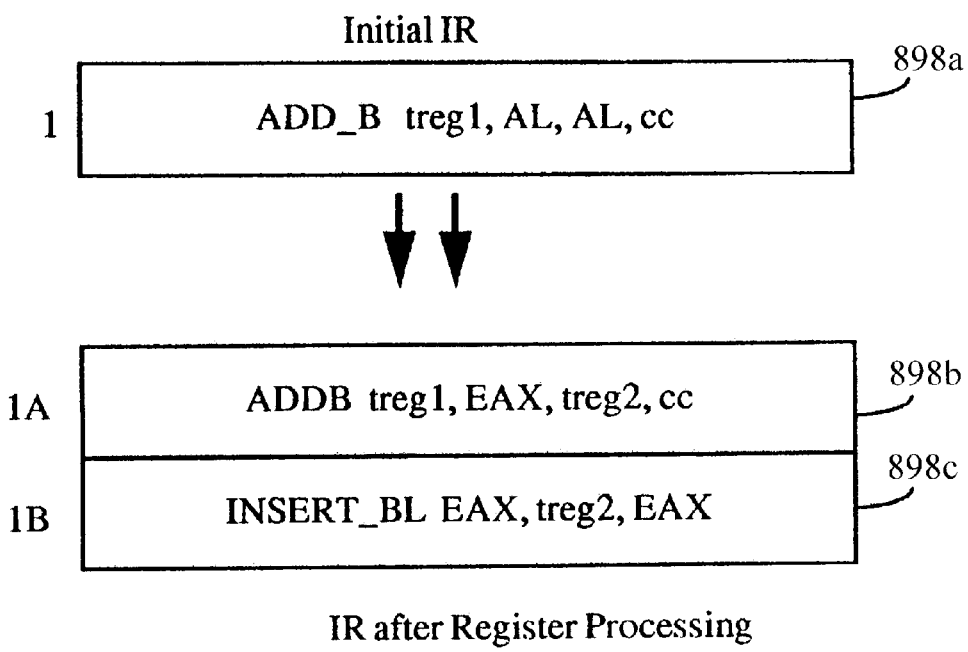
FIG. 67B is a block diagram which depicts a transformation of an initial IR as a result of register processing.

Referring now to FIG. 67B, an example is shown of how an initial IR is transformed after register processing. Specifically, an IR instruction code cell 898a is transformed into two corresponding code cells 898b and 898c. IR instruction code cell 898a performs byte addition of partial register operand AL with the contents of register treg1 with results stored in byte location AL. Additionally, condition codes are set by this instruction, as indicated by the "CC" of 898B. Register processing replaces partial register operand AL of instruction 898a with two equivalent instructions 898b and 898c, as indicated in FIG. 67B. Partial register AL of 898a is replaced with EAX, as in 898b and 898c. IR instruction code cell 898b adds the contents of register treg1 to register EAX storing the result in register treg2. IR instruction code cell 898c inserts a byte into register EAX from treg2 and stored the result in register EAX. IR instruction code cell 898c preserves the data comparability of register EAX in that only a byte of the data register is replaced. FIG. 67B is an example once again of how the partial register operand AH is replaced with the full register operand EAX and how additional instructions are added to preserve the operation result of the original instruction.

FLOATING POINT OPTIMIZATION

Floating point optimization processing, as depicted in step 856, is peephole optimization processing performed early in the overall translation and optimization process. As it is known in the art, peephole optimization processing replaces one or more instructions from one instruction set with one or more instructions which are deemed to be more efficient. In the instant case, the one or more instructions replaced are CISC instructions. The peephole optimization replaces the CISC instructions with an equivalent single RISC instruction which will comprise the final translated image. The peephole optimization processing, as depicted in step 856, is highly dependent upon the instruction set.

Figures 68A, 68B:
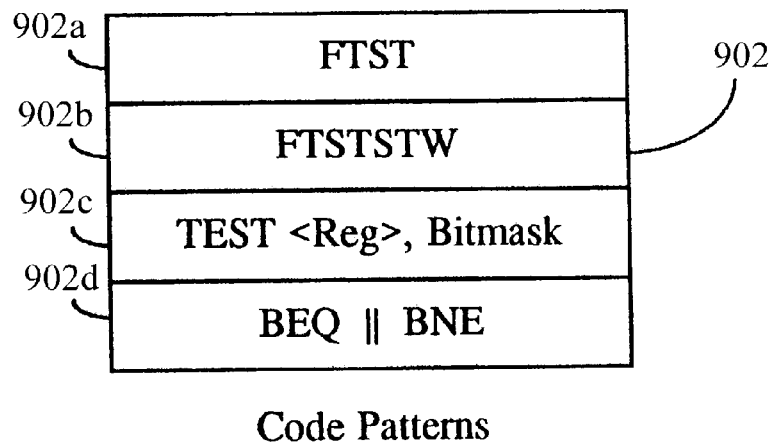
FIG. 68A is a block diagram which depicts a code pattern which is detected by early floating point optimization processing.
FIG. 68B is a block diagram which is a table indicating a replacement instruction for a specific code pattern detected in early floating point optimization processing.

Referring now to FIG. 68A, a code pattern 902 comprising multiple instructions is shown. This code pattern is searched for in the IR instructions and replaced with an equivalent RISC instruction. Specifically, the pattern depicted in 902 comprises four different instructions which must appear in sequence. For simplicity, only those opcodes and relevant operands used in identifying the code pattern are shown in 902 of FIG. 68A. Entries 902a to 902d correspond to IR instruction code cells which appear in sequence within the IR. Instruction 902a compares a floating point value stored as the top stack value with the constant 0. Typically, the stack is an area of memory pointed to by a register (stack register). Stack operands are implicit operands in the floating point (FP) Intel CISC instructions. The address of one of the implicit operands is indicated by the address in the stack register. Operands are pushed (added) onto the stack and popped (removed) from the stack as FP operations are performed.

When the CISC machine instruction which corresponds to the IR instruction code cell 902a is executed, certain bits in the status word register are set. Instruction 902b stores the status word of the 16 bit floating point state information to a register (denoted <REG> in FIGS. 68A–68B). Instruction 902c performs a test of the register to which the status word was stored by comparing the register to a bit mask specifying a comparison value. A branch is performed by instruction 902d based upon the content of the status word as compared to the bit mask.

Instructions 902a–902d perform a conditional branch based on the floating point value stored on top of the stack. Note that the last instruction 902d which will be searched for in the pattern can either be a branch on equal to zero (BEQ), or a branch not equal to zero (BNE). The RISC instruction set to which the series of CISC instructions is being translated comprises a floating point branch operation as a single instruction. Thus, the result of the four CISC instructions is accomplished with one equivalent replacement instruction in the RISC architecture.

The precise instruction which replaces instructions 902a–902d depends upon several items in the code pattern 902, as shown in FIG. 68B.

REPLACEMENT INSTRUCTIONS

Referring now to FIG. 68B, a table 903 is shown depicting a replacement instruction 908 which replaces a detected pattern 902a–902d. The precise replacement instruction shown as 908 depends upon the bit mask value 904, as used in instruction 902c, and the last instruction in the code pattern 906, as used in instruction 902d. For example, assume the bit mask value used in instruction 902c tests for the Z bit and the last instruction in 902d is a branch if equal to 0 instruction (BEQ). The Z bit is set in the CISC instruction if a zero data value is indicated by the FTST instruction 902a. The replacement instruction is the FBEQ instruction having an operand that corresponds to the register used in 902b and 902c. The replacement instructions included in column 908 have a one to one correspondence with a RISC instruction that will comprise the translated or native binary image 17c.

Several things should be noted about the floating point optimization processing being performed early in the translation and optimization of the first binary image 17*b*. Applying this optimization to the IR provides a transformation which results in a replacement IR instruction having a direct correspondence to a machine instruction that will comprise the translated binary image. Thus, early in processing elements of the IR have a direct correlation to the translated binary image 17*c*.

The IR used in this translation and optimization processing has a particular structure which provides great flexibility in that optimization and translation substeps can be intermixed and performed in an efficient order without undue restrictions. For example, the IR has the property that the opcode of any instruction code cell is one of: an opcode which corresponding to the non-native instruction set of the non-native image 17*b*, a pseudo op instruction specifically included for translation processing, or an opcode corresponding to a machine instruction in the destination or native instruction set of the native binary image 17*c*. Given this property, an optimization such as the early floating point peephole optimization processing of step 856 can be performed at multiple points during binary translation producing a resulting replacement instruction in the IR which has a direct correspondence to an instruction in the translated binary image 17*c*.

Typically, in a compiler several different IR are used rather than a single IR as here. In a compiler an initial IR goes through several transformations into other IRs in which each IR has varying properties and restrictions from the previous IR representation. Generally, these properties restrict the type of processing, e.g., translation and optimization steps, which can occur at various phases of translation or compilation. For example, within a compiler there is a compiler front end performing syntactic and semantic processing and a compiler back end which typically performs optimizations and code generations. The front end produces an initial IR which is input to the back end. The back end initially produces a compact intermediate representation thereby limiting or restricting the number of IR opcodes which it must analyze. The optimizer then transforms the compact intermediate representation and produces an optimized intermediate representation. The code generator subsequently generates a final intermediate representation from the optimized intermediate representation. The final intermediate representation has the property that its opcodes correspond directly to instructions in the destination instruction set. If an opcode that is typically included in the final intermediate representation appeared in the foregoing compact intermediate representation, an error in translation results. Given this typical organization of a compiler with the foregoing restrictions, the compiler itself is generally unable to interchange optimization steps with translation steps due to processing restrictions. The binary translator of the invention does not impose such undue restrictions on the IR. Thus, the binary translator can perform substeps of optimization and translation in an efficient order without undue restrictions.

Using a single IR in binary translation, rather than multiple IRs, as in the compiler described above, is generally a good design choice due to the nature of the transformation which occurs in the binary translation. In a binary translation, low-level machine instructions are transformed into other low-level machine instructions. In a compilation, high-level source code is transformed into low-level machine instructions. The source code is "high-level" relative to the machine instructions. In the binary translation, there is generally no transformation or mapping of high level language constructs to low-level machine instructions and a single IR suffices. Rather, as in compilation, transformation of high-level source code typically includes several repeated transformations of a higher level structure into a corresponding lower level structure to produce low-level machine instructions.

Step 858 of FIG. 63 performs floating point (FP) register stack addressing processing. The CISC instruction set in binary image 17*b* includes floating point instructions having implicit operands on the stack. The stack was previously discussed in conjunction with early FP peephole optimization processing. The RISC instruction set does not have implicit stack operand instructions. Thus, as with the partial register operand, the CISC instructions performing floating point register stack addressing must be transformed into an equivalent item in the RISC instruction set. Following is an example of four IR instruction code cells corresponding to CISC instructions to be translated:

| 1 FLD EA1 | /*push EA1 on stack */ |
|---|---|
| 2 FLD EA2 | /*push EA2 on stack */ |
| 3 FADDP | /*add two top stack elements, push result */ |
| 4 FST EA3 | /* store result in EA3 */ |

The first of the foregoing instructions loads or pushes the first operand register EA1's contents onto the stack. Similarly, the second instruction also pushes the content of operand register EA2 onto the stack placing the content in a memory location indicated by the address in the stack register. The third instruction performs a floating point add (FADDP) and pushes the result of the floating point addition onto the stack. The effect of the FADDP instruction is that the two operands EA1 and EA2 previously pushed on the stack are popped off, and replaced with an arithmetic result that is a single floating point number. The fourth instruction FST stores the result from the stack placing it in EA3. The fourth instruction pops the top value off of the stack returning the stack to its original position prior to the foregoing sequence of four instructions. The stack is an implicit operand in each of these four instructions. The Alpha RISC instruction set, associated with the translated image 17*c*, does not have similar floating point register stack addressing operands or equivalent instructions.

One translation technique makes explicit the implicit stack operand and substitutes, for the stack operand, an equivalent register in the RISC architecture. Later processing steps ensure that the replacement instruction opcode corresponds to a RISC instruction rather than perform a direct replacement within this translation step.

SECONDARY OPTIMIZATION AND TRANSLATION

After performing steps 852 through 858, the IR is considered to be well-formed in that peculiarities particular to the CISC instruction set, such as implicit FP stack operands, partial register operands, and condition codes, have been removed. After completion of step 858 of FIG. 63, the IR resembles a series of RISC instructions. Specifically, IR operands are register operands or constants. There are no more memory operands. Additionally, when possible, added instructions, for example, as a result of condition code processing or register processing, are either pseudo instructions or closely resemble the RISC instructions that will comprise the translated binary image 17*c*. When possible, steps 852 through 858 of a preferred implementation do not add opcodes or replace existing opcodes with other opcodes having a direct correlation to the binary image 17b currently being translated.

Figure 69:
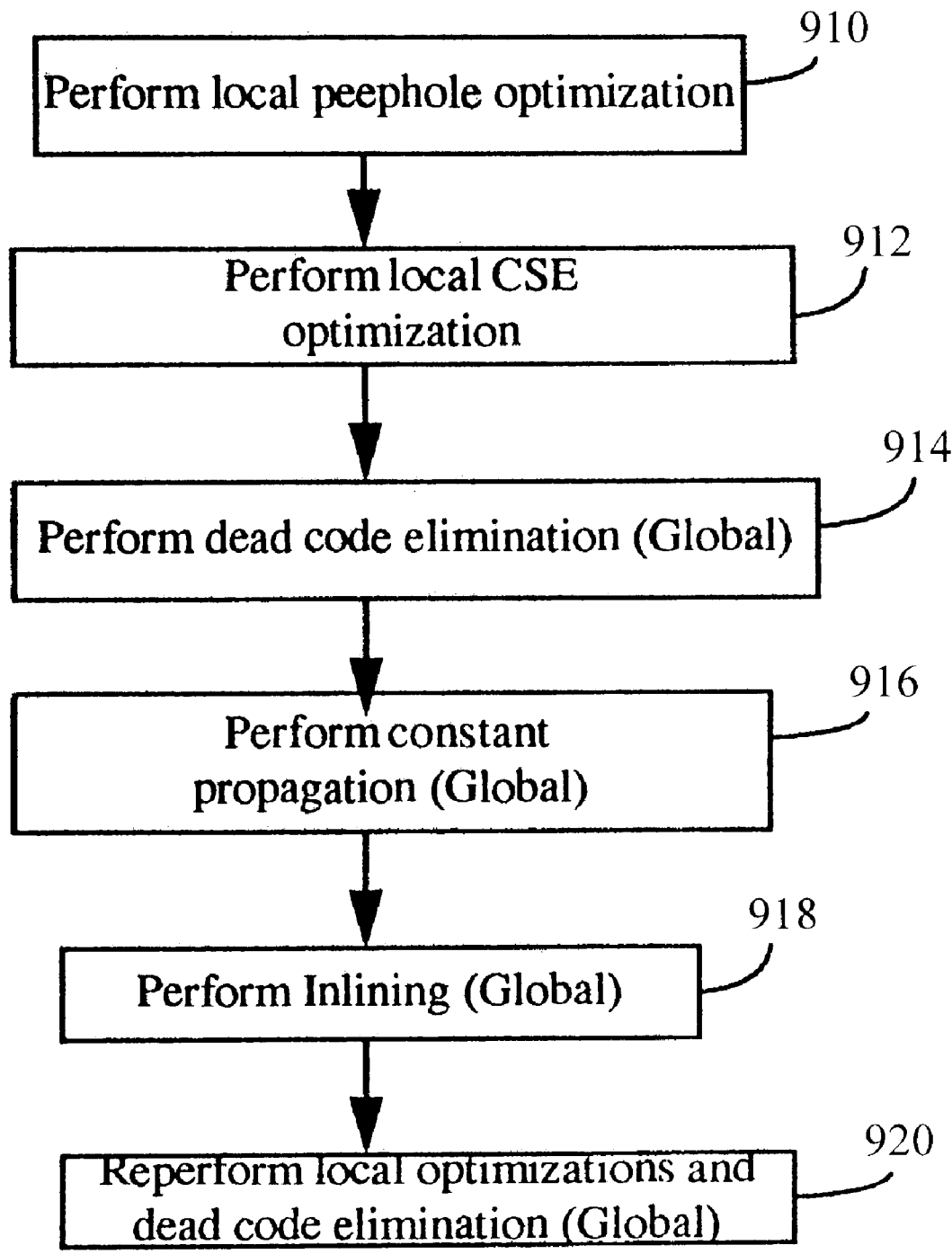
FIG. 69 is a flow chart depicting steps for local basic block and global routine optimization processing.

Referring now to FIG. 69, steps comprising local basic block and global routine optimization processing 860 are set forth. Typically, those optimizations which are performed per basic block are referred to as local optimizations, and those optimizations which are performed as between basic blocks are referred to as global optimizations.

Local peephole optimizations are performed, as in step 910. As previously mentioned a peephole optimization searches for a particular pattern or sequence of instructions and replaces those instructions with other instructions deemed to be more efficient. Previously, a peephole technique was applied to translations of step 856 performing floating point optimization processing. However, as used at step 856, the peephole technique accomplishes more than an optimization. In step 856, the peephole technique is used for translating a series of CISC instructions to a single RISC instruction. At step 910, the focus is optimization processing because of the prior translation steps already performed.

As in step 912, common subexpression elimination (CSE) is performed per basic block. In common subexpression elimination a subexpression is identified which produces a result. This subexpression is used multiple times within the translation unit or program. The optimization generally identifies the common subexpression, computes its result in one statement, and rather than use the entire expression in repeated locations, substitutes each repeated occurrence of the subexpression with the result as computed by the first statement.

Dead code elimination is performed for the translation unit, as in step 914. Dead code elimination involves identifying and removing those segments of code which can never be reached as by a section of code which is always branched around or has no entry point.

As in step 916, constant propagation is performed for a translation unit. Constant propagation typically involves operations with constants. One use of constant propagation, for example, is in the computation of addresses of subscripted variables when the subscript values can be determined earlier at compile time. As in step 918, inlining is performed for the translation unit. The inlining optimization of step 918 replaces a call to a routine, for example, with the instructions comprising the routine. The instructions of the routine are included in line rather than the call to the routine.

At this point in processing, a preferred implementation, as in step 920, repeats local optimization 910 processing and dead code elimination 912. Repeating certain optimizations can be beneficial in that repeating an earlier optimization can result in a better IR that has subsequently been effected by a later optimization. For example, repeating local peephole optimization, as in step 910, can be beneficial because additional code has been included as a result of inlining as in step 918. The specific optimizations which an implementation chooses to perform is highly dependent upon the IR representation and the previous translations and transformations which have occurred.

Additionally, it should be noted that the two level data flow data analysis technique previously can be used in performing the local and global routine optimization processing of step 860.

As in step 862, a substep of translation and optimization processing is exception handler processing. As previously discussed when building the initial IR, as in step 810, an initial determination was made as to whether or not an instruction is capable of generating a run time exception. Each IR instruction was previously examined in step 810 and a determination was made as to whether a corresponding machine instruction, if executed, could generate a run time exception. In this prior processing the determination was made solely by examining the IR opcode. A translator can more specifically determine if an exception can occur by examining the associated operands. For example, if an instruction is capable of generating only a memory access exception and the operand address is indicated by the stack pointer which is always known to point to a valid memory address, this instruction will not generate a memory access violation or exception at run time. Therefore, a further determination is made that even though the particular opcode itself is capable of generating an exception, using the specific operands of a particular instruction code cell, a memory exception is not generated. This step is generally a refinement of the previous processing determinations made in the initial IR processing of step 810.

CODE SELECTION AND OPERAND PROCESSING

Figure 70:
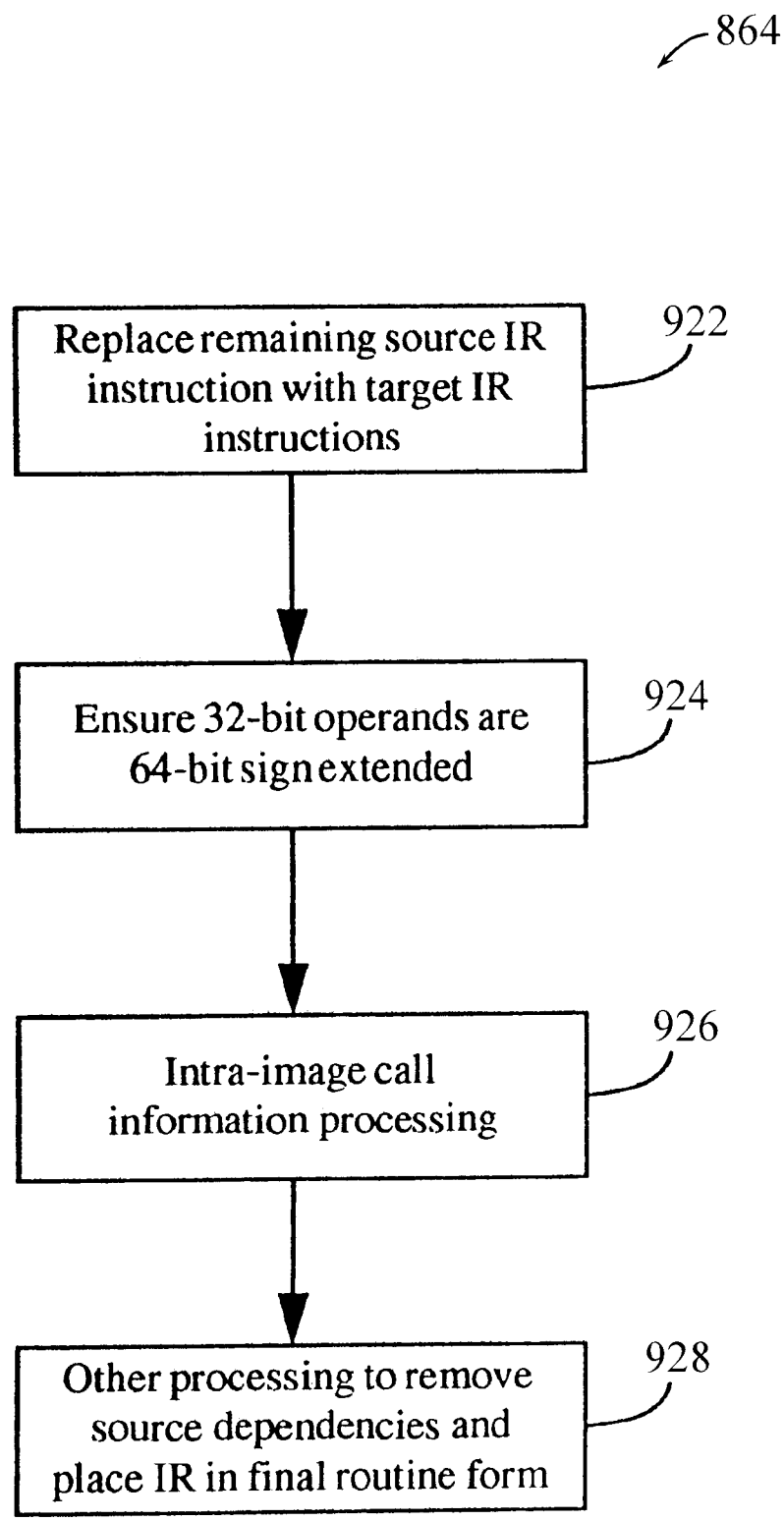
FIG. 70 is a flow chart depicting steps of code selection and operand processing which place the IR in final form.

Referring now to FIG. 70 code selection and operand processing (step 864 of FIG. 63) is set forth in detail. Generally, the code selection and operand processing perform remaining transformations needed to place IR instruction opcodes and operands in a direct correspondence with machine instructions that comprise the instruction set of the architecture of the computer system 10 and hence provide the native image 17c. As in step 922, any remaining source IR instruction opcodes are replaced with target IR instruction opcodes. A source IR instruction opcode has a direct correspondence with a machine instruction in the binary image 17b. In this step, remaining source instruction opcodes are replaced with one or more equivalent instruction opcodes each having a direct correspondence with a machine instruction in the second instruction set associated with the translated binary image 17c. For example, if the RISC architecture comprises only 64-bit length instructions performing 64 bit data operations, after completing step 864, each of the IR instruction code ,cells correspond to a 64 bit length instruction performing a 64 bit data operation.

Step 922 can be accomplished using a pattern driven instruction look-up and replacement technique using a table which maps a source instruction opcode to one or more corresponding target IR instruction opcodes. As in step 924, when translating a CISC operand to a RISC operand, the RISC architecture requires that the 32-bit CISC operands be transformed to corresponding 64-bit RISC operands. Additionally, in this specific translation, the high order 32 bits of each corresponding 64-bit RISC operand are sign extended. This processing step uses local data flow and global data flow information, as can be determined using the two level data flow analysis technique, to locate definitions and uses of operands to determine if a particular operand has been properly sign extended. As in step 926 intra image call processing is performed. An intra image call is a call made from one translation unit to another translation unit wherein both translation units are within the binary image being translated 17b.

Step 928 is performed as a "catch all" step performing any remaining miscellaneous processing necessary to remove source dependencies from the IR placing the IR in a final routine form such that no opcodes included in an IR instruction code cell have a direct correspondence to an instruction in the non-native binary image 17b. The IR in final routine form produced as a result of step 928 comprises IR instruction code cells which correspond directly to machine instructions associated with the instruction set of the computer system 10 to provide native binary image 17c.

INTRA-IMAGE CALL PROCESSING

Figure 70A:
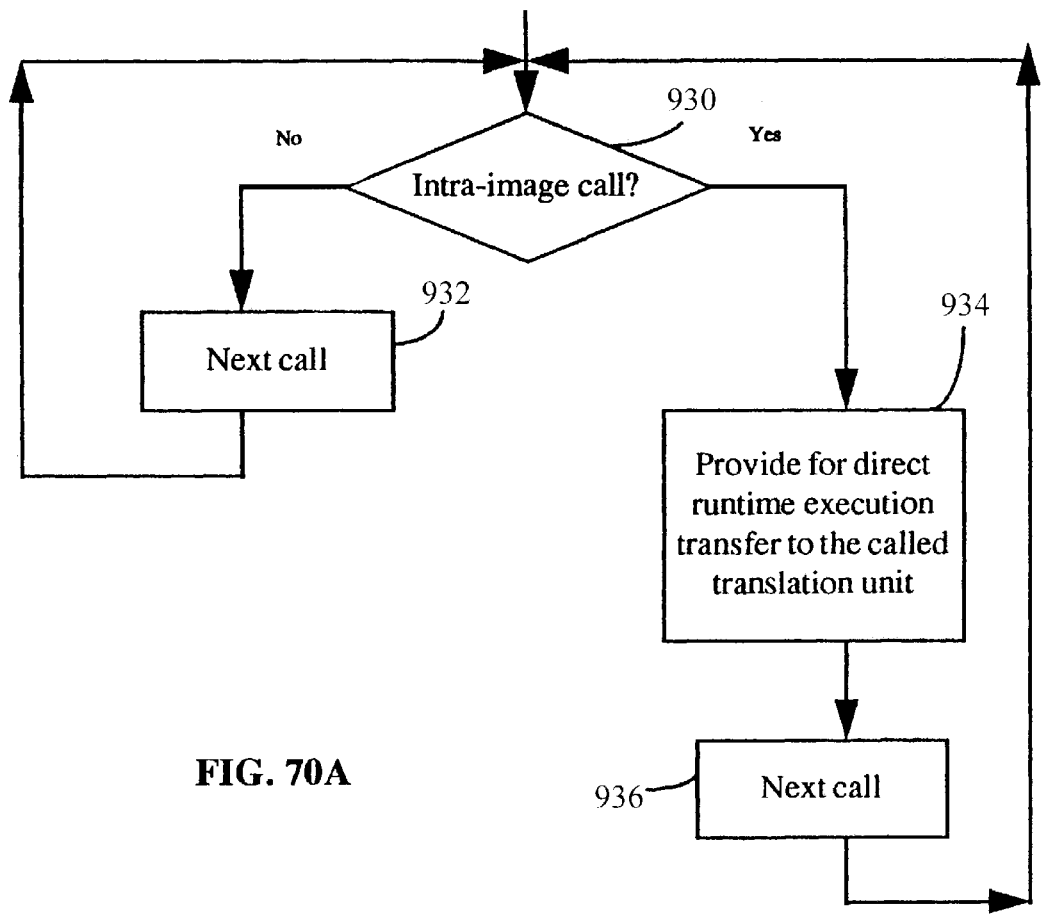
FIG. 70A is a flow chart depicting steps of intra image call processing.

Referring now to FIG. 70A, the steps of performing intra image call processing are set forth. As in step 930, a determination is made as to whether a call is an intra image call (YES decision) or an inter image call (NO decision). An inter image call performs a call to a routine in another translation unit. An intra-image call is a call from one translation unit or routine to another routine within the same binary image being translated.

If a determination is made at step 930 that the current call is an interimage call, run time intervention is required by the run time interpreter to transfer control to the called routine. As such, there is no special processing performed with the current call. Control proceeds to step 932 and the next call is examined.

If a determination is made at step 930 that the current call is an intra-image call, control proceeds to step 934. At step 934 provisions are made for direct run time execution transfer to the called translation unit. For example, one type of call is a PC (program counter) relative call in which the address of the called routine is represented by displacement relative to the instruction currently being executed. The effective address of the called routine is formed by adding the run time address of a program counter register plus and offset. The program counter register contains the address of the instruction following the call instruction. The offset represents a byte displacement. The binary image translator and optimizer 802 determine a correct translated displacement value for the called routine within the native binary image 17c.

Using the binary image address associated with the CISC call instruction, as in step 840, and the displacement comprising the CISC call instruction, a first target address within the non-native binary image 17b corresponding to the called routine is determined. The translator and optimizer 802 map the addresses of the CISC call instruction and the called routine within the binary image 17b, respectively, to first and second translated addresses within the translated binary image 17c. By determining the difference between these two translated addresses, the translated displacement is determined representing the displacement between the calling instruction and the called routine in the translated binary image 17c. Modifications are made to the IR code cell corresponding to the call instruction by including the translated displacement value.

After completing step 934, control proceeds to step 936 where the next call is examined. Processing resumes with step 930.

Figure 71A:
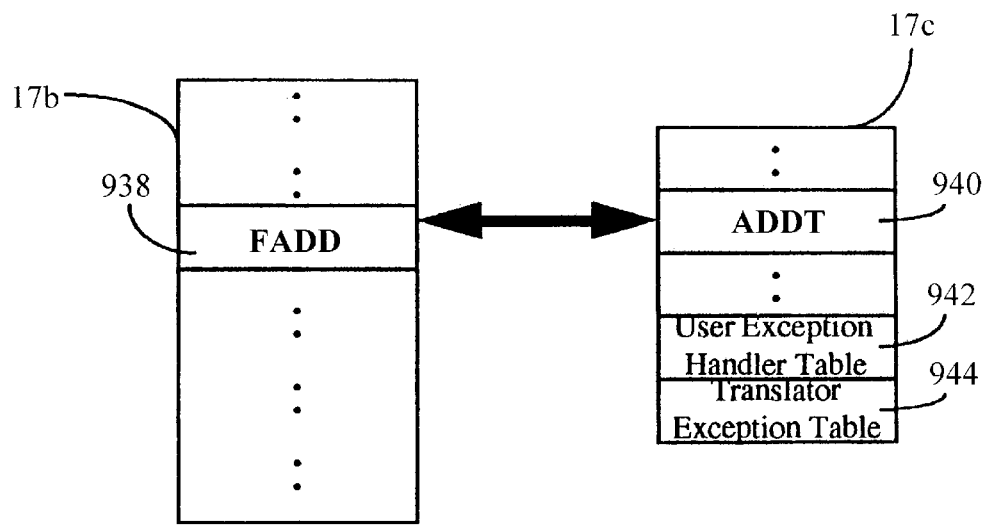
FIG. 71A is a block diagram depicting a translated image comprising tables used in exception handling.

In step 872 of FIG. 63, exception handler tables are generated to provide for proper run time control if an instruction in the translated binary image when executed generates a run time exception. Referring now to FIG. 71A, a diagram of a translated binary image 17c and its corresponding non-native binary image 17b are shown. The non-native image 17b has a floating point add (FADD) instruction 938. The binary image translator and optimizer 802 produce an equivalent instruction ADDT 940 in the translated binary image 17c. When executed, the translated instructions 940 can produce a run time exception, such as a floating point divide by 0 error, depending on the operand values at run-time. An exception handler is typically invoked when such a run-time condition occurs. The translated binary image 17c includes user exception handler tables 942 and translated exception tables 944. The user exception handler table 942 identifies a user routine address or handler to which control is transferred when a run-time exception occurs within a user routine or translation unit. The translator exception table 944 is used by the binary translation run-time system when an exception occurs as will be explained in following text.

The translator exception table 944 comprises one or more table entries.

Figures 71B, 71C:
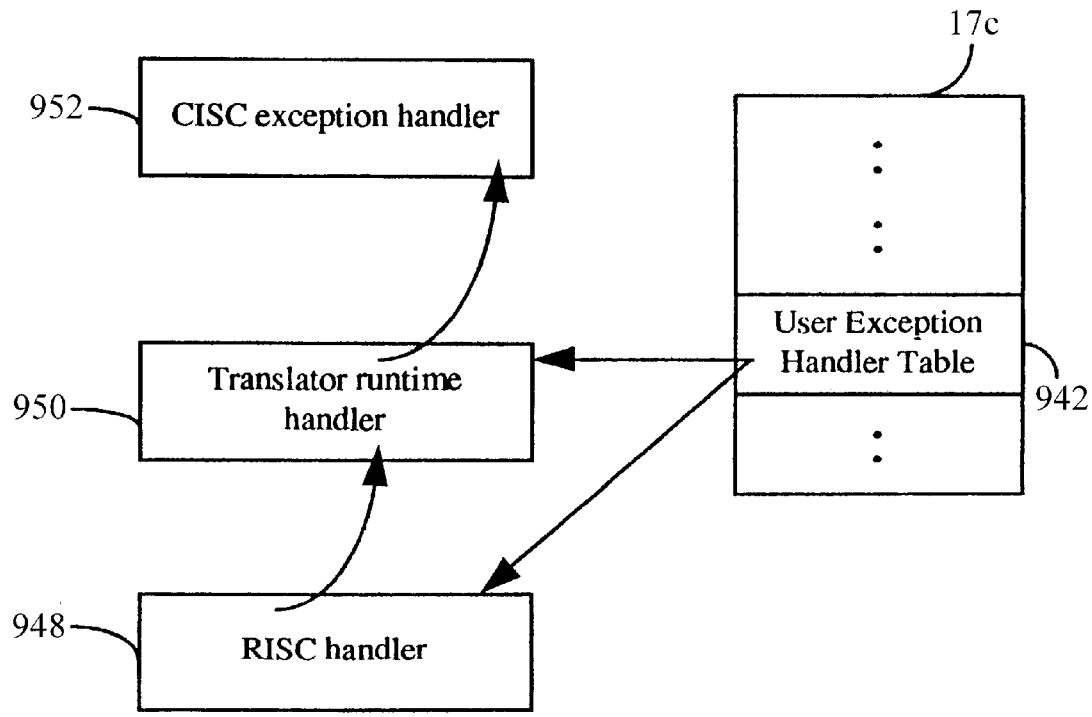
FIG. 71B is a block diagram depicting a table entry in a translator exception table.
FIG. 71C is a block diagram depicting run time transfer of control when a translated image is executed and an exception occurs.

Referring now to FIG. 71B, a diagram of the table entry for the translator exception table is shown. The table entry within the translator exception table 944 includes a first binary image address 946a, a count field 946b followed by one or more pairs of a CISC resource 946c and a corresponding RISC resource 946d. The first binary image address 946a corresponds to an address within the image 17b. The count field 946b indicates the number of resource pairs 946c to 946d that follow. The pairs of resource entries 946c and 946d identify, respectively, a CISC resource and a corresponding RISC resource. These entries are used at run time as will be described in conjunction with FIG. 71C.

Referring now to FIG. 71C the run time transfer of control when a run time exception occurs is shown. For example, a run time exception can occur when executing a translated binary image 17c, as with the ADDT instruction 940. At this point run time control passes to a standard portion of the operating system such as the RISC handler 948. The RISC handler reads the user exception handler tables 942 to obtain the address of a user specified handler to which run time control is transferred. The RISC handler 948 reads an address identifying a translator run time handler routine 950. The translator run time handler 950 is included as part of the binary translation system. The binary image translator and optimizer 802, when generating a translated binary image 17c, place the address of the translator run time handler routine 950 in the user exception handler table included in the translated binary image 17c. The user exception handler table is typically a standard part of an object file format of the translated binary image.

The translator run time handler routine 950 is a special routine included as part of the binary image translator. The translator run time handler 950 uses the information contained in the translator exception table 944 to map a RISC resource as included in the non-native binary image 17c to a CISC resource. The translator run time handler 950 transfers control to the appropriate CISC exception handler 952. At this point control transfers to the run-time system 32 to determine if the CISC exception handler 952 is translated, or if the run time interpreter must be invoked to execute the CISC exception handler 952.

TRANSLATOR-OPTIMIZER SUMMARY

The foregoing steps of optimization and translation are performed on a per translation unit basis. During the transformation from the initial IR produced in step 810 to the final binary image IR produced as a result of step 816, the intermediate data structures created and used by the binary image translator and optimizer 802 typically use a large amount of memory and additional computer system resources. To perform the translation and optimization upon the entire translation unit, rather than translate one translation unit at a time as in FIG. 63, would require a large amount of memory for the binary image translator and optimizer 802.

In summary, the steps of performing translation and optimization, as set forth in FIG. 63, and their particular order, as performed within a binary image transformer 800, are particularly dependent upon the instruction set of the non-native binary image 17b and the other machine instruction set of the translated binary image 17c. For example, special processing steps 852 through 858 are highly dependent upon the source instruction set used in the binary image 17b.

Additionally, other optimization and translation steps, such as step 856, which performs floating point optimization processing is highly dependent upon the instruction sets of both the non-native binary image 17b and the translated binary image 17c. The particular optimization steps and their respective order included, as in step 860, will typically vary with implementation enabling production of an efficiently executing binary translated image 17c.

An embodiment of the binary image transformer 800 may have only a portion of the planned functionality implemented and can still be used in binary translation. When the binary image transformer is under development, for example, a portion of the background translator and optimizer 802 may not be implemented. For example, one implementation of the binary image transformer does not perform processing for a floating point instruction in the CISC instruction set. As a result, the native binary image 17c does not comprise any translated floating point instructions. As a result, when executing the native binary image 17c, the run-time system always provides for interpretation of floating point instructions and control passed to the run-time interpreter for these instructions. Additionally, the binary image transformer contains special processing to ignore floating point instructions during the translation process. Such instructions would then be interpreted.

The foregoing techniques described for translation and optimization of a binary image affords a new and flexible way to perform translation and optimization of a binary image. Additionally, the technique is efficient in its use of computer system resources.

The foregoing technique is flexible in that the steps of optimization and translation can be intermixed and performed in a variety of different orderings. The intermediate representation affords this flexibility by not imposing undue restrictions or making assumptions about the state of an intermediate representation at various points during translation and optimization.

Using the foregoing intermediate representation decreases development and maintenance costs associated with a binary translation process. The foregoing single intermediate representation used throughout the binary translation process is a single IR having opcodes corresponding to both source and destination instruction sets. Since a single IR is used throughout the translation process, common service routines operating on the IR can be used throughout the binary translation process as contrasted with a more costly binary translation process having various IRs requiring multiple corresponding sets of service routines operating on the various IRs.

Having described preferred embodiments of the invention, it will now become apparent to those of skill in the art that other embodiments incorporating its concepts may be provided. It is felt therefore that this invention should not be limited to the disclosed embodiments but rather should be limited only by the spirit and scope of the appended claims.

PD96-0111
Chernoff et al.

APPENDIX A

GENERAL ORGANIZATION:

The pseudo code is organized as follows:

1. Profile, Profile_Call_Target_Iterator, Region and Translation_Unit class declarations
2. find_translation_units function
3. RegionEx and Region_Db class declarations
5. build_translation_unit function
6. visit_region function
7. merge_translation_units and merge_regions functions
8. Standard List and Set templates  **//

PD96-0111
Chernoff et al.

1. Profile, Profile_Call_Target_Iterator, Region and Translation_Unit

```
//** The pseudo code makes use of the following classes to
    access information in the Execution Profile. The
    implementation of these classes is not given here. **// class Profile {
    //** Return the set of call targets of the indirect
        transfer instruction at location @(xfer_instr_address).
        If there is no record in the profile for address
        @(xfer_instr_address) then return the empty set. **//
        Set<Address> target_set(Address xfer_instr_address);
};
//** Iterate over all the addresses in the profile which
    were the targets of calls (i.e. for which the
    RAW_PROFILE_RECORD_FLAGS_CALLED flag is set). **//
class Profile_Call_Target_Iterator {
    Profile_Call_Target_Iterator (Profile& profile);
    Address next_call();
};
//** The following classes are used to represent Translation
    Units and Regions. **//
class Region {
```

- 270 -

PD96-0111
Chernoff et al.

```
       public:

Region(Address entry);

//**Address of first byte covered by region **//

Address start_address;

5     //** Address of first byte after the region **//

Address end_address;

};

class Translation_Unit { public:

10         Translation_Unit();

Set<Address> entries;

Set<Region> regions;

};

//** Global set of translation units **//

15     Set<Translation_Unit> translation_units;
```

2. find_translation_units

```
       //** Given a profile the find_translation_units finds a set
           of translation units.  Every called location in the
           profile will be an entry of one of the translation
20         units in the returned set of translation units.  Every
           entry in the returned set is a called location in the
           profiles or the target of a call instruction reachable
```

- 271 -

PD96-0111
Chernoff et al.

from an entry of one of the translation units. This
function uses the function build_translation_unit which
follows. **/

//** Work list of addresses which are targets of call
5   instructions **//

Single_List<Address> call_target_list;

Set<Translation_Unit>& find_translation_units
            (Profile& profile)
{
10      translation_units = empty_set;
//** First process all locations in the profile which were
    the targets of call instructions in the executions
    which produced the profile. **//
    Profile_Call_Target_Iterator call_iterator(profile);
15      while (call_target = call_iterator.next_call())

translation_units.set_add(build_translation_unit(profile,
                                                call_target));
//** Now process locations which are the targets of call
20      instructions. **//
    while (!call_target_list.empty()) {
        Address call_target = call_target_list.first();
        call_target_list.remove_first();

- 272 -

PD96-0111
Chernoff et al.

```
            translation_units.set_add
            (build_translation_unit (profile, call_target));
        }
        return translation_units;
5   }
    3.  RegionEx and Region_Db
    //** An extension of Regions used in generating
    translation units **//
    class RegionEx : public Region {
10      public:
        enum Control_Flow {
            CF_NONE,
            CF_JUMP,
            CF_RETURN,
15          CF_FALL_THROUGH
        };
        RegionEx(Address entry, Translation_Unit&
    translation_unit)
            :
20          Region(entry),
            translation_unit(&translation_unit),
            control_flow(CF_NONE) {}
```

PD96-0111
Chernoff et al.

```
     //** The translation unit of which the region is a part **//
         Translation_Unit* translation_unit;
     //** Type of control flow which ends the region **//
         Control_Flow control_flow;
 5   }
     //** A collection or database of regions. **//
     Region_Db::add_region and Region_Db::delete_region
     //** Add and remove regions from the database. Other members
         of Region_Db provide access to regions based on their
10       start_address and end_address. The implementation of
         Region_Db is not given here. **//
     class Region_Db {
       public:
     //** Initially the Region_Db is empty **//
15       Region_Db();
         add_region(RegionEx& region);
         delete_region(RegionEx& region);
     //** Find region which covers a given address. (Note that in
         the presence of overlapping regions there may be more
20       than one region which covers a given address. In this
         case one of the covering regions is returned.) **//
         find_region(Address entry);
```

- 274 -

PD96-0111
Chernoff et al.

```
//** Return TRUE iff there is a region whose start_address
       is greater than region.start_address **//
       Boolean more_next(RegionEx& region);
//** Return TRUE iff there is a region whose start_address
       is less than region.start_address **//
       Boolean more_previous(RegionEx& region);
//** Return a reference to the region with the smallest
       start address greater than region.start_address **//
       RegionEx& next_region(RegionEx& region);
//** Return a reference to the region with the greatest
       start address smaller than region.start_address **//
       RegionEx& previous_region(RegionEx& region);
};
Region_Db region_db;
```

4. build_translation_unit

//** The following function builds a Translation Unit which
       includes entry *entry*. This is done by following the
       control flow, creating regions to cover all the
instructions which are reachable from the *entry*. This
       function uses visit_region which follows. In the
       process of following control flow, if it is found that
       a region of some other Translation Unit can be reached,

- 275 -

PD96-0111
Chernoff et al.

then that translation unit is merged with the translation unit being built. This maintains the property that every location is covered by a region from a single Translation Unit. Adjacent regions for the
5  Translation Unit being built are merged to maintain the property that regions are as big as possible. **//

```
       Translation_Unit* build_translation_unit(Profile& profile,
       Entry entry)
       {
10          Translation_Unit* translation_unit = new
                                   Translation_Unit;
            translation_unit->entries.set_set_add(entry);
            Single_List<Address> work;
            work.append(entry);
15          while (!work.empty()) {
                Address target_address = work.first();
                work.remove_first();
       //** Get region which covers the target_address **//
                RegionEx* region =
20          region_db.find_region(target_address);
       //** Does such a region already exist ? **//
                if (region == NULL) {
```

- 276 -

PD96-0111
Chernoff et al.

```
        //** Make one of no existing region **//
                region = new Region;
                region.translation_unit = translation_unit;
        //** If there is an existing region which ends at target
 5              address, merge it with region. We are extending an
                existing region having found that control can be
        transferred to the location at its end_address **//
                if (region_db.more_previous(region)) {
                        Region& previous_region =
10              (region_db.previous_region(region));
                        if (previous_region.region_end ==
                        region.region_start &&
                                previous_region.translation_unit ==
                                translation_unit)
15                              merge_regions(region,
                        previous_region);
                }
        //** Extend the region to include all locations which can be
                reached from target_address following sequential
20              control flow. **//
                        visit_region(region, work);
        //** Is the extended region adjacent to another region? **//
                if (region_db.more_next(region)) {
```

- 277 -

PD96-0111
Chernoff et al.

```
          //** There is an adjacent following region **//
                      Region& following_region =
              (region_db.next_region(region));
                      if (region.region_end ==
 5              following_region.region_start) {
              //** It's adjacent. If the extended region ends in an
              instruction with sequential control flow and the  adjacent
              region is from another translation unit, then     we need to
              merge the translation units. Otherwise
10                 just need to merge the extended region with the
              following adjacent region. **//
                      if (region.control_flow ==
                  Region::CF_FALL_THROUGH &&
              following_region.translation_unit !=
15            translation_unit)
                              merge_translation_units(
                          translation_unit,
                              *following_region.translation_unit);
                          else if
20            (following_region.translation_unit ==
              translation_unit)
                              merge_regions(region,following_region);
                      }
```

- 278 -

PD96-0111
Chernoff et al.

```
                }
            } else
    //** An existing region covers the target address. If it's
        from another translation_unit we need to merge the
5       translation_units **//
                if (region.translation_unit != translation_unit)
                    merge_translation_units(translation_unit,
                        region.translation_unit);
            }
10      return translation_unit;
    }

5.  visit_region
    //** Expand the region to the next unconditional control
        transfer (jump or return) or until the beginning of the
15      following region. Add targets of  control transfers to
        work list. **/
    void visit_region(Profile& profile, RegionEx& region,
    Set<Address>& work)
    {
20      RegionEx* following_region = 0;
        if (region_db.more_next(region))
            following_region = &region_db.next_region(region);
        Address address = region.end_address;
```

- 279 -

PD96-0111
Chernoff et al.

```
        while (1) {
            switch (instruction(address).opcode()) {
    //** instruction(address).opcode() is the opcode of the
            instruction at address in the source image. For the
5           purpose of this pseudo code, a particular set of
    opcodes are used, but the method applies to any similar
            instruction set. **//
            case illegal opcode:
    //** This location doesn't contain an instruction **//
10              return;

case JMP direct:
                {
    //** Unconditional flow, add target address to work list and
            end the region **//
15              Address target_address =
    instruction(address).target_address();
                work.append(target_address);
                region.control_flow = Region::CF_JUMP;
                goto end_region;
20              }
            case JMP indirect:
                {
```

- 280 -

```
                                                PD96-0111
                                              Chernoff et al.
       //** Indirect transfer of control, add indirect targets
           obtained from profile to work list and end the
           region **//
                    for (Set<Address_Iterator>
 5         iter(profile.target_set(address));
                            iter.more();
                            iter.next())
                        work.append(iter.current());
                    region.control_flow = Region::CF_JUMP;
10                  goto end_region;
                }
            case RET:
                {
       //** Return - ends the region and this control flow path**//
15                  region.control_flow = Region::CF_RETURN;
                    end_region:
                        region.region_end = address +
                            instruction(address).length();
       //** instruction(address).length() is the length of the
20         instruction at address **//
                    return;
                }
            case Jcc:
```

- 281 -

PD96-0111
Chernoff et al.

```
             case LOOP/LOOPcond:
                {
        //** Conditional flow **//
                    Address target_address =
  5                   instruction(address).target_address();
                    work.append(target_address);
                    goto fall_through_control_flow;
                }
             case CALL:
 10             {
        //** Call instruction **//
                    Translation_Unit* translation_unit =
                    region.translation_unit;
                    if (instruction(address).direct()) {
 15     //** Direct call, add target address to call_target_list.
            Note that this instruction may not have been executed
            and there may not be an entry in the profile which
            indicates that the target address was called.
        Therefore save the target_address on call_target_list  and
 20     will generate a translation unit for later **//
                    Address target_address =
                 instruction(address).target_address();
                        call_target_list.append(target_address);
```

- 282 -

PD96-0111
Chernoff et al.

```
            } else {
//** Indirect call. No need to do anything since any
indirect target occurs in the profile as the target of
    a call. **//
            }
//** Fall through. This assumes that the call can return.
    This assumption can be false leading visit_region to
    parse a region of the image which doesn't contain
    code. **//
        }
      default:
        {
//** The instruction at address has fall through control
    flow **//
            fall_through_control_flow:
                region.region_end = address +
            instruction(address).length();
//** If this region is adjacent to the following region the
    regions must be merged. This is done in
build_translation_unit on return from visit_region **//
            if (following_region &&
                (region.region_end == following_region->
                region_start)){
```

- 283 -

PD96-0111
Chernoff et al.

```
            {region.control_flow =

Region::CF_FALL_THROUGH;

return;

}
5      //** Either we have not yet reached the following region or
          this region overlaps with the following region.
       Overlapping regions are detected latter in the
       translation process. **// break;
10        }
        }
          address += instruction(address).length();
        }
      }
15   6. merge_translation_units
     //** Merge two translation units. All entries of unit2
          become entries of unit1. All regions of unit2 become
          regions of unit1. Regions are merged as necessary to
          maintain the invariant that there are never two
20        adjacent regions which are from the same translation  unit.
       Unit2 is removed from translation_units. **/
```

PD96-0111
Chernoff et al.

```
    void merge_translation_units(Translation_Unit& unit1,
    Translation_Unit& unit2)
    {
        unit1.entries = Set<Address>.set_union(unit1.entries,
5       unit2.entries);
    //** Make all of unit2's regions into regions of unit1 **//
        for (Set<Region_Iterator> iter(unit2.regions);
             iter.more();
             iter.next()) {
10          RegionEx* region = (RegionEx*) iter.current();
            region.translation_unit = unit1;
    //** Merge with preceding region if both regions are now
        regions of unit1 **//
            if (region_db.more_previous(region)) {
15              Region& previous_region =
    (region_db.previous_region(region));
                if (previous_region.region_end ==
        region.region_start &&
                    previous_region.translation_unit == unit1)
20                  merge_regions(region, previous_region);
            }
    //** Merge with following region if both regions are now
        regions of unit1 **//
```

- 285 -

PD96-0111
Chernoff et al.

```
             if (region_db.more_next(region)) {
                 Region& following_region =
         (region_db.next_region(region));
                 if (region.region_end ==
5        following_region.region_start &&
                     following_region.translation_unit == unit1)
                     merge_regions(region, following_region);
             }
         }
10       translation_units.delete(unit2);
     }
``` merge regions

```
     //** Merge two adjacent regions. This routine can only be
         called when region1.end_address region2.start_address.
15       The end_address of region1 is extended to include all
         of region2 and region2 is removed from region_db.**//
     void merge_regions(RegionEx& region1, RegionEx& region2)
     {
         region1.end_address = region2.end_address;
20       region_db.delete_region(region2);
```

7. Standard List and Set templates

```
template <class T>
```

- 286 -

```
                                                        PD96-0111
                                                        Chernoff et al.

class Single_List {
        public:
        //** A list is constructed as empty. **//
            Single_List();
   5    //** A list can be inspected to see if it is empty. **//
            Boolean empty() const;
        //** A value can be added to a list. **//
            void prepend(const T& value);
            void append(const T& value);
  10    //** The list can be set to empty. **//
            void remove_all();
        //** A reference to the value of the first list element can
            be obtained.  An error is generated if the list is
            empty. **//
  15        T& first() const;
        //** The first list element can be removed from the list.
            An error is generated if the list is empty. **//
            void remove_first();
        //** When a list is destructed, a @p(remove_all) is
  20    implicitly performed. **//
            Single_List();
      };
      template <class T>
```

- 287 -

PD96-0111
Chernoff et al.

```
      class Single_List_Iterator {
        public:
          Single_List_Iterator(const Single_List<T>& l);
        //** The iterator can be inspected to see if it has reached
  5            the end of the list. **//
          Boolean more() const;
        //** The current list element that the iterator is on can be
                accessed **//
          T& current() const;
 10     //** The iterator can be stepped to the next element in the
                list **//
          void next();
      };
      template<class T>
 15   class Set {
        public:
      //** A Set is constructed empty **//
          Set();
      //** Add @(element) to set **//
 20       void set_add(T& element);
      //** Delete @(element) from set **//
          void set_delete(T& element);
      //** Add all elements of set @(a) to set **//
```

- 288 -

PD96-0111
Chernoff et al.

```
     void set_union(Set<T>& a);
//** Remove all elements of @(a) from set **//
     void set_diff(Set<T>& a);
//** Return TRUE iff the set is empty **//
     Boolean empty();
};

template<class T>
class Set_Iterator {
     Set_Iterator(Set<T>& a);
//** Move to next element **//
     void next();
//** Return TRUE is there are more elements **//
     Boolean more();
//** Return the current element **//
     T* current();
};
```

```
                                                           PD96-0111
                                                           Chernoff et al.
         void request_global_data_flow(Routine r)
         {
                 /** The following pseudo-code is based upon the method
                     for performing global data flow analysis as
    5                described in "Efficiently Computing Static Single
                     Assignment Form and the Control Dependence Graph",
                     by Ron Citron et al. The steps depicted in this
                     routine are outlined in
                     FIG 55.
   10            **/

/**
                         -------FIG. 55 STEP 746 ------
                     All the global data flow connections between BBSCs
                     must be absent.  Cleanup from any prior global
   15                data flow analysis.
                 **/
                 ensure_all_global_data_flow_connections_deleted();

/**
                         -------FIG. 55 STEP 748 ------
   20                Compute the Dominator Tree for the routine.
                 **/
```

- 290 -

PD96-0111
Chernoff et al.

```
compute_dom(r);

/**

-------FIG. 55 STEP 750 ------

Compute the Dominance Frontier for the routine.
5       **/ compute_domf(r);

/**

-------FIG. 55   STEP 752 ------

Ensure that the local data flow summary 10      information is up to date.  Perform any local data flow analysis  not already computed for all basic blocks (BBs) comprising the routine "r".

**/ for (Each bb in Routine r; bb(r); bb(); bb++) {

15      ensure_local_data_flow_summary_computed(bb);

}

/**

-------FIG. 55   STEP 754 ------

Calculate merge points and add any needed merge 20      point definitions.  As described in the paper by
```

- 291 -

PD96-0111
Chernoff et al.

Citron et al., "phi-functions" are a special form of assignment placed at join nodes or merge points. To place a phi-function is to determine where merge points for merging definitions occur.

**/ place_phi_functions(r);

/**

The global data flow connections are made by traversing the dominator tree starting at the start_block of the dominator tree. Each state container, SC has a stack attribute that is used by this algorithm. Initially the stacks are empty. The following FOR loop performs the initialization of the SC stack attributes.

**/ for (Routine_Sc_Iterator sc(r); sc(); sc++) {
    sc.stack().set_empty();
}
/**

-------FIG. 55 STEP 756 ------

Make global data flow (GDF) connections

**/

```
                                                    PD96-0111
                                                    Chernoff et al.
       connect_phi_functions(r.start_block());
    };

/*************************************************************
    ***/
 5  void place_phi_functions(Routine r)
    {
       /**  Determine merge points within a routine of a
            program.
            The method steps performed by this function are
10          outlined in FIGs. 56A and 56B
         **/
         /**
            The attribute processed_sc is used by this
         algorithm to mark a BB as already having a
15       definition on the work list. Initially no BB is
         marked.  The FOR loop below initializes this list.
         **/
         for (each BB in routine r; bb(r); bb(); bb++) {
            bb.processed_sc() = 0;
20       }
         /**
            Phi functions are placed for each SC in turn.
```

- 293 -

PD96-0111
Chernoff et al.

Walk the list of state containers, SCs, for this
routine r to accumulate a list of data definitions
defined within this routine r. Basic blocks which
provide global definition used outside the basic
block are placed on a work list, "work", described
below.
**/
for (each Sc of this routine r; sc(r); sc(); sc++) {
/**
The work list of BBs to be processed is
maintained.
**/
List<Bb> work;

/**
The basic block state containers (BBSCs) of the SC
are visited to intially seed the work list.
At the same time it is determined if the SC is
upwardly exposed from any BB. If it is not then
there is no global data flow connectivity.
* NOTE *: This is in addition to that
described in the paper by Citron et al.
**/

- 294 -

PD96-0111
Chernoff et al.

```
        Boolean has_upward_exposure = FALSE;

for (each BBSC associated with the current SC;

bbsc(sc); bbsc(); bbsc++) { switch (bbsc.local_kind()) {

5             case NO_LOCAL_ACCESS:

/**

Delete merge BBSCs left over from previous global data flow computations.

**/

10             bbsc.free();

break;

case LOCAL_READ:

has_upward_exposure = TRUE;

break;

15          case LOCAL_READ_AND_WRITE:

case LOCAL_READ_MODIFY_WRITE:

has_upward_exposure = TRUE;

case LOCAL_WRITE:

{

20             /**

A definition is added to the work list if not already on the work list, as indicated by marker processed_sc.
```

- 295 -

PD96-0111
Chernoff et al.

```
            **/
            Sc& processed_sc =
                bbsc().bb().processed_sc();
            if (processed_sc != sc) {
                processed_sc = sc;
                work.prepend(bb);
            }
            break;
        }
    }
};
if (has_upward_exposure) {
    /**
        Only if upward exposure can there be global
        connectivity, even if there are definitions.
    **/
    while (!work()) {
        /**
            Add merge points using the Dominance
            Frontier.  Any additional BBSCs which
            are needed to represent merge points are
            created.  These BBSCs are created with
            "no local access" since they function
```

- 296 -

PD96-0111
Chernoff et al.

only as merge points and are not actually referenced within the BB with which the BBSC is associated.

\*\*/

```
5           for(Domf_Bb_Iteratorbb(work.remove_first());
                bb(); bb++) {
              if (bb.processed_sc() != sc) {
                 bb.alloc_bbsc(sc, NO_LOCAL_ACCESS);
                 bb.processed_sc() = sc;
10               work.prepend(bb);
              }
            }
          }
        }
15    }
    };
    /*************************************************
    ***/
    connect_phi_functions(Ir_Bb bb)
20    {
        /**
          Entering a BB while traversing the Dominator Tree.
          For  every SC that the BB defines, push the BB on
```

- 297 -

PD96-0111
Chernoff et al.

```
            the SC's stack.  The stack represents a layered list of SCs defined within the BB, top of stack being most recent definition for the SC.

**/

5     for (each bbsc of this BB; bbsc(bb); bb(); bb++) { switch (bbsc.local_kind()) { case LOCAL_READ:

/ Not a definition. / break;

10           case NO_LOCAL_ACCESS:

/ Put here to act as a true phi function, so, a definition / case LOCAL_READ_AND_WRITE:

case LOCAL_READ_MODIFY_WRITE:

15           case LOCAL_WRITE:

bbsc.sc().stack().push(bb);

break;

}

}

20     /**

Now visit every BB that this BB has a control flow edge (CFE) to.  For each of these, iterate over the BBSCs.  For each BBSC that upwardly exposes
```

PD96-0111
Chernoff et al.

the SC, connect a global data flow edge to the
definition BB along that control flow edge (the
top entry on the SC stack).
\*\*/

```
for (each other BB to which a first BB has a CFE;
     Bb_Out_Cfe cfe(bb); cfe(); cfe++) {
    for (Bb_Bbsc_Iterator bbsc(cfe.target());
      bbsc();bbsc++){
        switch (bbsc.local_kind()) {
          case LOCAL_READ:
          case NO_LOCAL_ACCESS:
            /** Put here to act as a true phi function:
                so a read. **/
          case LOCAL_READ_AND_WRITE:
          case LOCAL_READ_MODIFY_WRITE:
            /**
                Create global data flow (GDF) connection
                or edge between definition and
            reference/use.
            **/
            connect(cfe, bbsc);
            break;
          case LOCAL_WRITE:
```

- 299 -

```
                                            PD96-0111
                                            Chernoff et al.
            /**
                No upward exposure so no global data
                flow connection.
            **/
5           break;
          }
        }
      }
      /**
10        Continue the depth first traversal of the
      Dominator Tree and recursively call this function
          to create all GDF during this traversal of BB
          nodes of the dominator tree
      **/
15      for (Bb_Dom_Children_Iterator
      child_bb(Bb_Dom::bb_dom(bb));             child_bb();
      child_bb++) {
            connect_phi_functions(child_bb);
        }
20      /**
            Clean-up.  For every SC we pushed an entry on its
            stack, pop the entry.
        **/
```

- 300 -

PD96-0111
Chernoff et al.

```
        for (Bb_Bbsc_Iterator bbsc(bb); bb(); bb++) {
            switch (bbsc.local_kind()) {
              case LOCAL_READ:
                / Not a definition. /
5               break;
              case NO_LOCAL_ACCESS: /** Put here to act as a
                true phi function: so a definition.  **/
              case LOCAL_READ_AND_WRITE:
              case LOCAL_READ_MODIFY_WRITE:
10            case LOCAL_WRITE:
                bbsc.sc().stack().pop();
                break;
            }
        }
15    };
      /***************************************************
      ***/
      void connect(Cfe cfe, Bbsc use)
      {
20      /**
            Create GDF edge/connection between a global definition
            and its use or reference in another BB different from
            the defining BB.
```

- 301 -

PD96-0111
Chernoff et al.

```
        **/

Bbsc def;

Sc sc(use.sc());

/**
5           The definition BB is the top entry on the SC's stack. If the stack is empty then the SC is uninitialized, so we use the start block as the definition.

**/

10      if (sc.stack().isEmpty()) {

/** Use of uninitialized SC. **/

Bb start_bb(sc.routine().start_block());

sc.stack().push(start_bb);

def = Bbsc::alloc(start_bb, sc, NO_LOCAL_ACCESS);

15          /**

An implementation can add an UNINIT instruction in start block if desired to indicate use of an unitialized SC within this BB to provide additional GDF information, if needed. **/

20      } else def = Bbsc::alloc(sc.stack().top(), sc);

Bbsc::connect_global_data_flow(def, use);

/**
```

```
                                            PD96-0111
                                         Chernoff et al.
          An implementation can also record the control flow
          edge along which the definition is flowing, if
          this GDF information is used by an implementation
          in performing an optimization.
5         **/
     };
     /**********************************************************/
```

What is claimed is:

1. A method for maintaining a plurality of condition codes bits in an unevaluated state comprising the steps of:

storing, in response to an execution of a condition code modifying instruction, a first table of methods including an entry for each of said plurality of condition code bits which are associated with said condition code modifying instruction, said methods providing access to evaluation routines which, when executed, modify one or all of said plurality of condition code bits; and providing a first pointer to said first table of methods.

2. The method of claim 1 wherein said method further includes the steps of:

providing a second table of methods including an entry for each of said plurality of condition code bits which are associated with a previously executed condition code modifying instruction, said methods providing access to evaluation routines which, when executed, modify one or all of said plurality of condition code bits; and providing a second pointer to said second table of methods.

3. The method of claim 2 further including the steps of:

storing a first group of selected data, in response to said execution of said condition code modifying instruction and associated with said first pointer; and providing a second group of selected data, corresponding to said previously executed condition code modifying instruction and associated with said second pointer.

4. The method of claim 3, wherein said first table of methods includes an entry for each of eight available conditional branch predicates, an entry to obtain a nibble carry bit and an entry to receive a set of said plurality of condition code bits.

5. The method of claim 4, wherein said second table of methods includes an entry for each of eight available conditional branch predicates, an entry to obtain a nibble carry bit and an entry to receive a set of said plurality of condition code bits.

6. The method of claim 3, wherein said first group of selected data provides sufficient information to determine an appropriate modification to each of said plurality of condition code bits which are associated with said condition code modifying instruction.

7. The method of claim 6, wherein said second group of selected data provides sufficient information to determine an appropriate modification to each of said plurality of condition code bits which are associated with said previously executed condition code modifying instruction.

8. An apparatus for maintaining a plurality of condition codes bits in an unevaluated state comprising:

means for storing, in response to an execution of a condition code modifying instruction, a first table of methods including an entry for each of said plurality of condition code bits which are associated with said condition code modifying instruction, said methods providing access to evaluation routines which, when executed, modify one or all of said plurality of condition code bits; and means for providing a first pointer to said first table of methods.

9. The apparatus of claim 8 further including:

means for providing a second table of methods including an entry for each of said plurality of condition code bits which are associated with a previously executed condition code modifying instruction, said methods providing access to evaluation routines which, when executed, modify one or all of said plurality of condition code bits; and means for providing a second pointer to said second table of methods.

10. The apparatus of claim 9 further including:

means for storing a first group of selected data, in response to said execution of said condition code modifying instruction and associated with said first pointer; and means for providing a second group of selected data, corresponding to said previously executed condition code modifying instruction and associated with said second pointer.

11. The apparatus of claim 10, wherein said first table of methods includes an entry for each of eight available conditional branch predicates, an entry to obtain a nibble carry bit and an entry to receive a set of said plurality of condition code bits.

12. The apparatus of claim 11, wherein said second table of methods includes an entry for each of eight available conditional branch predicates, an entry to obtain a nibble carry bit and an entry to receive a set of said plurality of condition code bits.

13. The apparatus of claim 10, wherein said first group of selected data provides sufficient information to determine an appropriate modification to each of said plurality of condition code bits which are associated with said condition code modifying instruction.

14. The apparatus of claim 13, wherein said second group of selected data provides sufficient information to determine an appropriate modification to each of said plurality of condition code bits which are associated with said previously executed condition code modifying instruction.

15. An arrangement for use in a computer system for maintaining a plurality of condition codes bits in an unevaluated state comprising:

a data structure, said data structure comprising:

at least one evaluation routine which, when executed, modifies at least one of said plurality of condition code bits;

a table of methods including at least one entry corresponding to said at least one of said plurality of condition code bits associated with an executed condition code modifying instruction, said at least one entry identifying said at least one evaluation routine; and a pointer, associated with said executed condition code modifying instruction, identifying said table of methods.

16. The arrangement of claim 15 further including:

means for storing selected data, associated with said executed condition code modifying instruction, with said data providing sufficient information to determine an appropriate modification to said at least one of said plurality of condition code bits.

17. The arrangement of claim 16 wherein said pointer and said means for storing being included in said data structure.

18. The arrangement of claim 16 wherein said pointer and said means for storing being implemented in a plurality of registers in said computer system.

* * * * *